July 28, 1959 J. G. PEARCE ET AL 2,897,283

MULTIOFFICE INTERLOCKED SIGNALING TELEPHONE SYSTEM

Filed April 18, 1958 54 Sheets-Sheet 1

INVENTORS.
JAMES GORDON PEARCE
MATTHEW P. TUBINIS
BY F. H. Henson
ATTORNEY

PULSE CHART

July 28, 1959 J. G. PEARCE ET AL 2,897,283

MULTIOFFICE INTERLOCKED SIGNALING TELEPHONE SYSTEM

Filed April 18, 1958

54 Sheets-Sheet 7

July 28, 1959 J. G. PEARCE ET AL 2,897,283

MULTIOFFICE INTERLOCKED SIGNALING TELEPHONE SYSTEM

Filed April 18, 1958

54 Sheets-Sheet 8

July 28, 1959 J. G. PEARCE ET AL 2,897,283

MULTIOFFICE INTERLOCKED SIGNALING TELEPHONE SYSTEM

Filed April 18, 1958 54 Sheets-Sheet 13

July 28, 1959 J. G. PEARCE ET AL 2,897,283

MULTIOFFICE INTERLOCKED SIGNALING TELEPHONE SYSTEM

Filed April 18, 1958 54 Sheets-Sheet 16

July 28, 1959 J. G. PEARCE ET AL 2,897,283

MULTIOFFICE INTERLOCKED SIGNALING TELEPHONE SYSTEM

Filed April 18, 1958 54 Sheets-Sheet 17

July 28, 1959 J. G. PEARCE ET AL 2,897,283

MULTIOFFICE INTERLOCKED SIGNALING TELEPHONE SYSTEM

Filed April 18, 1958 54 Sheets-Sheet 20

July 28, 1959 J. G. PEARCE ET AL 2,897,283

MULTIOFFICE INTERLOCKED SIGNALING TELEPHONE SYSTEM

Filed April 18, 1958 54 Sheets-Sheet 21

July 28, 1959 J. G. PEARCE ET AL 2,897,283

MULTIOFFICE INTERLOCKED SIGNALING TELEPHONE SYSTEM

Filed April 18, 1958 54 Sheets-Sheet 24

July 28, 1959 J. G. PEARCE ET AL 2,897,283

MULTIOFFICE INTERLOCKED SIGNALING TELEPHONE SYSTEM

Filed April 18, 1958 54 Sheets-Sheet 29

July 28, 1959 J. G. PEARCE ET AL 2,897,283

MULTIOFFICE INTERLOCKED SIGNALING TELEPHONE SYSTEM

Filed April 18, 1958 54 Sheets-Sheet 30

July 28, 1959 J. G. PEARCE ET AL 2,897,283

MULTIOFFICE INTERLOCKED SIGNALING TELEPHONE SYSTEM

Filed April 18, 1958 54 Sheets-Sheet 31

July 28, 1959 J. G. PEARCE ET AL 2,897,283

MULTIOFFICE INTERLOCKED SIGNALING TELEPHONE SYSTEM

Filed April 18, 1958 54 Sheets-Sheet 32

July 28, 1959 J. G. PEARCE ET AL 2,897,283

MULTIOFFICE INTERLOCKED SIGNALING TELEPHONE SYSTEM

Filed April 18, 1958 54 Sheets-Sheet 34

July 28, 1959 J. G. PEARCE ET AL 2,897,283

MULTIOFFICE INTERLOCKED SIGNALING TELEPHONE SYSTEM

Filed April 18, 1958 54 Sheets-Sheet 35

July 28, 1959 J. G. PEARCE ET AL 2,897,283

MULTIOFFICE INTERLOCKED SIGNALING TELEPHONE SYSTEM

Filed April 18, 1958 54 Sheets-Sheet 36

HYBRID CIRCUITS

July 28, 1959 J. G. PEARCE ET AL 2,897,283

MULTIOFFICE INTERLOCKED SIGNALING TELEPHONE SYSTEM

Filed April 18, 1958

54 Sheets-Sheet 42

July 28, 1959 J. G. PEARCE ET AL 2,897,283

MULTIOFFICE INTERLOCKED SIGNALING TELEPHONE SYSTEM

Filed April 18, 1958 54 Sheets-Sheet 43

July 28, 1959 J. G. PEARCE ET AL 2,897,283

MULTIOFFICE INTERLOCKED SIGNALING TELEPHONE SYSTEM

Filed April 18, 1958

54 Sheets-Sheet 44

QUEUE STORE DISTRIBUTOR (1,2, OR R.O.)

NOTE. MK(+) USED FOR READOUT DISTRIBUTOR
MK(-) USED FOR DISTRIBUTOR 1 & 2

July 28, 1959 J. G. PEARCE ET AL 2,897,283

MULTIOFFICE INTERLOCKED SIGNALING TELEPHONE SYSTEM

Filed April 18, 1958

54 Sheets-Sheet 50

July 28, 1959 J. G. PEARCE ET AL 2,897,283

MULTIOFFICE INTERLOCKED SIGNALING TELEPHONE SYSTEM

Filed April 18, 1958 54 Sheets-Sheet 51

July 28, 1959 J. G. PEARCE ET AL 2,897,283

MULTIOFFICE INTERLOCKED SIGNALING TELEPHONE SYSTEM

Filed April 18, 1958

54 Sheets-Sheet 54

United States Patent Office
2,897,283
Patented July 28, 1959

2,897,283

MULTIOFFICE INTERLOCKED SIGNALING TELEPHONE SYSTEM

James G. Pearce, Rochester, and Matthew P. Tubinis, Penfield, N.Y., assignors to General Dynamics Corporation, Rochester, N.Y., a corporation of Delaware Application April 18, 1958, Serial No. 729,351
24 Claims. (Cl. 179—18)

This invention relates in general to telephone systems and, more particularly, to multioffice interlocked signaling telephone systems.

Many telephone systems of the prior art utilize voice frequency signaling for the transmittal of line selecting information from a register sender in an originating office to and through tandem offices to a terminating office. In most of these systems, no means is provided for interlocking the signaling between the register sender and the registers in the tandem and terminating offices since physical wire toll lines are used to interconnect the various offices. In military applications, or in systems where rough terrain separates the various offices of a telephone system, it is often necessary to use radio links to interconnect the various offices of the system. Since radio links are subject to fading, it may happen in some cases that transmitted voice frequency signals are completely lost and, in other cases, that a single pair of voice frequency signals representing a single digit designation are received as two pairs of signals representing two digits having the same numerical value. In either event, the result is the registration of incorrect line selecting information in the registers of the tandem and terminating offices.

Accordingly, it is the general object of this invention to provide a new and improved telephone system.

It is a more particular object of this invention to provide a new and improved multioffice telephone system in which the signaling between offices of the system is completely interlocked.

In accordance with the present invention, the register sender in the originating office functions to transmit a voice frequency seize signal to the called office until a voice frequency seize acknowledge signal is received from that office signifying that an incoming register in the called office has been seized and is in readiness to receive digit information, to then transmit a compound voice frequency digit designation signal until a voice frequency digit acknowledge signal is received from the called office, and to then transmit a second seize signal to the called office for the purpose of enabling the incoming register to control the switching equipment in the called office to further extend the connection. The second seize signal received by a particular called office is not acknowledged in that office but, rather, is acknowledged in the next succeeding office when an incoming register is connected to the extended connection in that office. The incoming registers in each tandem office and in the terminating office are arranged to transmit a different compound voice frequency digit acknowledgment signal for each digit designation signal received. If the digit acknowledgment signal received by the register sender is correct for the digit designation signal transmitted, the register sender transmits a second seize signal as stated above. However, if the digit acknowledgment signal received by the register sender is incorrect for the digit designation signal transmitted, the register sender transmits a cancel signal to the called office and then retransmits the canceled digit designation. Thus, it can be seen that digits cannot be lost due to radio link fading since each digit designation is transmitted until it is acknowledged, that a single digit cannot be registered as two digits of the same numerical value since a seize signal is transmitted between digit designations, and that the numerical value of the digit registered by the incoming register is checked before the incoming register is enabled to further extend the connection in accordance with the registered digit designation.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise 52 figures on 54 sheets.

Fig. 1 shows the trunking diagram of a telephone system in which the invention may be embodied.

Figs. 2A, 2B, and 2C, when arranged as shown in Fig. 3B, show a long distance switching center in block diagram form.

Fig. 3A is a pulse chart of control pulses used in the disclosed system.

Figs. 4–10, inclusive, when arranged as shown in Fig. 3B, show details of a line terminating unit for use in a long distance switching center.

Figs. 11 and 12, when arranged with Fig. 12 to the right of Fig. 11, show circuit details of a seize and release scan circuit for use in a long distance switching center.

Figs. 13–17, inclusive, when arranged as shown in Fig. 3B, show details of a transmission highway monitor circuit for use in long distance switching center.

Figs. 18–20, inclusive, when arranged as shown in Fig. 3B, show details of a control counter circuit and a calling unit finder circuit for use in a long distance switching center.

Figure 3A:
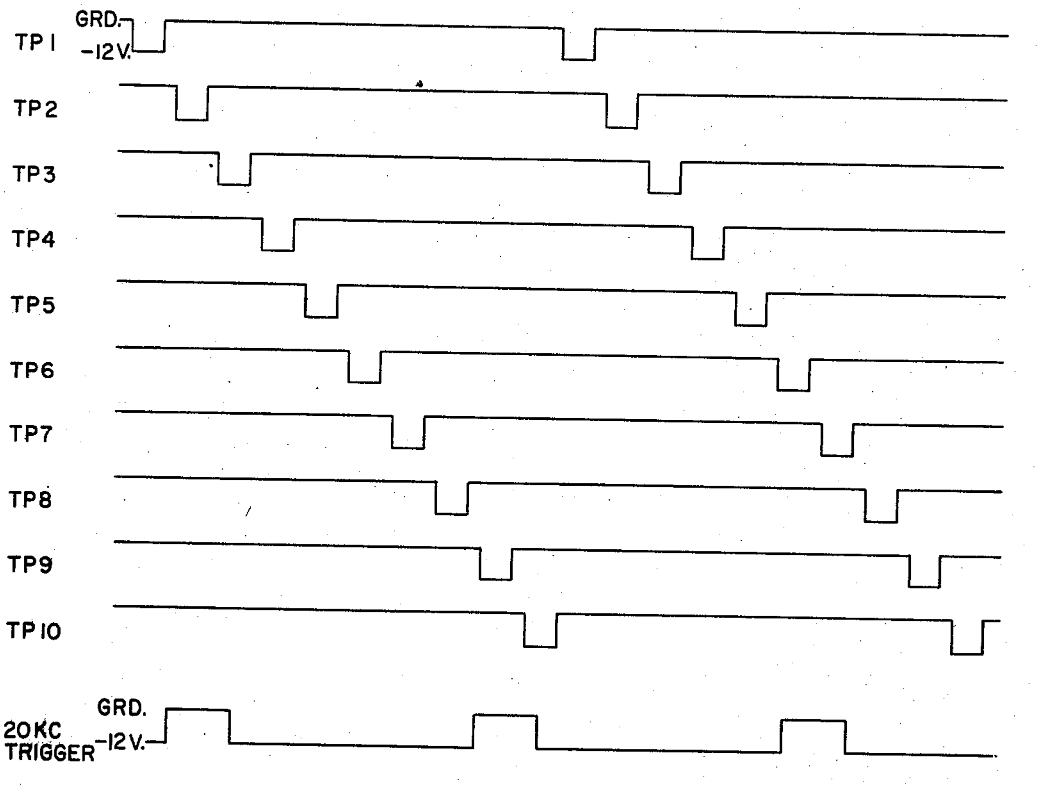
Figure 3B:
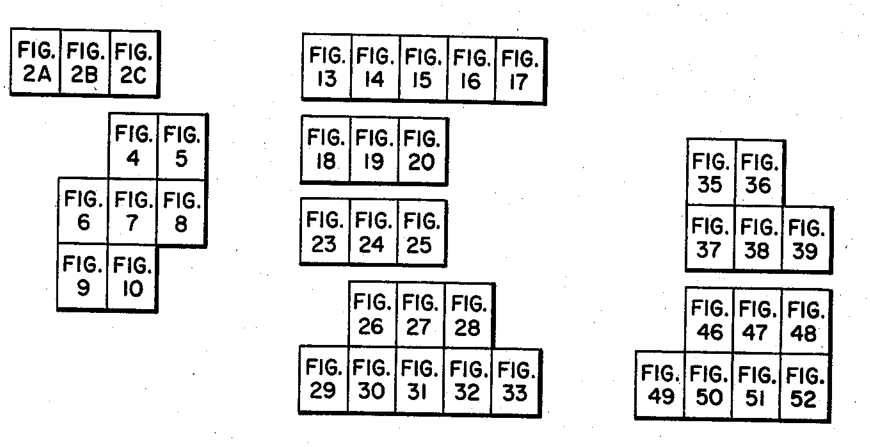
Figure 23:
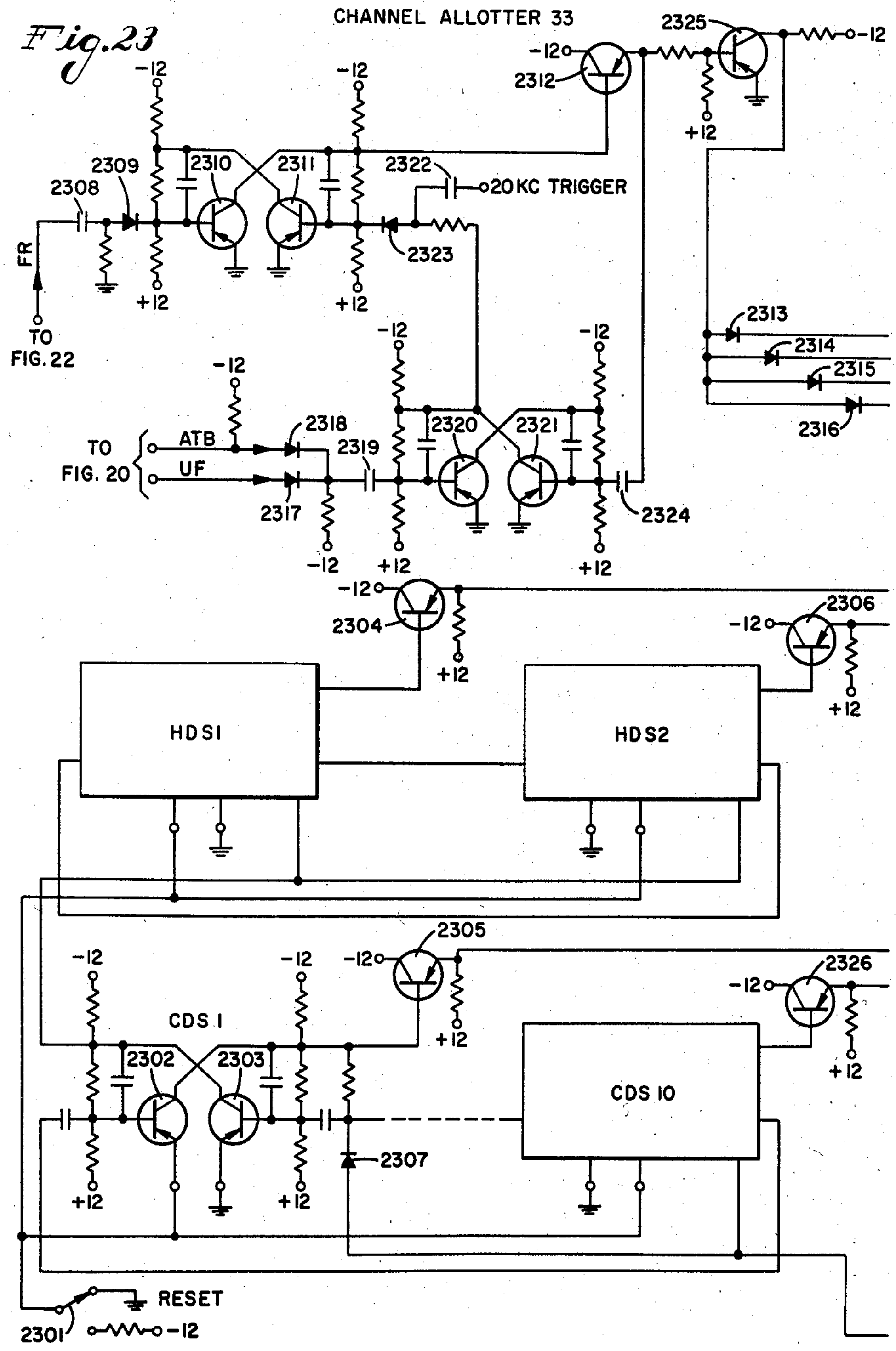
Figure 24:
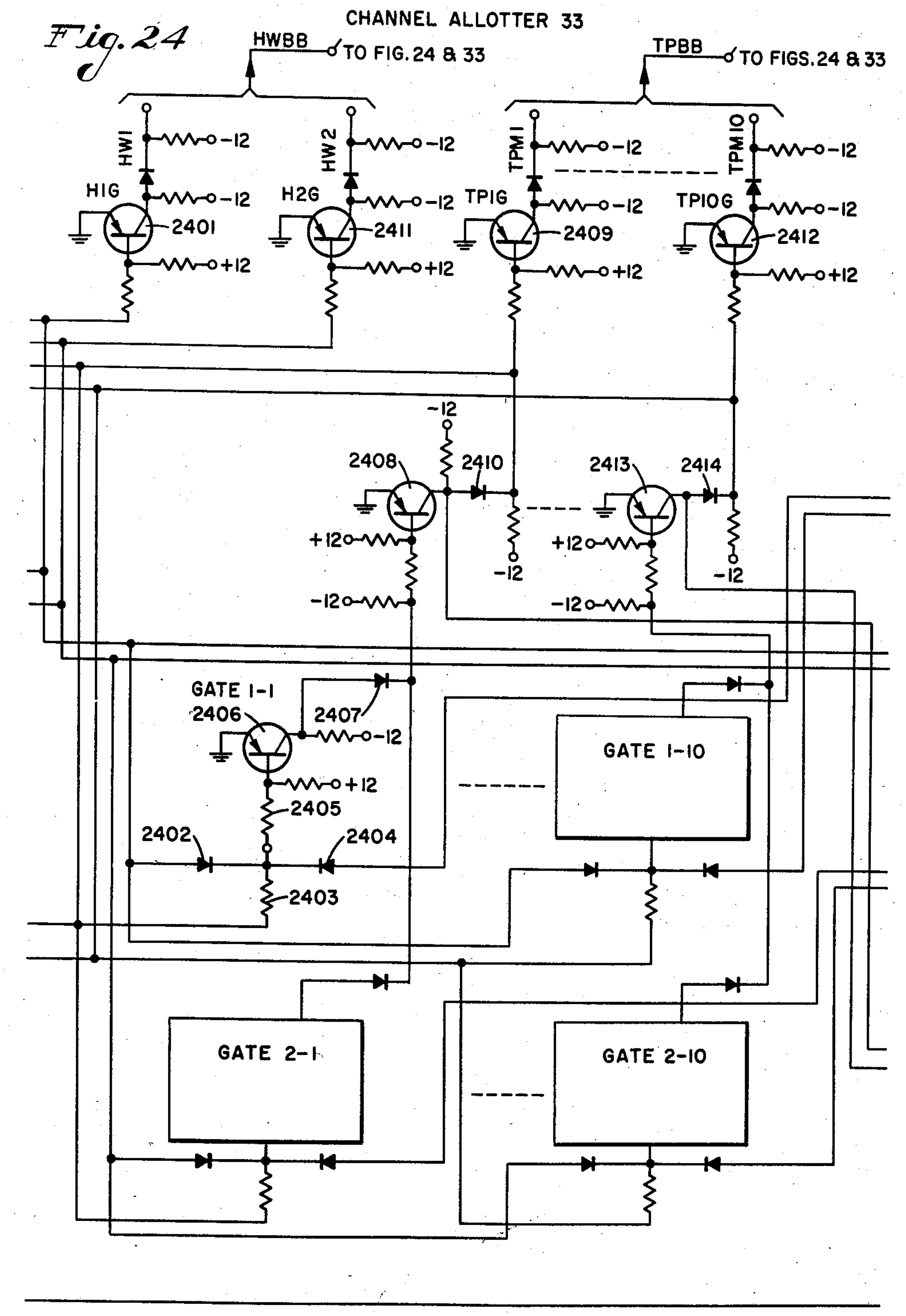
Figure 25:
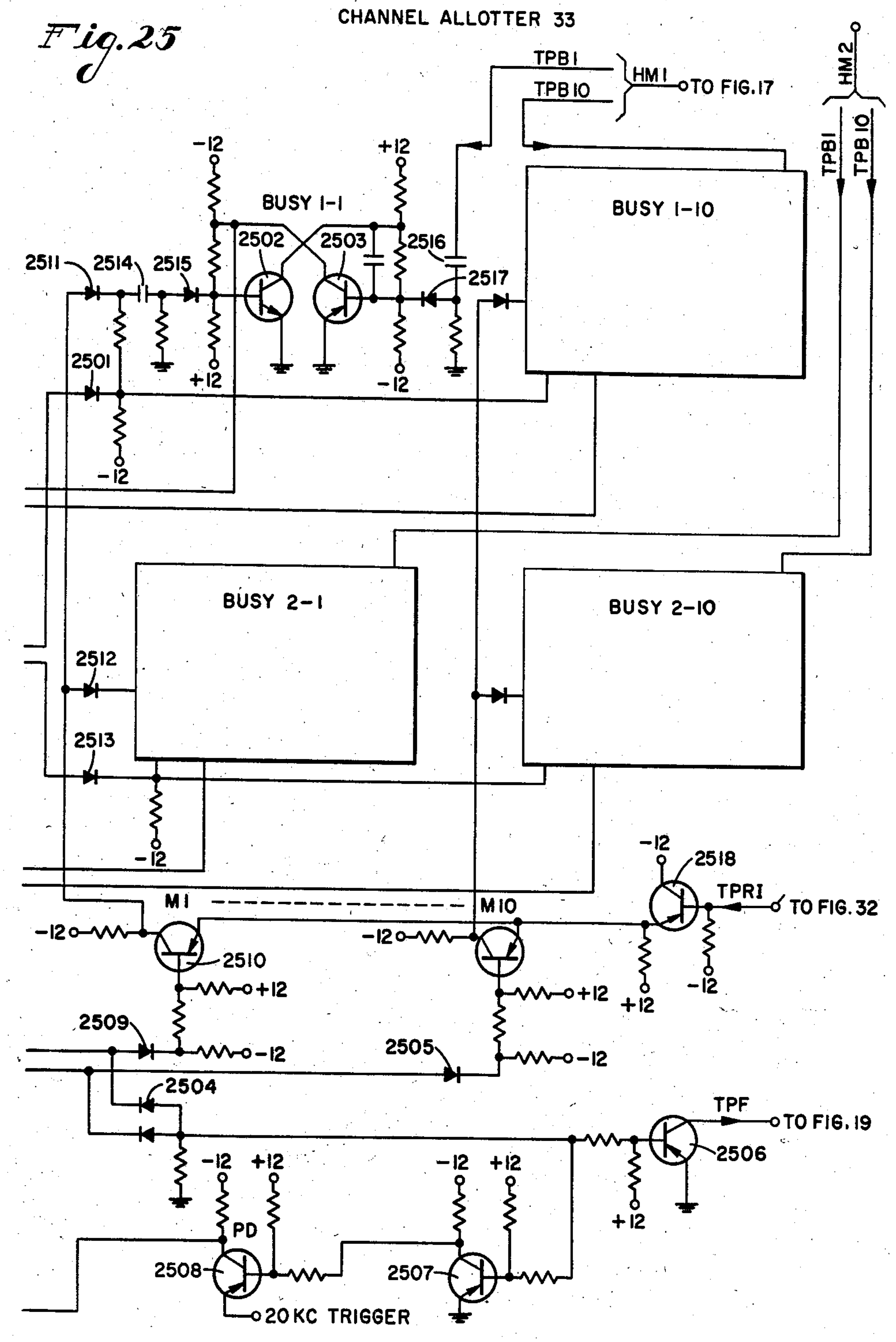
Figure 26:
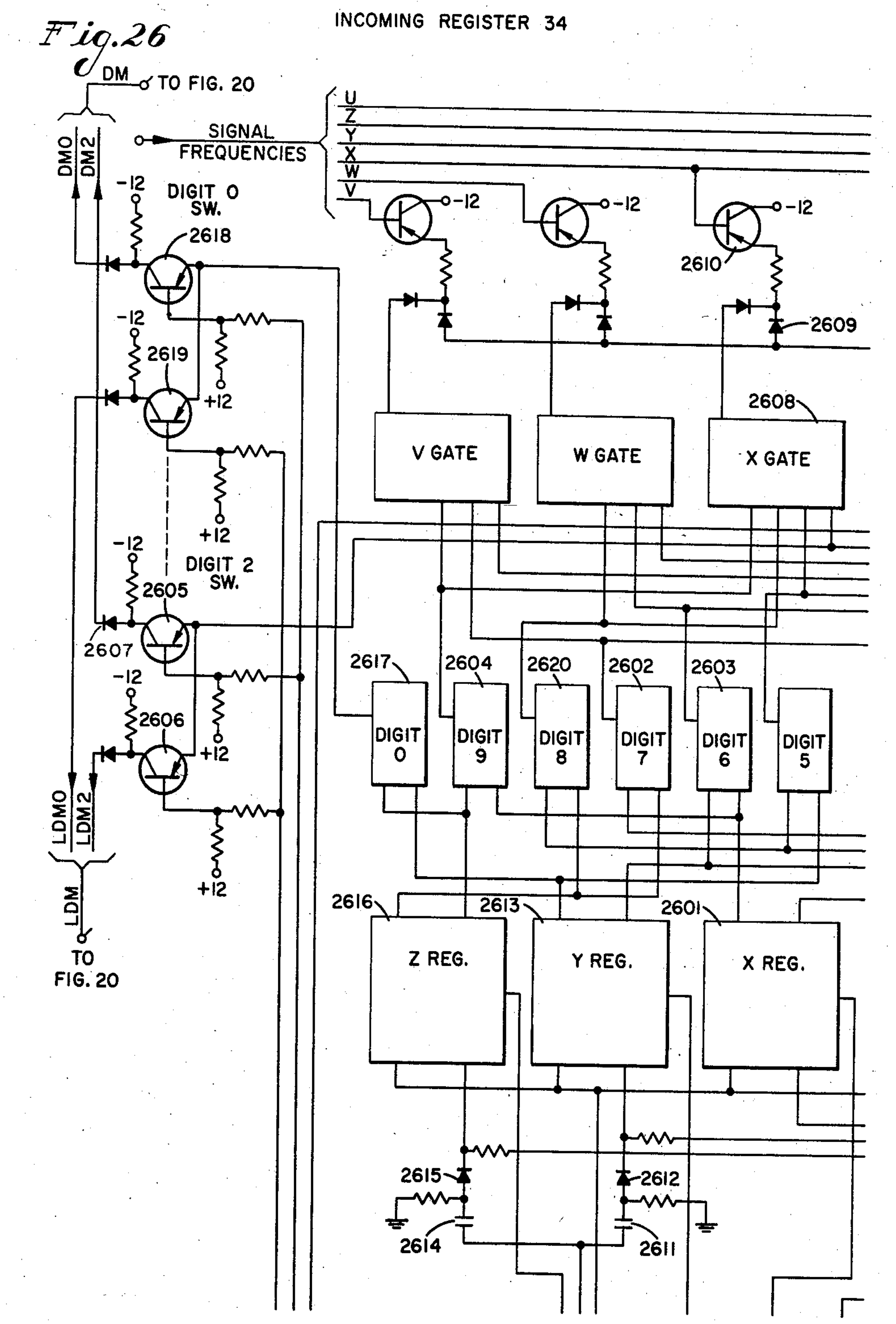
Figure 27:
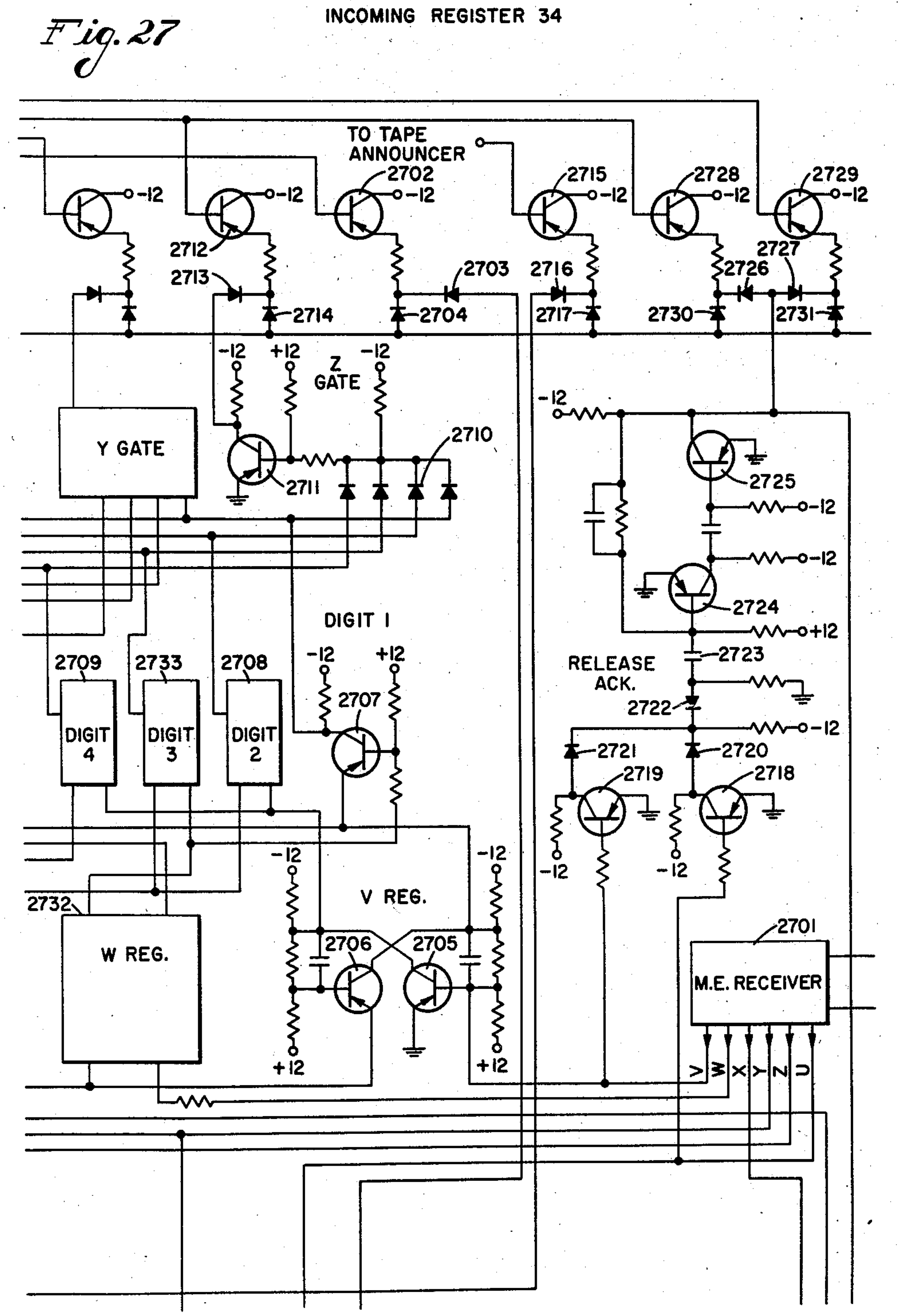

Figs. 23–25, inclusive, when arranged as shown in Fig. 3B, show details of a channel allotter for use in a long distance switching center.

Figs. 26–33, inclusive, when arranged as shown in Fig. 3B, show circuit details of an incoming register for use in a long distance switching center.

Figure 34:
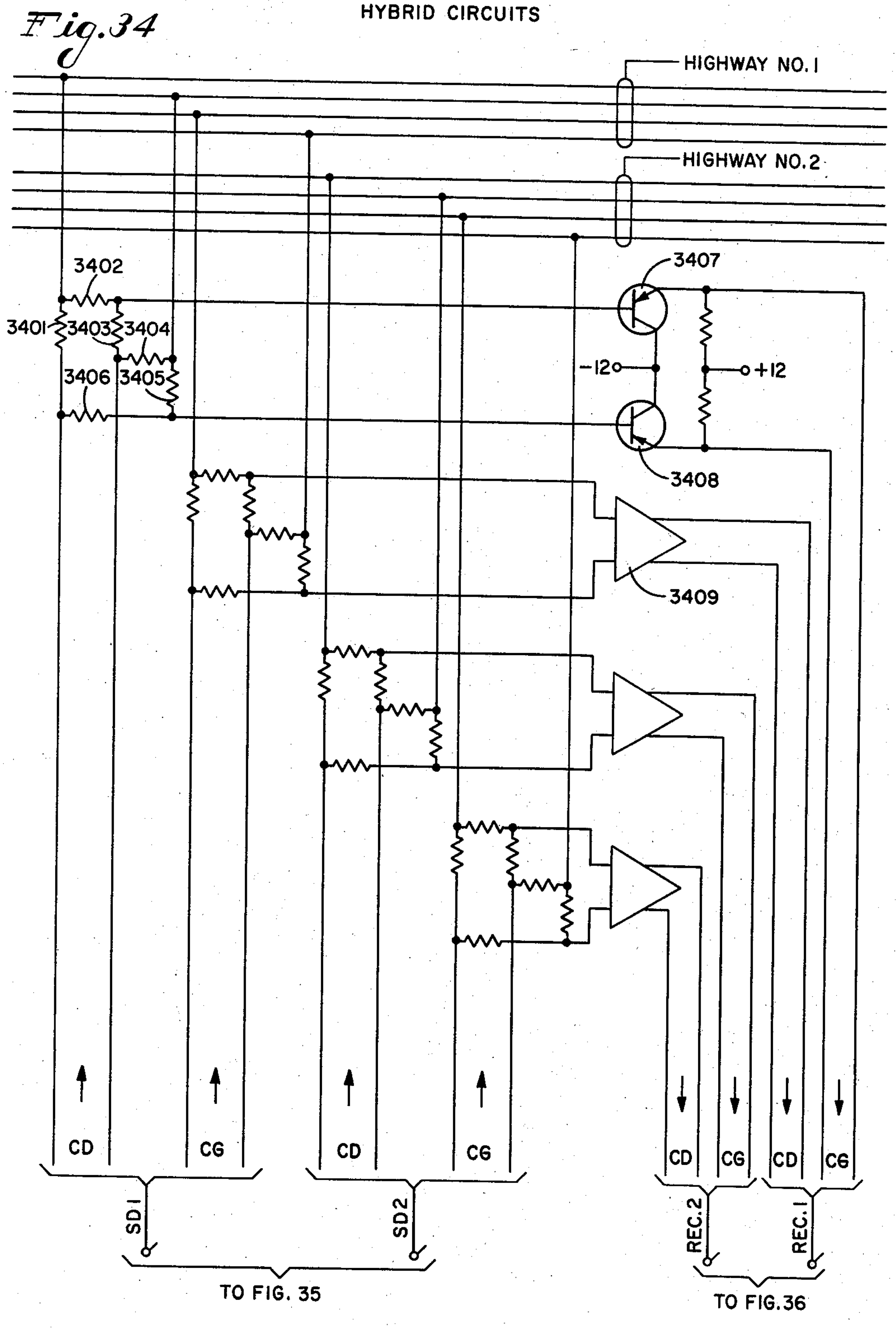

Fig. 34 shows circuit details of hybrid circuits associated with an attendant's cabinet in a long distance switching center.

Figs. 35–39, inclusive, when arranged as shown in Fig. 3B, show details of an attendant's cabinet link circuit.

Figure 40:
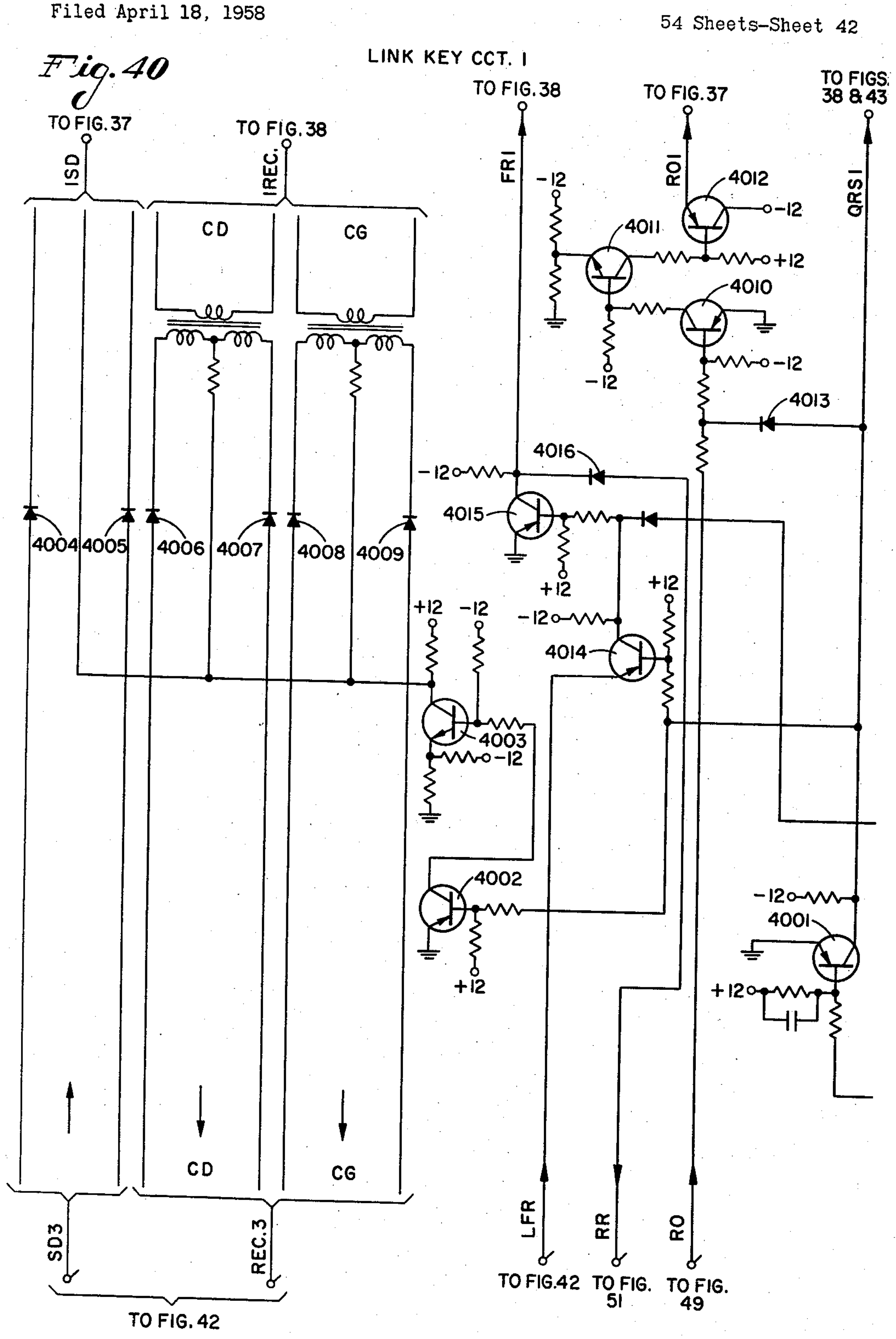
Figure 41:
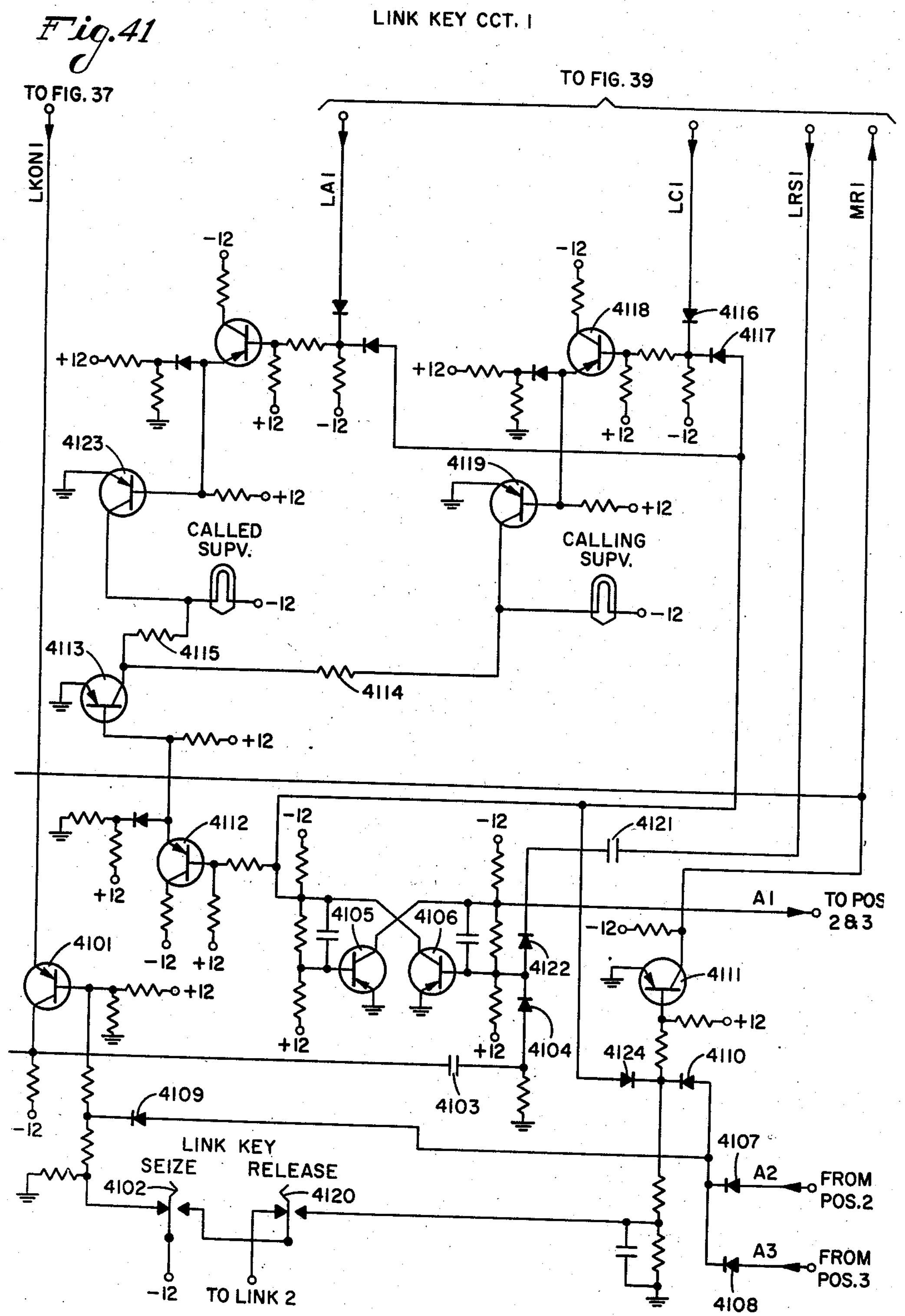

Figs. 40 and 41, when arranged with Fig. 41 to the right of Fig. 40, show details of an attendant's cabinet link key circuit.

Figure 42:
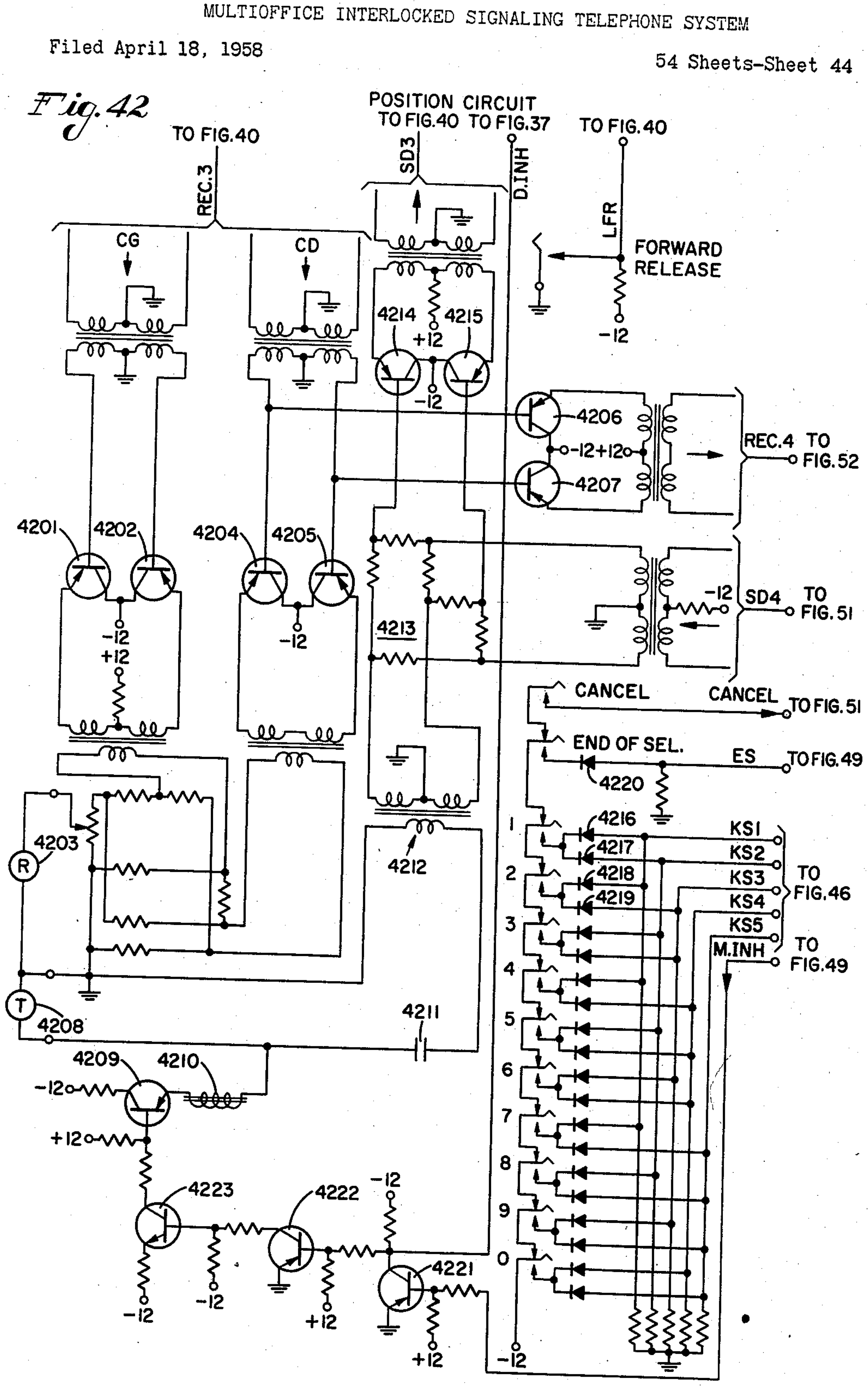

Fig. 42 shows details of an attendant's position circuit.

Figure 43:
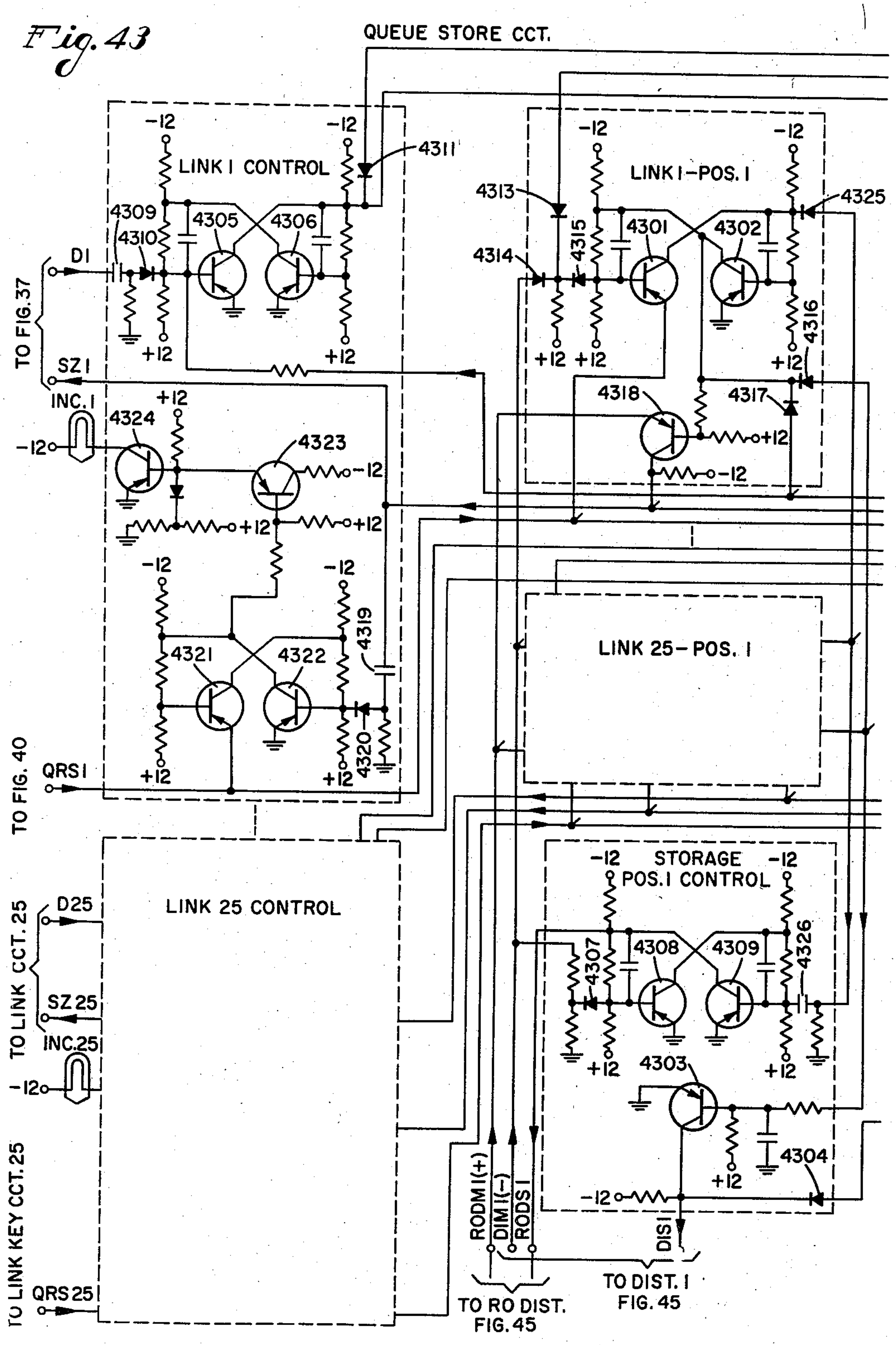
Figure 44:
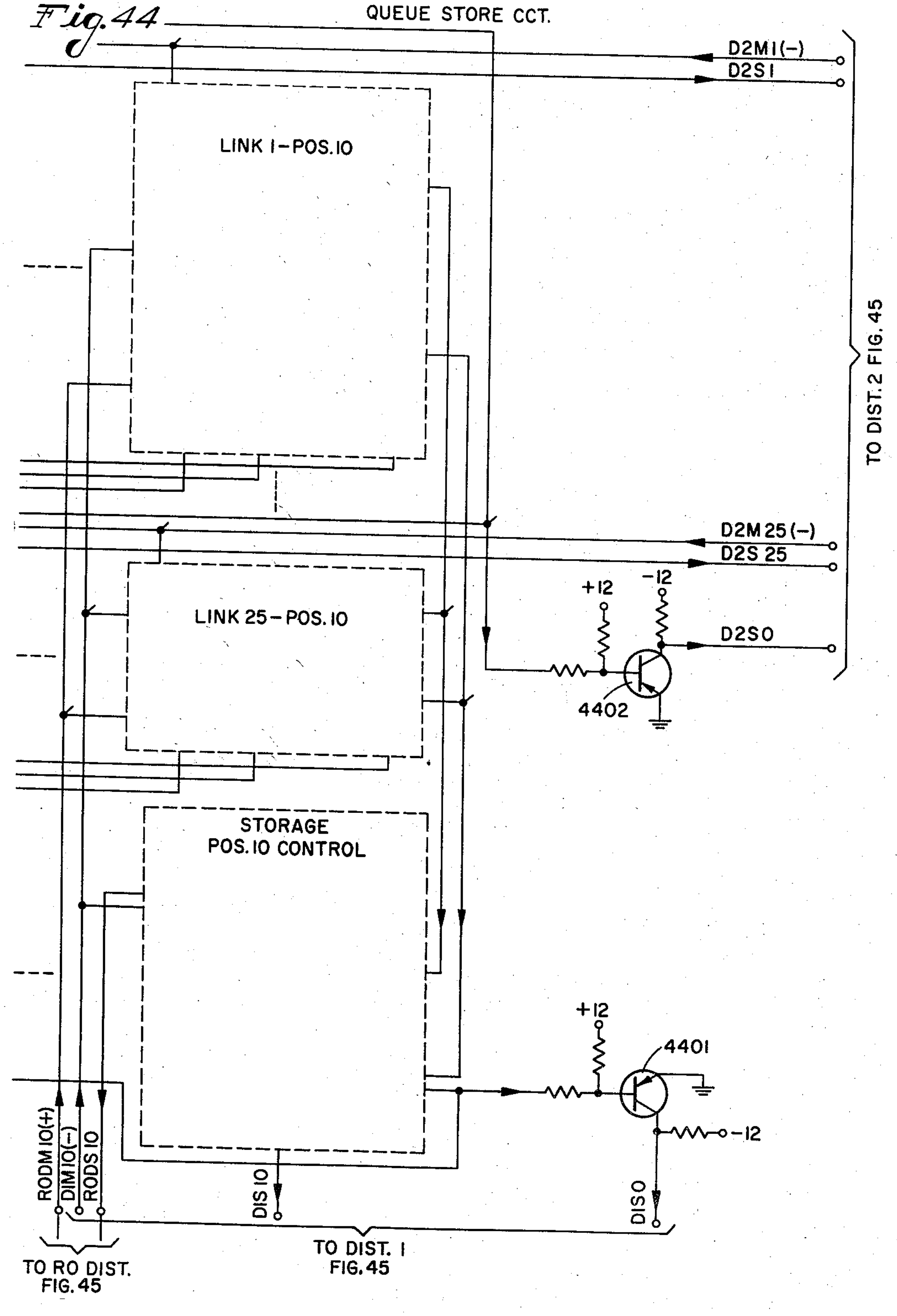

Figs. 43 and 44, when arranged with Fig. 44 to the right of Fig. 43, show details of an attendant's cabinet queue store circuit.

Figure 45:
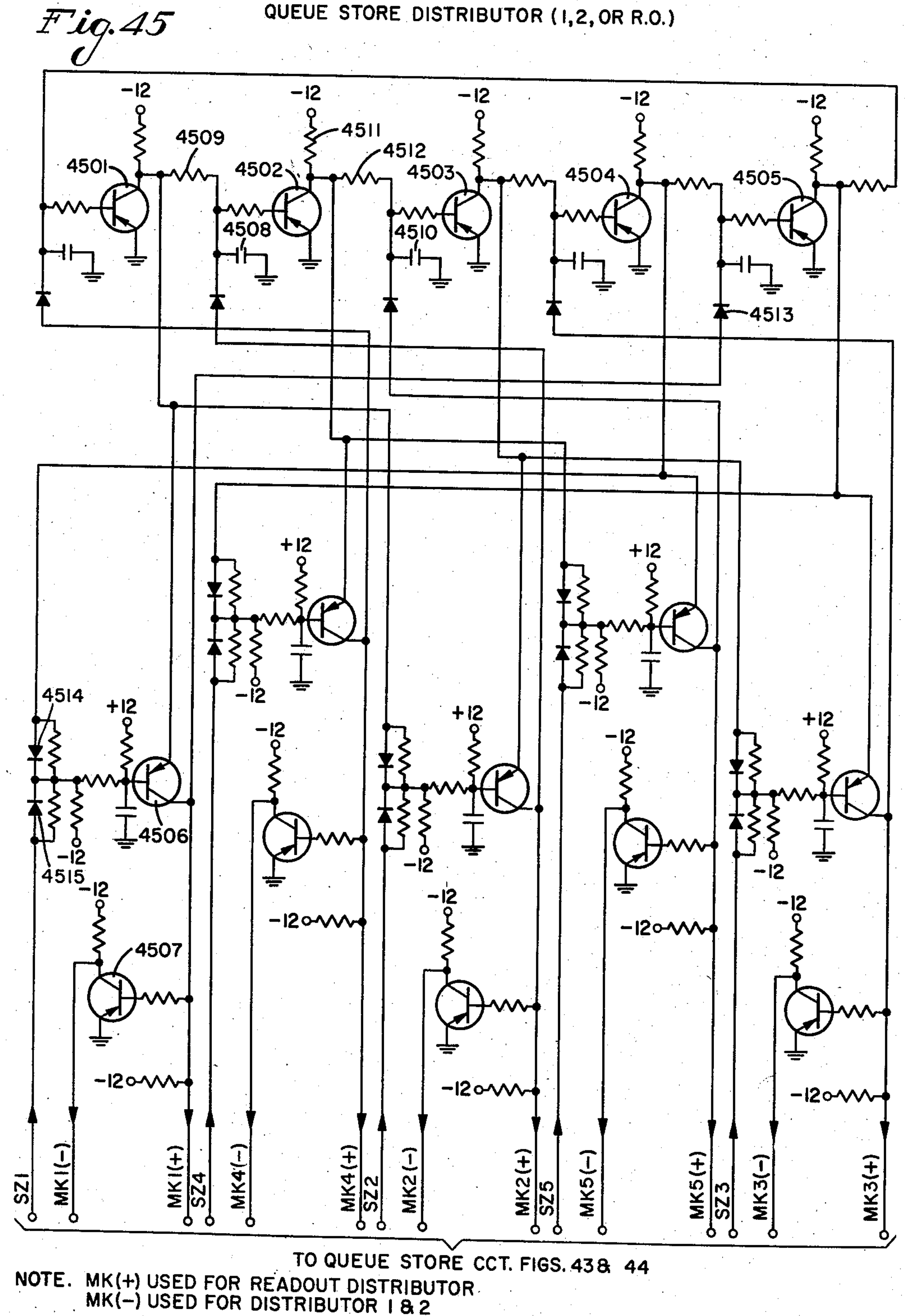
Figure 46:
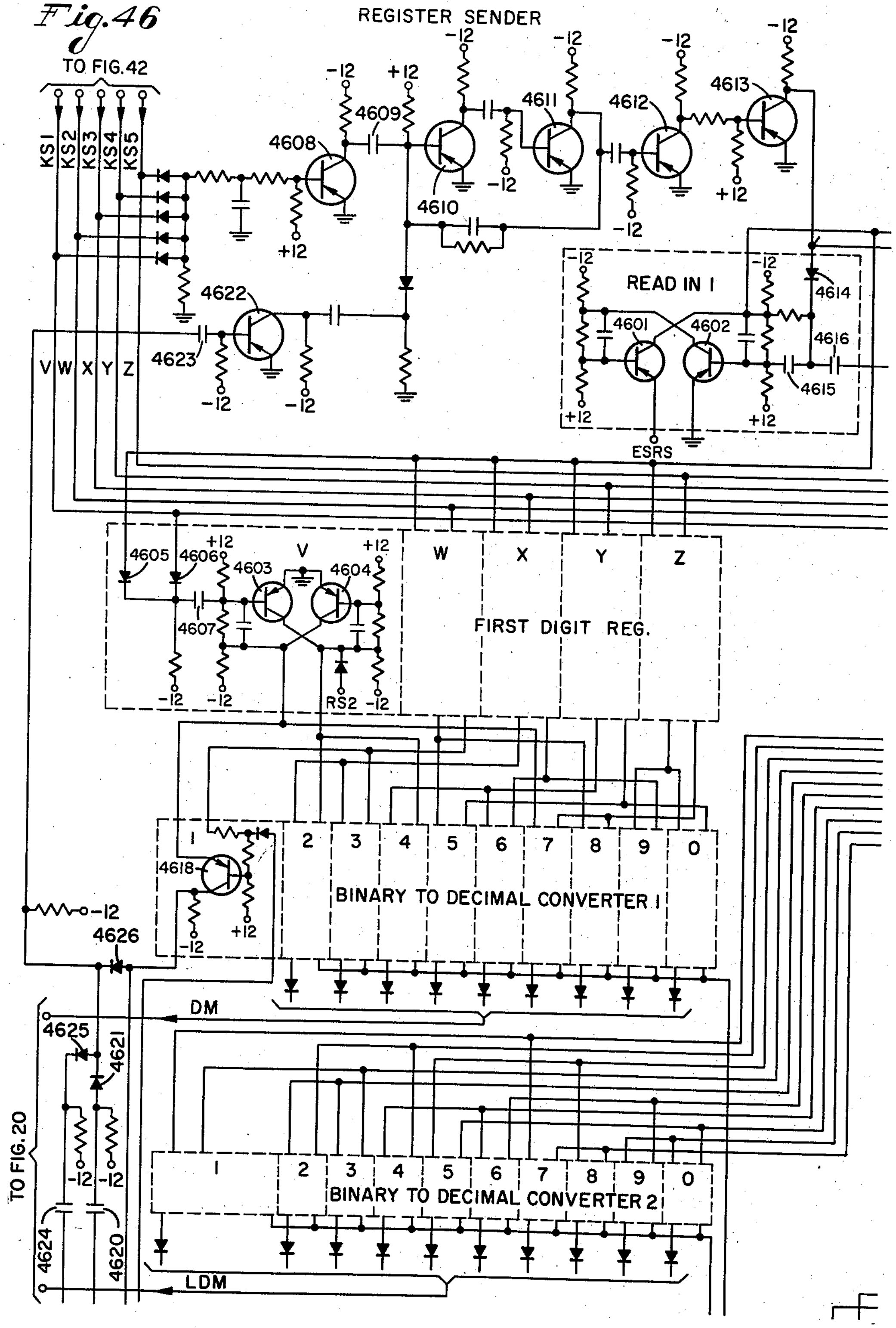
Figure 47:
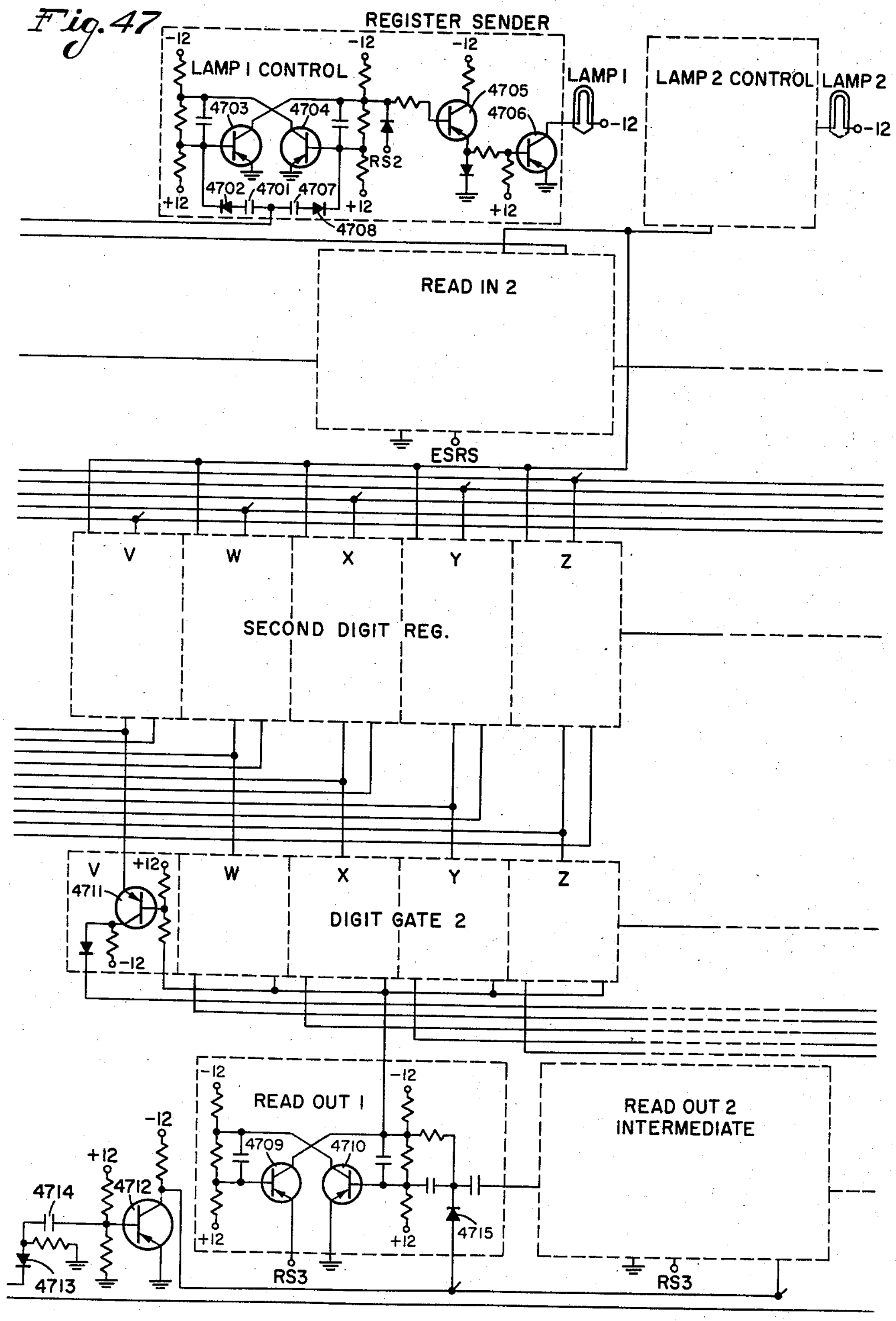
Figure 48:
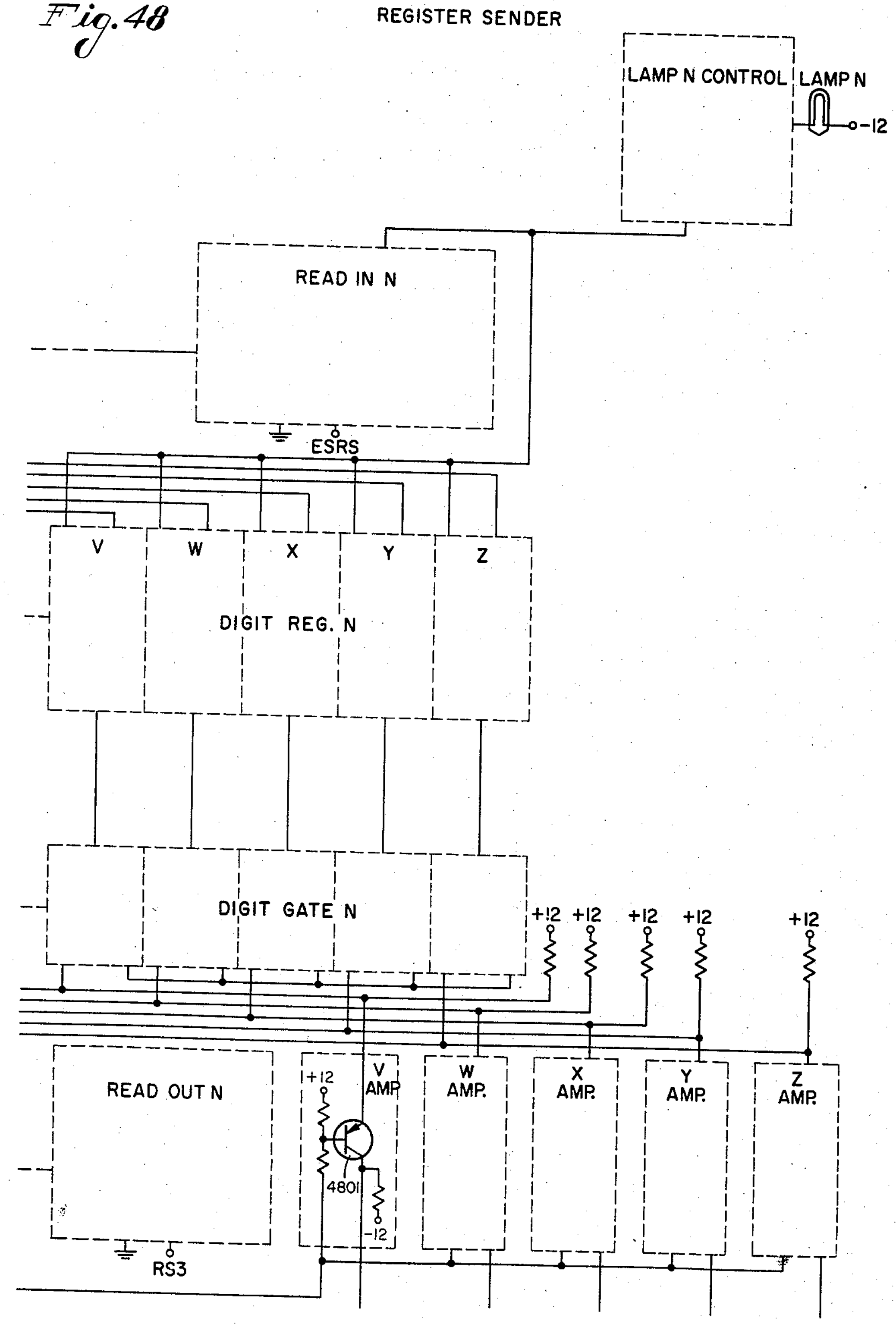

Fig. 45 shows details of an attendant's cabinet queue store distributor circuit.

Figs. 46–52, inclusive, when arranged as shown in Fig. 3B, show details of an attendant's cabinet register sender.

Figure 1:
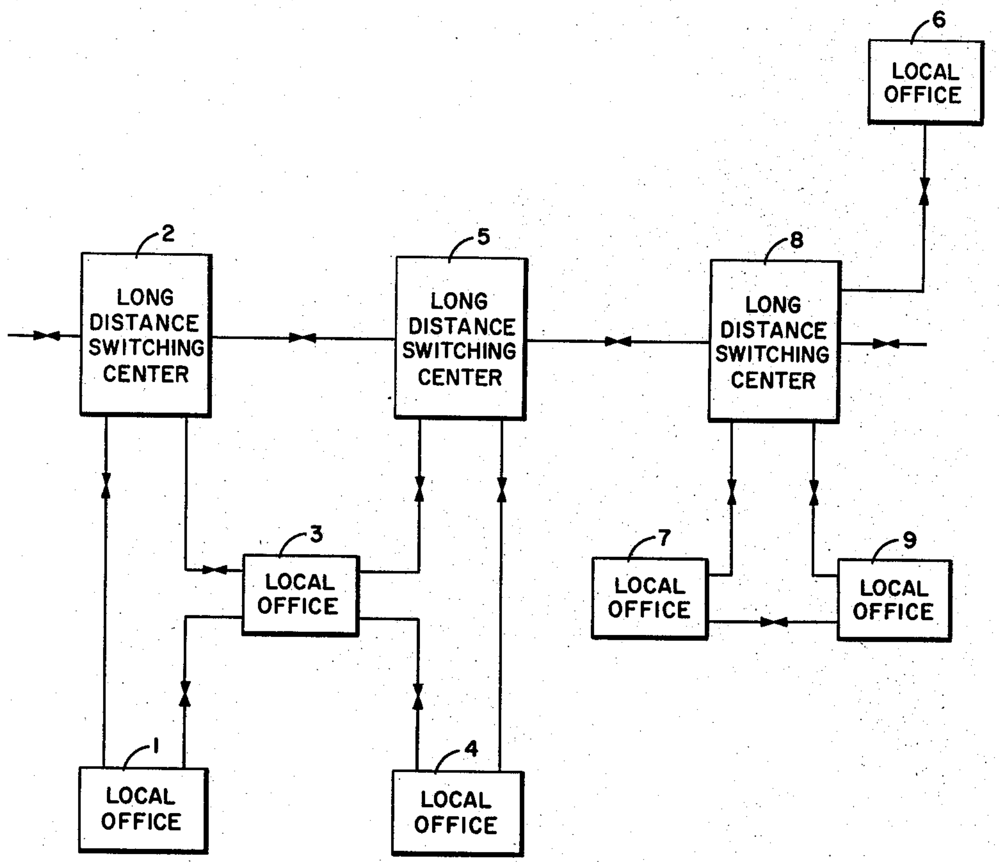
Figure 2A:
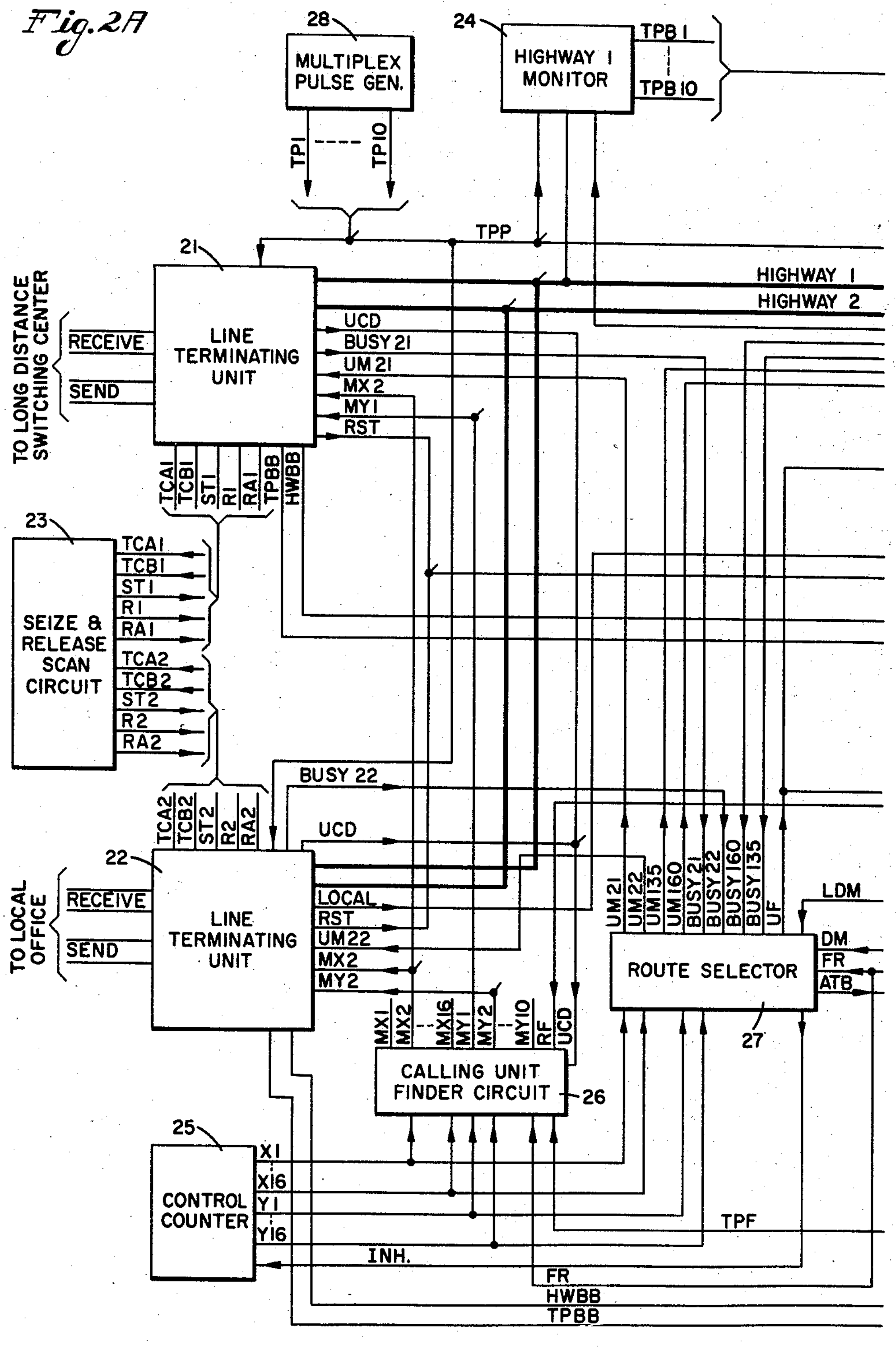
Figure 2B:
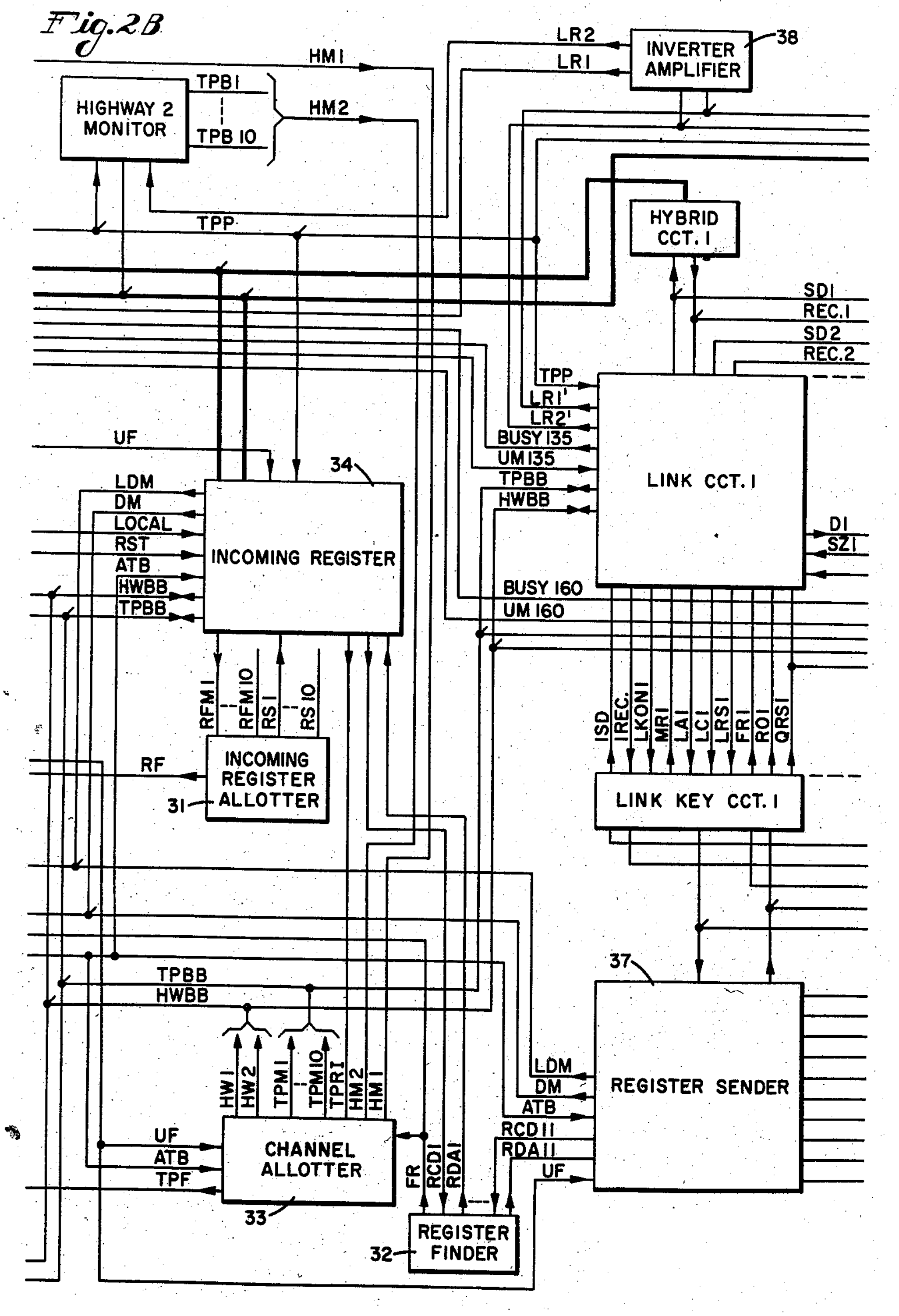
Figure 2C:
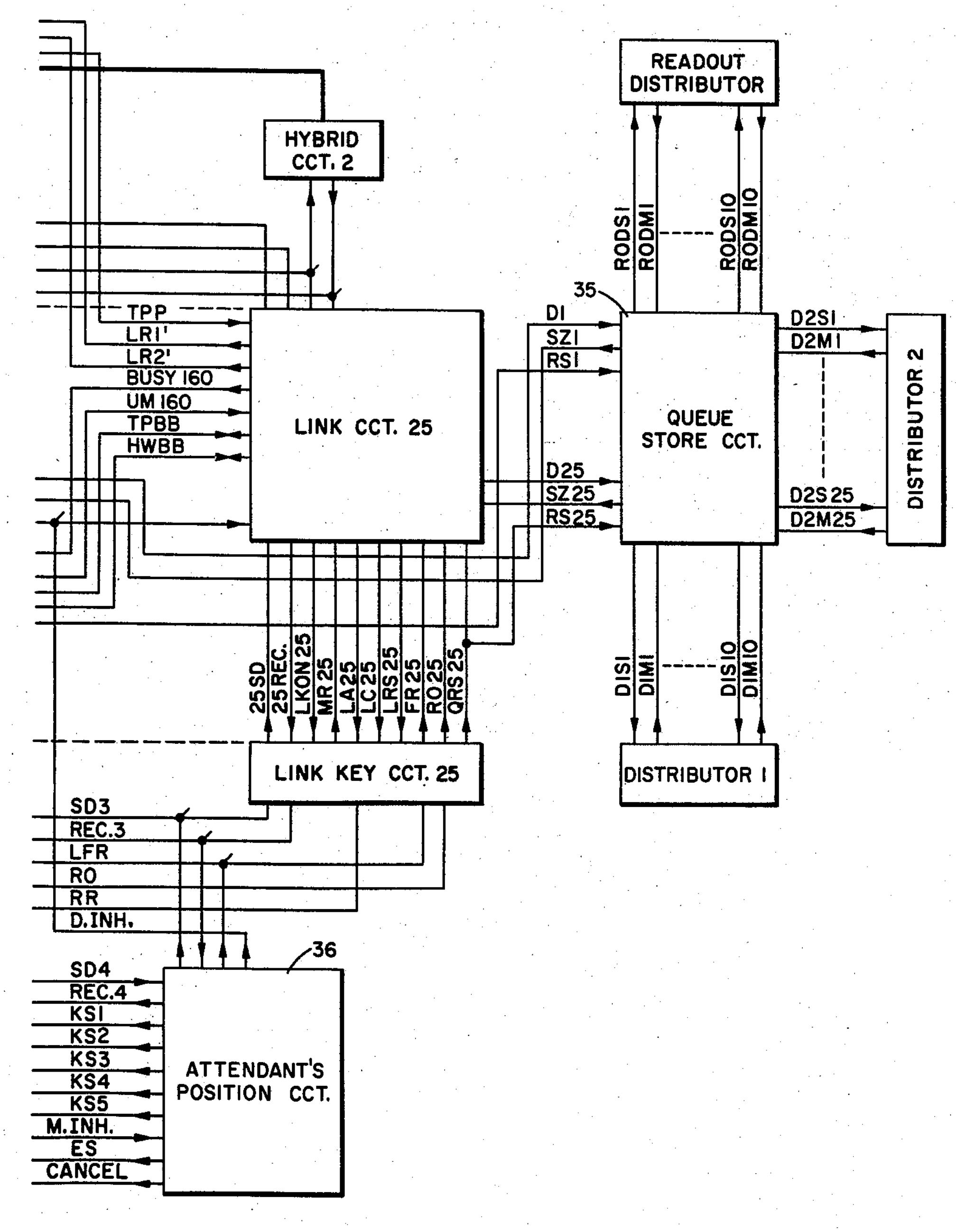

The overall operation of the system in which the invention has been illustrated can best be understood by reference to Figures 2A, 2B, and 2C in conjunction with reference to the trunking diagram shown in Fig. 1. The invention has been illustrated as being embodied in a system developed for the military, but the principles taught by the invention can be practiced in commercial type telephone systems.

As shown in Fig. 1, calls between subscribers in different local offices may be routed through one or more long distance switching centers. For example, a call from a subscriber in local office 1 to a subscriber in local office 9 is routed through long distance switching centers 2, 5, and 8. The call is initiated by the transmission of a voice frequency seize signal over a trunk line interconnecting office 1 and long distance switching center 2, which trunk line is four-wire and may be either physical wire or a radio link. In long distance switching center 2, the line terminating unit terminating that trunk line is marked as a unit terminating a trunk line from a local office. For example, unit 22 in Fig. 2A is identified as a local unit by the inclusion of conductor local, which extends between unit 22 and incoming register 34. In response to the seizure of unit 22 and the subsequent marking of conductor local, incoming register 34 is controlled to automatically route the call to an idle one of the attendant's link circuits, such as link circuit 1 of Fig. 2B, in that long distance switching center. When the incoming lamp corresponding to link circuit 1 is illuminated under control of queue store circuit 35, the attendant operates a key in link key circuit 1 to connect link circuit 1 to the attendant's position circuit 36. In accordance with instructions received over the connection from the originating subscriber at local office 1, the attendant then keys the routing digits required to reach local office 9 on the key set associated with the key sender register 37. The keyed number comprises routing digits corresponding to long distance switching centers 5 and 8, an arbitrary digit which may be the digit "1," identifying local, and a digit corresponding to local office 9. The common equipment in long distance switching center 2 then functions to seize an idle terminating unit, such as unit 21 in Fig. 2A, which terminates a trunk line extending to long distance switching center 5, and a seize signal is transmitted over that trunk line to seize the unit terminating that trunk line in long distance switching center 5. In long distance switching center 5, an incoming register, such as incoming register 34 of Fig. 2B, then controls the common equipment, in accordance with the digit received from the key sender register in office 2, to select an idle terminating unit which terminates a trunk line extending between long distance switching centers 5 and 8. The operation in long distance switching center 8 is identical to that just described in long distance switching center 5 with the exception that the arbitrary digit "1" followed by the digit corresponding to local office 9 control the incoming register 34 in that office to control the selection of an idle terminating unit extending to local office 9 in the groups of local terminating units. In the illustrated system, the attendant in office 2 then passes the number of the desired called station to the answering attendant in local office 9. Thus, it can be seen that the extension of a call is controlled from the attendant's position at the first long distance switching center encountered, the intermediate switching centers are each controlled by a single digit to select an idle trunk line to the next long distance switching center, and the final long distance switching center is controlled by two digits to select the desired local office.

Figs. 2A, 2B, and 2C, which show in block diagram form the equipment located at any one of the long distance switching centers, will now be described in more detail. Although just two line terminating units, namely, units 21 and 22, have been shown, it is to be understood that there is supplied a group of line terminating units 21 for each long distance switching center accessible to the illustrated long distance switching center, and a group of line terminating units 22 for each local office accessible to the illustrated long distance switching center. For example, long distance switching center 5 comprises a group of line terminating units, such as unit 21, which terminate trunk lines or radio links between long distance switching centers 2 and 5 and a group of line terminating units, such as unit 21, which terminate trunk lines or radio links between long distance switching centers 8 and 5. Long distance switching center 5 also comprises a group of line terminating units, such as unit 22, which terminate trunk lines or radio links between local office 3 and long distance switching center 5 and a group of line terminating units, such as unit 22, which terminate trunk lines or radio links between local office 4 and long distance switching center 5. Similarly, only one incoming register, namely, incoming register 34, has been shown but it is to be understood that the number of incoming registers actually employed will be determined by the existing traffic conditions.

The line terminating units, such as 21 and 22, the incoming registers, such as 34, and the attendant's link circuits, such as link circuit 1 of Fig. 2B, are all interconnected by one or more transmission highway networks. Two transmission highway networks are shown and are labeled highway 1 and highway 2. Each of the transmission highway networks comprises four wires carrying ten time division multiplex channels. Multiplex pulse generator 28 is provided in the system for the purpose of continuously providing recurring pulses on conductors TP1–TP10, which pulses individually identify the ten channels in each highway network. The pulses applied to conductors TP1–TP10 by multiplex pulse generator 28 may have a recurrence frequency of 12 kc. Preferably, each pulse persists for approximately four microseconds and a guard time of approximately four microseconds is provided between pulses. The pulses applied to conductors TP1–TP10, and which are graphically illustrated in Fig. 3A of the drawings, are routed over cable TPP to all of the line terminating units, to each of the highway monitor circuits, to each of the attendant's link circuits, and to each of the incoming registers. As will be more fully described hereinafter, the above described pulses are used in each of these circuits to periodically activate switches within each of the circuits for the purpose of connecting that circuit to a selected one of the highway networks in a selected time division channel.

The line terminating units, the incoming registers, and the attendant's link circuits are also interconnected by a control network comprising bus bars HWBB and TPBB. Since the illustrated system includes two highway networks, the highway marking bus bar HWBB comprises the two conductors HW1 and HW2. The time position marking bus bar comprises ten conductors TPM1–TPM10, inclusive. Channel allotter 33 is controlled to apply a D.-C. potential to one of the highway marking conductors and to one of the channel marking conductors at any given time for the purpose of individually assigning an idle channel to each calling line.

To illustrate the operation of the system, assume that channel allotter 33 is applying a D.-C. potential to conductors HW1 and TPM1 to thus identify channel 1 on transmission highway network 1 as the next idle channel to be assigned for use. Also assume that incoming register 34 has been assigned for use by incoming register allotter 31. Incoming register allotter 31 comprises a ring circuit having a number of stages equal to the number of incoming registers and is controlled to seize the next idle register when the previously assigned register is taken into use. An idle register is identified by the presence of potential on an individual register free marking conductor, such as RFM1, and is seized by the allotter by the application of a potential to an individual register seize conductor, such as RS1. Next assume that a voice frequency seize signal appears on the receive conductors of the trunk line terminated by line terminating unit 21. The trunk line receive conductors are coupled within unit 21 to conductors TCA1 and TCB1, which extend to seize and release scan circuit 23. Circuit 23 is associated with ten or more terminating units and is controlled to continuously scan the TC conductors from each of its associated terminating units for seize, release, and release acknowledge signals. By using a common circuit, such as 23, a single multifrequency receiver is shared by ten or more units instead of having an individual receiver provided for each terminating unit. When the multifrequency receiver in circuit 23 is connected to conductors TCA1 and TCB1, the voice frequency seize signal appearing on those conductors is detected by circuit 23 and a potential is applied to start conductor ST1 to seize line terminating unit 21. Unit 21 is responsive to the receipt of a start potential on conductor ST1 to apply potential to unit connect demand conductor UCD, which is common to all of the units and which extends to calling unit finder circuit 26. Unit 21 also functions at this time to apply potential to busy conductor busy 21 for the purpose of marking unit 21 busy to route selector 27.

Control counter 25, which comprises a sixteen stage ring counter driven from the output of a ten stage ring counter, is controlled to supply X and Y marking signals, which, in pairs, correspond to individual ones of the terminating units, to calling unit finder circuit 26 and to route selector 27. The tens stage ring in control counter 25 is driven by 20 kc. clock pulses, of the type shown in Fig. 3A, and the sixteen stage ring is driven by the tenth stage of the ten stage ring. An output signal is taken from each stage of each ring and applied to an individual conductor. Thus, while a signal is appearing on conductor X1, ten successive pulses appear on conductors Y1–Y10, inclusive. The sixteen stage ring is then advanced to mark conductor X2 and conductors Y1–Y10 are again marked in turn. Calling unit finder circuit 26 functions to repeat the marking signals received over conductors X1–X16, inclusive, and Y1–Y10, inclusive, to marking conductors MX1–MX16, inclusive, and MY1–MY10, inclusive, respectively, only when potential is applied to the unit connect demand conductor UCD by one or more calling units, when a register has been assigned for use as denoted by the application of potential to register found conductor RF by the incoming register allotter 31, and when an idle channel is being marked on the control network as denoted by the application of potential to the time position found conductor TPF by channel allotter 33.

Since it was assumed that channel allotter 33 is applying marking signals corresponding to channel 1 on highway network 1 to the control network, that incoming register 34 is assigned for use, and that terminating unit 21 is applying potential to conductor UCD, the calling unit finder circuit 26 now functions to repeat the marking signals received over conductors X1–X16, inclusive, and Y1–Y16, inclusive, to conductors MX1–MX16, inclusive, and MY1–MY10, inclusive. When potential is applied simultaneously to conductors MX2 and MY1, the storage circuit in calling line terminating unit 21 is controlled to read in the highway and channel marking signals applied by channel allotter 33 to the highway and time position marking bus bars HWBB and TPBB, respectively. Also responsive to the receipt of potential on conductors MX2 and MY1, unit 21 serves to discontinue the application of potential to conductor UCD and serves to apply potential to common register start conductor RST. Conductor RST is gated with the individual register seize conductor, such as RS1 in register 34, in each of the incoming registers so that only the storage circuit in the assigned register is controlled to read in the highway and channel marking signals appearing on the control network when a potential is applied to conductor RST by one of the units.

When the storage circuit in register 34 has read in the highway and time position information, a signal is applied to time position read in conductor TPRI, which extends from the incoming registers to channel allotter 33. The signal applied to conductor TPRI is effective in channel allotter 33 to mark channel 1 on highway 1 busy within the allotter so that that time position cannot be assigned to another call and the allotter 33 is further controlled to apply marking signals corresponding to the next idle channel to bus bars HWBB and TPBB.

Each of the line terminating units, each of the incoming registers, and each of the attendant's link circuits comprises a group of switches for connecting that unit, register, or link circuit to each of the transmission highway networks. In accordance with the channel and highway identifying information read into the storage circuit in any unit or register, the particular pulse on the one of the conductors TP1–TP10 corresponding to the assigned channel is gated to the group of switches corresponding to the assigned highway network and is there utilized to activate the switches. Thus in the assumed call, the switches associated with highway 1 in both line terminating unit 21 and in incoming register 34 are turned on by time position 1 pulse TP1 in each frame of the recurring time position pulses and unit 21 and register 34 are thereby connected to highway 1 during time position 1. The seize signal appearing on the receive conductors of the trunk line terminated by unit 21 is now detected by a multifrequency receiver in register 34 and, responsive thereto, incoming register 34 serves to transmit a seize acknowledge signal to highway 1 and thus to unit 21 and the send conductors of the trunk line terminated by unit 21. Since unit 21 terminates a trunk line from another long distance switching center, the call being described is set up under control of a key sender register in a preceding long distance switching center. The key sender register in the originating long distance switching center is controlled by the received seize acknowledge signal to discontinue the transmission of a seize signal and to then transmit compounded voice frequency signals corresponding to the digit designation of the next long distance switching center to be utilized in establishing the connection. The multifrequency receiver in register 34 detects the transmitted voice frequency signals corresponding to a particular digit and a digit register in register 34 is set in accordance therewith. The incoming register 34 then transmits a digit acknowledge signal back over the trunk line to the originating office. The digit acknowledge signal also comprises compounded voice frequency signals which correspond to the particular setting of the digit register in incoming register 34, but at least one of the signals in the digit acknowledge signal is of a different frequency than the frequency used to set the digit register. The digit acknowledge signal enables the originating key sender register to compare the setting of the digit register in incoming register 34 with the digital information transmitted by the key sender. If the setting of the digit register in incoming register 34 is correct, the originating key sender transmits a second seize signal over the trunk line to incoming register 34.

The second seize signal received by incoming register 34 controls register 34 to apply potential to register connect demand conductor RCD1, which extends to register finder 32. When register finder 32 finds register 34, as denoted by the application of potential to register demand answer conductor RDA1, register 34 is controlled to read out the channel identification information stored in its storage circuit to the highway and time position marking bus bars HWBB and TPBB, respectively. Simultaneously therewith, register 34 serves to apply potential to one of the digit marking conductors, identified as DM, in accordance with the designation of the called unit registered in the digit register of register 34. Also simultaneously therewith, register finder 32 applies potential to found register conductor FR, which extends to channel allotter 33, to route selector 27, and to calling unit finder circuit 26. The potential applied to conductor FR controls channel allotter 33 to terminate the application of marking potentials to the highway and time position bus bars HWBB and TPBB. The potential applied to conductor FR also controls the calling unit finder circuit 26 to terminate the application of marking potentials to the MX1–MX16 and MY1–MY10 conductors if circuit 26 is in the process of finding a calling unit. Thus when a register is reading out channel indentifying information to the bus bars, the channel allotter is disconnected from said bus bars and the calling unit finder is disabled so that the time position marked by the register cannot be seized by a calling unit.

Route selector 27 is controlled by the marking applied to one of the conductors DM by the incoming register to select the desired called group of units and is further controlled by the signals successively applied to conductors X1–X16 and Y1–Y10 by control counter 25 and by busy marking signals applied to the busy conductors, such as busy 21 and busy 22, to select an idle unit in the selected group of units. If, as was assumed, the call is to be routed to another long distance switching center, a line terminating unit identical to unit 21 is seized by the route selector by the application of potential to the unit marking conductor, such as UM21, corresponding to that unit. If there is no idle unit available, route selector 27 applies a potential to all trunks busy conductor ATB which controls the incoming register 34 to return a busy signal to the originating office and also controls channel allotter 33 to resume its operation. When an idle unit in the called group is seized, route selector 27 functions to apply potential to the unit found conductor UF, which extends to the channel allotter, the incoming registers, and to the key sender registers. Simultaneously therewith, route selector 27 applies potential to inhibitor conductor INH, which extends to the control counter 25 for the purpose of momentarily halting the stepping of the ring circuits in that circuit so that the X and Y conductors corresponding to the seized unit remain marked for a short period of time. When the seized unit applies ground to its individual busy conductor, such as busy 21, the route selector removes potential from conductors UF and INH. Incoming register 34 is controlled by the potential applied to conductor UF and by the next occurring 20 kc. clock pulse, of the type shown in Fig. 3A, to restore to its normal unoperated condition. Channel allotter 33 is controlled by the potential applied to conductor UF and by the next occurring clock pulse to re-apply the marking potentials corresponding to the next idle channel to bus bars HWBB and TPBB.

The storage circuits in the calling and called units now control the connection of their respective units to highway 1 during time position 1 for the transmittal of speech and supervisory signals between the units for the duration of the call.

At the termination of the call, a voice frequency release signal is transmitted over either the calling trunk line or the called trunk line and is detected by the seize and release scan circuit associated with either the calling unit or called unit, respectively. If it be assumed that a release signal appears on the receive conductors of the trunk line associated with line terminating unit 21, the receive signal is detected on conductors TCA1 and TCB1 by seize and release scan circuit 23, and circuit 23 functions to apply potential to conductor R1 which extends to unit 21. When potential is applied to conductor R1, unit 21 functions to apply a voice frequency release acknowledge signal to the send conductors of its associated trunk line for a purpose which will become apparent as the description proceeds. The release signal received over the trunk line also appears in time position 1 on highway 1 and is detected by a multifrequency receiver in highway 1 monitor circuit 24, which circuit is controlled to continuously scan the ten time position channels on highway 1 for release and release acknowledge signals. Unit 21 is released and its storage circuit returned to its normally unoperated condition responsive to the receipt of potential on conductor R1 but only after a time delay of sufficient duration to allow the release signal to be detected by highway 1 monitor circuit 24. The received release signal is regenerated in highway 1 monitor circuit 24 and applied in time position 1 to highway 1. The regenerated release signal is demodulated in the called line terminating unit and applied to the send conductors of the trunk line associated with the called unit. The regenerated release signal transmitted over the called trunk line serves to release the incoming line terminating unit in the succeeding long distance switching center after that unit has functioned to return a release acknowledge signal over the called trunk line to the illustrated long distance switching center.

The release acknowledge signal returned over the called trunk line is detected by the seize and release scan circuit associated with the called unit and potential is applied to the release acknowledge conductor, such as RA1, which extends to the called unit. The release acknowledge signal received over the called trunk line also appears in time positon 1 on highway 1 and is detected in highway 1 monitor circuit 24. Highway 1 monitor circuit 24 is controlled by the received release acknowledge signal to terminate the regeneration of the release signal and to apply a potential to time position busy 1 conductor TPB1, which extends in highway monitor 1 cable HM1 to channel allotter 33. In channel allotter 33, time position 1 on highway 1 is marked as idle responsive to the receipt of a potential on conductor TPP1 in cable HM1. The called line terminating unit is released and its storage circuit returned to its normally unoperated condition responsive to the receipt of potential on conductor RA1 but only after a delay of sufficient duration to allow the release acknowledge signal to be detected by highway 1 monitor circuit 24. Thus, it can be seen that the release signal is regenerated in each succeeding long distance switching center and that the regenerated release signal is transmitted until a release acknowledge signal is received from the next succeeding office. This feature is incorporated in the illustrated system for the purpose of offsetting the effects of fading when radio links are used in the system.

The operation of the long distance switching center, shown in Figs. 2A, 2B, and 2C, is somewhat different from the above when a call is originated at a local office having access to the illustrated long distance switching center. As previously explained, the line terminating units which terminate trunk lines from local offices are characterized as such by a local conductor which extends between those units and the incoming registers. When a local office terminating unit, such as unit 22, is seized on a call from a local office to the illustrated long distance switching center, a potential is applied in that unit to conductor local simultaneously with the application of potential to the register start conductor RST. Under these conditions, the assigned incoming register is controlled to automatically store the digit corresponding to the attendant's link circuits, which digit may be the digit "0," in its digit register. The incoming register immediately calls for the register finder and the route selector is controlled to seize an idle one of the attendant's link circuits, such as link circuit 1 of Fig. 2B, at the attendant's position. Link circuit 1 is seized by the route selector over units marking conductor UM135, which is individual to link circuit 1. The time position and highway information stored in the incoming register is read out to bus bars HWBB and TPBB and read in by a storage circuit in link circuit 1 in the exact same manner as previously described. Thus, responsive to seizure, the calling line terminating unit and an idle one of the attendant's link circuits are connected to an idle channel on one of the highway networks.

It can be seen that all of the link circuits 1–25, inclusive, are connected to highway 1 by send and receive conductors SD1 and REC.1 and through hybrid circuit 1. Similarly, link circuits 1–25, inclusive, are connected to highway 2 by send and receive conductors SD2 and REC.2 and through hybrid circuit 2.

When link circuit 1 is seized over conductor UM135 by the route selector, link circuit 1 functions to apply potential to demand conductor D1 which extends to queue store circuit 35. Queue store circuit 35 comprises ten or more storage positions each comprising a storage element corresponding to each link circuit. Distributors 1 and 2 control the activation of a single storage element in each storage position in the same order that potential is applied to the individual demand conductors, such as conductor D1. The read out distributor serves to read out the storage positions on a one at a time basis in the same order in which the calls were stored. When the read out distributor advances to the storage position in which the demand from link circuit 1 is registered, an incoming lamp corresponding to link circuit 1 is illuminated and potential is applied to seize conductor SZ1 which extends to link circuit 1. Link circuit 1 is responsive to the receipt of potential on conductor SZ1 to apply potential to link-on conductor LKON1 which prepares link key circuit 1 for operation.

When the attendant operates a key associated with link key circuit 1 responsive to the illumination of the incoming lamp corresponding to link circuit 1, potential is applied to the queue reset conductor QRS1 to remove the potential from demand conductor D1 in link circuit 1 and to reset the activated storage element in queue store circuit 35 corresponding to link circuit 1. When the storage element corresponding to link circuit 1 is reset, the read out distributor is advanced to the next storage position.

Signals received in the assigned time position on the assigned highway network are demodulated in link circuit 1, passed over receive conductors 1REC. to link key circuit 1, and then coupled over receive conductors REC.3 to the attendant's position circuit 36 when the key in link key circuit 1 is operated.

In accordance with oral instructions received over the trunk line and transmitted in the assigned time position on the assigned highway network to the link circuit, and coupled over conductors 1REC. and REC.3, the operator at the attendant's position circuit 36 keys the digits corresponding to the route required to reach the desired called party. The operation of any particular key results in the application of a D.-C. potential to a unique combination of two of the five conductors KS1–KS5, inclusive. The digit information received over conductors KS1–KS5 is stored in the key sender register and at the end of the keying operation, which is indicated by the application of potential to end of selection conductor ES, key sender register 37 applies potential to register connect demand conductor RCD11. When the key sender register is found by register finder 32, as denoted by the application of potential to register demand answer conductor RDA11, the key sender register applies potential to read out conductor RO, which extends to the link circuits. Link circuit 1 is controlled by the potential applied to conductor RO, and coupled through link key circuit 1 to conductor RO1, to control its storage circuit to read out the stored highway and channel marking information to bus bars HWBB and TPBB. Digit marking information corresponding to the first digit stored in the digit register in the key sender register is simultaneously applied by the key sender register to one of the digit marking conductors DM for the purpose of controlling route selector 27 to seize an idle unit in the group of line terminating units corresponding to said digit marking. The key sender register then functions to apply a voice frequency seize signal to send conductors S4 and thus over send conductors SD3 and 1SD to link circuit 1. In link circuit 1, the seize signal is multiplexed on to the assigned highway in the assigned time position and thus routed to the line terminating unit corresponding to the called office and over the trunk line or radio link to the called office. As previously mentioned, the key sender register 37 continues to transmit a seize signal until a seize acknowledge signal is received from the incoming register in the called office over conductors 1REC., REC.3, and REC.4. When a seize acknowledge signal is received, register sender 37 discontinues the transmission of a seize signal and then transmits a compound voice frequency signal corresponding to the next registered digit to send conductor S4 and thus to the called office. The digit designation signal is transmitted until a digit acknowledge signal is received. As previously explained, if the digit acknowledgment signal is correct for the digit designation signal transmitted, register sender 37 transmits a second seize signal to the called office. If the digit acknowledgment signal received is not correct for the digit designation signal transmitted, register sender 37 transmits a voice frequency cancel signal and then retransmits the canceled digit designation.

When the call is completed, the attendant retires from the connection by restoring the seize key in link key circuit 1, and is then free to process another call. When a release signal is received over either the calling or called trunk lines, it is detected by a multifrequency receiver in link circuit 1 and potential is applied to either conductor LC1 or LA1, respectively, to illuminate a lamp in link key circuit 1. The attendant then operates a release key in link key circuit 1 to apply potential to manual release conductor MR1 to restore link circuit 1 to its normal condition. Link circuit 1 functions to apply potential to conductor LRS1 to restore all of the circuits in link key circuit 1 to normal.

If the attendant should wish to reset the digit registers in register sender 37 before the end of selection key has been operated and thus before the sender has started to transmit, a cancel key is operated in position circuit 36 and potential is applied to conductor cancel for this purpose. If it is desired to cancel transmitted digits when the attendant realizes that a mistake in keying has been made or if an ATB condition is encountered and the attendant desires to reroute the call, a forward release key at position circuit 36 is operated and potential is applied to link forward release conductor LFR. The potential on conductor LFR is routed through operated link key circuit 1 and applied to conductor FR1. In link circuit 1, the potential on conductor FR1 is converted to pulses in the assigned time position and the resulting pulses are applied to conductor LR1' (assuming that highway 1 is the assigned highway). The pulses on conductor LR1' are amplified and inverted by inverter amplifier 38 and routed over conductor LR1 to highway 1 monitor circuit 24 where they are effective to cause the release of all circuits in the forward direction only. That is, the called line terminating unit and the circuits in the distant offices are released but the assigned time position is not marked idle to the channel allotter so that the calling line terminating unit and link circuit 1 remain activated.

When the register sender 37 is seized by the register finder 32 to initiate the transmission of digit information, a timing circuit is activated in register sender 37 to measure a ten second "no acknowledgment" period during which the call should be completed. During this period, potential is applied to microphone inhibit conductor MINH for the purpose of cutting off the attendant's microphone so as to prevent interference with the voice frequency signaling. Simultaneously therewith, potential is applied in position circuit 36 to dial inhibit conductor DINH for the purpose of controlling link circuit 1 to route the digit designation signals to the pair of highway conductors over which transmission is made to the called circuits.

The operation of the illustrated long distance switching center is slightly different from the above when the desired called line is associated with a local office associated with the illustrated long distance switching center. As previously described, an arbitrary digit "1" is prefixed to the digit identifying the terminating local office so that the incoming register, such as 34, is controlled to apply the digit marking corresponding to the designation of the desired local office to a local set of digit marking bus bars, such as LDM. This feature is included in the illustrated system so that the long distance switching center can serve more than ten groups of local and long distance trunk lines.

DETAILED DESCRIPTION

All of the transistors used in the system are of the junction type and all of the transistors have been given the conventional notation of an arrow superimposed on the emitter electrode. The direction of the arrow, of course, designates whether the particular transistor is of the NPN or PNP junction type. A NPN junction transistor is identified by an arrow which points away from the base electrode while a PNP junction transistor is identified by an arrow which points toward the base electrode. Insofar as the base and emitter of a transistor are concerned, the transistor is biased for conduction whenever the N-type material is negative with respect to the P-type material. Thus, a PNP junction transistor is biased for conduction whenever the base is negative with respect to the emitter, and a NPN junction transistor is biased for conduction whenever the base is positive with respect to the emitter.

*Line terminating unit*

Figure 10:
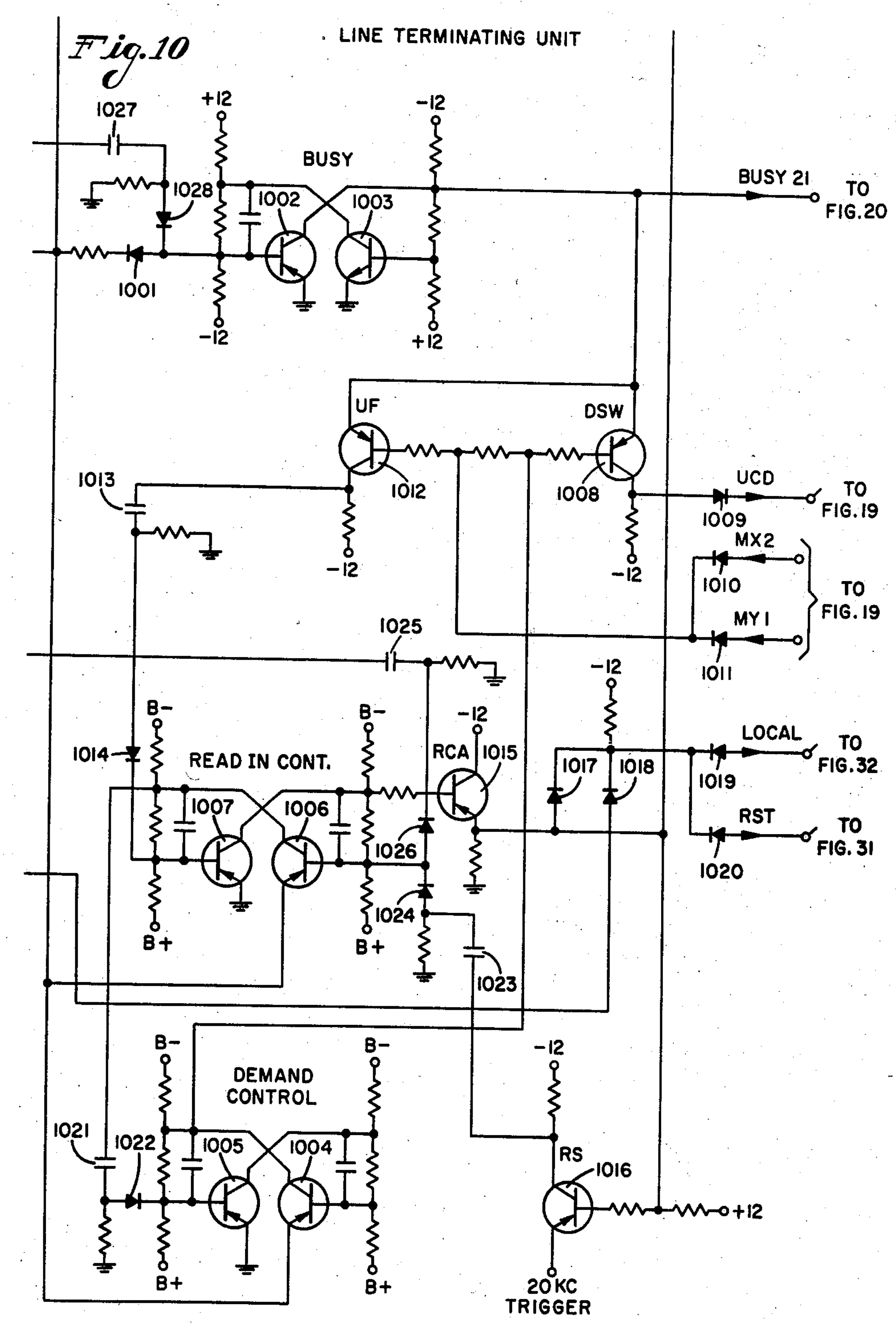

The line terminating unit is shown in detail in Figs. 4–10, inclusive. The line terminating units terminating trunk lines from other long distance switching centers are identical to units terminating trunk lines from local offices with the single exception that the conductor identified as local in Fig. 10 is omitted from the long distance terminating units. As explained in the general description, the assigned incoming register is controlled over conductor local to automatically route an incoming local call to the attendant's position.

The operation of the line terminating unit on a call incoming to the long distance switching center will first be described. When a call is initiated in the distant office, a voice frequency seize signal is transmitted over the receive conductors of the trunk line, coupled through repeat coil 401, amplified by the push-pull connected, emitter follower, buffer amplifier transistors 402 and 403 and applied to conductors TCA1 and TCB1, which extend to the seize and release scan circuit associated with the illustrated unit. When the seize signal appearing on conductors TCA1 and TCB1 is detected by the seize and release scan circuit, that circuit functions to replace the minus twelve volt potential normally appearing on conductor ST1 (Fig. 6) with ground potential. This waveform is differentiated by capacitor 601 and resistor 602 and the resulting positive pulse corresponding to the leading edge of the waveform is coupled through diode 603 to the base of transistor 604 in the incoming call control flip-flip circuit, comprising transistors 604 and 605. A flip-flip circuit is a bi-stable circuit in which both transistors are either nonconductive, or both transistors are conductive. The positive pulse coupled through diode 603 serves to render transistor 604 conductive and the resulting negative-going signal at the collector of transistor 604 renders transistor 605 conductive. When transistor 605 becomes conductive, the positive-going signal at its collector is coupled through capacitor 606 and diode 607 to the base of transistor 608 and renders normally conducting transistor 608 non-conductive. When transistor 608 becomes non-conductive, the resulting positive-going potential at its collector renders transistor 609, which forms the other stage of the calling and called control flip-flop circuit, conductive. Under these conditions, calling amplifier transistor 610 is biased for conduction and called amplifier transistor 611 is biased for non-conduction. Ground potential appearing at the collector of transistor 610 is coupled to the emitter electrode of a transistor, such as calling transistor 801, in each of the highway selector circuits in the channel identification storage circuit included in the line terminating unit, and minus twelve volt potential appearing at the collector of transistor 611 is coupled to the emitter of a transistor, such as called transistor 802, in each of the highway selectors. Thus, the highway selector transistors which control the calling send and receive gates of the terminating unit are enabled for operation, and the highway selecting transistors which control the called send and receive gates of the terminating unit are disabled.

When transistor 604 of the incoming call control flip-flip circuit becomes conductive, the negative-going signal appearing at its collector is coupled through capacitor 901 to the base of transistor 902. Transistors 902 and 903 form a conventional monostable circuit in which transistor 903 is normally conductive and transistor 902 is normally non-conductive. When a negative pulse is applied to the base of transistor 902 to render that transistor conductive, transistor 903 is rendered non-conductive for a period of approximately ten microseconds and the circuit then reverts to its normal condition. Thus, a negative-going ten microsecond pulse appears at the collector of transistor 903 responsive to seizure of the line terminating unit as marked by the operation of the incoming call control flip-flip circuit. The negative pulse appearing at the collector of transistor 903 is coupled through diode 1001 to the base of transistor 1002 and transistors 1002 and 1003 of the busy flip-flip circuit are rendered conductive. When transistor 1002 becomes conductive, its collector rises to ground potential and the illustrated line terminating unit is marked busy to the route selector over busy conductor busy 21.

The negative-going pulse appearing at the collector of transistor 903 is also coupled to the emitter electrode of transistor 904 in the voltage control flip-flip circuit, comprising transistors 904 and 905. Transistor 904 is made non-conductive by the negative pulse applied to its emitter and transistor 905 is rendered non-conductive when transistor 904 becomes non-conductive. When transistor 904 becomes non-conductive and the potential at its collector drops to a negative value, amplifier transistors 906, 907, and 908 are rendered conductive and minus twelve volt potential is applied to the bus bar B−, which extends to the highway selector and time position store circuits in the channel identifying storage circuit of the unit, and to the read in control and demand control flip-flop circuits of Fig. 10. Similarly, when transistor 905 becomes non-conductive and the potential at its collector rises to a positive value, the amplifier transistors 909 and 910 are rendered conductive and plus twelve volt potential is applied to bus bar B+, which also extends to the highway selector and time position store circuits in the channel identifying storage circuit of the unit, and to the read in control and demand control flip-flop circuits. Thus, voltage is supplied to the above-identified circuits and those circuits are now enabled for operation. Diodes 913, 914, and 915 are employed in the circuit to minimize hole storage in transistors 907, 908, and 910, respectively.

The negative-going pulse appearing at the collector of transistor 903 is also coupled to the emitter electrodes of transistor 1004 in the demand control flip-flop circuit, transistor 1006 in the read in control flip-flop circuit, a transistor corresponding to 701 in a flip-flop circuit in each highway selector, and a transistor corresponding to 703 in a flip-flip circuit in each time position store circuit. It is to be noted that the emitter electrodes of the above-identified transistors are made negative simultaneously with the application of B+ and B− potential to the circuits. Thus, the other transistor in each flip-flop circuit, namely, transistors 1005, 1007, and 702, is made conductive when power is applied to the circuits and the non-conductivity of the flip-flip circuit transistors 703 and 704 is assured. When transistor 903 again becomes conductive at the end of the ten microsecond period, the emitter electrodes of transistors 1004, 1006, 701, and 703 are again returned to ground potential. The positive-going pulse appearing at the collector of transistor 903 when that transistor again becomes conductive is coupled through capacitor 912 to the base of transistor 911 but has no effect on that transistor because of the unoperated condition of the outgoing call flip-flip circuit.

When transistor 1005 in the demand control flip-flop circuit becomes conductive, the negative potential appearing at the collector of non-conductive transistor 1004 renders demand switch transistor 1008 conductive since the emitter of that transistor is returned to ground potential at the collector of busy flip-flip circuit transistor 1002. When transistor 1008 becomes conductive, the ground potential appearing at its collector is coupled through diode 1009 to the units connect demand conductor UCD, which extends to the calling unit finder circuit 26. It will be recalled from the general description that calling unit finder circuit 26 is controlled by the potential applied to conductor UCD to search for the calling unit if an incoming register has been assigned for use and if an idle highway and channel are being marked on bus bars HWBB and TPBB, respectively. The calling unit finder circuit functions to apply a minus twelve volt potential to each of the MX conductors in turn and to each of the MY conductors in turn while each MX conductor is marked. It can be seen that conductors MX2 and MY1, which identify the illustrated unit, are coupled by diodes 1010 and 1011, respectively, to the base of units found transistor 1012. Diodes 1010 and 1011 form an "or" gate for positive signals and when conductors MX2 and MY1 are both returned to minus twelve volts, transistor 1012 is rendered conductive from the negative potential appearing at the collector of transistor 1004 in the demand control flip-flop circuit. It will be noted that the control counter 25 is stepped by the 20 kc. clock pulses of the type illustrated in Fig. 34. This pulse is a positive pulse of approximately ten microseconds duration and negative potential is applied to the X and Y conductors only when the positive pulse is not present. Therefore, conductors MX2 and MY1 will each have minus twelve volt potential applied thereto for a period of approximately forty microseconds. When transistor 1012 is rendered conductive, a positive-going pulse is coupled through capacitor 1013 and diode 1014 to the base of transistor 1007 in the read in flip-flop circuit. Transistor 1007 is thereby rendered non-conductive, transistor 1006 becomes conductive, and the emitter of read in control emitter follower transistor 1015 drops to a negative potential. When transistor 1006 becomes conductive, the positive-going potential swing at its collector is coupled through capacitor 1021 and diode 1022 to the base of transistor 1005 to restore the demand control flip-flop circuit to the condition wherein transistor 1004 is conductive and transistor 1005 is non-conductive. The resulting ground potential at the collector of transistor 1004 renders transistors 1008 and 1012 non-conductive and ground potential is removed from conductor UCD. The negative potential appearing at the emitter of transistor 1015 is applied to the base of reset transistor 1016 but transistor 1016 does not become conductive since the 20 kc. trigger conductor has minus twelve volt potential applied thereto at this time. The emitter of transistor 1015 is also coupled to the anode terminal of diode 1017 which, with diode 1018, forms a two-input "and" gate for negative signals. The anode of diode 1018 is also returned to a negative potential at this time since transistor 916 in the outgoing call flip-flip circuit is non-conductive. Therefore, a negative signal appears at the common cathode terminals of diodes 1017 and 1018 and is coupled through diodes 1019 and 1020 to conductor local and to register start conductor RST, respectively. The application of negative potential to conductor RST enables the storage circuit in the assigned register to read in the highway and channel marking signals applied to bus bars HWBB and TPBB, respectively, by the channel allotter, as explained in the general description. The application of negative potential to conductor local, which is wired on local terminating units only, controls the assigned register to automatically route the call to the attendant's position, as explained in the general description.

When the emitter potential of transistor 1015 drops to a negative value, the storage circuit in the illustrated unit is controlled to read in the highway and channel marking signals applied to bus bars HWBB and TPBB, respectively, by the channel allotter. It can be seen that the base of a transistor corresponding to transistor 705 in each highway selector and the base of a transistor corresponding to transistor 706 in each time position store circuit are returned to the emitter electrode of transistor 1015, that the emitter of each transistor corresponding to 705 is returned to an individual one of the highway marking conductors, and that the emitter of each transistor corresponding to 706 is returned to an individual one of the time position marking conductors. If it be assumed that the channel allotter is applying ground potential to highway conductor HW1 and time position marking conductor TPM1, thus identifying channel 1 on highway 1, it can be seen that transistors 705 and 706 are now rendered conductive. The transistors corresponding to 705 and 706 in the other highway selectors and time position store circuits, respectively, are not rendered conductive since their emitter electrodes are returned to minus twelve volt potential appearing on their individually associated highway and time position marking conductors. Ground potential appearing at the collector of conducting transistor 705 is utilized to trigger the flip-flop circuit comprising transistors 701 and 702 to the condition wherein transistor 701 is conductive and transistor 702 is non-conductive. Similarly, the ground potential appearing at the collector of conducting transistor 706 is utilized to trigger the flip-flip circuit comprising transistors 703 and 704 to the condition wherein both transistors are conductive.

The next occurring positive-going pulse on conductor 20 kc. trigger serves to render reset transistor 1016 conductive and the resulting positive-going pulse at the collector of transistor 1016 is coupled through capacitor 1023 and diode 1024 to the base of transistor 1006 to reset the read in control flip-flop circuit to the condition wherein transistor 1007 is conductive and transistor 1006 is non-conductive. When transistor 1007 becomes conductive, the emitter of transistor 1015 rises to ground potential and conductor local, conductor RST, the base of transistor 1016, the base of each transistor 705, and the base of each transistor 706 are returned to ground potential. Thus, the storage circuit in the illustrated unit is controlled to read in the highway and channel marking signals appearing on bus bars HWBB and TPBB and the read in control circuits are then disabled so that further marking signals appearing on those bus bars have no effect on the illustrated unit.

Returning to the consideration of the highway No. 1 selector, it can be seen that when transistor 702 becomes non-conductive responsive to the reading in of marking for highway 1, negative potential is applied to the base electrodes of calling transistor 801 and called transistor 802 in that highway selector. It will be recalled that the emitter of transistor 801 is returned to ground potential at the collector of conducting transistor 610 and that the emitter of transistor 802 is returned to minus twelve volt potential at the collector of non-conducting transistor 611. Therefore, transistor 801 is rendered conductive and transistor 802 remains non-conductive when transistor 702 is triggered to its non-conductive condition.

Figure 7:
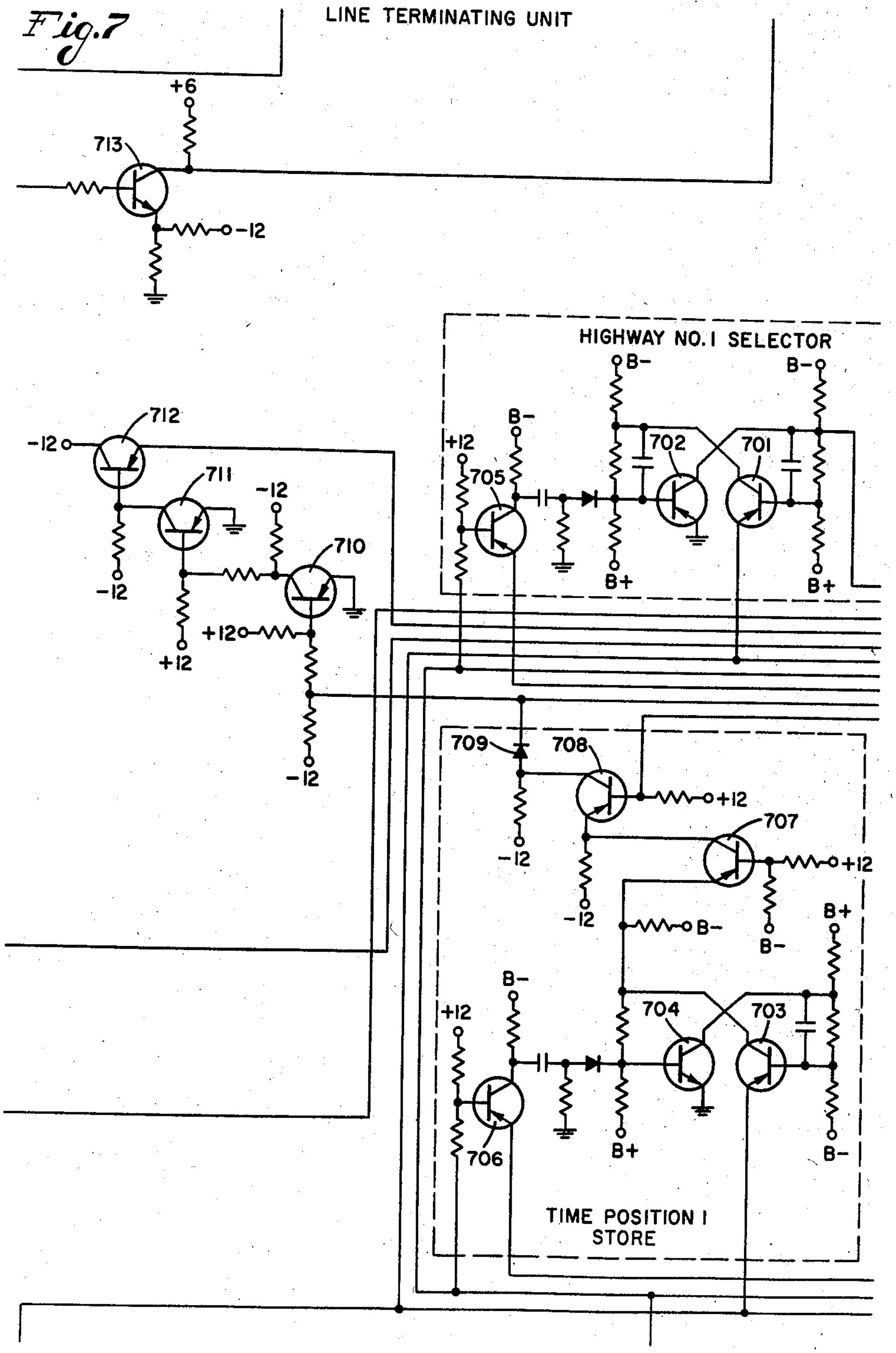
Figure 8:
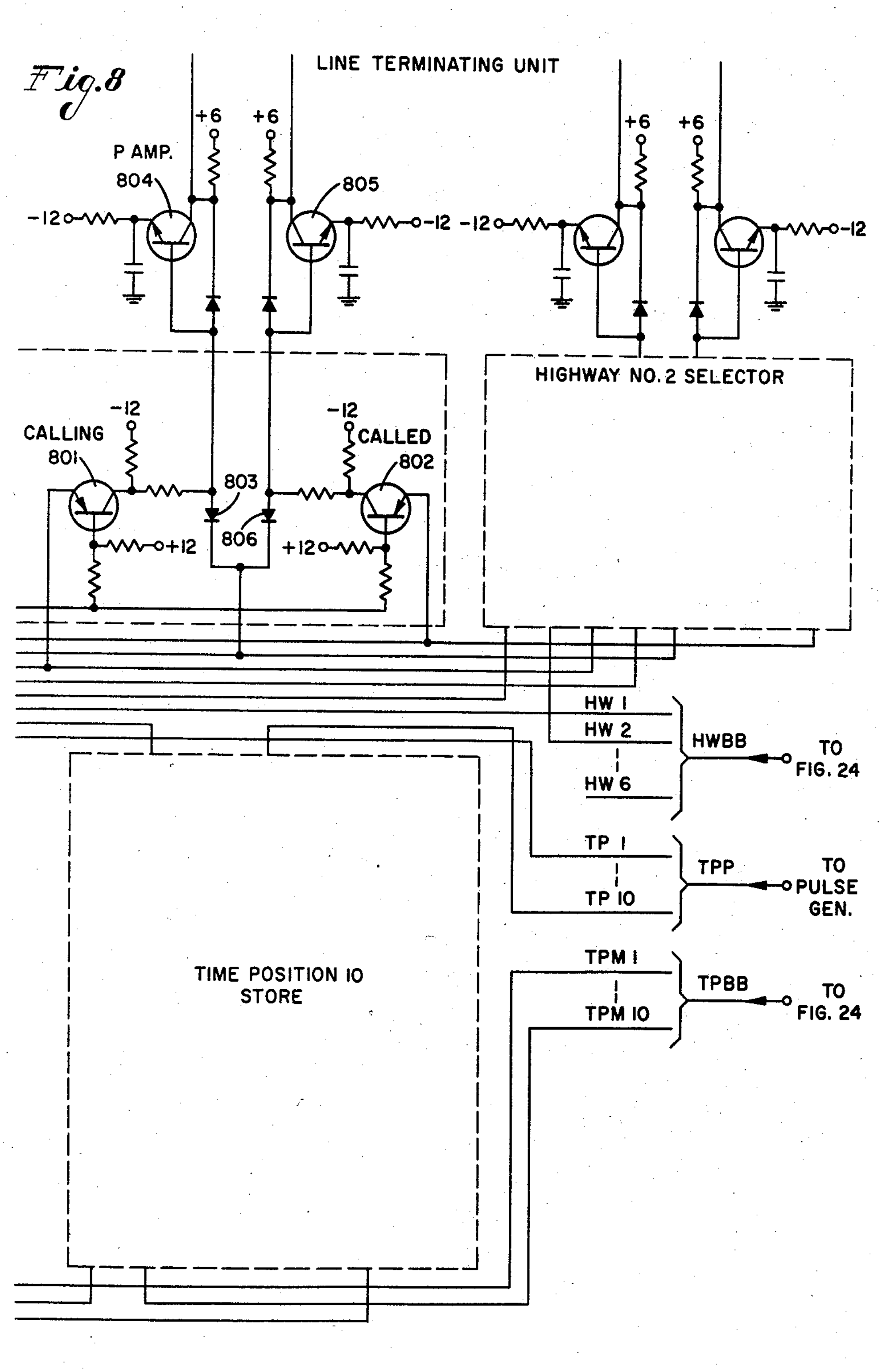
Figure 9:
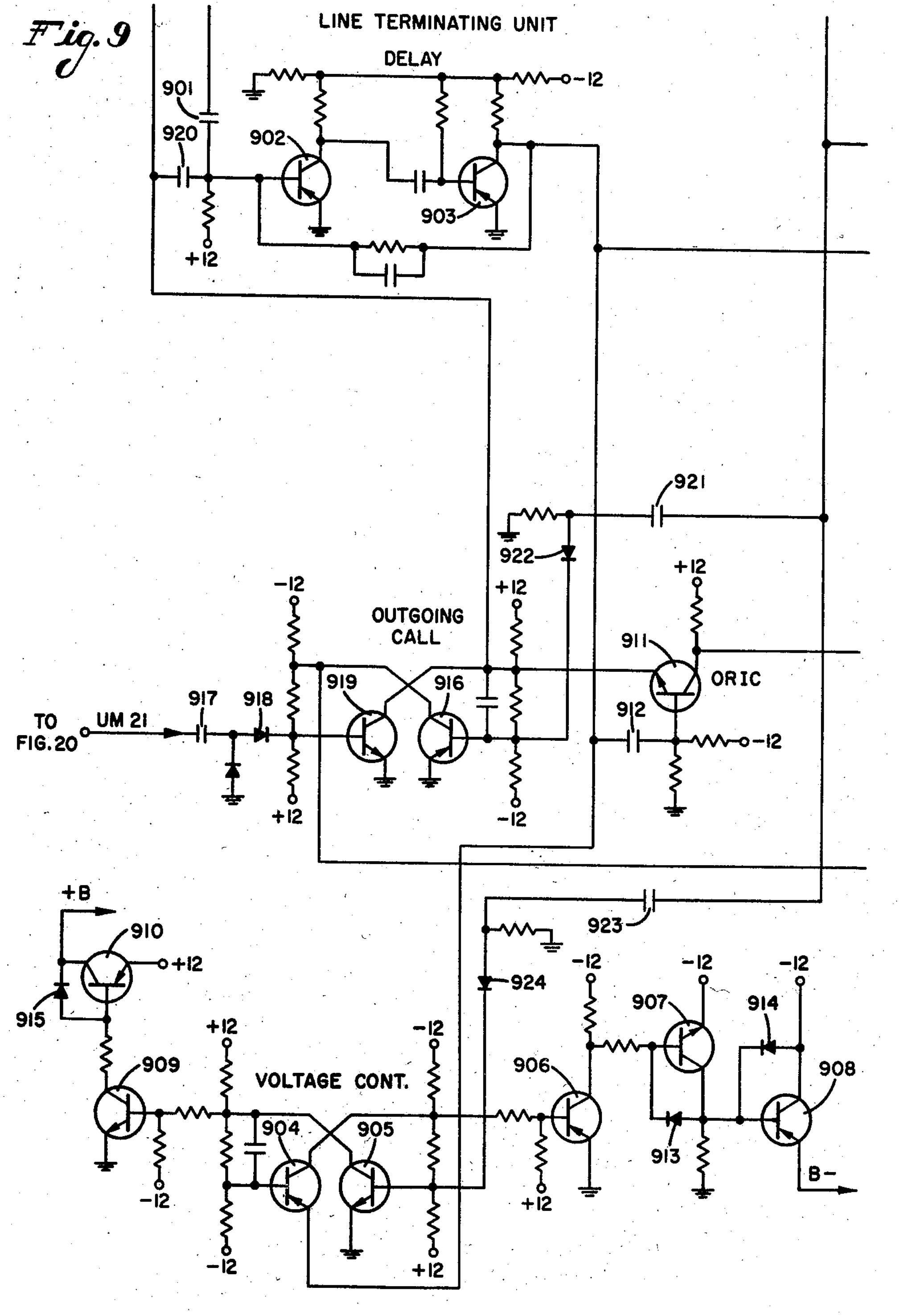

Referring to the time position 1 store circuit of Fig. 7, it can be seen that when transistors 703 and 704 are rendered conductive responsive to the reading in of marking for time position channel 1, ground potential is applied to the emitter of transistor 707 to render transistor 707 conductive and the ground potential is then switched through conducting transistor 707 and applied to the emitter of transistor 708 to enable transistor 708 for conduction. The base of transistor 708 is individually connected to time position 1 conductor TP1 and when a negative pulse is received on that conductor, transistor 708 is rendered conductive and a positive-going pulse is coupled through diode 709 to the base of transistor 710. Diode 709 forms one input of a ten-input "or" gate for positive pulses and the particular time position pulse coupled through the gate is determined by the setting of the time position store circuits. As just described, when the flip-flip circuit in time position 1 store circuit is operated, the pulse coupled through the "or" gate occurs in time position 1. As explained in the general description, the pulses appearing on conductors TP1–TP10, inclusive, occur at a frequency of 12 kc. and may be generated by any suitable pulse generator circuit. Pulses TP1–TP10 are graphically illustrated in Fig. 3A.

The positive pulse in time position 1 coupled through diode 709 is utilized to render transistor 710 non-conductive and the resulting negative-going pulse at the collector of transistor 710 renders transistor 711 conductive. The positive-going pulse appearing at the collector of transistor 711 is coupled to the base of emitter follower transistor 712. The emitter of transistor 712 is returned to ground at the collector of conducting calling transistor 801 through diode 803. When transistor 711 is non-conductive, the emitter of transistor 712 stands at approximately minus twelve volts and pulse amplifier 804 is held non-conductive. Now, when the emitter potential of transistor 712 rises to ground during time position 1, pulse amplifier 804 is rendered conductive to transmit a negative pulse to the calling send and receive gates associated with highway 1. It is to be noted that the pulses appearing at the emitter of transistor 712 are blocked from the base of pulse amplifier transistor 805, which controls the called send and receive gates associated with highway 1, by diode 806 which is biased in the reverse direction because of the non-conductivity of called transistor 802. Thus, a negative pulse is applied to the send and receive calling gates associated with highway 1 in time position 1 in each frame of the recurring pulse frames for the duration of the call under consideration.

Figure 4:
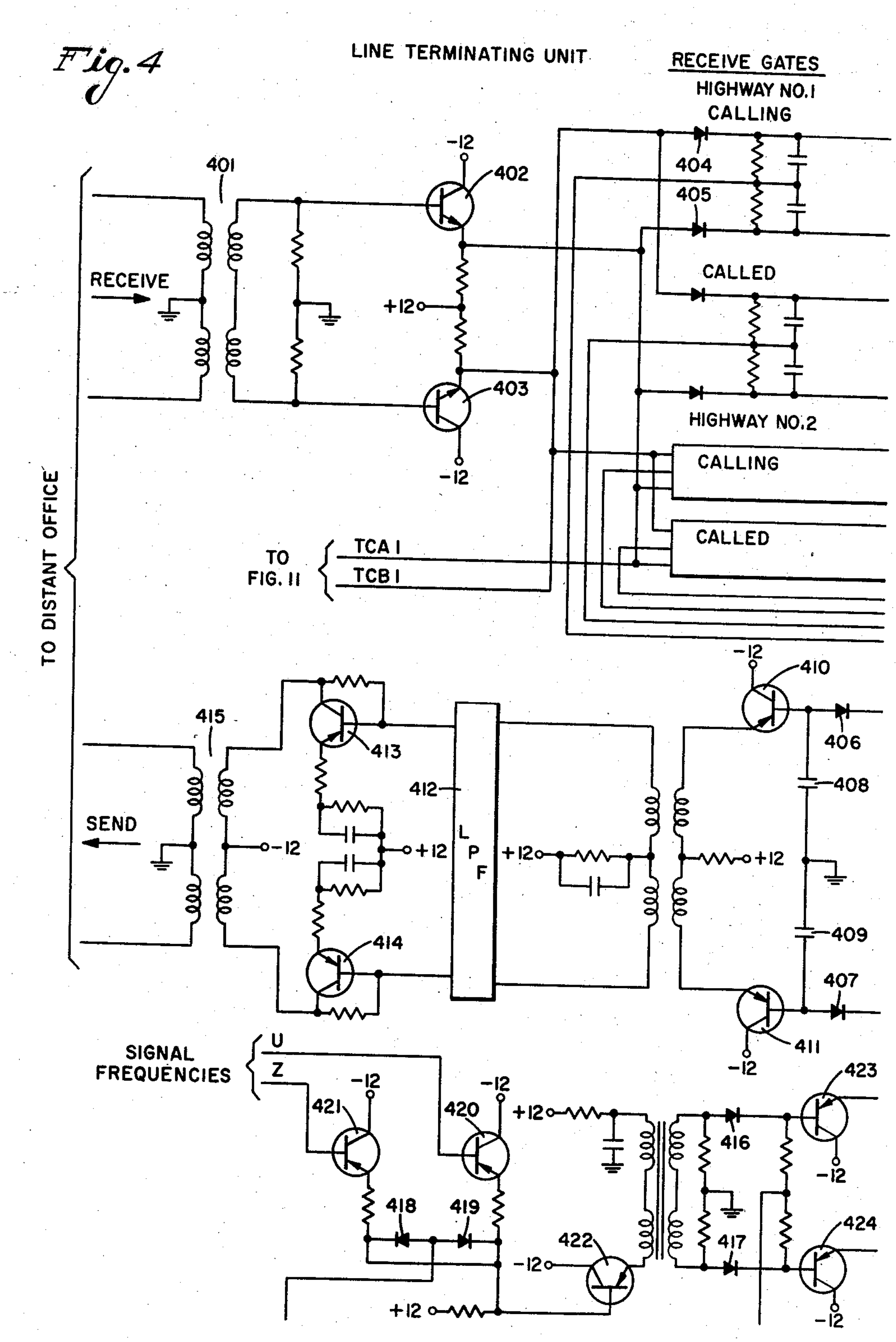
Figure 5:
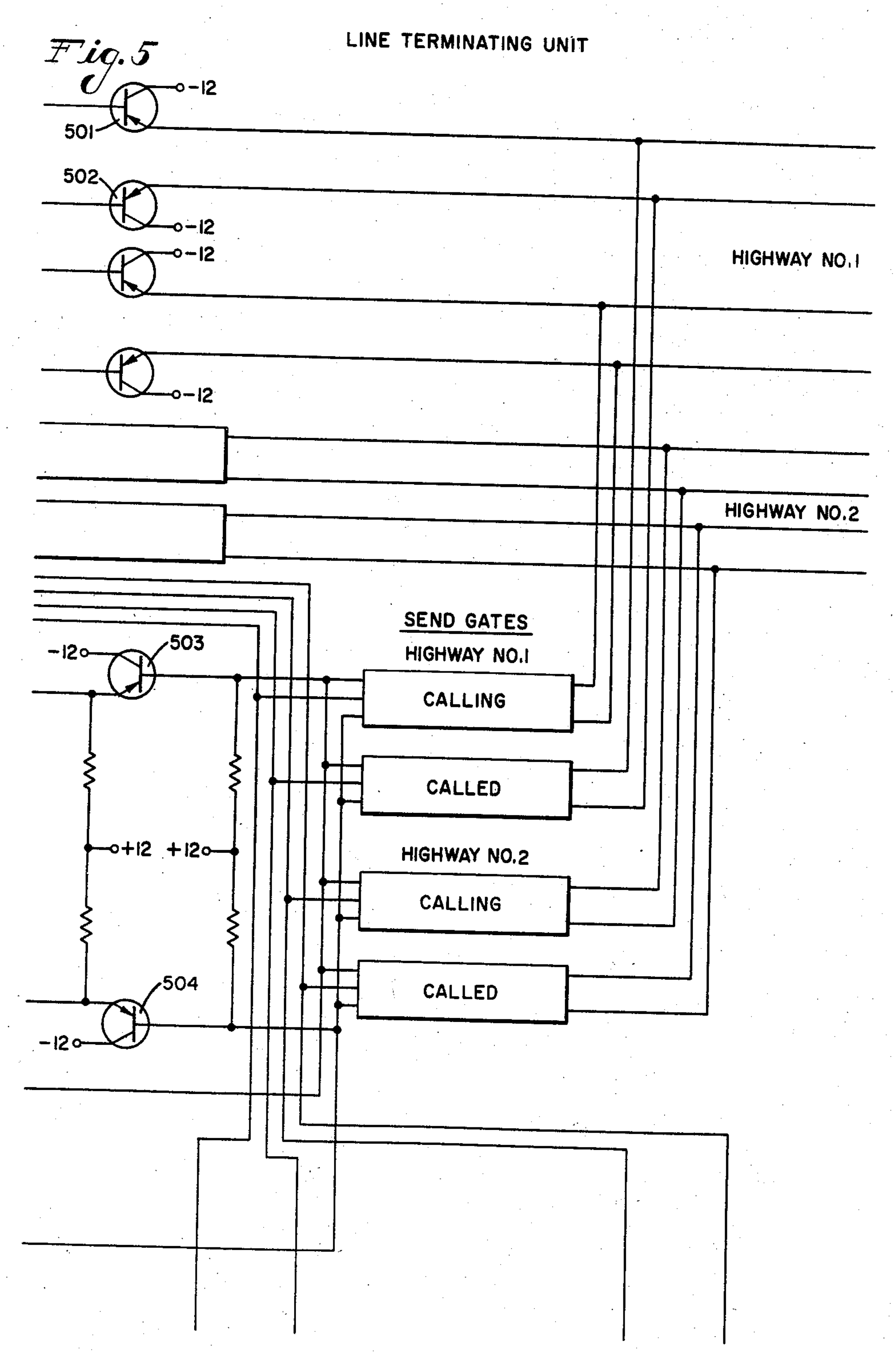
Figure 6:
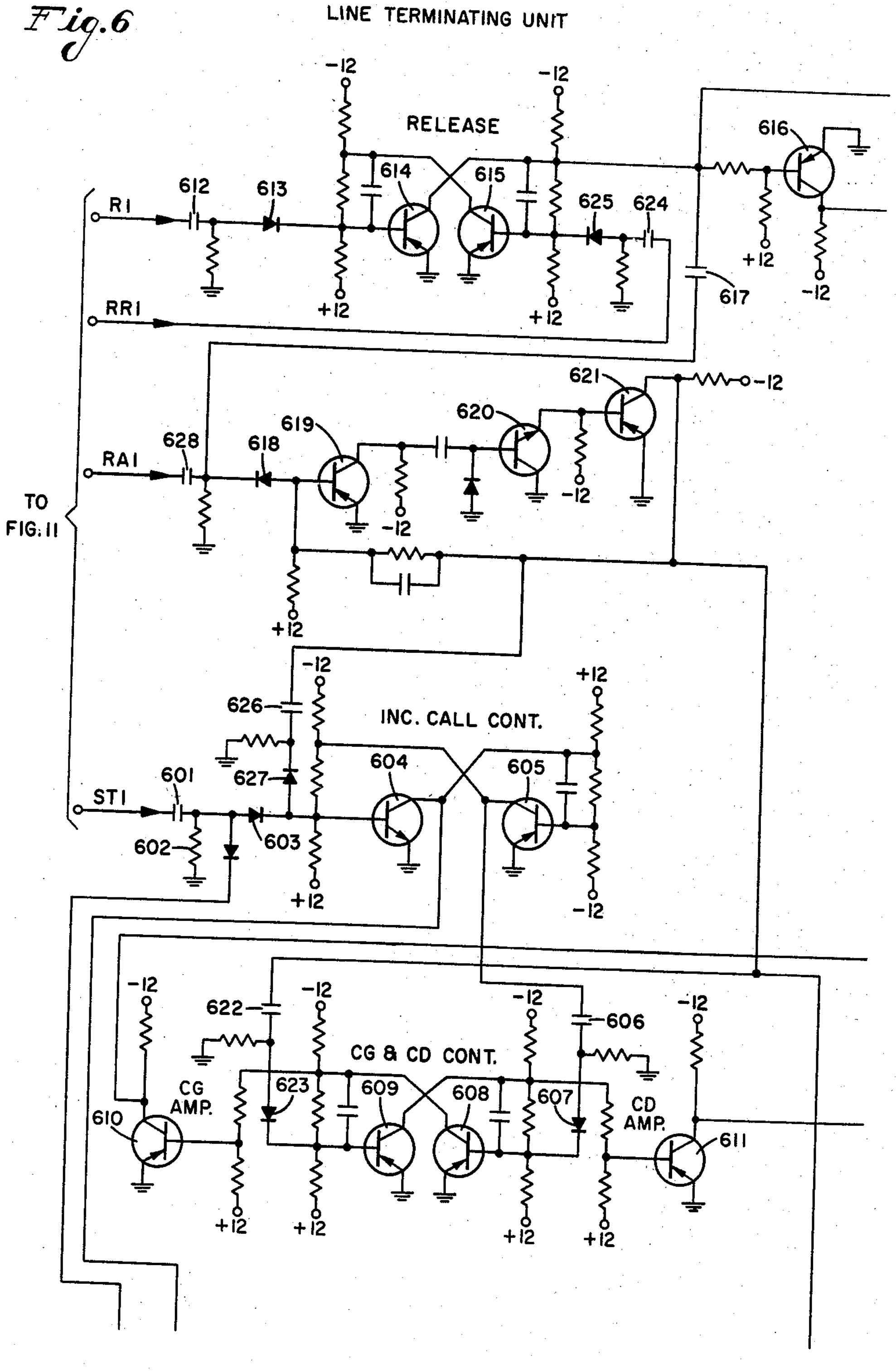

Examining the calling receive gate associated with highway 1 and shown in Fig. 4, it can be seen that the gate comprises diodes 404 and 405. The cathode terminals of diodes 404 and 405 are returned to the collector of pulse amplifier transistor 804, which collector stands at plus six volt potential except during time position 1. During time position 1, the collector of transistor 804 drops to approximately minus six volt potential and diodes 404 and 405 are biased for conduction and pass any signals appearing at the output of the buffer amplifier transistors 402 and 403. The signal samples passed by diodes 404 and 405 are amplified by emitter follower transistors 501 and 502 and applied to the upper pair of conductors of the four-wire highway No. 1 transmission network. Similarly, a pair of diodes in the calling send gate associated with highway No. 1 are controlled to pass signal samples appearing on the lower pair of conductors of the four-wire highway No. 1 transmission network in time position 1. The passed signal samples are applied to the base electrodes of push-pull connected, emitter follower transistors 503 and 504. As will be later described in detail, the incoming register assigned to handle the call being described is controlled by its channel identifying storage circuit to receive voice frequency seize and dialing signals in time position 1 appearing on the upper pair of conductors of highway 1 and to transmit voice frequency seize acknowledge and digit acknowledge signals in time position 1 to the lower pair of conductors of highway 1. Similarly, the called unit selected by the incoming register under control of the illustrated unit is controlled to receive voice and supervisory signals appearing in time position 1 on the upper pair of conductors of highway 1 and to transmit voice and supervisory signals in time position 1 to the lower pair of conductors of highway 1.

In the illustrated unit, the signal samples passed by the calling send gate associated with highway 1 and amplified by emitter follower transistors 503 and 504 are detected by diodes 406 and 407 and integrated by capacitors 408 and 409. The resulting demodulated signals are amplified by emitter follower transistors 410 and 411, passed through low-pass filter 412 to remove any 12 kc. signal, amplified in push-pull connected amplifier transistors 413 and 414, and coupled through repeat coil 415 to the send conductors of the trunk line extending to the distant office.

It is believed expedient to a more complete understanding of the invention to describe the operation of the illustrated unit when it is the called unit before proceeding to describe the release of the unit since the release operation is essentially the same whether the unit is calling or called. The illustrated unit is seized by the route selector over units marking conductor UM21 which is normally returned to minus twelve volt potential in the route selector. It will be recalled that the route selector functions to apply ground potential to conductor UM21 to seize the illustrated unit only if the unit is not marked busy by the application of ground potential to conductor busy 21. The positive-going signal applied to conductor UM21 is coupled through capacitor 917 and diode 918 to the base of transistor 919 in the outgoing call flip-flip circuit. The positive pulse renders transistors 919 and 916 conductive and the resulting negative-going signal at the collector of transistor 919 is coupled through capacitor 920 to trigger the monostable ten microsecond delay circuit comprising transistors 902 and 903. The negative-going pulse appearing at the collector of transistor 903 serves to trigger the voltage control and busy flip-flip circuits, and to set the read in control, demand control, highway selector, and time position store circuits, all as previously described in conjunction with an incoming call. Ground potential applied to unit connect demand conductor UCD has no effect at this time since the calling unit finder circuit is disabled by the route selector as described in the general description.

At the termination of the ten microsecond delay period, transistor 903 again becomes conductive and its collector rises to ground potential. This positive swing is coupled through capacitor 912 to the base of outgoing read in control transistor 911. Since the emitter electrode of transistor 911 is now returned to ground potential at the collector of transistor 919, transistor 911 is rendered conductive by the positive-going pulse. The resulting negative-going potential swing at the collector of transistor 911 is coupled through capacitor 1025 and diode 1026 to the base of transistor 1006 in the read in control flip-flop circuit and serves to operate that circuit to the condition wherein transistor 1006 is conductive and transistor 1007 is non-conductive. The resulting negative potential at the emitter of read in control amplifier transistor 1015 controls the highway selector and time position store circuits to read in the highway and time position channel information applied to the bus bars by one of the incoming registers or attendant's link circuits in the same manner as previously described. The "and" gate for negative signals, comprising diodes 1017 and 1018, is blocked at this time since the collector of transistor 916 stands at ground potential. Therefore, the negative pulse appearing at the emitter of transistor 1015 is not applied to conductors local and RST on an outgoing call. The next occurring positive-going pulse on conductor 20 kc. trigger renders transistor 1016 conductive to reset the read in control flip-flop circuit.

The only remaining difference between the operation on an incoming call and the operation on an outgoing call is that the calling and called control flip-flop circuit is not operated on an outgoing call. Therefore, called amplifier transistor 611 is conductive and serves to apply ground potential to the emitter electrode of a transistor corresponding to called transistor 802 in each of the highway selectors. Calling amplifier transistor 610 remains non-conductive on an outgoing call and thus serves to apply minus twelve volt potential to the emitter electrode of a transistor corresponding to calling transistor 801 in each of the highway selectors. Thus, assuming that highway 1 is the assigned highway and time position 1 is the assigned channel, the positive-going pulses in time position 1 which appear in the output circuit of transistor 712 are coupled to the base of pulse amplifier transistor 805 rather than to the base of pulse amplifier transistor 804. Therefore, the called receive and send gates associated with highway 1 are activated on an outgoing call.

It can be seen that the signals received over the trunk line and which appear at the output of the buffer amplifier transistors 402 and 403 are coupled through the called receive gate associated with highway 1 and applied to the lower pair of conductors of the four-wire highway 1 network. Similarly, the called send gate associated with the highway 1 is connected to the upper pair of conductors of the highway 1 network. It should now be apparent that a calling unit transmits signals to the highway on the upper pair of conductors and receives signals from the highway on the lower pair of conductors while a called unit transmits signals to the highway on the lower pair of conductors and receives signals from the highway on the upper pair of conductors.

The release of an established call is initiated by the transmission of a voice frequency release signal over either trunk line between the calling office and the illustrated long distance switching center or the trunk line between the called office and the illustrated long distance switching center. It will be recalled from the general description that the line terminating unit associated with the trunk line over which the release signal is received serves to transmit a release acknowledge signal back over that trunk line, the highway monitor circuit associated with the highway used to establish the call detects the release signal and is controlled to transmit a regenerated release signal to the other office, and that the line terminating unit associated with the trunk line over which the release signal is received is thereafter released from the connection. It will also be recalled that when a release acknowledge signal is received over the trunk line extending to the other office, the highway monitor circuit detects the release acknowledge signal and responsive thereto marks the channel used in the call as idle to the channel allotter, and the line terminating unit associated with the trunk line extending to the other office is thereafter released from the connection.

First assume that a voice frequency release signal is received over the receive conductors of the trunk line associated with the illustrated unit. The received release signal is amplified by transistors 402 and 403 and the amplified signal is passed through either the calling or called receive gates associated with highway 1 to highway 1, and is also applied to conductors TCA1 and TCB1, which extend to the seize and release scan circuit associated with the illustrated unit. When the seize and release scan circuit associated with the illustrated unit detects the voice frequency receive signal on conductors TCA1 and TCB1, it functions to apply a positive-going pulse to release conductor R1 which is individual to the illustrated unit. The positive-going pulse applied to conductor R1 is coupled through capacitor 612 and diode 613 to the base of transistor 614 in the release flip-flop circuit, comprising transistors 614 and 615, and serves to operate the release flip-flop circuit to the condition wherein transistor 615 is conductive and transistor 614 is non-conductive. The resulting negative potential at the collector of transistor 614 renders transistor 616 conductive and the resulting ground potential at the collector of conducting transistor 616 serves to make transistor 713 conductive. It can be seen that the cathode terminals of gating diodes 416 and 417 are returned to the collector of transistor 713. When transistor 713 is non-conductive and its collector stands at plus six volts, diodes 416 and 417 are biased for non-conduction. However, when transistor 713 is conductive and its collector potential drops to approximately minus six volts, diodes 416 and 417 are biased for conduction.

It can also be seen that the anode terminals of gating diodes 418 and 419 are returned to the collector terminal of transistor 614 in the release flip-flop circuit. Prior to the operation of the release flip-flop circuit, the release acknowledge signal frequencies U and Z amplified by emitter follower transistors 420 and 421, respectively, are shunted to ground potential at the collector of transistor 614 through diodes 418 and 419. However, when transistor 614 is rendered non-conductive responsive to the receipt of a release signal and its collector potential drops to a negative value, diodes 418 and 419 are biased for non-conduction. The release acknowledge signal frequencies appearing at the emitter electrodes of transistors 420 and 421 are now amplified by transistor 422, passed by diodes 416 and 417, and further amplified by emitter follower buffer amplifier transistors 423 and 424. The amplified signals appearing at the output of transistors 423 and 424 are applied to the base electrodes of transistors 503 and 504 and thus coupled to the send conductors of the trunk line terminated by the illustrated unit.

The negative-going potential swing at the collector of transistor 614, resulting from the receipt of a release signal, is also coupled through capacitor 617 and diode 618 to the base of transistor 619. Transistors 619, 620, and 621 comprise a monostable circuit in which transistor 621 is normally biased for conduction and transistors 619 and 620 are normally biased for non-conduction. When a negative signal is applied to the base of transistor 619, transistors 619 and 620 are rendered conductive and transistor 621 becomes non-conductive. The resulting negative potential swing at the collector of transistor 621 is coupled through capacitor 626 and diode 627 to the base of transistor 604 in the incoming call control flip-flop circuit and serves to restore that flip-flop, if operated, to the condition wherein both transistors are non-conductive. After a delay of approximately one second, which is sufficiently long to insure that the highway monitor circuit has detected the release signal, the delay circuit reverts to the condition in which transistors 619 and 620 are non-conductive and transistor 621 is conductive. The resulting positive-going swing at the collector of transistor 621 is coupled through capacitor 622 and diode 623 to the base of transistor 609 in the calling and called control flip-flop circuit, through capacitor 1027 and diode 1028 to the base of transistor 1002 in the busy flip-flop circuit, through capacitor 921 and diode 922 to the base of transistor 916 in the outgoing call flip-flip circuit, and through capacitor 923 and diode 924 to the base of transistor 905 in the voltage control flip-flip circuit. The positive pulse coupled to the just described base electrodes serves to return the respective circuits to their normal condition in which transistors 608, 904, and 905 are conductive and transistors 609, 1002, 1003, 916, and 919 are non-conductive. When transistors 904 and 905 in the voltage control flip-flip circuit again become conductive, minus twelve volt potential and plus twelve volt potential are removed from bus bars B— and B+, respectively, and the transistors in the highway selector and time position store circuits, as well as in the read in control and demand control flip-flop circuits, are rendered non-conductive.

When the release acknowledge signal transmitted over the send conductors of the trunk line by the illustrated unit is detected in the distant office, that office discontinues the transmission of the release signal over the receive conductors of the trunk line. The seize and release scan circuit associated with the illustrated unit is effective to transmit a positive-going pulse over conductor RR1 whenever a release signal is not detected on conductors TCA1 and TCB1. Therefore, when a release signal is no longer transmitted over the trunk line, the positive-going pulse appearing on conductor RR1 and coupled through capacitor 624 and diode 625 serves to reset the release flip-flop circuit to the condition wherein transistor 614 is conductive and transistor 615 is non-conductive. When transistor 614 again becomes conductive, gating diodes 416 and 417 are biased for non-conduction and gating diodes 418 and 419 are biased for condution to thereby discontinue the transmission of a release acknowledge signal to the send conductors of the trunk line.

The operation of the illustrated unit differs slightly from the above when a release acknowledge signal rather than a release signal is received over the receive conductors of the trunk line associated with the illustrated unit. Under these conditions, the seize and release scan circuit is responsive to the detection of a release acknowledge signal on conductors TCA1 and TCB1 to apply a positive-going signal to conductor RA1. The positive-going pulse on conductor RA1 is coupled through capacitor 628 and diode 618 to trigger the one-second delay circuit comprising transistors 619, 620, and 621. As previously described, when transistor 621 becomes conductive at the termination of the one-second delay period, which is sufficiently long to permit the highway monitor circuit to detect the release acknowledge signal, the illustrated unit is released from the connection and reset for operation on another call.

*Scan and release scan circuit*

Figure 11:
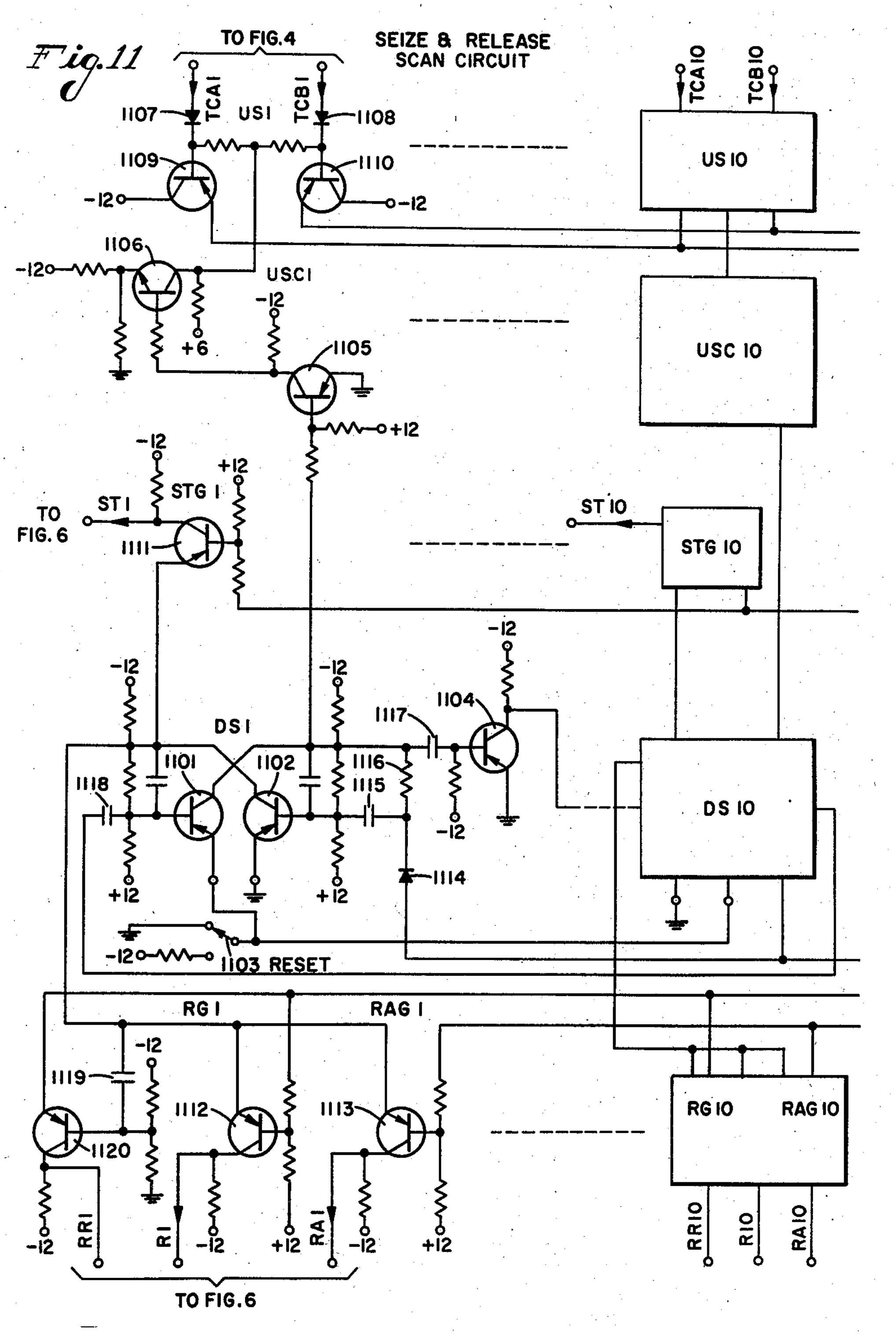
Figure 12:
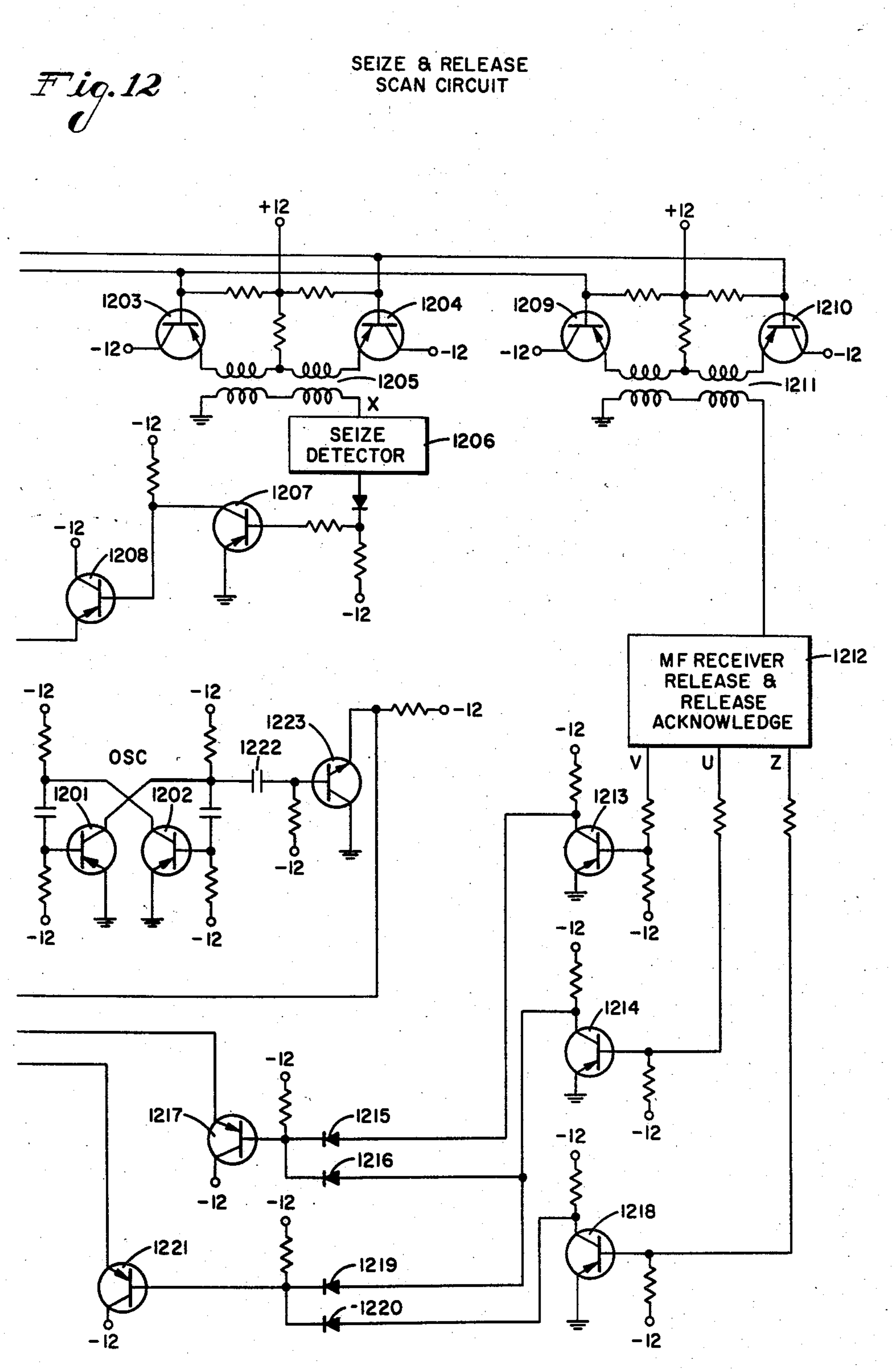
Figure 13:
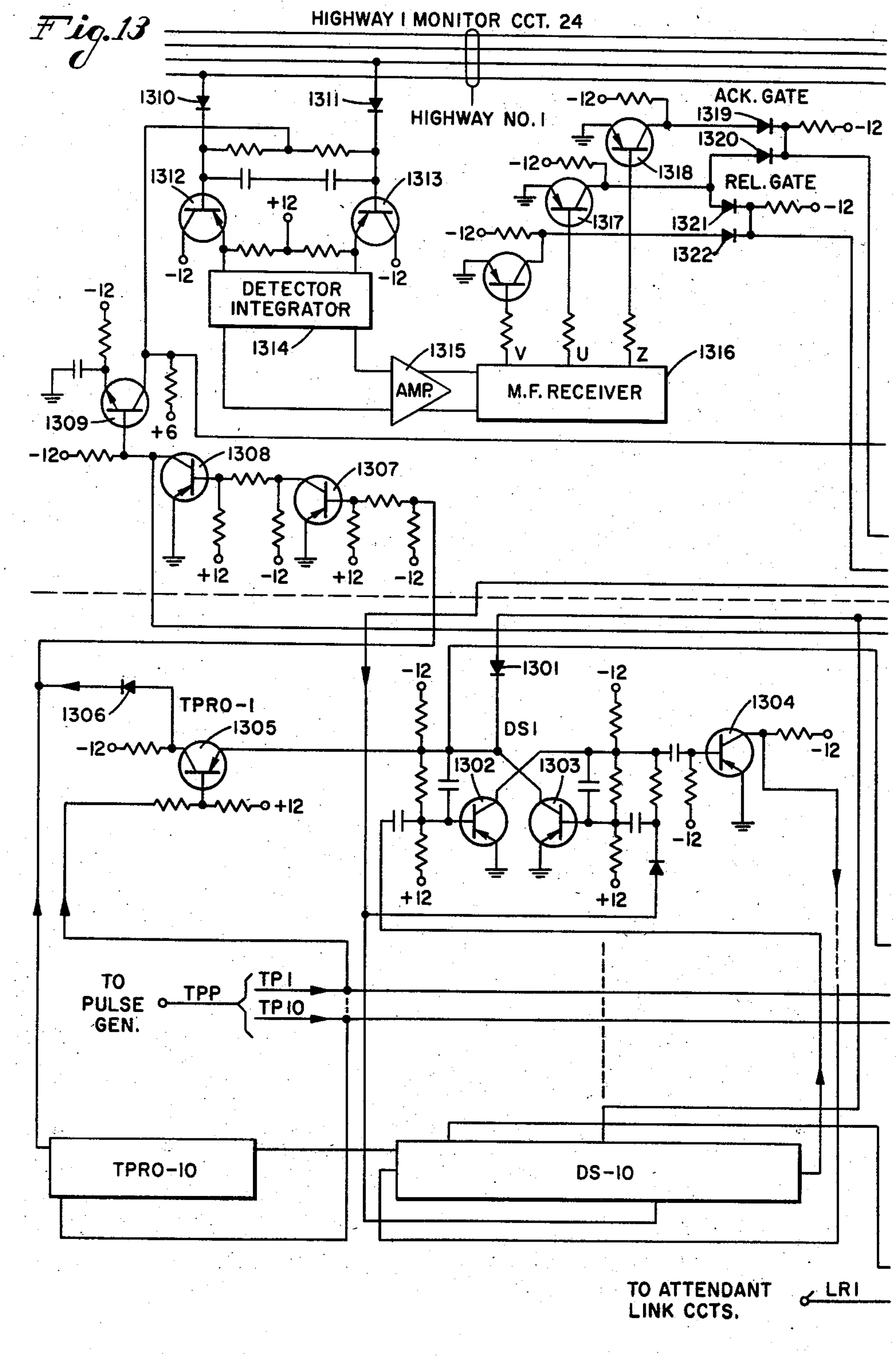
Figure 14:
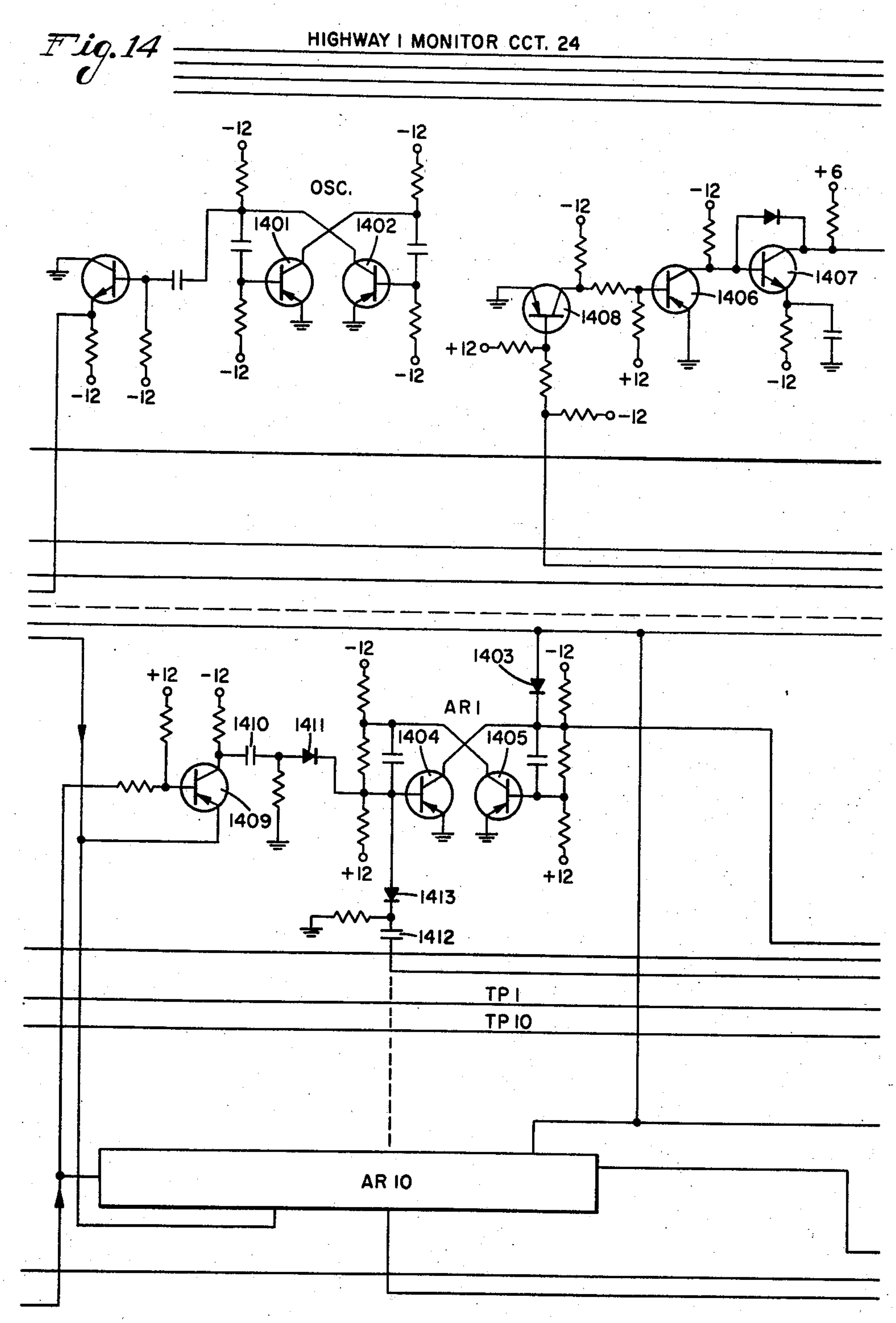
Figure 15:
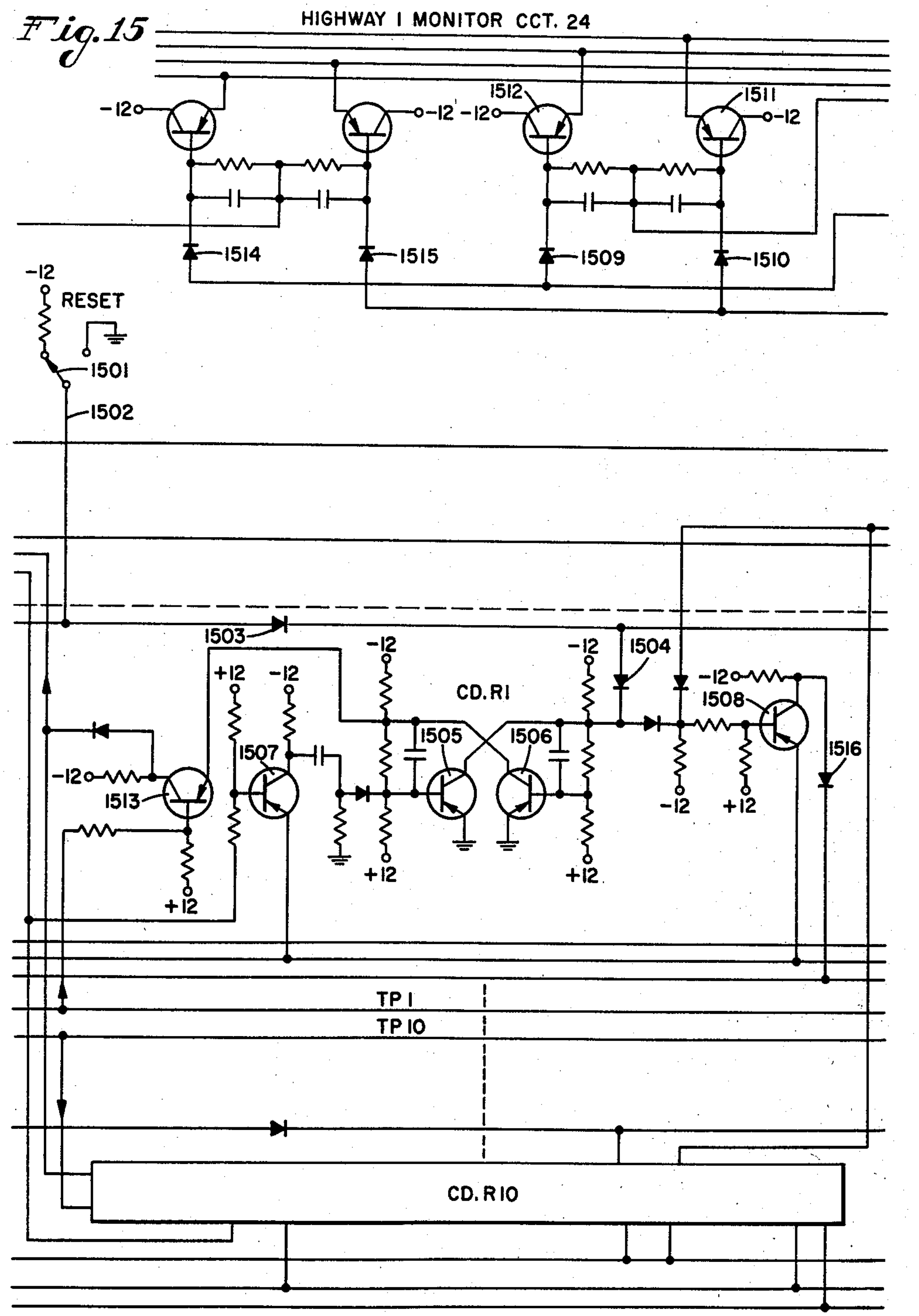
Figure 16:
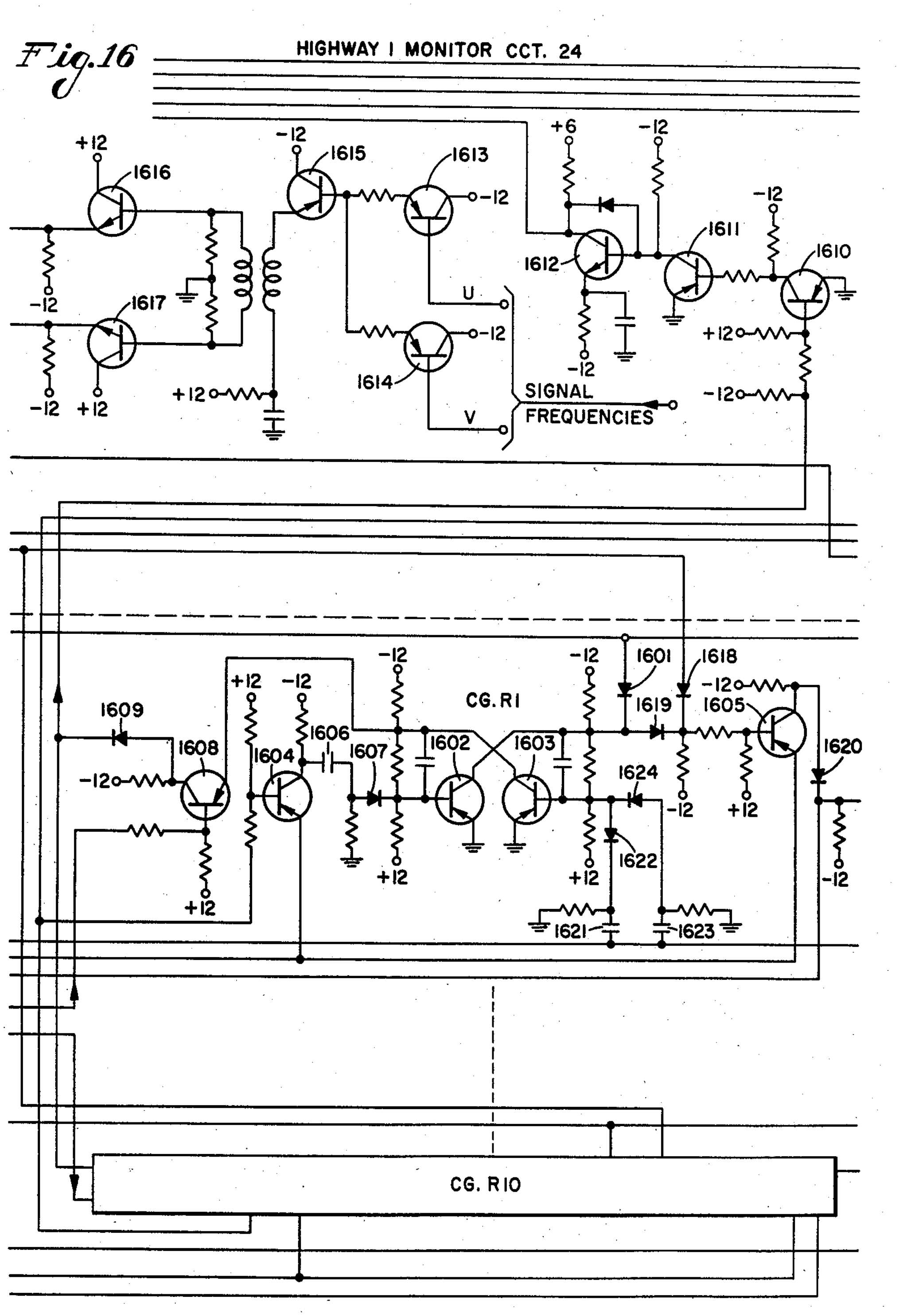
Figure 17:
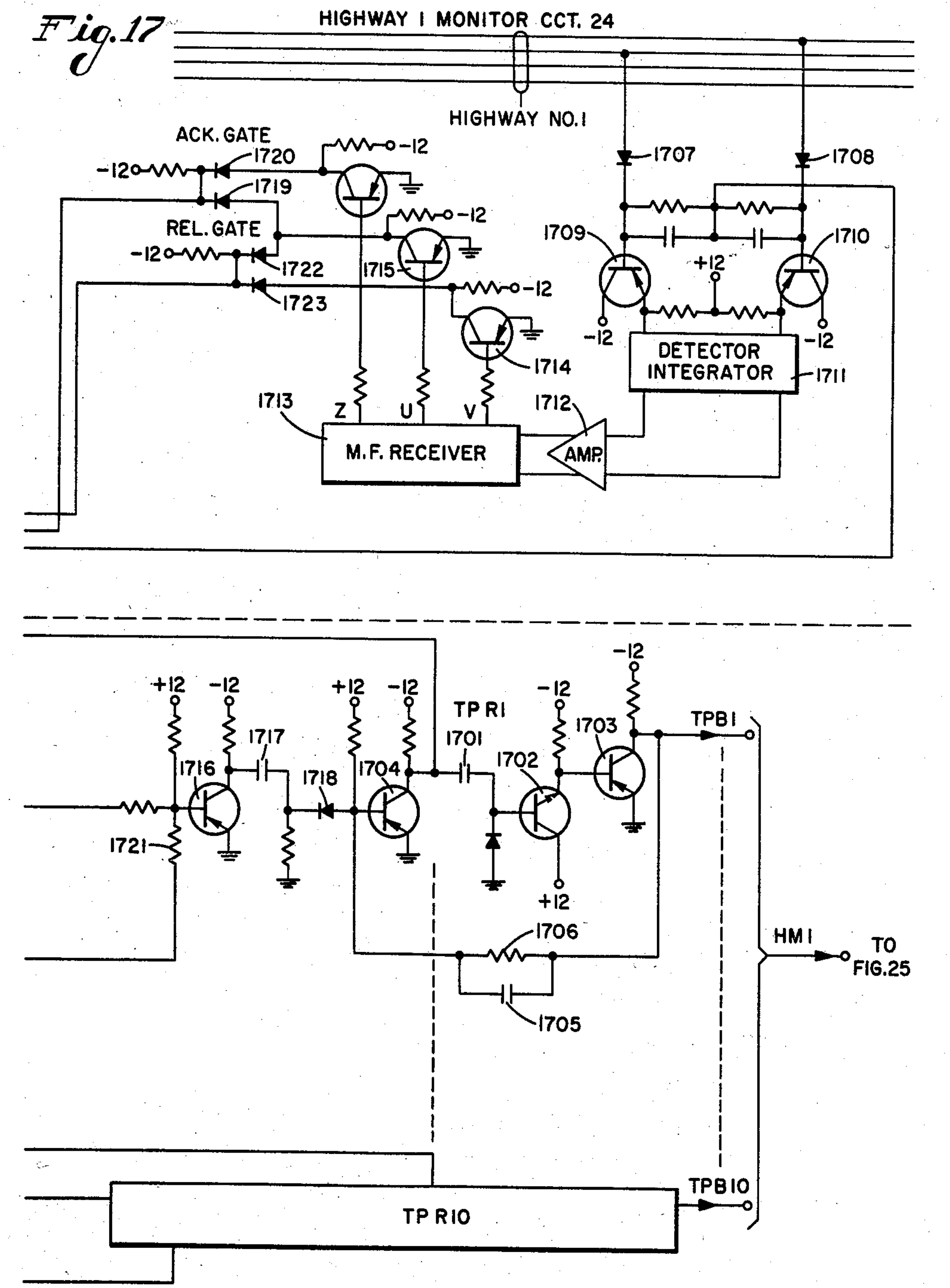

The seize and release scan circuit, shown in Figs. 11 and 12, is controlled to continuously scan a number of trunk line receive conductors for seize, release, and release acknowledge voice frequency signals. In practice, each seize and release scan circuit is associated with approximately ten trunk lines, which trunk lines are preferably in different groups so that the failure of a common seize and release scan circuit will not take out of service all of the trunk lines extending to a particular office.

The illustrated circuit comprises equipment common to the ten units terminating the ten trunk lines and ten groups of equipment individually corresponding to the units served by the circuit. The common equipment, which is shown in Fig. 12, comprises a seize signal detector, a multifrequency receiver for detecting release and release acknowledge signals, and a free running multivibrator oscillator. Each group of equipment individually corresponding to a unit served by the circuit comprises a unit scanning gate such as US1, a unit scanning control gate such as USC1, a start gate such as STG1, a distributor stage such as DS1, a release gate such as RG1, a release acknowledge gate such as RAG1, and a release reset gate such as RRG1.

The scanning operation is controlled by the distributor comprising stages DS1–DS10, inclusive, which is stepped under control of the free running multivibrator oscillator comprising transistors 1201 and 1202. When the circuit is first placed in operation, the reset switch 1103 is momentarily operated to the position in which minus twelve volt potential is applied to the emitter electrode of transistor 1101 in the first distributor stage DS1 and to the emitter electrode of the transistor corresponding to 1102 in all of the other distributor stages. Thus, responsive to the momentary operation of switch 1103, transistor 1102 in stage DS1 and the transistor corresponding to transistor 1101 in all of the other stages are rendered conductive. Also, it can be seen that the delay transistor 1104 in each of the stages is normally biased for conduction.

Referring to the first group of equipment, it can be seen that when transistor 1101 is non-conductive, transistor 1105 is biased for conduction and the ground potential appearing at the collector of transistotr 1105 biases transistor 1106 for conduction. Under these conditions, the cathode terminals of diodes 1107 and 1108 in the units scanning gate 1 are returned to the approximately minus six volt potential appearing at the collector of transistor 1106 and the diodes are biased in the forward direction to couple any signals appearing on conductors TCA1 and TCB1 to the base electrodes of emitter follower transistors 1109 and 1110, respectively. Units scanning gate 1 is the only one of the units scanning gates open at this time since all of the other distributor stages are operated to the condition in which the transistor corresponding to 1101 is conductive.

Signals appearing at the outputs of transistors 1109 and 1110 are amplified by emitter follower transistors 1203 and 1204 and coupled by transformer 1205 to the input of the seize detector 1206. Seize detector 1206 and all of the other single or multiple frequency receivers found in the system may be of any conventional type and are equipped with suitable voice guard circuits so that an output is realized from each receiver only when the particular frequency or frequencies to which it is responsive are received. If a seize signal of frequency X is applied to the input of detector 1206, a ground potential appears at the output of detector 1206 and normally conductive transistor 1207 is thereby rendered non-conductive. Thus, the potential at the emitter of emitter follower transistotr 1208 falls to a negative value. It can be seen that the emitter electrode of start gate 1 transistor 1111 is returned to ground potential at the collector of conducting transistor 1102 while the emitter electrodes of the remaining start gate transistors are returned to a negative potential. Therefore, only transistor 111 is rendered conductive when a negative potential appears at the emitter of transistor 1208. When transistor 1111 is conductive, ground potential is applied to start conductor ST1 which is individual to the unit being scanned. As previously explained, the application of ground potential to conductor ST1 serves to control the associated unit to seize an idle channel in the illustrated long distance switching center.

The signals appearing at the outputs of transistors 1109 and 1110 are also amplified by emitter follower transistors 1209 and 1210 and coupled by transformer 1211 to the input of release and release acknowledge detector 1212. If a release signal of compounded frequencies V and U is applied to the input of detector 1212, ground potential appears on output conductors V and U and normally conducting transistors 1213 and 1214 are rendered non-conductive. The anodes of diodes 1215 and 1216, which form an "and" gate for negative signals, are connected to the collector electrodes of transistors 1213 and 1214, respectively. Thus, when either one or both of transistors 1213 and 1214 is or are conductive, the emitter of emitter follower transistor 1217 stands at ground potential. However, when a release signal is received and both transistors 1213 and 1214 become non-conductive, the emitter electrode of transistor 1217 drops to approximately minus twelve volt potential. The emitter electrode of transistor 1217 is connected to the base electrode of the transistor corresponding to transistor 1112 in each of the release gates, but since the emitter of transistor 1112 in release gate 1 is the only one returned to ground potential at this time, transistor 1112 in release gate 1 is the only transistor rendered conductive when the emitter of 1217 drops to a negative potential. Therefore, ground potential is applied to release conductor R1 whenever a release signal is received on conductors TCA1 and TCB1 while the receiver is connected thereto. Similarly, if a release acknowledge signal of compounded frequencies U and Z is applied to the input of detector 1212, ground potential appears on output conductors U and Z and normally conducting transistors 1214 and 1218 are rendered non-conductive. The anode terminals of diodes 1219 and 1220, which form an "and" gate for negative signals, are connected to the collector electrodes of transistors 1214 and 1218, respectively. Thus, when either one or both of transistors 1214 and 1218 is or are conductive, the emitter electrode of emitter follower transistor 1221 stands at ground potential. However, when a release acknowledge signal is received and both transistors 1214 and 1218 are non-conductive, the emitter of electrode of transistor 1221 drops to approximately minus twelve volt potential. The emitter electrode of transistor 1221 is connected to the base electrode of the transistor corresponding to transistor 1113 in each of the release acknowledge gates but since the emitter of transistor 1113 in release acknowledge gate 1 is the only one returned to ground potential at this time, transistor 1113 in release acknowledge gate 1 is the only transistor rendered conductive when the emitter of transistor 1221 drops to a negative potential. Therefore, ground potential is applied to release acknowledge conductor RA1 whenever a release acknowledge signal is received on conductors TCA1 and TCB1 while the receiver is connected thereto.

As previously stated, the setting of the distributor stages is controlled by the free running multivibrator oscillator comprising transistors 1201 and 1202. Each time that transistor 1201 becomes conductive in the cycle of operation, the positive-going potential swing at its collector is coupled through capacitor 1222 to the base of emitter follower transistor 1223. The resulting positive-going pulse at the emitter of transistor 1223 is coupled through a diode corresponding to diode 1114 and a capacitor corresponding to capacitor 1115 to the base electrode of the transistor corresponding to transistor 1102 in each distributor stage. In distributor stage 1, the positive pulse applied to the base of transistor 1102 serves to reset that flip-flop circuit to the condition wherein transistor 1101 is conductive and transistor 1102 is non-conductive. The positive pulse applied to the base of the transistor corresponding to 1102 in each of the other distributor stages has no effect since transistor 1102 is non-conductive in those distributor stages. In distributor stage 1, the positive pulse coupled through diode 1114 is also coupled through resistor 1116 and capacitor 1117 to the base of transistor 1104 and thus renders that transistor non-conductive. It can be seen that the positive pulse coupled through the diode corresponding to diode 1114 in the other stages has no effect on the transistor corresponding to 1104 in those stages since the upper end of the resistor corresponding to 1116 is held at ground potential by virtue of the conduction of the transistor corresponding to 1101 in those stages.

When transistor 1104 in distributor stage 1 is rendered non-conductive, the resulting negative potential swing at its collector is coupled through a capacitor corresponding to capacitor 1118 to the base of the transistor corresponding to 1101 in the second distributor stage. Since the transistor corresponding to 1101 in the second distributor stage is already conductive, the negative pulse has no effect on that stage. Capacitor 1117 in distributor stage 1 now discharges to a point where the base of transistor 1104 is negative with respect to its emitter and transistor 1104 is again rendered conductive. The resulting positive-going pulse at the collector of transistor 1104 is coupled through a capacitor corresponding to capacitor 1118 in stage 2 and serves to set the second distributor stage to the condition wherein the transistor in that stage corresponding to 1102 is conductive and the transistor corresponding to 1101 is non-conductive. The delay introduced in the stepping of the distributor stages by transistor 1104 is sufficient to permit the detector outputs to decay to zero if a signal has been detected on the previously sampled trunk line. Thus, it can be seen that the frequency at which the free running multivibrator oscillator is designed to operate is controlled by the above described requirements.

It will be recalled that distributor stage 1 is reset to the condition wherein transistor 1101 is conductive and transistor 1102 is non-conductive immediately upon the receipt of a positive pulse from the oscillator. When the collector of transistor 1101 returns to ground potential, transistors 1105 and 1106 become non-conductive and diodes 1107 and 1108 are biased in the reverse direction so that any signals appearing on conductors TCA1 and TCB1 are blocked from the detector circuits. Also, when the collector of transistor 1102 returns to a negative potential, transistors 1111, 1112, and 1113 are biased for non-conduction. The negative potential swing at the collector of transistor 1102 is also coupled through capacitor 1119 to the base of transistor 1120 in the release reset gate 1. Transistor 1120 is rendered conductive by the negative pulse only if the emitter electrode of transistor 1217 stands at ground potential, thus signifying that a release signal was not detected on conductors TCA1 and TCB1. If a release signal was not detected while receiver 1212 was connected to conductors TCA1 and TCB1, transistor 1120 applies a positive-going pulse to conductor RR1 to reset the release flip-flop circuit in the line terminating unit if that flip-flop circuit is in an operated condition.

It should be obvious from the about that the seize and release scan circuit is continuously operated to scan each of its associated trunk lines in turn for seize, release, and release acknowledge signals. If any one of those signals is detected, a signal is applied to a corresponding conductor individual to the line terminating unit which terminates that trunk line.

*Highway monitor circuit*

A highway monitor circuit, such as the one shown in Figs. 13–17, inclusive, is provided for each highway transmission network in the long distance switching center. Each highway monitor circuit is controlled to continuously scan the ten time position channels on its associated highway for release and release acknowledge voice frequency signals. It will be recalled from the description of the line terminating unit that a calling unit transmits signals to the upper pair of highway conductors and receives signals on the lower pair of highway conductors, while a called unit transmits signals to the lower pair of highway conductors and receives signals from the upper pair of highway conductors. Therefore, since release and release acknowledge signals may be transmitted over either the trunk line associated with the calling unit or the trunk line associated with the called unit, it is necessary for the highway monitor circuit to monitor both pairs of highway conductors for release and release acknowledge signals.

The illustrated circuit comprises equipment common to the ten time position channels and ten groups of equipment individually corresponding to the ten time position channels. The common equipment, which is shown above the dotted line in Figs. 13–17, inclusive, comprises two multifrequency receivers for monitoring the upper and lower pairs of conductors of the highway, respectively, a free running multivibrator oscillator, and the necessary equipment for applying locally generated release signals to either the upper or lower pairs of conductors of the highway. Each group of equipment individually corresponding to a time position channel comprises a time position read out gate such as TPRO1, a distributor stage such as RS1, an attendant's release circuit such as AR1, a called release gate such as CDR1, a calling release gate such as CGR1, and a time position reset gate such as TPR1.

The scanning operation is controlled by the distributor comprising stages DS1–DS10, inclusive, and which is stepped under control of the free running multivibrator oscillator comprising transistors 1401 and 1402. When the circuit is first placed in operation, the reset switch 1501 is momentarily operated to the position in which ground potential is applied to conductor 1502. The positive-going pulse applied to conductor 1502 is coupled through diode 1301 to the base of transistor 1302 in the first distributor stage and through a diode corresponding to diode 1301 to the base of a transistor corresponding to transistor 1303 in each of the other distributor stages. The distributor stages are thus set to the condition wherein transistor 1303 is conductive in the first stage and the transistor corresponding to transistor 1302 is conductive in all of the other distributor stages. The transistor corresponding to transistor 1304 is biased for conduction in each of the distributor stages. The positive-going pulse on conductor 1502 is also coupled through a diode corresponding to diode 1403 to the base of a transistor corresponding to transistor 1405 in each of the attendant's release gate circuits so that the flip-flop circuit in each gate is operated to the condition in which transistor 1404 is conductive and transistor 1405 is non-conductive. The positive-going pulse on conductor 1502 is also coupled through diodes corresponding to diodes 1503 and 1504 to the base of a transistor corresponding to transistor 1506 in each of the called release gates so that the flip-flop circuit in each gate is operated to the condition wherein transistor 1505 is conductive and transistor 1506 is non-conductive. The positive-going pulse on conductor 1502 is also coupled through diodes corresponding to diodes 1503 and 1601 to the base of a transistor corresponding to transistor 1603 in each of the calling release gates so that the flip-flop circuit in each gate is operated to the condition in which transistor 1602 is conductive and transistor 1603 is non-conductive. The positive-going pulse on conductor 1502 is also coupled through a diode corresponding to diode 1503 and a capacitor corresponding to capacitor 1701 to the base of a transistor corresponding to transistor 1702 in each time position reset circuit. Transistors 1702, 1703, and 1704 in each time position reset circuit comprise a monostable circuit in which transistor 1704 is normally non-conductive, the emitter of transistor 1702 is normally slightly negative, and transistor 1703 is normally conductive. A positive pulse coupled through capacitor 1701 serves to produce a positive pulse at the emitter of transistor 1702 and transistor 1703 is thereby rendered non-conductive. The negative potential swing at the collector of transistor 1703 is coupled through capacitor 1705 and resistor 1706 to the base of transistor 1704 and renders that transistor conductive. After approximately a one-second delay, the monostable circuit reverts to the condition wherein transistors 1702 and 1704 are non-conductive and transistor 1703 is conductive. Thus, a negative-going pulse of approximately one-second duration is applied to the individual time position busy conductor, such as TPB1, which extends to the channel allotter circuit. As will be explained more fully hereinafter, the trailing edge of the pulse applied to conductor TPP1 is utilized in the channel allotter circuit to mark the time position 1 channel on highway network 1 as idle to the channel allotter. Thus, responsive to the momentary operation of reset key 1501, the various gate circuits are set, distributor stage 1 is activated, and the ten time position channels are marked idle to the channel allotter.

Referring to distributor stage 1, it can be seen that the ground potential appearing at the collector of conducting transistor 1303 is applied to the emitter electrodes of transistors 1507 and 1508 in the called release 1 gate and to the emitter electrodes of transistors 1604 and 1605 in the calling release 1 gate. Thus, transistors 1507, 1508, 1604, and 1605 are enabled for operation while the corresponding transistors in the other called and calling release gates are not so enabled because of the non-conductivity of the transsistor corresponding to 1303 in their associated distributor stages. The ground potential appearing at the collector of conducting transistor 1303 is also applied to the emitter of the time position read out 1 transistor 1305. Each negative-going four microsecond pulse appearing on conductor TP1 thus serves to render transistor 1305 conductive as long as transistor 1303 is conductive. It should be apparent that the other time position read out transistors corresponding to transistor 1305 are not rendered conductive by the negative pulses appearing on their individually associated time position pulse conductors since the emitter electrodes of those transistors are returned to a negative potential at the collector of the transistor corresponding to 1303 in their individually associated distributor stages.

The positive-going pulses in time position 1 appearing at the collector of transistor 1305 are coupled through diode 1306, which forms one input of a ten-input "or" gate for positive pulses, and each pulse serves to render normally conductive transistor 1307 non-conductive. Each negative-going pulse at the collector of transistor 1307 renders transistor 1308 conductive and each resulting positive-going pulse at the collector of transistor 1308 renders transistor 1309 conductive. Thus, as long as the first distributor stage is operated to the condition wherein transistor 1303 is conductive, a negative-going pulse in time position 1 periodically appears at the collector of transistor 1309. It can be seen that the cathode terminals of gating diodes 1310 and 1311, and the cathode terminals of gating diodes 1707 and 1708 are returned to the collector of transistor 1309. When transistor 1309 is non-conductive and its collector stands at plus six volt potential, these diodes are biased in the reverse direction. However, when transistor 1309 is conductive and its collector stands at approximately minus six volt potential, the above-mentioned diodes are biased in the forward direction. Signals transmitted to the highway by a called unit and appearing on the lower pair of highway conductors in time position 1 are passed through diodes 1310 and 1311, amplified by emitter follower transistors 1312 and 1313, detected and integrated by detector integrator 1314, amplified by amplifier 1315, and applied to the input of multifrequency receiver 1316. Similarly, signals transmitted by a calling unit and appearing on the upper pair of highway monitors in time position 1 are passed by diodes 1707 and 1708, amplified by emitter follower transistors 1709 and 1710, detected and integrated by detector integrator 1711, amplified by amplifier 1712, and applied to the input of multifrequency receiver 1713. Detector integrators 1314 and 1711 and amplifiers 1315 and 1712 may be identical to their previously described respective counterparts in the line terminating unit. As previously stated, the multifrequency receivers used throughout the system may be of any conventional type and are equipped with suitable voice guard circuits so that an output is realized from each receiver only when the particular frequencies to which it is responsive are received.

To illustrate the operation of the circuit, first assume that a voice frequency release signal of compounded frequencies U and V is transmitted over a trunk line associated with a calling unit and signal samples of said release signal appear on the upper pair of highway conductors in time position 1. When a release signal of frequencies U and V is applied to the input of multifrequency receiver 1713, ground potential appears on output conductors U and V and normally conductive transistors 1714 and 1715 are rendered non-conductive. The anodes of release gate diodes 1722 and 1723, which form an "and" gate for negative signals, are connected to the collector electrodes of transistors 1715 and 1714, respectively. Thus, when either one or both of transistors 1714 and 1715 is or are conductive, ground potential is applied to the base electrode of a transistor corresponding to transistor 1604 in each of the calling release gate circuits. However, when a release signal is received and both transistors 1714 and 1715 are non-conductive, the output of the release gate drops to a negative potential value and transistor 1604 in calling release gate 1 is rendered conductive since its emitter electrode is returned to ground potential at the collector of conducting transistor 1313. The resulting positive-going potential swing at the collector of transistor 1604 is coupled through capacitor 1606 and diode 1607, and serves to set the calling release flip-flop circuit to the condition in which transistor 1603 is conductive and transistor 1602 is non-conductive. When transistor 1603 becomes conductive, the emitter of transistor 1608 is returned to ground potential and each negative pulse thereafter occurring on time position conductor TP1 serves to render transistor 1608 conductive.

The positive-going pulses in time position 1 appearing at the collector of transistor 1608 are coupled through diode 1609, which forms one input of a ten-input "or" gate for positive pulses, and applied to the base of normally conductive transistor 1610 to make that transistor non-conductive. Each negative-going pulse appearing at the collector of transistor 1610 is reproduced as a positive-going pulse at the collector of transistor 1611 and transistor 1612 is thereby rendered conductive to apply a minus six volt pulse to the cathode terminals of gating diodes 1509 and 1510. When gating diodes 1509 and 1510 are biased for conduction during time position 1, the locally generated release signal frequencies U and V, which are amplified and modulated by transistors 1613 and 1614, amplified by transistor 1615, and amplified by emitter follower transistors 1616 and 1617, are passed by the diodes and applied through emitter follower transistors 1511 and 1512 to the upper pair of conductors of the transmission highway network. Thus, it can be seen that when a release signal is detected by the highway monitor circuit on the upper pair of highway conductors in any particular time position, the monitor circuit functions to apply a locally generated release signal to the upper pair of conductors in the same time position. It will be recalled that the calling unit which terminates the trunk line over which the release signal is received, is released from the connection after a time delay of sufficient duration to allow the monitor circuit to detect the release signal. The highway monitor circuit continues to apply the release signal to the upper pair of conductors in time position 1 and thus to the called unit and the send conductors of the trunk line terminated by that unit until a release acknowledge signal is returned over the receive conductors of that trunk line to the illustrated long distance switching center.

When a release acknowledge signal is returned over the receive conductors of the trunk line terminated by the called unit, release acknowledge signal samples appear on the lower pair of highway conductors in time position 1. When a release acknowledge signal of frequencies U and Z is applied to the input of multifrequency receiver 1316, ground potential appears on output conductors U and Z, normally conductive transistors 1317 and 1318 are rendered non-conductive, and a negative signal appears at the output of the acknowledge gate comprising diodes 1319 and 1320. The negative potential signal appearing at the output of the acknowledge gate is applied to the anode of diode 1618, which with diode 1619 forms an "and" gate for negative signals. Since the anode terminal of diode 1619 is also returned to a negative potential at the collector of non-conducting transistor 1602, the output of the gate goes negative and transistor 1605 becomes conductive. When transistor 1605 becomes conductive and its collector rises to ground potential, normally conductive transistor 1716 is rendered non-conductive through diode 1620. The resulting negative potential swing at the collector of transistor 1716 is coupled through capacitor 1717 and diode 1718 to the base of transistor 1704. As previously described, transistors 1704, 1702, and 1703 comprise a monostable circuit. The negative pulse applied to the base of transistor 1704 triggers transistor 1704 conductive and the resulting positive pulse at the emitter of transistor 1702 renders transistor 1703 non-conductive for approximately one second. Also as previously described, time position 1 channel on highway 1 is marked idle to the channel allotter over conductor TPB1 when transistor 1703 again becomes conductive at the end of the one-second period. When transistor 1704 is triggered conductive and its collector rises to ground potential, the flip-flop circuit in the calling release 1 gate is reset through diode 1601 to the condition wherein transistor 1602 is conductive and transistor 1603 is non-conductive.

In the above description of operation it was assumed that the release and release acknowledge signals were both received during a single activation of distributor stage DS1. It will often happen in practice that a release signal is received near the end of the period in which a particular stage is activated. Under these conditions, the flip-flop circuit in calling release gate 1 remains in the condition wherein transistor 1603 is conductive to thereby gate release signals to the highway in time position 1 even during the period when the other distributor stages are successively activated. A release acknowledge signal received in time position 1 is, of course, not coupled to the input of multifrequency receiver 1316 until distributor stage DS1 is again activated. At that time, the time position reset 1 monostable circuit is triggered to mark time position 1 idle and the flip-flop circuit in calling release 1 gate is reset to the condition wherein transistor 1602 is conductive.

Next assume that a release signal is transmitted over the trunk line terminated by the called unit, and signal samples of that release signal appear on the lower pair of highway conductors in time position 1. Under these conditions, transistor 1507 in the called release 1 gate is triggered conductive through the action of the release gate diodes 1321 and 1322 and the flip-flop circuit in the called release 1 gate is thereby operated to the condition in which transistor 1506 is conductive and transistor 1505 is non-conductive. Transistors 1513, 1408, 1406, and 1407 then function in the exact same manner as did the previously described transistors 1608, 1610, 1611, and 1612 to apply negative pulses in time position 1 to the cathode terminals of gating diodes 1514 and 1515. Thus, the release signal frequencies U and V are applied to the lower pair of highway conductors in time position 1.

When a release acknowledge signal is received on the upper pair of highway conductors in time position 1, the output of the acknowledge gate comprising diodes 1719 and 1720 goes negative and transistor 1508 in the called release 1 gate is rendered conductive. When transistor 1508 becomes conductive, the positive-going signal at its collector is coupled through diode 1516 and serves to trigger the time position reset 1 monostable circuit to mark time position 1 idle to the channel allotter, all as previously described. The positive-going pulse appearing at the collector of transistor 1704 is coupled through diode 1504 to reset the called release 1 gate flip-flop circuit to the condition wherein transistor 1505 is conductive and transistor 1506 is non-conductive.

It will be recalled from the general description that a call from a local office is automatically routed to the attendant's position in the illustrated long distance switching center and in accordance with oral instructions received from the calling party, the attendant keys the digits required to route the call to the desired destination. When the number is completely keyed, the attendant operates an end of selection key and the common equipment in the illustrated long distance switching center is controlled in accordance with the first digit registered in the key sender register to select an idle terminating unit in the group of terminating units associated with trunk lines extending to the next succeeding long distance switching center. The remaining digits are then transmitted to and through the succeeding switching centers until the desired called party is selected in a terminating local office. It may happen that the attendant at the attendant's position incorrectly keys the number and, therefore, wishes to re-key. If the error is realized before the end of selection key is operated, the operation of a cancel key provided at the position is effective to reset the key sender register. However, if the sender is transmitting digits to the succeeding offices or has completed the transmission of same, it is, of course, necessary to release the established connection in the forward direction. For this purpose, a forward release key is provided at the attendant's position. When the release key is operated, negative pulses in the time position of the channel assigned to the attendant's link circuit handling the particular call are applied to conductor LR1 and thus to the base electrode of a transistor corresponding to transistor 1409 in each of the attendant's release gates. If it is assumed that the pulses applied to conductor LR1 occur in time position 1, transistor 1409 in attendant's release gate 1 will be rendered conductive by each pulse during the period when the first distributor stage DS1 is activated. This is because the emitter of each transistor corresponding to transistor 1409 is returned to the collector of transistor 1308 and positive pulses in time position 1 appear at the collector of transistor 1308 only when distributor stage 1 is activated, as previously described. When transistor 1409 becomes conductive, the positive-going potential swing at its collector is coupled through capacitor 1410 and diode 1411 to trigger the flip-flop circuit in the attendant's release 1 gate to the condition in which transistor 1405 is conductive and transistor 1404 is non-conductive.

When transistor 1404 becomes non-conductive, the negative potential swing at its collector is coupled through capacitor 1621 and diode 1622 to trigger the flip-flop circuit in the calling release 1 gate to the condition wherein transistor 1603 is conductive and transistor 1602 is non-conductive. The calling release 1 gate then controls transistors 1608, 1610, 1611, and 1612 to enable diodes 1509 and 1510 to gate a release signal in time position 1 to the upper pair of highway conductors, all as previously described. When a release acknowledge signal is returned over the lower pair of highway conductors, transistor 1605 is triggered conductive to apply ground potential through diode 1620 to the time position reset 1 monostable circuit, all as previously described. The monostable circuit is prevented from operating at this time, however, by the negative potential appearing at the collector of transistor 1404 and coupled through resistor 1721 to the base of transistor 1716. Thus, time position 1 on highway 1 is not marked idle to the channel allotter since channel 1 is still being used by the calling line terminating unit and the attendant's link circuit handling the call.

When the distributor is advanced to the next stage, the flip-flop circuit in distributor stage 1 is operated to the condition in which transistor 1303 is non-conductive and transistor 1302 is conductive. When transistor 1303 becomes non-conductive and its collector potential returns to a negative value, the emitter of transistor 1605 is made negative and transistor 1605 becomes non-conductive. When the collector of transistor 1605 falls to a negative potential, diode 1620 is biased for non-conduction and a negative pulse is coupled through capacitor 1412 and diode 1413 to reset the attendant's release 1 flip-flop circuit to the condition in which transistor 1404 is conductive and transistor 1405 is non-conductive. When transistor 1404 becomes conductive, the positive potential swing at its collector is coupled through capacitor 1623 and diode 1624 to reset the calling release 1 flip-flop circuit to the condition wherein transistor 1602 is conductive and transistor 1603 is non-conductive. Thus, the circuits are all reset to their normal condition.

The distributor comprising stages DS1–DS10, inclusive, is identical to the seize and release scan circuit distributor which was previously described. The distributor is stepped under control of free running multivibrator transistors 1401 and 1402, and the transistor corresponding to transistor 1304 in each stage delays the activation of the next succeeding stage by a period of time long enough to allow the output of the multifrequency receivers to decay to zero if any signals were detected during the activation of the preceding stage.

*Control counter 15*

Figure 18:
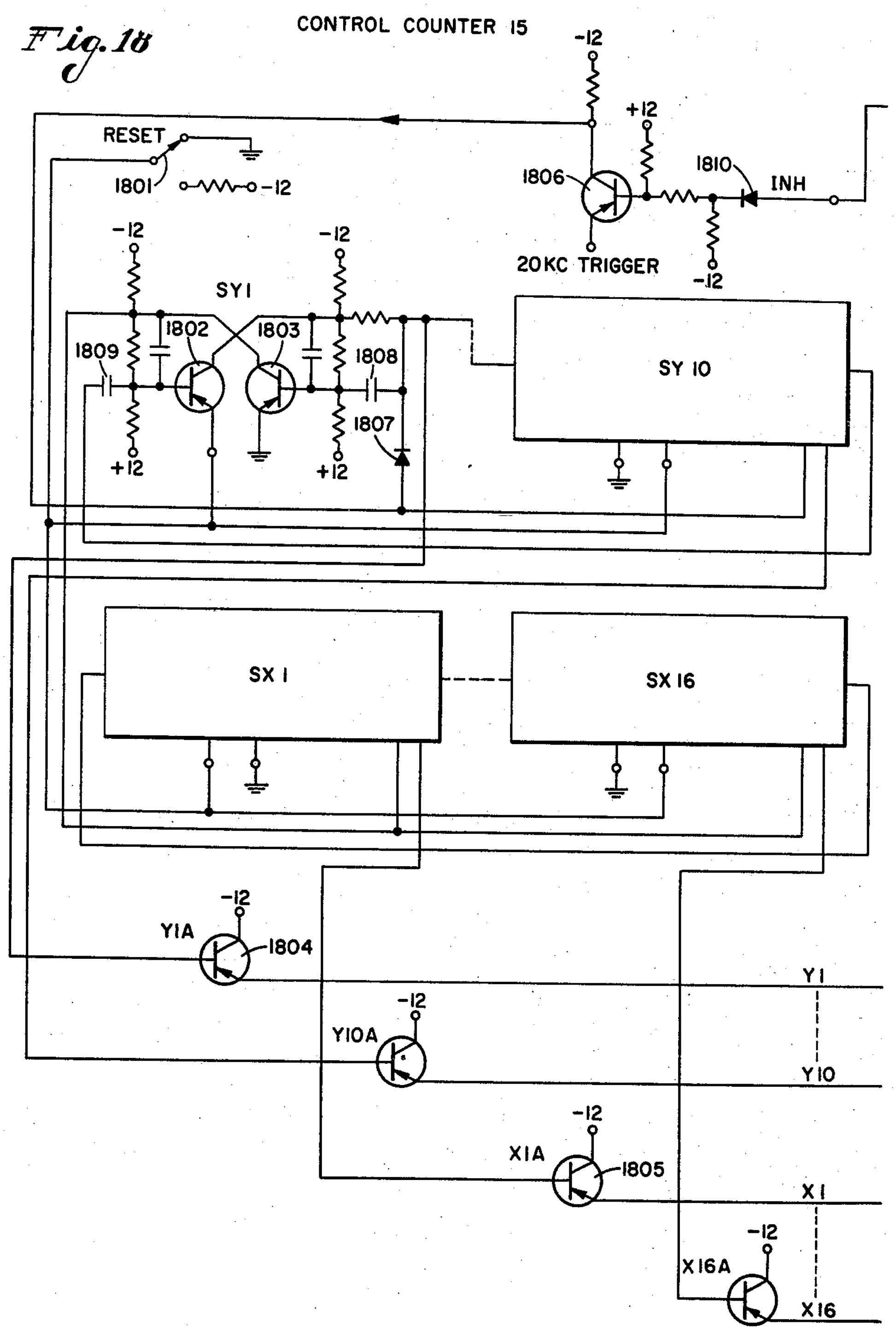

Control counter 15, which is shown in Fig. 18, has been illustrated as comprising a sixteen-stage ring counter driven by a ten-stage ring counter and is thus capable of supplying marking signals individually identifying as many as one hundred and sixty line terminating units and attendant's link circuits. Each stage of both ring counters comprises a flip-flop circuit identical to the one shown in stage SY1 of the ten-stage ring counter.

When the circuit is first placed in operation, reset switch 1801 is momentarily operated to the position in which minus twelve volt potential is applied to the emitter electrode of a transistor corresponding to transistor 1802 in the first stage SY1 of the ten-stage ring counter and in the first stage SX1 of the sixteen-stage ring counter. The minus twelve volt potential is also applied to the emitter electrode of a transistor corresponding to transistor 1803 in the remaining stages of both the ten- and sixteen-stage ring counters. Thus, responsive to momentary operation of switch 1801, stages SY1 and SX1 are operated to the condition wherein transistor 1803 is conductive and transistor 1802 is non-conductive, and stages SY2–SY10 and SX2–SX16 are operated to the condition wherein transistor 1802 is conductive and transistor 1803 is non-conductive. Under these conditions, a negative potential is applied to the base electrode of the Y1 amplifier transistor 1804 and to the base electrode of the X1 amplifier transistor 1805 and a negative potential appears on conductors Y1 and X1. All of the other marking conductors, namely, conductors Y2–Y10 and X2–X16, are returned to ground potential since the transistor corresponding to transistor 1802 is conductive in each respective stage, and ground potential is applied to the base electrode of the respective emitter follower amplifier transistor.

The ten-stage ring counter is stepped under control of transistor 1806 each time that a positive-going pulse appears on conductor 20 kc. trigger. It will be recalled that the potential applied to conductor 20 kc. trigger rises from minus twelve volts to ground potential for ten microseconds in each fifty microsecond period, as shown in Fig. 3A of the drawings. Thus, a ten microsecond positive-going pulse appears at the collector of transistor 1806 and is applied to the anode terminal of a diode corresponding to diode 1807 in each of the stages SY1–SY10. In stage SY1, a positive-going pulse is coupled through diode 1807 and capacitor 1808 to the base of transistor 1803 and serves to trigger transistor 1803 non-conductive and transistor 1802 conductive. The positive-going pulse coupled through diode 1807 in stage SY1 is also coupled through a capacitor corresponding to capacitor 1809 to the base of the transistor corresponding to 1802 in stage SY2 and serves to trigger that stage to the condition wherein transistor 1803 is conductive and transistor 1802 is non-conductive. A positive-going pulse applied to the anode terminal of the diode corresponding to 1807 in each of the remaining stages has no effect on those stages since the cathode terminal of diode 1807 in each stage is returned to ground potential at the collector of conducting transistor 1802. It can be seen that the base electrode of transistor amplifier 1804 is held at ground potential for the duration of the trigger pulse and that the base of the second stage amplifier transistor corresponding to 1804 is also held at ground potential for the duration of the trigger pulse even though transistor 1802 in that stage is triggered non-conductive. Thus, all of the Y marking conductors are held at ground potential during the transition period and conductor Y2 goes to a negative potential at the termination of the trigger pulse. The next succeeding positive-going trigger pulse triggers transistor 1803 in stage SY2 non-conductive and transistor 1803 in stage SY3 conductive. Each succeeding stage is triggered in successive order and the stepping operation is continuous except when a ground potential is received over the inhibit conductor INH from route selector 17. When ground potential is applied to conductor INH, it is coupled through diode 1809 to the base of transistor 1806 and transistor 1806 is, of course, inhibited from operating.

Each time that the tenth stage SY10 is reset and a positive-going pulse is therefore coupled through capacitor 1809 to trigger transistor 1802 non-conductive and transistor 1803 conductive in stage SY1, the resulting positive-going potential swing at the collector of transistor 1803 in stage SY1 is applied to the anode treminal of a diode corresponding to 1807 in each of the stages SX1–SX16. Thus, the sixteen-stage ring counter, comprising stages SX1–SX16, is stepped at one-tenth the frequency of the ten-stage ring counter comprising stages SY1–SY10. It should now be apparent that a negative potential is applied to the X marking conductors in successive order and that while said negative potential is applied to any one of the X marking conductors, a negative potential is applied to each of the Y marking conductors in successive order.

*Calling unit finder circuit 26*

Figure 19:
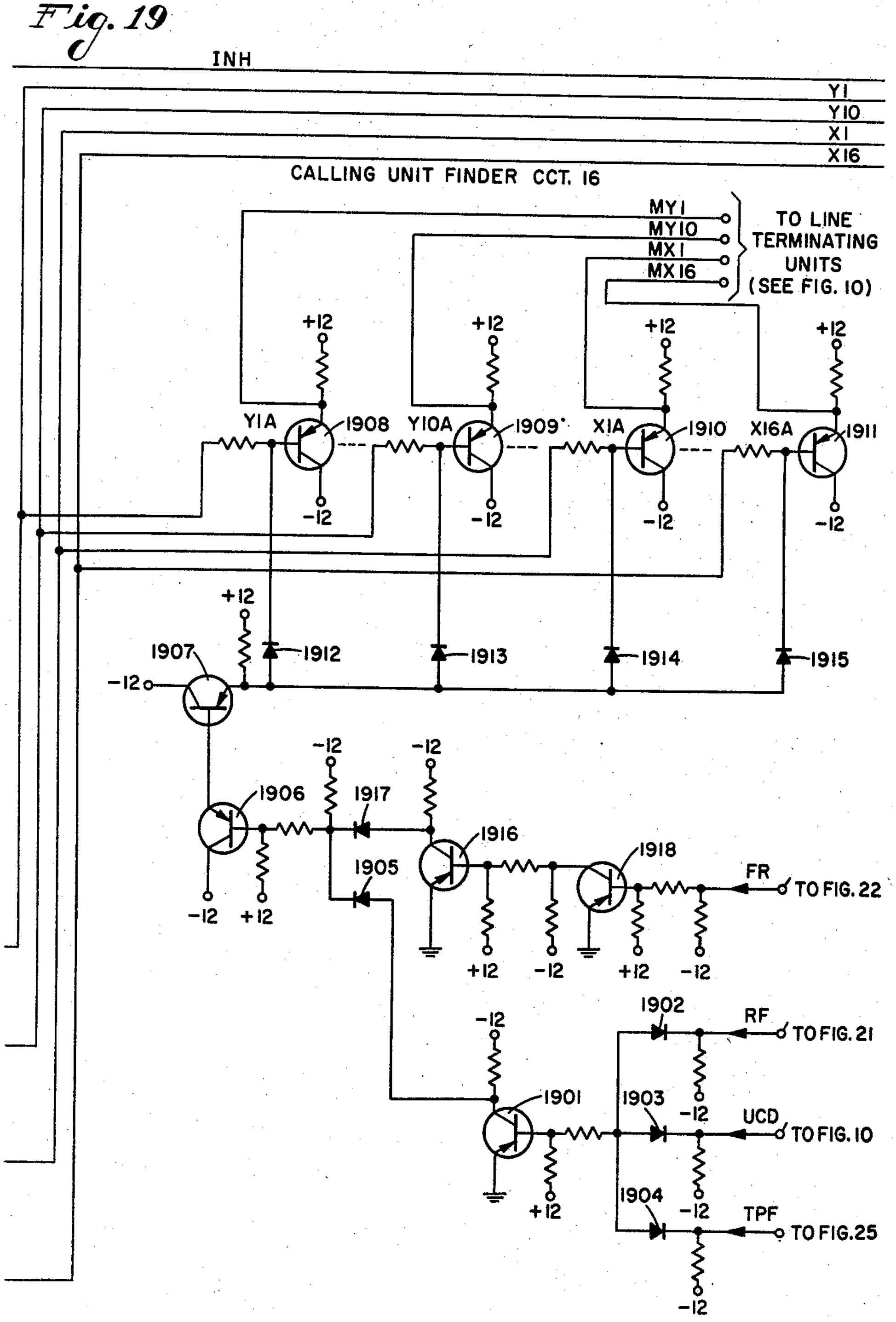

It will be recalled that the purpose of the calling unit finder circuit, which is shown in Fig. 19, is to transmit an enabling signal to each of the line terminating units in turn when one or more of the units are in a calling condition and that a calling line terminating unit and the assigned incoming register are controlled to seize the marked idle time position channel responsive to the receipt of an enabling signal. It will also be recalled from the general description that the calling unit finder serves to repeat the signals received over conductors Y1–Y10 and X1–X16 from the control counter to the marking conductors MY1–MY10 and MX1–MX16, respectively, if an incoming register has been assigned for use, an idle channel is being marked by the channel allotter, a call is initiated on the trunk line terminated by one of the units, and if channel identifying information is not being read out of one of the registers or link circuits to the channel and highway marking bus bars.

It can be seen that the register found conductor RF, the unit connect demand conductor UCD, and the time position found conductor TPF are coupled to the base of transistor 1901 through diodes 1902, 1903, and 1904, respectively. The incoming register allotter functions to apply ground potential to conductor RF only when an idle incoming register has been assigned for use, each line terminating unit functions to apply ground potential to common conductor UCD when a call is initiated on the trunk line terminated by that unit, and the channel allotter functions to apply ground potential to conductor TPF only when the channel allotter is marking an idle channel and highway to the units and incoming registers. If any one of the above-mentioned conductors has a negative potential applied thereto, transistor 1901 is conductive and ground potential is applied to the anode terminal of diode 1905. Under these conditions, the output potential appearing at the emitter electrodes of emitter follower transistors 1906 and 1907 has a positive value and the base electrodes of amplifier transistors 1908–1911 are held at said positive potential value through diodes 1912–1915, respectively. Therefore, the negative signal appearing on one of the Y1–Y10 conductors and the negative signal appearing on one of the X1–X16 conductors have no effect on the corresponding Y and X amplifier transistors, and conductors MY1–MY10, inclusive, and conductors MX1–MX16, inclusive, have a positive potential applied thereto.

When an incoming register has been assigned for use, when a call is initiated on the trunk line terminated by one of the units, and when the channel allotter is marking an idle channel and highway, ground potential appears on conductors RF, UCD, and TPF, respectively, and transistor 1901 is rendered non-conductive. When transistor 1901 becomes non-conductive, minus twelve volt potential is applied to the anode terminal of diode 1905. If it be assumed that an incoming register to link circuit is not reading out channel information to the bus bars at this time, transistor 1916 is also non-conductive, as will be described hereinafter, and minus twelve volt potential is also applied to the anode of diode 1917. Under these conditions, diodes 1905 and 1917, which form an "and" gate for negative signals, are biased for non-conduction and the output potential appearing at the emitter electrodes of emitter follower transistors 1906 and 1907 has a negative value. Diodes 1912–1915 are now biased in the reverse direction and the signals applied to conductors Y1–Y10 and X1–X16 by the control counter are amplified by emitter follower transistors 1908–1911 and applied to marking conductors MY1–MY10 and MX1–MX16, respectively.

When the X and Y marking conductors corresponding to the calling line terminating unit are simultaneously marked with negative potential, that unit and the assigned incoming register read in the time position channel identifying information, the incoming register allotter is then controlled to assign the next idle register for use, and the channel allotter is controlled to mark the next idle channel for use. When another register and time position have been assigned, the calling unit finder transistor 1901 is again rendered non-conductive if another call is awaiting attention as signified by the application of ground potential to conductor UCD.

It will be recalled from the general description that incoming registers or key sender registers having the designation of a called unit registered therein are controlled by the register finder to read out channel and highway identifying information to the bus bars on a one-at-a-time basis. When a register has been seized by the register finder for reading out purposes, ground potential is applied to conductor FR by the register finder. Ground potential on conductor FR serves to render normally conductive transistor 1918 non-conductive and the resulting negative potential at the collector of transistor 1918 renders transistor 1916 conductive. Ground potential appearing at the collector of transistor 1916 is coupled through diode 1917 and serves to hold the emitter electrodes of transistors 1906 and 1907 at a positive potential value regardless of the condition of conductors RF, UCD, and TPF. Thus, when a register is reading out information to the bus bars, the calling unit finder is prevented from transmitting enabling signals to the line terminating units so that the time position channel read out by a register cannot be seized by a calling unit.

*Route selector 17*

Figure 20:
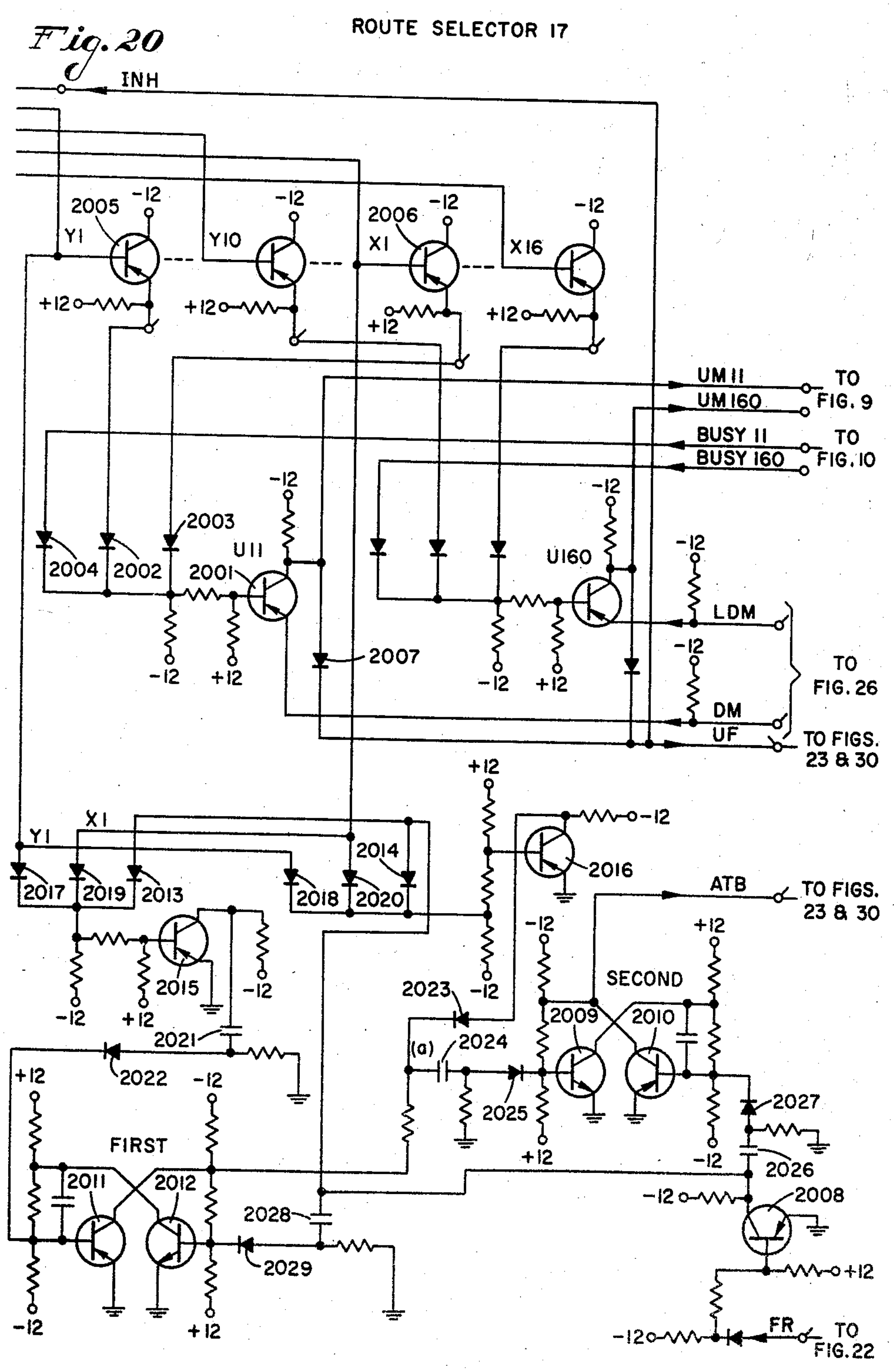

The route selector, which is shown in Fig. 20, comprises an individual gate for each of the line terminating units and for each of the attendant's link circuits provided in the long distance switching center. For example, the gate corresponding to line terminating unit 11 comprises transistor 2001 and diodes 2002, 2003, and 2004. The anode terminals of diodes 2002, 2003, and 2004, which form an "and" gate for negative pulses, are returned to the emitter electrode of Y1 transistor 2005, the emitter electrode of X1 transistor 2006, and to conductor busy 11, respectively. The emitter electrode of transistor 2001 is connected to one of the digit marking conductors DM, which extends from the incoming and key sender registers. It will be recalled from the general description that when a register is controlled to read out channel identifying information, it is also controlled to apply ground potential to the one of the digit marking conductors DM which corresponds to the particular digit stored in that register. In the route selector, the conductor DM which corresponds to a particular group of units terminating trunk lines to a particular long distance switching center is connected to the emitter electrodes of the transistors in the gate circuits corresponding to those units. Similarly, local digit marking conductors, such as LDM, are connected in the route selector to the emitter electrodes of the transistors in the gate circuits corresponding to units terminating trunk lines extending to particular local offices.

If it is assumed that a register is applying ground potential to conductor DM, transistor 2001 and all of the other transistors corresponding to units in that particular group are enabled for operation. As the control counter advances, the X and Y conductors are marked with negative potential, as previously described. When the control counter advances to the setting wherein negative potential is applied to conductors X1 and Y1, a negative potential appears at the emitter electrodes of transistors 2006 and 2005 and is applied to the anode terminals of diodes 2003 and 2002, respectively. If unit 11 is not already busy handling a call, negative potential is also applied in unit 11 to conductor busy 11 and appears at the anode terminal of diode 2004. Under these conditions, transistor 2001 is rendered conductive and ground potential is applied to unit marking conductor UM11 to seize unit 11 and control that unit to read in the channel and highway information applied to the bus bars by a register. Ground potential appearing at the collector of transistor 2001 is also coupled through diode 2007 to the inhibit conductor INH and to the units found conductor UF. As previously described, ground potential applied to conductor INH serves to block the control counter from further stepping so that conductors X1 and Y1 continue to be marked with negative potential. Ground potential applied to conductor UF serves to release the register and to control the channel allotter to mark the next idle channel on the bus bars when the next 20 kc. trigger pulse is received by those circuits. When unit 11 is seized over conductor UM11, that unit functions to apply ground potential to conductor busy 11 and transistor 2001 is made non-conductive to thereby remove ground potential from conductors UM11, INH, and UF.

If unit 11 is already busy on another call when negative potential is simultaneously applied to conductors X1 and Y1, the ground potential on conductor busy 11 prevents transistor 2001 from becoming conductive. The control counter continues to advance until an idle unit in the group of units marked by conductor DM is found. If no idle unit is found in the group of units marked by ground potential on conductor DM, an all trunks busy circuit provided in the route selector operates to inform the register of this condition.

When no register is being read out as signified by negative potential on conductor FR, transistor 2008 is biased for conduction, transistors 2011 and 2012 in the first flip-flop circuit are conductive, and transistors 2009 and 2010 in the second flip-flop circuit are non-conductive. Ground potential at the collector of conducting transistor 2008 is coupled through diodes 2013 and 2014 to the base electrodes of transistors 2015 and 2016, respectively, and holds those transistors non-conductive. The anodes of diodes 2017 and 2018 are connected to conductor Y1, which extends to the control counter, and the anodes of diodes 2019 and 2020 are connected to conductor X1, which extends to the control counter.

When a register is found by the register finder and ground potential is applied to conductor FR, transistor 2008 is rendered non-conductive and the anode terminals of diodes 2013 and 2014 are returned to minus twelve volt potential. When the control counter advances to the setting wherein conductors X1 and Y1 are simultaneously returned to minus twelve volt potential, the output signals from both the "and" gate for negative signals comprising diodes 2013, 2017, and 2019 and the "and" gate for negative signals comprising diodes 2014, 2018, and 2020 go negative and transistors 2015 and 2016 are rendered conductive. The resulting positive potential swing at the collector of transistor 2015 is coupled through capacitor 2021 and diode 2022 to the base of transistor 2011 and serves to trigger flip-flop transistors 2011 and 2012 non-conductive. It can be seen that prior to the triggering of transistor 2011 to a non-conductive condition, point (*a*) is returned to ground potential at the collector of transistor 2011 and diode 2023 is biased for non-conduction. When transistor 2016 is triggered conductive, diode 2023 is no longer biased in the reverse direction but point (*a*) remains at ground potential. Now, when transistor 2011 is triggered conductive and its collector goes negative, point (*a*) becomes slightly negative and the second flip-flop circuit transistors 2009 and 2010 remain non-conductive.

If the control counter advances through a complete cycle while ground potential remains on conductor FR, thus signifying that all units in the selected group are busy, negative potential is again simultaneously applied to conductors X1 and Y1 and transistors 2015 and 2016 are rendered conductive. The positive-going potential swing at the collector of transistor 2015 has no effect on the first flip-flop circuit since transistors 2011 and 2012 are already non-conductive. The positive-going potential swing at the collector of transistor 2016 is coupled through diode 2023, capacitor 2024, and diode 2025 to the base of transistor 2009 and serves to trigger flip-flip circuit transistors 2009 and 2010 conductive. When transistor 2010 becomes conductive, ground potential is applied to conductor ATB and controls the register to transmit a busy signal to the calling unit and thus to the calling trunk line. The register then releases and ground is removed from conductor FR by the register finder when ground potential is removed from conductor FR. Transistor 2008 becomes conductive and the resulting ground potential at its collector blocks the previously described "and" gates for negative signals. The positive potential swing at the collector of 2008 is coupled through capacitor 2026 and diode 2027 to reset flip-flip transistors 2009 and 2010 to the non-conductive condition and is also coupled through capacitor 2028 and diode 2029 to reset flip-flip transistors 2011 and 2012 to the conductive condition.

*Incoming register allotter 31*

Figure 21:
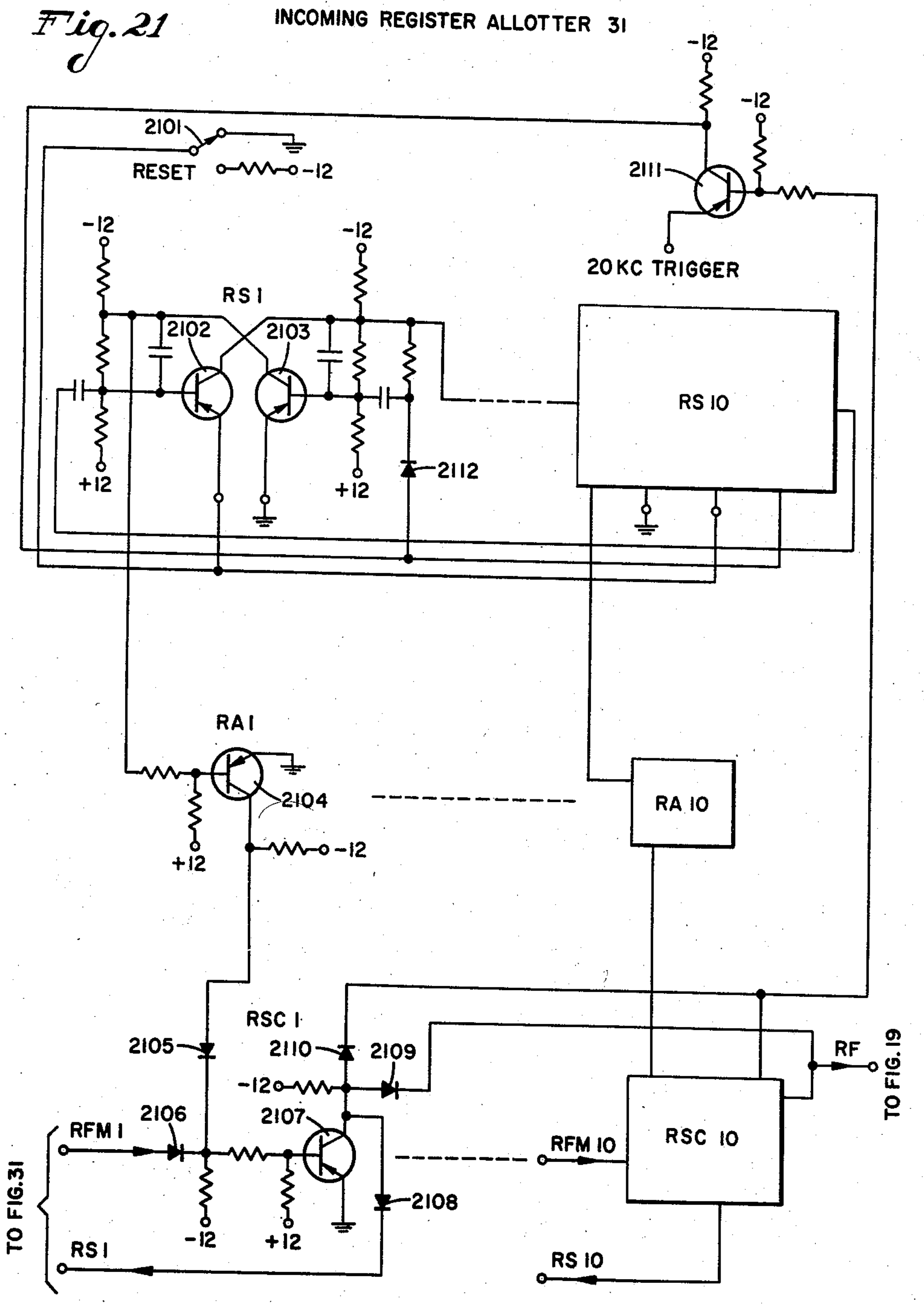
Fig. 21 shows details of an incoming register allotter for use in a long distance switching center.

The incoming register allotter, which is shown in Fig. 21, comprises a group of equipment for each incoming register provided in the long distance switching center. Each group of equipment comprises a ring counter distributor stage such as RS1, an amplifier such as RA1, and a register seize control gate such as RSC1. The incoming register allotter has been illustrated as comprising ten groups of equipment and is thus capable of allotting ten incoming registers for use in turn.

When the circuit is first placed in operation, reset key 2101 is momentarily operated to the position wherein minus twelve volt potential is applied to the emitter electrode of transistor 2102 in distributor stage RS1 and to the emitter electrode of a transistor corresponding to transistor 2103 in each of the remaining distributor stages. Thus, responsive to the momentary operation of reset key 2101, the first distributor stage is set to the condition wherein transistor 2103 is conductive and transistor 2102 is non-conductive, and the remaining distributor stages are each set to the condition wherein transistor 2102 is conductive and transistor 2103 is non-conductive. The base of amplifier transistor 2104 in the first group of equipment is returned to the collector of transistor 2103 in the first distributor stage and since transistor 2103 is conductive, the ground potential at its collector holds transistor 2104 non-conductive. The collector of transistor 2104 thus stands at minus twelve volt potential and said minus twelve volt potential is applied to the anode terminal of diode 2105, which with diode 2106, forms an "and" gate for negative signals. If it is assumed that the first incoming register is not busy handling a call, the anode terminal of diode 2106 is also returned to minus twelve volt potential in the first incoming register over the individual register free marking conductor RFM1. Thus, with both inputs to the "and" gate negative, the output of the "and" gate is negative, and transistor 2107 is conductive.

When transistor 2107 is conductive, the ground potential appearing at its collector is applied through diode 2108 to the register seize conductor RS1 to enable the first incoming register to read in time position channel and highway information applied to the bus bars by the channel allotter when a calling line terminating unit is enabled by the calling unit finder, all as previously described. Ground potential appearing at the collector of transistor 2107 is also coupled through diode 2109 to the register free conductor RF which extends to the calling unit finder circuit. As previously described, the calling unit finder circuit functions to transmit enabling signals to each line terminating unit in turn only when an incoming register has been assigned for use as signified by ground potential on conductor RF. It is to be noted that conductor RF is connected to stages RSC1–RSC10 and that ground potential can be applied to said conductor by any one of the stages. Ground potential appearing at the collector of transistor 2107 is also coupled through diode 2110 to the base of transistor 2111. Ground potential applied to the base of transistor 2111 through a diode corresponding to 2110 in any one of the register seize control stages is effective to prevent transistor 2111 from being rendered conductive by the positive clock pulses appearing on conductor 20 kc. trigger.

The incoming register allotter remains in the just described condition until the first incoming register is controlled to read in time position and highway information by a calling unit, as previously described. At that time, conductor RFM1 returns to ground potential and transistor 2107 becomes non-conductive to remove ground potential from conductors RS1 and RF and from the base of drive transistor 2111. The next occurring positive-going clock pulse on conductor 20 kc. trigger renders transistor 2111 conductive and the resulting ground potential appearing at its collector is applied to the anode terminal of a diode corresponding to 2112 in each distributor stage. The distributor in the incoming register allotter, which is identical to the previously described distributor in control counter 25, is controlled by the positive pulse to advance to the setting wherein the transistor corresponding to 2103 in the second stage is conductive and the transistor corresponding to 2103 in all of the other distributor stages is non-conductive. If the second incoming register is not marked as busy by ground potential on conductor RFM2, the transistor corresponding to 2107 in stage RSC2 becomes conductive and ground potential is applied to conductors RS2 and RF and to the base of transistor 2111. If the second incoming register is busy, the transistor corresponding to 2107 in RSC2 remains non-conductive and transistor 2111 becomes conductive during the next occurring 20 kc. clock pulse to advance the distributor to the third stage. If all of the incoming registers are busy, the distributor is controlled to advance at a 20 kc. rate and the calling unit finder circuit is prevented from transmitting enabling signals to the line terminating units since ground potential is not applied to conductor RF by the incoming register allotter.

When a distributor stage, such as RS1, is in the condition wherein transistor 2103 is non-conductive and transistor 2102 is conductive, the amplifier transistor corresponding to 2104 is held conductive by the negative potential appearing at the collector of the transistor corresponding to 2103. When the amplifier transistor corresponding to 2104 is conductive, ground potential is coupled through the diode corresponding to 2105 so that the control transistor corresponding to 2107 is prevented from becoming conductive regardless of the condition of the individual register free marking conductor, such as RFM1.

*Register finder 32*

Figure 22:
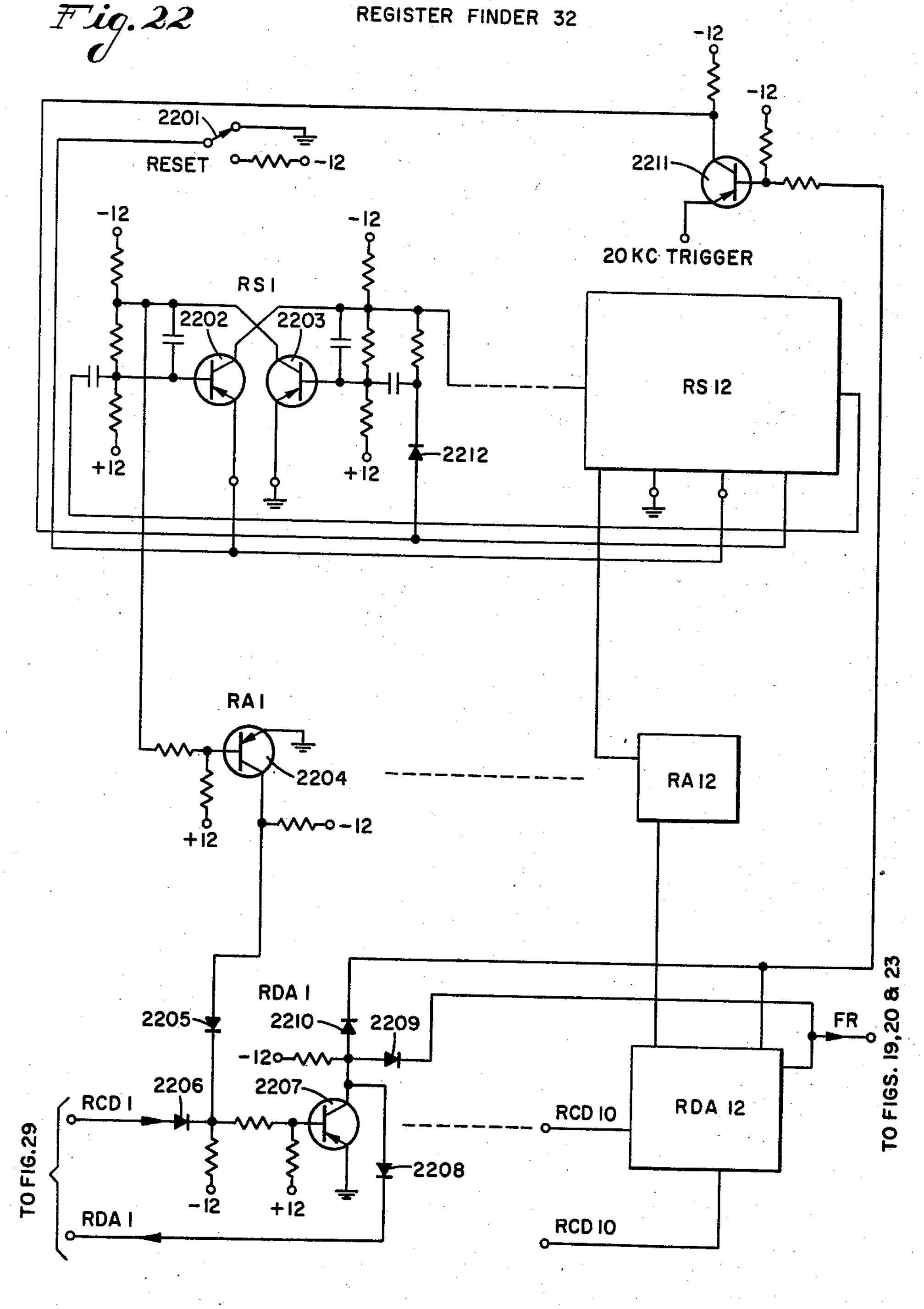
Fig. 22 shows details of a register finder for use in a long distance switching center.

The register finder, which is shown in Fig. 22, comprises a group of equipment for each incoming register and for each key sender register provided in the long distance switching center. Each group of equipment comprises a ring counter distributor stage such as RS1, an amplifier such as RA1, and a register demand answer gate such as RDA1. The register finder has been illustrated as comprising twelve groups of equipment and is thus capable of serving twelve registers.

When the circuit is first placed in operation, reset key 2201 is momentarily operated to a position wherein minus twelve volt potential is applied to the emitter electrode of transistor 2202 in distributor stage RS1 and to the emitter electrode of a transistor corresponding to 2203 in each of the other distributor stages. Thus, responsive to the momentary operation of the reset key 2201, transistor 2203 in the first distributor stage is made conductive and transistor 2202 in each of the other distributor stages is made conductive. The base of amplifier transistor 2204 in the first group of equipment is returned to the collector of transistor 2203 in the first distributor stage and since 2203 is conductive, the ground potential at its collector holds transistor 2204 non-conductive. The minus twelve volt potential appearing at the collector of non-conducting transistor 2204 is applied to the anode terminal of diode 2205, which with diode 2206, forms an "and" gate for negative signals. The register connect demand conductor RCD1, which is connected to the anode of diode 2206, is normally returned to ground potential in the first register and drops to minus twelve volt potential only when the first register has a digit stored therein and is in readiness to read out channel and highway information to the bus bars and digit marking information to the digit marking conductors.

If it is assumed that the first register is applying minus twelve volt potential to conductor RCD1 at the time that the first stage of the distributor is activated, the output signal from the gate comprising diodes 2205 and 2206 is negative and transistor 2207 becomes conductive. When transistor 2207 is conductive, the ground potential appearing at its collector is coupled through diode 2208 to the register demand answer conductor RDA1 to enable the first register to read out channel and highway information to the bus bars and to read out digit marking information to the digit marking conductors. Ground potential at the collector of transistor 2207 is also coupled through diode 2209 to conductor FR, which extends to the channel allotter, the route selector, and to the calling unit finder circuit. As previously described, ground potential on conductor FR controls the channel allotter to discontinue the application of marking signals to the channel and highway bus bars, controls the route selector to initiate the measurement of an all trunks busy period, and controls the calling unit finder circuit to discontinue the transmittal of enabling signals to the terminating units so that a calling terminating unit cannot seize the channel identified on the bus bars by the first register. Ground potential at the collector of conducting transistor 2207 is also coupled through diode 2210 to the base of drive transistor 2211. Ground potential applied to the base of transistor 2211 through a diode corresponding to 2210 in any one of the register demand answer stages is effective to prevent transistor 2211 from becoming conductive if a positive-going clock pulse appears on conductor 20 kc. trigger during the interval in which transistor 2207 is conductive.

The register finder remains in the just described condition until the route selector seizes a terminating unit in the group of terminating units identified by the marking applied to the digit marking conductors by the first register, as previously described. At that time, conductor RCD1 returns to ground potential and transistor 2207 becomes non-conductive to remove ground from conductors RDA1 and FR and from the base of transistor 2211. The next occurring positive-going clock pulse on conductor 20 kc. trigger renders transistor 2211 conductive and the resulting ground potential appearing at its collector is applied to the anode terminal of a diode corresponding to 2212 in each ditributor stage. The distributor in the register finder, which is identical to the previously described distributor in control counter 25, is controlled by the positive-going pulse to advance to the setting wherein the transistor corresponding to 2203 in the second distributor stage is conductive and the transistor corresponding to 2203 in all of the other distributor stages is non-conductive. If the second register is in readiness to read out, the transistor corresponding to 2207 in RDA2 becomes conductive and ground potential is applied to conductors RDA2 and FR and to the base of transistor 2211. If the second register is not in readiness to read out and ground potential therefore appears on conductor RCD1, the transistor corresponding to 2207 in RDA2 remains non-conductive and drive transistor 2211 becomes conductive during the next occurring 20 kc. clock pulse to advance the distributor so that the third stage is activated. If none of the registers are demanding attention for read out purposes, the distributor is controlled to continuously advance at a 20 kc. rate.

When a distributor stage, such as RS1, is in the condition wherein transistor 2202 is conductive and transistor 2203 is non-conductive, amplifier transistor 2204 is held conductive by the negative potential appearing at the collector of transistor 2203. When transistor 2204 is conductive, ground potential is coupled through diode 2205 so that transistor 2207 is prevented from becoming conductive regardless of the condition of the individual connect demand conductor, such as RCD1.

*Channel allotter 33*

The channel allotter, which is shown in detail in Figs. 23–25, comprises a highway ring counter distributor and a channel ring counter distributor. As illsutrated, the highway distributor comprises two stages, namely, stages HDS1 and HDS2, and the channel distributor comprises ten stages, namely, stages CDS1–CDS10. More highway networks and more channels per highway network can be served by the channel allotter by the addition of stages to the highway and channel distributors, respectively. The channel allotter also comprises an individual gate for each time position on each highway. Gates 1–1 through 1–10 correspond to the ten time position channels on the first highway, and gates 2–1 through 2–10 correspond to the ten time position channels on highway 2. Similarly, an individual flip-flop circuit is provided for each time position on each highway for the purpose of recording the idle or busy condition of that time position. Thus, flip-flops busy 1–1 through busy 1–10 correspond to the time position channels on highway 1 and flip-flops busy 2–1 through busy 2–10 individually correspond to the ten time position channels on highway 2.

When the circuit is first placed in operation, reset key 2301 is momentarily operated to the position in which minus twelve volt potential is applied to the emitter electrode of transistor 2302 in the first channel distributor stage CDS1 and to the emitter electrode of a transistor corresponding to 2302 in the first highway distributor stage HDS1. The minus twelve volt potential is also applied to the emitter electrode of a transistor corresponding to 2303 in each of the channel distributor stages CDS2–CDS10 and to the emitter electrode of a transistor corresponding to 2303 in the second highway distributor stage HDS2. Thus, responsive to the momentary operation of reset key 2301, the first channel stage CDS1 and the first highway distributor stage HDS1 are set in the condition in which transistor 2303 is conductive and the remaining channel and highway distributor stages are set in the condition which transistor 2302 is conductive.

Since the transistors 2302 in stages HDS1 and CDS1 are non-conductive, the output signals appearing at the emitter electrodes of emitter follower transistors 2304 and 2305 have a negative potential value. The negative potential signal appearing at the emitter of transistor 2304 is applied to the base of the highway 1 gating transistor 2401 and since transistor 2325 is non-conductive at this time, as will be described later, transistor 2401 is made conductive to apply ground potential to conductor HW1 of the highway bus bar HWBB. The negative potential signal at the emitter of transistor 2304 is also applied to the anode terminal of a diode corresponding to 2402 in each of the gate circuits gate 1–1 through gate 1–10, inclusive. The negative potential signal at the emitter of transistor 2304 is also applied to the anode terminal of diode 2501. The negative potential signal at the emitter of transistor 2305 is coupled through resistor 2403 to the cathode terminals of diodes 2402 and 2404 in gate 1–1 and through a corresponding resistor to the cathode terminals of corresponding diodes in gate 2–1. If it be assumed that time position 1 channel on highway 1 is not in use on another call and that busy 1–1 flip-flip transistors 2502 and 2503 are therefore non-conductive, the anode terminal of diode 2404 in gate 1–1 is also returned to a negative potential. Since the anode terminals of diodes 2402 and 2404 are both returned to a negative potential, the negative potential at the emitter of transistor 2305 and coupled through resistor 2403 is further coupled through resistor 2405 to the base of transistor 2406 in gate 1–1 to render transistor 2406 conductive.

When transistor 2406 is conductive, ground potential at its collector is coupled through diode 2407 to render normally conductive transistor 2408 non-conductive. The negative potential signal at the emitter of transistor 2305 is also coupled to the base of time position 1 gate transistor 2409 and since the anode terminal of diode 2410 is also returned to a negative potential at the collector of non-conducting transistor 2408, transistor 2409 becomes conductive to apply ground potential to the time position 1 bus bar conductor TPM1. Thus, time position 1 on highway network 1 is marked on the highway and time position marking bus bars HWBB and TPBB, respectively, as the time position to be assigned to the next call initiated in the long distance switching center.

The negative potential appearing at the collector of non-conducting transistor 2408 is also coupled through diode 2504 to the base electrodes of transistors 2506 and 2507 to render those transistors conductive. The resulting ground potential at the collector of conducting transistor 2506 is applied to conductor TPF and serves as an indication to the calling unit finder circuit that a time position channel is being marked on the bus bars by the channel allotter. The ground potential appearing at the collector of conducting transistor 2507 serves to prevent the pulse drive transistor 2508 from becoming conductive when the next occurring 20 kc. clock pulse appears on conductor 20 kc. trigger. It will be noted that the negative potential at the collector of non-conducting transistor 2408 is also applied to the anode terminal of diode 2509 but the marking 1 transistor 2510 is prevented from becoming conductive at this time since its emitter is returned to a negative potential at the emitter of emitter follower transistor 2518. The emitter of transistor 2518 stands at a negative potential at this time since the time position read in conductor TPRI, which extends to all of the incoming registers, stands at minus twelve volt potential at all times except when a time position is being read in by one of the registers.

The channel allotter remains in the just described condition in which ground potential is applied to conductors HW1 and TPM1 of the highway bus bars HWBB and the time position bus bars TPBB, respectively, until such time as the time position 1 channel on highway 1 is seized by a calling unit and the assigned register. The remaining highway and time position marking conductors stand at minus twelve volt potential at this time. It can be seen that highway 2 gating transistor 2411 is biased for non-conduction and its collector stands at minus twelve volt potential since the transistor corresponding to 2302 in the second highway distributor stage HDS2 is conductive and the emitter electrode of emitter follower transistor 2306 therefore stands at ground potential. The remaining time position gating transistors, such as time position 10 gating transistor 2412, are biased for non-conduction and their collector electrodes stand at minus twelve volt potential since the transistor corresponding to 2413 individually associated with each gate is conductive. It can be seen that when transistor 2413 is conductive, the ground potential appearing at its collector is coupled through diode 2414 to hold transistor 2412 non-conductive. In addition to the above, the base electrodes of the gating transistors, such as 2412, are also returned to ground potential at the emitters of the emitter follower transistors corresponding to 2326.

When the channel and highway identifying information placed on the bus bars by the channel allotter is read in by a calling line terminating unit and the assigned one of the incoming registers, ground potential is momentarily applied to conductor TPRI by the assigned register and the emitter electrode of transistor 2518 rises to ground potential. When the emitter electrode of transistor 2518 rises to ground potential, each of the marking transistors M1–M10 is enabled for conduction. Marking transistor 2510 becomes conductive since the anode terminal of diode 2509 is returned to minus twelve volt potential at the collector of non-conducting transistor 2408, as previously described. The other marking transistors remain non-conductive since the anode terminal of the diodes corresponding to 2505 are returned to ground potential at the collectors of conducting transistors corresponding to 2413. Ground potential appearing at the collector of conducting transistor 2510 is applied to the anode terminals of diodes 2511 and 2512 in the busy 1–1 and busy 2-1 circuits, respectively. The busy 2–1 flip-flip circuit is not triggered since the anode terminal of diode 2513 is returned to ground potential at the emitter of transistor 2306. Since the anode terminal of diode 2501 is returned to negative potential at the emitter of transistor 2304, the positive-going potential swing at the collector of transistor 2510 is coupled through diode 2511, capacitor 2514, and diode 2515 to set the busy 1–1 flip-flip circuit to the condition wherein transistors 2502 and 2503 are conductive.

When transistor 2503 in the flip-flip circuit busy 1–1 becomes conductive, ground potential is applied to the anode terminal of diode 2404 and transistor 2406 is thereby made non-conductive, transistor 2408 becomes conductive, and transistor 2409 is rendered non-conductive to remove ground potential from time position marking conductor TPM1. When transistor 2408 becomes conductive and its collector rises to ground potential, transistors 2510, 2506, and 2507, become non-conductive. When transistor 2507 becomes non-conductive and its collector drops to minus twelve volt potential, pulse drive transistor 2508 is enabled for conduction during the next occurring positive-going pulse on conductor 20 kc. trigger. The positive-going pulse at the collector of transistor 2508 is applied to the anode terminal of a diode corresponding to 2307 in each of the channel distributor stages. The channel distributor, which is identical to the previously described distributor in control counter 25, is controlled by the positive-going pulse to advance to the setting wherein the second stage CDS2 is activated. If the transistors of the busy 1–2 flip-flip circuit are not conductive, thus signifying that time position 2 on highway 1 is idle, the gate 1–2 transistor corresponding to 2406 becomes conductive and ground potential is applied to bus bar conductor TPM2. However, if the transistors in busy 1–2 flip-flip circuit are not conductive, thus signifying that time position 2 on highway 1 is busy, the gate 1–2 transistor corresponding to 2406 is prevented from becoming conductive by ground potential coupled through the diode corresponding to 2404 and the pulse drive transistor 2508 is controlled by the next occurring clock pulse on conductor 20 kc. trigger to advance the channel distributor to the setting wherein the third stage CDS3 is activated. As the marked channels are taken into use, the channel distributor is advanced from stage to stage under control of pulse drive transistor 2508. Each time that the first stage CDS1 is activated and transistor 2303 in that stage becomes conductive, the positive-going potential swing at the collector of that transistor is utilized to advance the highway distributor.

As previously described, the busy flip-flip circuit individually corresponding to a particular one of the channels on one of the highways is triggered to the condition wherein the transistors forming that flip-flip circuit are conductive when that channel is seized. It will be recalled that a highway monitor circuit is provided for each highway network in the long distance switching center and each monitor circuit functions to continuously scan the time positions on its associated highway network for release and release acknowledge signals. It will also be recalled that when a release and a release acknowledge signal have been detected by the highway monitor circuit in a particular time position channel, the highway monitor circuit functions to apply a negative-going one-second pulse to the individual time position busy conductor corresponding to that channel. It can be seen that when the negative-going pulse is applied to conductor TPB1 by the highway monitor circuit associated with the first transmission highway network, the pulse is differentiated by capacitor 2516 and the positive pulse corresponding to the trailing edge of said one second pulse is coupled through diode 2517 to the base of transistor 2503 and serves to render transistors 2502 and 2503 of the busy 1–1 flip-flip circuit non-conductive. When transistor 2503 becomes non-conductive, a negative potential is again applied to the anode terminal of diode 2404 in gate 1–1 to thus mark time position 1 on highway 1 idle so that that time position can be assigned for use again when the highway and channel distributors advance to the setting wherein stages HDS1 and CDS1 are activated.

It will be recalled from the general description that the channel allotter is controlled to discontinue the application of channel and highway marking signals to the bus bar conductors whenever an incoming register or an attendant's link circuit is being controlled to read out channel and highway marking signals to those bus bars. When the register finder seizes an incoming or key sender register for the purpose of controlling that register to read out, ground potential is applied to conductor FR by the register finder. The positive potential swing on conductor FR is coupled through capacitor 2308 and diode 2309 and serves to operate the flip-flop circuit comprising transistors 2310 and 2311 to the condition wherein 2311 is conductive and 2310 is non-conductive. When transistor 2310 becomes non-conductive, the emitter electrode of emitter follower transistor 2312 goes negative and transistor 2325 becomes conductive. When transistor 2325 is conductive, the ground potential appearing at its collector is coupled through diodes 2313–2316 to the base electrodes of transistors 2401, 2411, 2409, and 2412, respectively, and through corresponding diodes to the base electrodes of the time position 2 gating-time position 9 gating transistors. Thus, all of the above-mentioned gating transistors are prevented from becoming conductive regardless of the setting of the highway and channel distributors and the channel allotter is effectively disconnected from the highway and time position bus bars HWBB and TPBB, respectively.

When a line terminating unit is seized by the route selector and ground potential is applied by the route selector to conductor UF, the ground potential is coupled through diode 2317 so that the output of the "or" gate for positive signals formed by diodes 2317 and 2318 goes positive. The positive-going potential at the output of the "or" gate is coupled through capacitor 2319 and serves to trigger the flip-flop circuit comprising transistors 2320 and 2321 to the condition in which 2321 is conductive and 2320 is non-conductive. When transistor 2321 becomes conductive, the upper terminal of capacitor 2322 is returned to ground potential. The next occurring positive-going clock pulse on conductor 20 kc. trigger is coupled through capacitor 2322 and diode 2323 to reset the flip-flop circuit comprising transistors 2310 and 2311 to the condition wherein transistor 2310 is again conductive. When transistor 2310 becomes conductive, the output signal from emitter follower transistor 2312 goes to ground potential, transistor 2325 becomes non-conductive, and the channel allotter is again effectively connected to the highway and channel bus bars. The positive potential swing at the emitter of emitter follower transistor 2312 is also coupled through capacitor 2324 to reset the flip-flop circuit comprising transistors 2320 and 2321 to the condition wherein transistor 2320 is conductive.

In the event that the route selector does not find an idle line terminating unit in the group of units marked by the register being read out, the route selector functions to apply ground potential to the all trunks busy conductor ATB. The ground potential appearing on conductor ATB is coupled through diode 2318 and is utilized to reset the flip-flop circuit comprising transistors 2310 and 2311 in the exact same manner as just described.

*Incoming register 34*

The purpose of the incoming register, which is shown in Figs. 26–33, is to register the digital information received from a calling line terminating unit, to then control the route selector to select an idle line terminating unit in the group of units corresponding to the registered digit information, and to then control the selected line terminating unit to seize the time position channel seized by the calling line terminating unit and the register. The register then releases from the connection and is free to handle another call.

Before proceeding to describe the operation of the incoming register in detail, it is believed expedient to the understanding of the operation of the system to tabulate the various frequencies used for the transmission of supervisory and dialing information in the illustrated system. The frequencies assigned for the various purposes are as follows:

| Digits (received by inc. reg.): | Digit acknowledgment |
|---|---|
| 1–VW | YZ |
| 2–VX | XZ |
| 3–WX | WZ |
| 4–VY | VZ |
| 5–WY | XY |
| 6–XY | WY |
| 7–VZ | VY |
| 8–WZ | WX |
| 9–XZ | VX |
| 0–YZ | VW |

| Supervisory: | Acknowledgment |
|---|---|
| Seizure X | X |
| Release UV | UZ |
| Cancel UY | None |

In the tested embodiment of the invention, the various letter designated frequencies have the following values: $U$=900 c.p.s., $V$=1100 c.p.s., $W$=1300 c.p.s., $X$=1500 c.p.s., $Y$=1700 c.p.s., and $Z$=1900 c.p.s.

Figure 28:
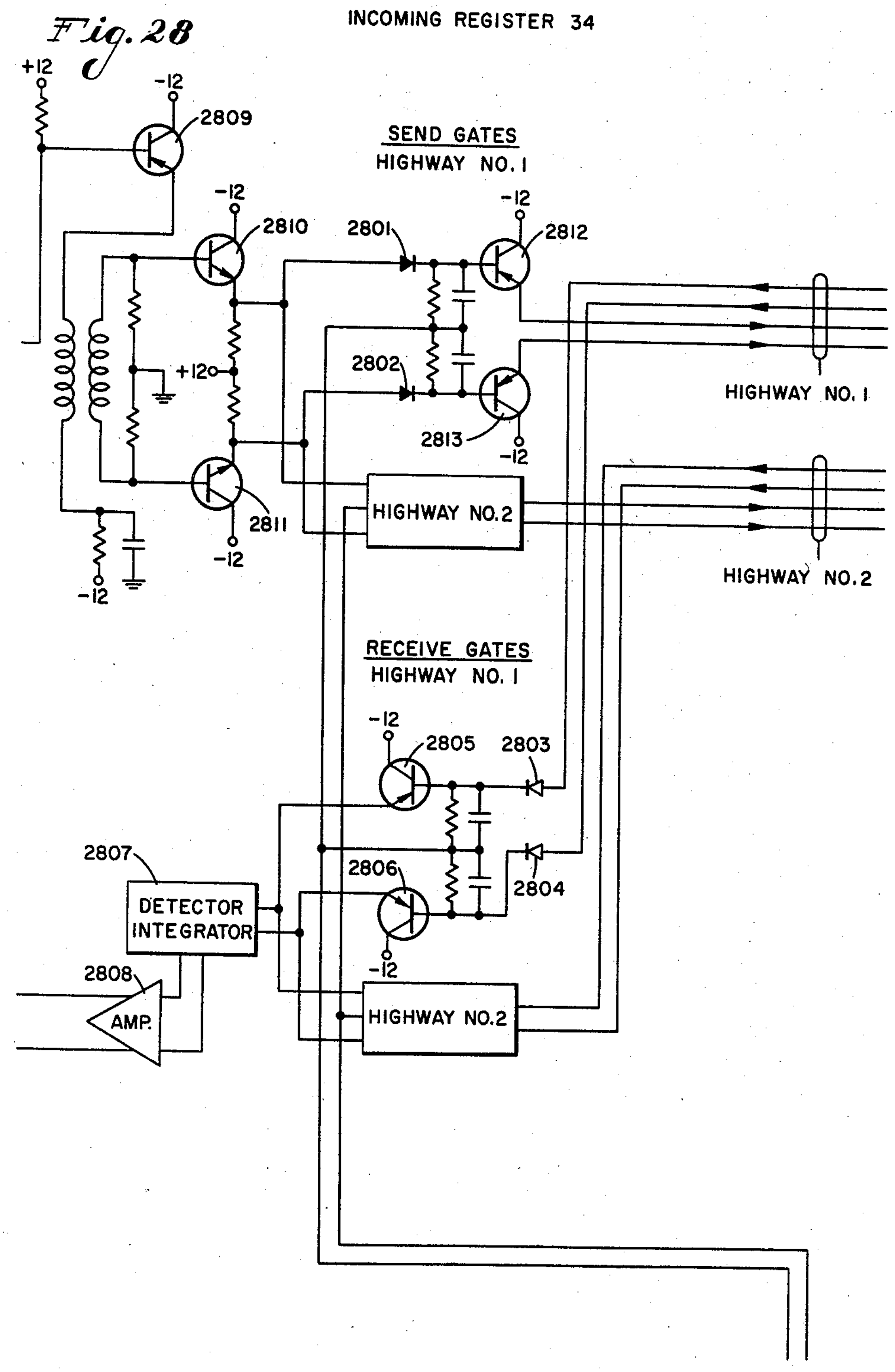
Figure 29:
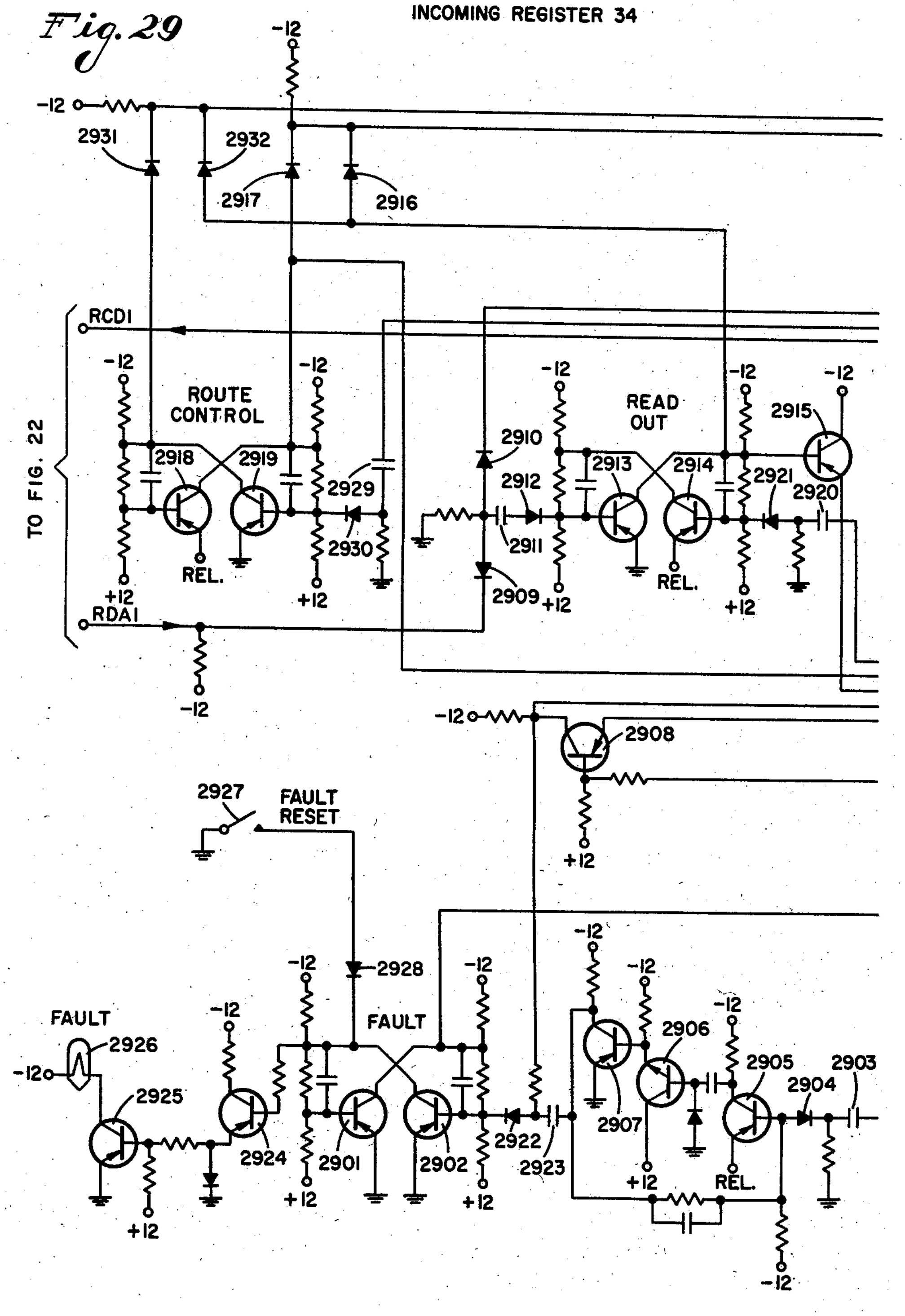
Figure 30:
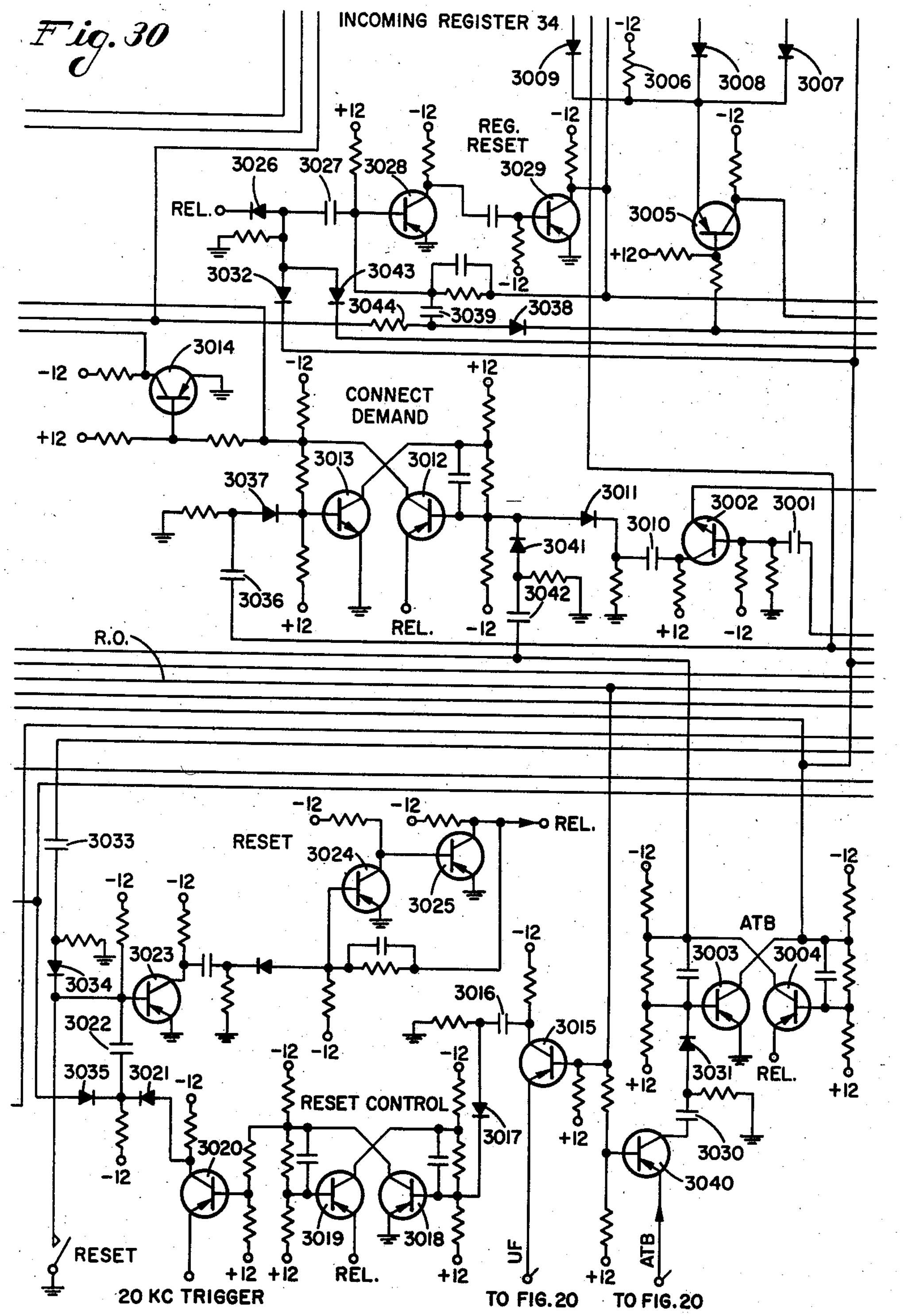
Figure 31:
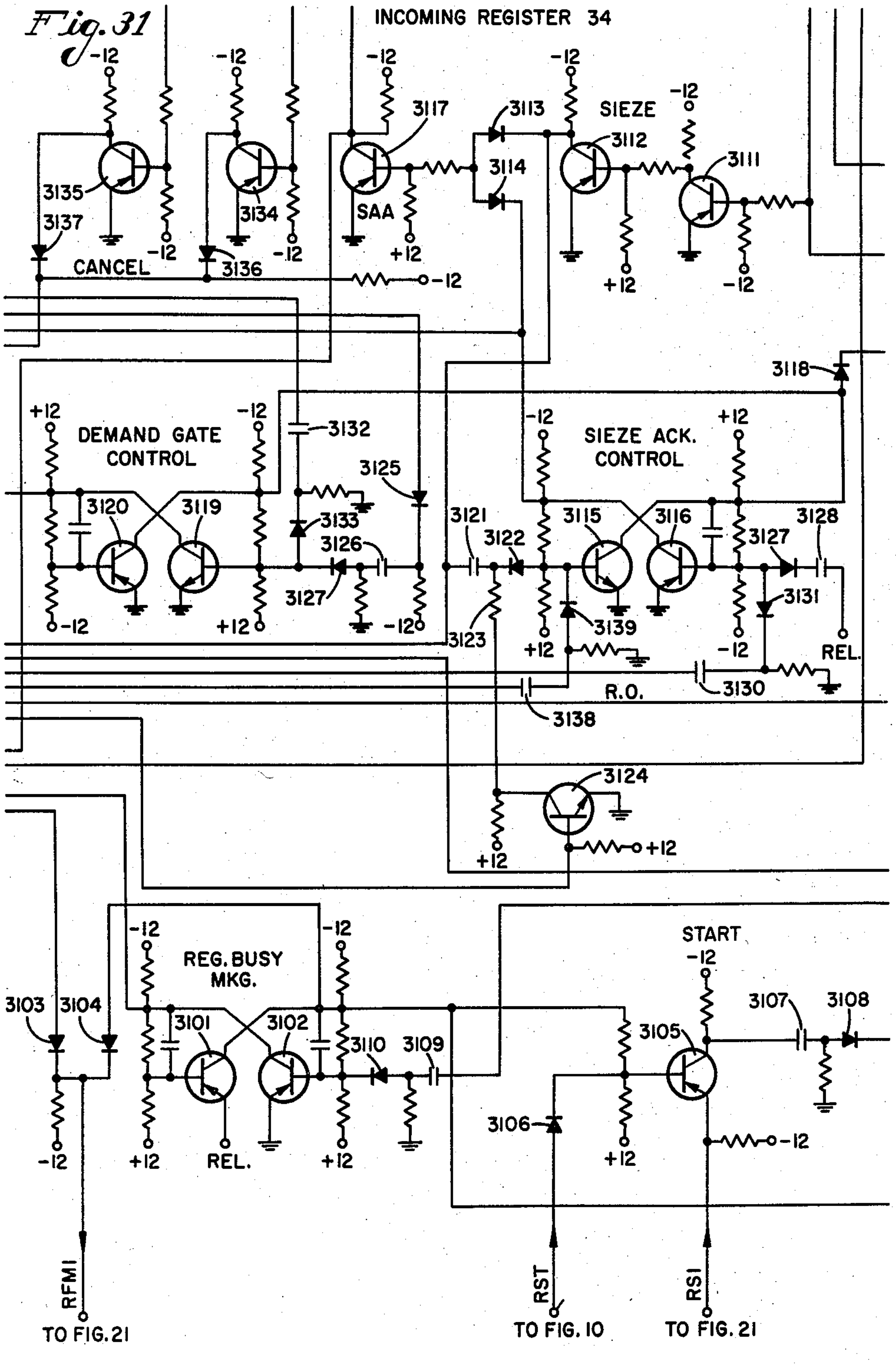
Figure 32:
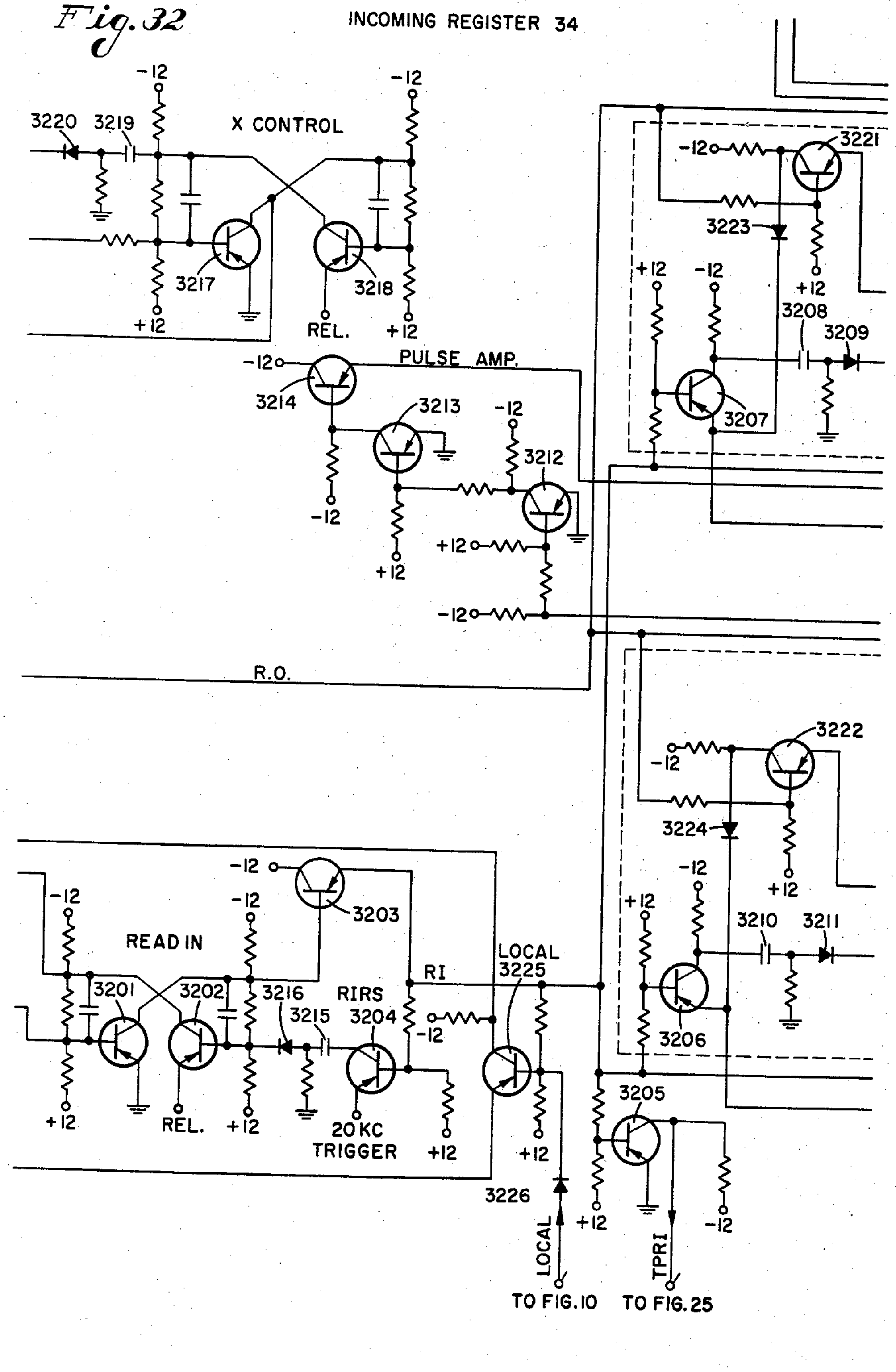
Figure 33:
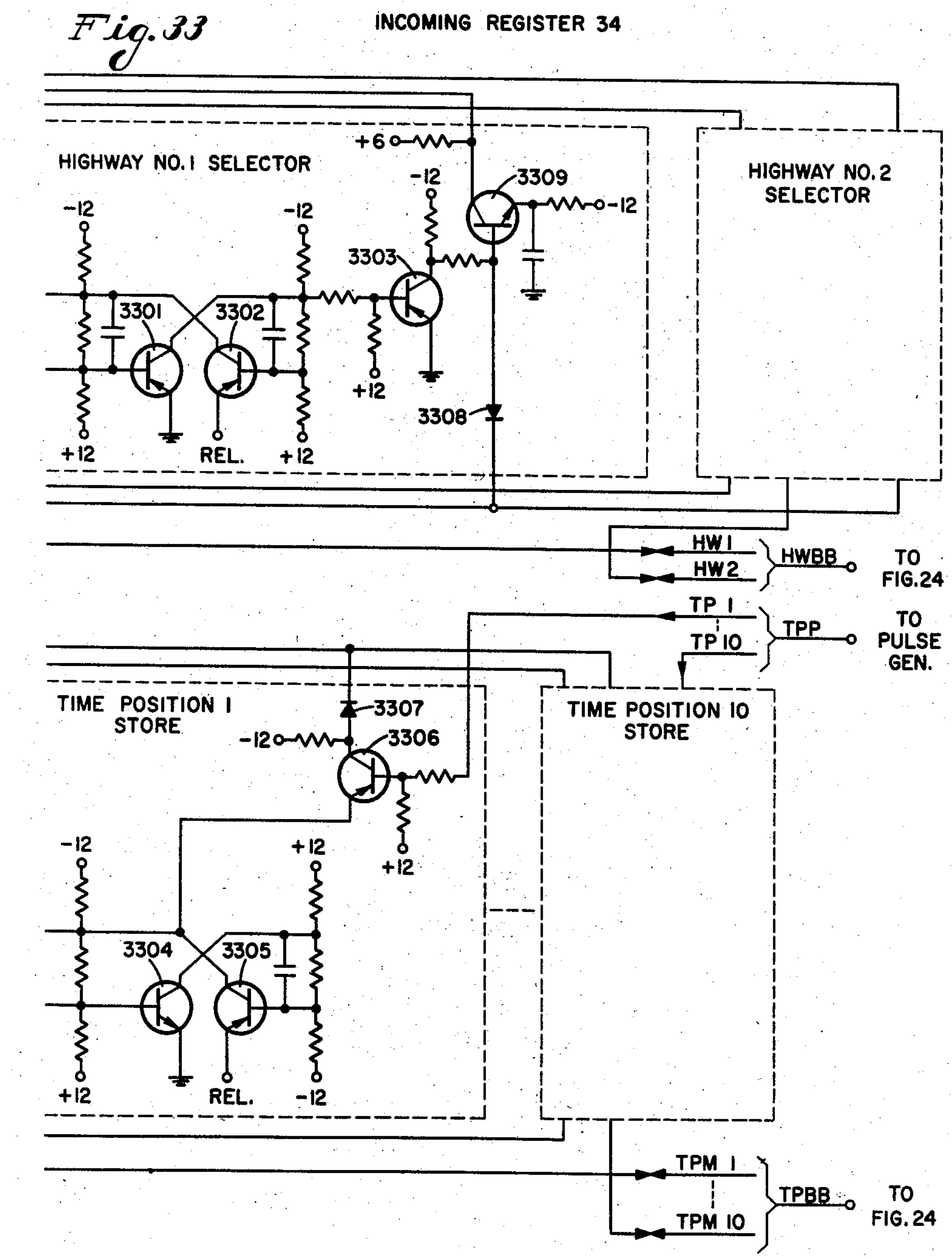

In the reset condition of the incoming register, the send and receive gates of Fig. 28 are closed, each flip-flop circuit in which the emitter of one transistor is returned to reset conductor RS1 is in the condition wherein the other transistor in that flip-flop is conductive, the seize acknowledge control flip-flip circuit of Fig. 31 is in the condition in which both transistors are conductive, the demand gate control flip-flip circuit of Fig. 31 is in the condition in which both transistors are non-conductive, the flip-flip circuit in each of the ten time position store circuits (Fig. 33) is in the condition in which both transistors are non-conductive, and the fault control flip-flop circuit comprising transistors 2901 and 2902 is in the condition wherein transistor 2902 is conductive. Under these conditions, the anode terminals of diodes 3103 and 3104, which form an "and" gate for negative signals, are returned to negative potential and register free marking conductor RFM1, which extends to the incoming register allotter, is marked at a negative potential to indicate to the incoming register allotter that the illustrated incoming register is in readiness to handle a call. The anode terminal of diode 3103 is returned to negative potential at the collector of non-conducting transistor 2901 in the fault control flip-flop circuit, and the anode terminal of diode 3104 is returned to the collector of non-conducting transistor 3101 in the register busy marking flip-flop circuit. When the illustrated incoming register is assigned for use by the incoming register allotter, ground potential is applied to the register seize conductor RS1 and start transistor 3105 is enabled for conduction.

To illustrate the operation of the register, first assume that the calling line terminating unit found by the calling unit finder circuit terminates a trunk line extending to another long distance switching center. When the calling line terminating unit is enabled by the calling unit finder circuit, the calling unit functions to apply negative potential to register start conductor RST, which is common to all of the incoming register circuits. Thus, the base of transistor 3105 goes negative and since its emitter is returned to ground potential on conductor RS1, transistor 3105 is rendered conductive. The resulting positive-going potential swing at the collector of transistor 3105 is coupled through capacitor 3107 and diode 3108 to the base of transistor 3201 to set the read in flip-flop circuit to the condition in which transistor 3202 is conductive and transistor 3201 is non-conductive. The positive-going potential swing at the collector of transistor 3202 is coupled through capacitor 3109 and diode 3110 to set the register busy marking flip-flop circuit to the condition in which transistor 3101 is conductive. When transistor 3101 becomes conductive, ground potential at its collector is coupled through diode 3104 to conductor RFM1 and the incoming register allotter is thereby enabled to assign the next idle incoming register for use when the next 20 kc. clock pulse is received.

Returning to the consideration of the read in flip-flop circuit, it can be seen that when transistor 3201 becomes non-conductive, and its collector falls to a negative potential, a negative potential is applied to read in conductor RI at the emitter electrode of emitter follower transistor 3203. The negative potential on conductor RI is applied to the base of read in reset transistor 3204 to enable said transistor to become conductive when the next occurring positive-going clock pulse is received on conductor 20 kc. trigger. It will be recalled that the calling unit functions to transmit the start signal to register start conductor RST at the termination of a ten microsecond clock pulse. Therefore, another clock pulse does not occur on conductor 20 kc. trigger until approximately forty microseconds after the base of transistor 3204 is made negative. The negative potential on conductor RI is also applied to the base of transistor 3205 to render transistor 3205 conductive. When transistor 3205 becomes conductive, ground potential is applied to time position read in conductor TPRI to enable the channel allotter to mark the next idle time position channel on the bus bars when the next 20 kc. clock pulse is received.

The negative potential on conductor RI is also applied to the base of a transistor corresponding to 3206 in each of the ten time position store circuits and to the base of a transistor corresponding to 3207 in both of the highway selectors. If it is assumed that the channel allotter is applying ground potential to highway bus bar conductor HW1 and to time position bus bar conductor TPM1, thus identifying time position channel 1 on highway 1, transistor 3207 in highway No. 1 selector and transistor 3206 in time position 1 store circuit are rendered conductive. When transistor 3207 becomes conductive, the positive-going potential swing at its collector is coupled through capacitor 3208 and diode 3209 to the base of transistor 3301 to thereby set the flip-flop circuit in the highway 1 selector to the condition wherein transistor 3302 is conductive and transistor 3301 is non-conductive. When transistor 3301 becomes non-conductive, transistor 3303 becomes conductive. When transistor 3206 in the time position 1 store circuit becomes conductive, the positive-going potential swing at its collector is coupled through capacitor 3210 and diode 3211 to the base of transistor 3304 and the flip-flip transistors 3304 and 3305 are thereby rendered conductive. When transistor 3305 becomes conductive and its collector rises to ground potential, transistor 3306 is enabled for conduction. Thus, the highway and channel identifying information is read into and stored in the highway selector and time position store circuits of the incoming register. It will be recalled that the same information is simultaneously read into and stored in corresponding circuits in the calling line terminating unit so that the incoming register and the calling line terminating unit have now effectvely seized the channel assigned for use by the channel allotter.

The next occurring clock pulse on conductor 20 kc. trigger renders previously enabled read in reset transistor 3204 conductive and the positive potential swing at the collector of transistor 3204 is coupled through capacitor 3215 and diode 3216 to reset the read in flip-flop circuit to the condition wherein transistor 3201 is conductive and transistor 3202 is non-conductive. When transistor 3201 again becomes conductive, the emitter of emitter follower transistor 3203, and thus conductor RI, rise to ground potential and the highway selector and time position store circuits in the illustrated incoming register are prevented from reading in marking signals thereafter appearing on the highway and channel marking bus bars.

It can be seen that the base of transistor 3306 in the time position 1 store circuit is individually connected to conductor TP1, which, as previously explained, has negative-going recurring pulses in time position 1 applied thereto by a suitable time position pulse generator. Each negative pulse in time position 1 occurring on conductor TP1 renders transistor 3306 conductive and a positive pulse in time position 1 is coupled through diode 3307 to the base of normally conductive transistor 3212. It should be obvious that the transistor corresponding to 3306 in each of the other time position store circuits is not rendered conductive by the negative pulses occurring on its individually associated time pulse conductor since the emitter electrode of the transistor is returned to negative potential at the collector of the flip-flop transistor corresponding to 3505 in each of those circuits. Therefore, only positive-going pulses in time position 1 are applied to the base of transistor 3212. Each pulse renders transistor 3212 non-conductive, transistor 3213 conductive, and a corresponding positive-going pulse appears at the emitter of transistor 3214. The positive-going pulses in time position 1 appearing at the emitter of emitter follower transistor 3214 are applied to the cathode terminal of diode 3308 in highway 1 selector and to the cathode terminal of a diode corresponding to 3308 in the highway 2 selector circuit. In highway No. 1 selector, the positive-going pulses are coupled through diode 3308 to the base of transistor 3309 and each pulse renders transistor 3309 conductive. The positive-going pulses applied to the cathode terminal of the diode corresponding to 3308 in the highway 2 selector have no effect on the transistor corresponding to 3309 in that selector since the transistor corresponding to 3303 is non-conductive and the anode terminal of the diode corresponding to 3308 is therefore returned to negative potential and the diode is biased in the reverse direction.

The incoming register comprises a send gate and a receive gate for each highway transmission network, which gates are identical to the previously described gates in the line terminating unit. It can be seen that the cathode terminals of diodes 2801 and 2802 in the send gate associated with highway 1 and the cathode terminals of diodes 2803 and 2804 in the receive gate associated with highway 1 are returned to the collector of transistor 3309. When transistor 3309 is non-conductive, the plus six volt potential appearing at its collector is applied to the cathode terminals of the diodes and the diodes serve to block the transmission of any signals between the incoming register and the highway transmission network. However, when transistor 3309 becomes conductive in time position 1 in each frame of time position pulses and its collector potential falls to approximately minus six volt potential, the gating diodes are biased in the forward direction and pass signals between the highway and the incoming register. It will be recalled that the calling line terminating unit is controlled to transmit signal samples in time position 1 to the upper pair of highway conductors and to receive signal samples appearing on the lower pair of highway conductors. As shown, the incoming register is controlled to transmit signal samples to the lower pair of highway conductors and to receive signal samples from the upper pair of highway conductors. Therefore, signal samples in time position 1 transmitted to highway 1 by the calling line terminating unit are passed by diodes 2803 and 2804, amplified by emitter follower transistors 2805 and 2806, and detected and integrated by detector-integrator 2807. The detected signal is amplified by amplifier 2808 and applied to the input of multifrequency receiver 2701. Detector-integrator 2807 and amplifier 2808 may be identical to their previously described respective counterparts in the line terminating units. As previously stated, the multifrequency receivers used throughout the system may be of any conventional type and are equipped with suitable voice guard circuits so that an output is realized from each receiver only when the particular frequencies to which it is responsive are received.

The seize signal of frequency X, which activated the calling line terminating unit and which is still present on the receive conductors of the trunk line terminated by that unit, is detected by the multifrequency receiver 2701 and a positive potential appears on the X output conductor from receiver 2701. The positive potential on conductor X renders normally conductive seize transistor 3111 non-conductive and normally non-conductive seize transistor 3112 conductive. The cathode terminals of diodes 3113 and 3114, which form an "or" gate for negative signals, are returned to the collector of seize transistor 3112 and to the collector of the seize acknowledge control flip-flip circuit transistor 3116, respectively. As previously described, flip-flip transistors 3115 and 3116 are conductive at this time so that the cathode of diode 3114 is returned to ground. When transistor 3112 becomes conductive and its collector rises to ground potential, seize acknowledge amplifier transistor 3117 becomes non-conductive and its collector potential drops to minus twelve volts. Prior to the time when transistor 3117 is rendered non-conductive, the seize acknowledge signal frequency X amplified by emitter follower transistor 2702 is shunted to ground at the collector of transistor 3117 through diode 2703. When transistor 3117 becomes non-conductive, diode 2703 is biased in the reverse direction and frequency X appearing at the emitter of transistor 2702 is passed through diode 2704 and applied to the base of emitter follower transistor 2809. The amplified signal appearing at the output of transistor 2809 is further amplified by emitter follower transistors 2810 and 2811, sampled in time position 1 by diodes 2801 and 2802, and the resulting signal samples are amplified by emitter follower transistors 2812 and 2813 and transmitted over the lower pair of highway conductors to the calling unit. The negative potential swing at the collector of transistor 3117 is also coupled through capacitor 2903 and diode 2904 to the base of transistor 2905. Transistors 2905, 2906, and 2907 form a monostable circuit having a one-second delay and which is utilized to illuminate the fault lamp if the call is not processed within the measured period. The detailed operation of this portion of the circuit will be described later.

The positive potential appearing on output conductor X from receiver 2701, as a result of the detection of a seize signal by receiver 2701, is also applied to the base of transistor 3217 in the X control flip-flop circuit. The X control flip-flop circuit is prevented from being triggered to the condition wherein transistor 3218 is conductive because of the application of ground potential from the collector of conducting transistor 3115 in the seize acknowledge control flip-flip circuit through diode 3118 to the collector of transistor 3217 and thus to the base of cross-coupled transistor 3218. The X control flip-flop circuit is provided in the register to prevent the X stage of the digit register from being activated by a seize signal of frequency X, which same frequency is used as one of the compounded frequencies comprising digits "2," "3," "6," and "9."

The positive-going potential swing occurring at the collector of seize transistor 3112, as a result of the application of positive potential to the X output conductor of receiver 2701, is also coupled through the capacitor 3001 to the base of transistor 3002 but transistor 3002 cannot become conductive at this time since its emitter electrode is returned to a positive potential at the collector of non-conducting transistor 3119 in the demand gate control flip-flip circuit. The positive-going pulse at the collector of transistor 3112 is also coupled through capacitor 3121 but is locked by diode 3122 from the base of transistor 3115 in the seize acknowledge control flip-flip circuit. It might be well to mention at this time that resistor 3123, associated with the input to the seize acknowledge control flip-flip circuit, is returned to ground potential at this time at the collector of conducting transistor 3124. Transistor 3124 is held conductive by ground potential appearing at the collector of conducting transistor 2908 which, in turn, is held conductive by ground potential applied to its emitter from normally conductive transistor 3003 in the all trunks busy flip-flop circuit and by negative potential applied to its base from the collector of non-conductive transistor 3102 in the register busy marking flip-flop circuit. Thus, as long as the register is busy and an all trunks busy condition is not encountered by the route selector, resistor 3123 is returned to ground potential for a purpose which will be later described.

When the seize acknowledge signal transmitted by the illustrated incoming register is received by the originating key sender register, the key sender register terminates the transmission of a seize signal and the output conductor X from multifrequency receiver 2701 goes negative. When output conductor X goes negative, seize transistor 3111 becomes conductive and seize transistor 3112 becomes non-conductive. When transistor 3112 becomes non-conductive, seize acknowledge amplifier transistor 3117 becomes conductive from the negative potential at the collector of transistor 3112 coupled through diode 3113 and a seize acknowledge signal is no longer applied to the highway. The negative potential swing at the collector of transistor 3112 is coupled through capacitor 3121 and diode 3122 to the base of transistor 3115 and thereby sets the seize acknowledge control flip-flip circuit to the condition wherein transistors 3115 and 3116 are non-conductive. The resulting negative potential at the collector of transistor 3116 is coupled through diode 3114 to the base of seize acknowledge amplifier transistor 3117 for the purpose of assuring the continued conduction of that transistor regardless of the further operation of the seize transistor 3112. The negative potential at the collector of transistor 3116 is also coupled to the base of transistor 3005 but transistor 3005 does not become conductive at this time since its emitter is returned to minus twelve volt potential through resistor 3006. When transistor 3115 of the seize acknowledge control flip-flip circuit becomes non-conductive, direct ground is removed from the collector of transistor 3217 in the X control flip-flop circuit and that circuit is now enabled for operation.

To illustrate the operation of the X control flip-flop circuit, assume that the originating key sender register now transmits the voice frequency dialing signal comprising compounded frequencies V and X, which compounded signal corresponds to the digit "2." When the compounded frequencies V and X are applied to the input of multifrequency receiver 2701, positive potential is applied by receiver 2701 to output conductors V and X. The positive potential applied to conductor V is applied to the base electrode of transistor 2705 in the V register and the V register is thereby set to the condition wherein transistor 2706 is conductive and 2705 is non-conductive. The positive potential applied to conductor X, of course, triggers seize transistor 3111 non-conductive and seize transistor 3112 conductive but the output of transistor 3112 has no effect at this time. Seize acknowledge amplifier transistor 3117 remains conductive through diode 3114, as previously described. The positive potential on conductor X is also applied to the base of transistor 3217 and sets the X control flip-flop circuit to the condition in which transistor 3218 is conductive and transistor 3217 is non-conductive. When transistor 3218 becomes conductive, a positive pulse is coupled through capacitor 3219 and diode 3220 to the base of the transistor corresponding to 2705 in the X register 2601, and the X register is set to the condition wherein the transistor corresponding to 2706 is conductive and the transistor corresponding to 2705 is non-conductive. When transistor 2705 in the V register becomes non-conductive, negative potential is applied to the base electrodes of transistors corresponding to 2707 in digit "2" stage 2708 and in digit "4" stage 2709. When transistor 2706 in the V register becomes conductive, ground potential is applied to the emitter electrode of transistor 2707 in the digit "1" stage and to the emitter electrode of a transistor corresponding to 2707 in the digit "7" stage 2602. When the transistor corresponding to 2705 in the X register 2601 becomes non-conductive, negative potential is applied to the base electrodes of transistors corresponding to 2707 in the digit "6" stage 2603 and in the digit "9" stage 2604. When the transistor corresponding to 2706 in the X register 2601 becomes conductive, ground potential is applied to the emitter electrodes of transistors corresponding to 2707 in the digit "2" stage 2708 and in the digit "3" stage 2733. Thus, the transistor corresponding to 2707 in digit "2" stage 2708 is the only transistor having both negative potential applied to its base and ground potential applied to its emitter by the operation of the X and V register flip-flop circuits.

When the transistor corresponding to 2707 in the digit "2" stage 2708 becomes conductive, ground potential appearing at its collector is applied to the anode terminal of diode 2710 in the Z gate, to the anode terminal of a diode corresponding to 2710 in the X gate 2608, and to the emitter electrodes of transistors 2605 and 2606 in the digit "2" switch stage. Diode 2710 forms one input of a four-input "or" gate for positive signals and when ground potential is applied to its anode terminal, Z gate transistor 2711 is rendered non-conductive. It can be seen that prior to the time that transistors 2711 becomes non-conductive, Z frequency, which is amplified by emitter follower transistor 2712, is shunted to ground at the collector of transistor 2711 through diode 2713. When transistor 2711 becomes conductive, diode 2713 is biased for non-conduction and Z frequency is coupled through diode 2714 to the base of emitter follower transistor 2809. Similarly, when the transistor corresponding to 2711 in the X gate 2608 becomes conductive, X frequency, which is amplified by emitter follower transistor 2610, is coupled through diode 2609 to the base of emitter follower transistor 2809. Thus, signal samples of compounded frequencies X and Z are coupled through the highway No. 1 send gate to the lower pair of conductors and serve as a digit acknowledge signal to the originating key sender register.

When the transistor corresponding to 2706 in the X register 2601 becomes conductive, ground potential at its collector is applied to the anode terminal of diode 3007, which with diodes 3008 and 3009 forms an "or" gate for positive signals. The anode terminals of diodes 3008 and 3009 are coupled to the collector electrodes of the transistors corresponding to 2706 in the Y and Z registers, respectively. Since at least one of the frequencies, X, Y, and Z is used in any one of the digits "2–0," inclusive, one of the inputs to the "or" gate goes to ground potential when any digit other than "1" is stored in the register. Transistor 3005 is now rendered conductive since its emitter is returned to ground potential through diode 3007 and its base is returned to a negative potential at the collector of non-conducting transistor 3116 in the seize acknowledge control flip-flip circuit. When transistor 3005 becomes conductive, the positive-going potential swing at its collector is coupled through diode 3125, capacitor 3126, and diode 3127 to the base of transistor 3119 and serves to set the demand gate control flip-flip circuit to the condition wherein transistors 3119 and 3120 are conductive. When transistor 3119 becomes conductive, ground potential is applied to the emitter of transistor 3002. When transistor 3120 becomes conductive, ground potential is again coupled through diode 3118 to the collector of transistor 3217 in the X control flip-flop circuit and serves to set that flip-flop circuit to the condition in which transistor 3218 is non-conductive.

When the digit acknowledge signal is received by the originating key sender register, the key sender register is controlled to discontinue the transmission of the voice frequency dialing signals V and X, and positive potential is removed from the V and X output conductors by receiver 2701. When positive potential is removed from output conductor X, seize transistor 3111 becomes conductive and seize transistor 3112 reverts to its non-conductive condition. The originating key sender register now functions to transmit a second seize signal and positive potential is applied to output conductor X by receiver 2701 to again render transistor 3111 non-conductive and transistor 3112 conductive. The X control flip-flop circuit remains in the setting wherein transistor 3218 is non-conductive since the collector of transistor 3217 is returned to ground potential at the collector of conducting transistor 3120. When transistor 3112 becomes conductive, the positive-going potential swing at its collector is coupled through capacitor 3001 to render transistor 3002 conductive since the emitter of transistor 3002 is returned to ground potential at the collector of conducting transistor 3119 in the demand control flip-flip circuit.

When transistor 3002 becomes conductive, the negative-going potential swing at its collector is coupled through capacitor 3010 and diode 3011 to set the connect demand flip-flip circuit to the condition in which transistors 3012 and 3013 are both conductive. When transistor 3012 becomes conductive, normally conducting transistor 3014 becomes non-conductive and minus twelve volt potential is applied to the register connect demand conductor RCD1, which extends to the register finder. Negative potential on conductor RCD1 signifies to the register finder that the illustrated incoming register has a routing digit stored therein and is in readiness to read out digit marking information to the route selector and time position channel and highway information to the channel and highway marking bus bars.

The register finder seizes the illustrated incoming register for read out purposes by applying ground potential to register demand answer conductor RDA1 and thus to the cathode terminal of diode 2909, which with diode 2910 forms an "and" gate for positive signals. A positive-going output signal is realized from the "and" gate since the cathode terminal of diode 2910 is returned to ground potential at the collector of conducting transistor 3012. The positive-going signal at the output of the "and" gate is coupled through capacitor 2911 and diode 2912 to the base of transistor 2913 and sets the read out flip-flop circuit to the condition in which transistor 2914 is conductive and transistor 2913 is non-conductive. When transistor 2913 becomes non-conductive and its collector falls to a negative potential, a negative potential is applied to read out conductor RO at the emitter of emitter follower transistor 2915. The negative potential on conductor RO is applied to the base electrodes of transistors 3015 and 3040 but these transistors remain non-conductive since units found conductor UF and all trunks busy conductor ATB are returned to a negative potential at this time.

The negative potential on conductor RO is also applied to the base of transistor 3221 in the highway 1 selector circuit, to the base electrode of a transistor corresponding to 3221 in the highway 2 selector, to the base electrode of transistor 3222 in the time position 1 store circuit, and to the base electrodes of transistors corresponding to 3222 in the remaining nine time position store circuits. Since the flip-flop circuit in the highway 1 selector is operated to the condition in which transistor 3302 is conductive, transistor 3221 is rendered conductive and ground potential at its collector is coupled through diode 3323 to the highway bus bar conductor HW1. Similarly, since the flip-flip circuit transistors in the time position 1 store circuit are conductive, transistor 3222 is rendered conductive and ground potential at its collector is coupled through diode 3224 to the time position bus bar conductor TPM1. Thus, time position 1 channel on highway 1 is identified on the bus bars to the called line terminating unit selected by the route selector. It will be recalled that the channel allotter is effectively disconnected from the bus bars when the register finder seizes one of the registers for read out purposes so that the same set of bus bars can be used by the channel allotter and the registers. Simultaneously with the application of marking signals to the highway and channel bus bars, the register is controlled to transmit digit marking information to the route selector for the purpose of controlling the route selector to seize an idle unit in the group of units represented by the digit information stored in the register. It can be seen that when the read out flip-flop circuit is triggered to the condition in which transistor 2914 is conductive, negative potential appearing at the collector of non-conducting transistor 2913 is applied to the anode terminal of diode 2916, which with diode 2917 forms an "and" gate for negative signals. The anode terminal of diode 2917 is also returned to a negative potential at the collector of non-conducting transistor 2918 in the route control flip-flop circuit. The negative potential signal at the output of the "and" gate formed by diodes 2916 and 2917 is applied to the base electrode of a transistor corresponding to 2605 in each of the digit switches 2–0. Since the digit "2" is stored in the digit register and the emitter electrode of transistor 2605 is therefore returned to ground potential, transistor 2605 in the digit "2" switch becomes conductive and ground potential is applied through diode 2607 to the digit marking 2 conductor DM2, which extends to the route selector. The route selector is thus controlled to select an idle unit in the second group of units, which group of units individually terminate trunk lines extending to the desired long distance switching center. The line terminating unit selected by the route selector is then controlled to read in the highway and time position channel information applied to the bus bars by the illustrated register and thus seize the marked channel.

When an idle unit in the marked group is seized by the route selector, ground potential is applied to unit found conductor UF and thus to the emitter of transistor 3015. Transistor 3015 becomes conductive since the negative potential appearing on conductor RO is applied to its base electrode, as previously described. The positive-going potential swing at the collector of transistor 3015 is coupled through capacitor 3016 and diode 3017 to set the reset control flip-flop circuit to the condition in which transistor 3019 is conductive and transistor 3018 is non-conductive. When transistor 3018 becomes non-conductive, the base of transistor 3020 is returned to negative potential so that the next occurring positive-going clock pulse on conductor 20 kc. trigger renders transistor 3020 conductive. The positive-going potential swing at the collector of transistor 3020 is coupled through diode 3021 and capacitor 3022 to the base of transistor 3023 in the reset monostable circuit comprising transistors 3023, 3024, and 3025, which monostable circuit is identical to the monostable circuits previously described. Briefly, transistors 3023 and 3025 are normally biased for conduction and transistor 3024 is normally biased for non-conduction. When a positive-going pulse is coupled through diode 3021 and capacitor 3022 to the base of transistor 3023, transistor 3023 is triggered non-conductive, transistor 3024 is triggered conductive, and transistor 3025 is triggered non-conductive to apply negative potential to conductor REL. After a short interval, the reset monostable circuit reverts to its normal operated condition. The negative pulse on release conductor REL is applied to the emitter electrodes of transistor 2918 in the route control flip-flop circuit, transistor 2914 in the read out flip-flop, transistor 3218 in the X control flip-flop, transistor 3019 in the reset control flip-flop, transistor 3004 in the ATB flip-flop, transistor 3101 in the register busy marking flip-flop, transistor 3202 in the read in flip-flop, and transistor 3302 in the highway selector circuits. Each of the above-identified flip-flop circuits is thus reset to the condition, or remains in the condition, in which the other transistor of each flip-flop circuit is conductive. The negative pulse on conductor REL is also applied to the emitter of transistor 2905 for the purpose of terminating the timing operation of the monostable circuit comprising transistors 2905, 2906, and 2907. The negative pulse on conductor REL is also applied to the emitter of transistor 3012 and renders both transistors 3012 and 3013 of the connect demand flip-flip circuit non-conductive. The negative pulse on conductor REL is also coupled through capacitor 3128 and diode 3129 to the base of transistor 3116 and triggers both transistors 3116 and 3115 of the seize acknowledge control flip-flip circuit conductive. The negative pulse on conductor REL is also applied to the emitter electrode of a transistor corresponding to 3305 in each of the time position store flip-flip circuits and thus assures that each time position store flip-flip circuit is in the condition in which both transistors are non-conductive. The negative pulse on conductor REL is also coupled through diode 3026 and capacitor 3027 to the base of normally non-conductive transistor 3028. The negative pulse applied to the base of transistor 3028 renders transistor 3028 conductive. When transistor 3028 becomes conductive, transistor 3029, which forms the other stage of the register reset monostable circuit, becomes non-conductive and a negative pulse is applied to the emitter electrode of a transistor corresponding to 2706 in each of the digit register circuits. The digit register flip-flop circuits are thereby set in the condition in which the transistor corresponding to 2705 is conductive. The negative pulse appearing at the collector of transistor 3029 is also coupled through capacitor 3132 and diode 3133 to reset the demand gate control flip-flip circuit to the condition wherein transistors 3119 and 3120 are non-conductive. The incoming register is now completely reset and in readiness to handle another call.

Whenever the route selector encounters an all trunks busy condition in the selected group of line terminating units, ground potential is applied to conductor ATB rather than to the unit found conductor UF, as explained in the description of the route selector. It will be recalled that the base of transistor 3040 is returned to negative potential appearing on read out conductor RO. Therefore, when ground potential is applied to conductor ATB, transistor 3040 becomes conductive and a positive-going pulse is coupled through capacitor 3030 and diode 3031 to the base of transistor 3003 to set the all trunks busy flip-flop circuit to the condition in which transistor 3004 is conductive. When transistor 3004 becomes conductive, the positive potential swing at its collector is coupled through capacitor 3032 and diode 3033 to the base of transistor 3012 to set the connect demand flip-flip circuit to the condition wherein both transistors are non-conductive. Negative potential is thereby removed from the register connect demand conductor RCD1 to enable the register finder to advance to the next register demanding attention. When transistor 3004 becomes conductive, the positive-going potential swing at its collector is also coupled through capacitors 2920 and 2921 to set the read out flip-flop circuit to the condition in which transistor 2913 is conductive. When transistor 2913 becomes conductive, ground potential is applied to read out conductor RO and the transmission of highway and channel marking information to the bus bars is terminated by the illustrated incoming register. When transistor 2913 becomes conductive, ground potential is applied to the anode terminal of diode 2916 and thus to the base electrodes of all of the digit switch transistors corresponding to 2605. Thus, digit marking information is removed from the digit marking conductors, which extend to the route selector.

When transistor 3003 of the all trunks busy flip-flop circuit becomes non-conductive, the negative-going potential swing at its collector is coupled through capacitor 3130 and diode 3131 to set the seize acknowledge control flip-flip circuit to the condition in which both transistors 3115 and 3116 are conductive. The negative-going potential swing at the collector of transistor 3003 is also coupled through diode 3032 and capacitor 3027 to the base of transistor 3028 to trigger the register reset monostable circuit and thereby release the digit register and reset the demand gate control flip-flip circuit, as previously explained. Prior to the time when transistor 3003 becomes non-conductive, the recorded busy announcing message received from the tape announcer and amplified by transistor 2715 is shunted to ground at the collector of transistor 3003 through diode 2716. When transistor 3003 becomes non-conductive, diode 2716 is biased in the reverse direction and the recorded message is coupled through diode 2717 to the base of emitter follower amplifier transistor 2809 and thus to the attendant at the originating long distance switching center. When transistor 3003 becomes non-conductive, the negative potential at its collector is also applied to the emitter of transistor 2908 and transistor 2908 is thereby rendered non-conductive. When transistor 2908 becomes non-conductive and its collector potential drops to minus twelve volts, diode 2922 is biased in the reverse direction so as to prevent the operation of the fault flip-flop circuit if the attendant at the originating long distance switching center fails to release the connection within the time interval measured by the monostable circuit comprising transistors 2905, 2906, and 2907. When transistor 2908 becomes non-conductive, transistor 3124 becomes non-conductive but serves no purpose at this time.

When the attendant at the originating long distance switching center releases the connection after receiving the recorded message or at any other time or if the calling party should hang up when the incoming register is connected to the highway, a release signal, comprising frequencies U and V, is transmitted over the trunk line and detected by multifrequency receiver 2701 and positive potential appears on the output conductors U and V from the receiver. The V digit register is, of course, triggered but since the digit register stages were all reset under control of the all trunks busy flip-flop circuit, the V stage is the only digit register stage in an activated condition and none of the digit gating transistors are rendered conductive. With positive potential on conductors U and V, normally conducting transistors 2718 and 2719 are rendered non-conductive and a negative signal appears at the output of the "and" gate for negative signals comprising diodes 2720 and 2721. The negative signal appearing at the output of the "and" gate is coupled through diode 2722 and capacitor 2723 to trigger the monostable circuit, comprising transistors 2724 and 2725, to the condition wherein transistor 2724 is conductive and transistor 2725 is non-conductive. After approximately fifty milliseconds, the monostable circuit reverts to the condition in which transistor 2724 is non-conductive and transistor 2725 is conductive. The negative pulse at the collector of transistor 2725 serves to reverse bias diodes 2726 and 2727 so that signal frequencies Z and U, amplified by emitter follower transistors 2728 and 2729, respectively, are coupled through diodes 2730 and 2731, respectively, to the base of emitter follower transistor 2809. Thus, a release acknowledge signal of approximately fifty milliseconds duration is transmitted to the originating office and to the highway monitor circuit in the illustrated long distance switching center. The highway monitor circuit is responsive to the receipt of the release acknowledge signal to mark time position 1 channel on highway 1 as idle to the channel allotter. The negative pulse at the collector of transistor 2725 is also differentiated by capacitor 3033 and the positive-going spike corresponding to the trailing edge of said pulse is coupled through diode 3034 to trigger the reset monostable circuit, comprising transistors 3023, 3024, and 3025, and thus completely reset the incoming register, as previously described.

Next assume that the digit acknowledge signal returned by the incoming register does not correspond to the digit transmitted by the originating key sender register. Under these conditions, the register sender at the originating long distance switching center transmits a cancel signal comprising frequencies U and Y over the trunk line. When the cancel signal is detected by receiver 2701, positive potential appears on output conductors U and Y and normally conductive transistors 3134 and 3135 are thereby rendered non-conductive. Under these conditions, the anode terminals of diodes 3136 and 3137, which form an "and" gate for negative signals, are both returned to minus twelve volt potential and the register reset monostable circuit is triggered through diode 3043 and capacitor 3027 to reset the digit register flip-flop stage to the condition in which the transistor corresponding to 2705 in each stage is conductive. The key sender register then re-transmits the canceled digit.

Next assume that there is a malfunction in the incoming register and the incoming register therefore fails to complete a call within the time period measured by the monostable circuit comprising transistors 2905, 2906, and 2907. It will be recalled that when seize acknowledge amplifier transistor 3117 becomes conductive responsive to the receipt of a seize signal by the multifrequency receiver 2701, the negative potential swing at its collector is coupled through capacitor 2903 and diode 2904 to the base of transistor 2905. Transistors 2905, 2906, and 2907 form a monostable circuit in which transistor 2905 is normally non-conductive, the emitter of transistor 2906 is slightly negative, and transistor 2907 is normally conductive. When a negative pulse is coupled through diode 2904 to the base of transistor 2905, transistor 2905 is rendered conductive, the emitter electrode of transistor 2906 goes positive, and transistor 2907 is rendered non-conductive. After a period of approximately one second, the monostable circuit reverts to the condition in which transistor 2907 is conductive. The positive-going potential swing at the collector of transistor 2907 is coupled through capacitor 2923 and diode 2922 to set the fault flip-flop circuit to the condition wherein transistor 2901 is conductive and transistor 2902 is non-conductive. When transistor 2902 becomes non-conductive and its collector potential goes negative, the emitter of emitter follower transistor 2924 goes negative and transistor 2925 is rendered conductive to illuminate fault lamp 2926. When transistor 2901 becomes conductive, the positive-going potential swing at its collector is coupled through diode 3035 and capacitor 3022 to trigger the reset monostable circuit and thus reset the incoming register. It is to be noted that when the register busy marking flip-flop circuit is reset and transistor 3102 becomes conductive, transistors 2908 and 3124 become non-conductive. Now when the send and receive gates are closed as a result of resetting of the highway selector and time position store circuits, a seize signal is no longer detected by multifrequency receiver 2701, output conductor X from the receiver goes negative, seize transistor 3111 becomes conductive, and seize transistor 3112 becomes non-conductive. The seize acknowledge control flip-flip circuit, which was triggered to the condition in which both transistors 3115 and 3116 are conductive by the pulse on conductor REL, is prevented from being triggered to the condition in which transistors 3115 and 3116 are both non-conductive when transistor 3112 becomes non-conductive since resistor 3123 is now returned to plus twelve volt potential at the collector of non-conducting transistor 3124.

The ground potential at the collector of conducting transistor 2901 in the fault flip-flop circuit is also applied to the anode terminal of diode 3103 and thus to the register free marking conductor RFM1. Thus, the illustrated incoming register is effectively taken out of service since it cannot be reassigned for use by the register allotter. The incoming register remains in the condition just described until the manually operated fault reset switch is operated to apply ground potential through diode 2928 to the collector of transistor 2902 and thus to the base of transistor 2901 to reset the fault flip-flop circuit to the condition in which transistor 2902 is conductive and transistor 2901 is non-conductive. Under these conditions, fault lamp 2926 is extinguished and negative potential is applied to conductor RFM1.

Next assume that the calling line terminating unit found by the calling unit finder circuit terminates a trunk line extending to a local office. When the calling line terminating unit is enabled by the calling unit finder circuit, the calling unit functions to apply negative potential to register start conductor RST and to conductor local, which conductors are common to all of the incoming registers. If the illustrated incoming register has been assigned for use by the channel allotter, the read in flip-flop circuit is triggered, the time position channel and highway information applied to the bus bars by the channel allotter is read in, the register busy marking flip-flop circuit is triggered, and the read in flip-flop circuit is then reset by the next occurring positive-going clock pulse appearing on conductor 20 kc. trigger, all as previously described. When transistor 3101 in the register busy marking flip-flop circuit becomes conductive, ground potential is applied to the emitter of local transistor 3225 and since conductor RI and the anode terminal of diode 3226 both stand at negative potential, transistor 3225 is rendered conductive. When the read in flip-flop circuit is reset by the next occurring clock pulse, conductor RI returns to ground potential and transistor 3225 becomes non-conductive. Thus, a positive-going pulse of approximately forty microseconds duration occurs at the collector of transistor 3225 and a positive pulse is coupled through capacitor 2611 and diode 2612 to the base of a transistor corresponding to 2705 in the Y digit register 2613, and a positive pulse is also coupled through capacitor 2614 and diode 2615 to the base of a transistor corresponding to 2705 in the Z digit register 2616.

When the flip-flop circuit in the Y register 2613 and the flip-flop circuit in the Z register 2616 are both in the condition in which the transistor corresponding to 2706 in each flip-flop is conductive and the transistor corresponding to 2605 in each flip-flop is non-conductive, the transistor corresponding to 2707 in the digit "0" stage 2617 becomes conductive since its base is returned to a negative potential at the collector of the transistor corresponding to 2705 in the Y register 2613 and its emitter is returned to ground potential at the collector of the transistor corresponding to 2706 in the Z register 2616. When the transistor corresponding to 2707 in the digit "0" stage 2617 becomes conductive, ground potential is applied to the emitter electrodes of transistors 2618 and 2619 in the digit "0" switch. The positive going pulse at the collector of local transistor 3221 is also utilized to trigger the connect demand flip-flop transistors 3013 and 3012 conductive through capacitor 3036 and diode 3037. When transistor 3012 becomes conductive, a negative potential is applied to the register connect demand conductor RCD1 to signal the register finder that the illustrated incoming register is in readiness to read out digit marking, time position, and highway identifying information. When ground potential is applied to conductor RDA1 by the register finder, the read out flip-flop circuit is triggered and negative potential is applied to read out conductor RO to control the highway selector and time position store circuits to read out, all as previously described. When transistor 2913 of the read out flip-flop circuit becomes non-conductive, negative potential is applied to the anode terminal of diode 2916 and transistor 2618 of the digit "0" switch is rendered conductive to apply ground potential to digit marking 0 conductor DM0, which extends to the route selector. Since level 0 corresponds to the attendant's link circuits, the route selector is controlled by the potential on conductor DM0 to seize an idle one of the attendant's link circuits. The seized link circuit is then controlled to read in time position channel and highway information applied to the bus bars by the incoming register in the exact same manner as previously described for a seized line terminating unit. When a link circuit is seized, the route selector applies ground potential to the unit found conductor UF and the register is released during the next occurring clock pulse, as previously described.

It will be noted that the above-described operation of the incoming register occurs automatically responsive to the receipt of marking on conductor local and is completely independent of any signal transmitted over the trunk line from the local office. The seize signal transmitted over the trunk line from the local office and which controls the seizure of the line terminating unit is still present on the highway conductors at the time that the incoming register seizes the allotted time channel. The seize signal frequency X applied to the input of the multifrequency receiver 2701, of course results in the application of a positive potential to output conductor X from receiver 2701. When seize transistor 3112 becomes conductive, seize acknowledge amplifier 3117 becomes non-conductive and a seize acknowledge signal is returned to the local office, as previously described, but has no effect in the local office. The local office equipment is designated to transmit a timed seize signal of approximately one second duration. The received seize signal has no effect on the incoming register other than that described above.

The operation of the incoming register on a call from another long distance switching center to a local office served by the illustrated long distance switching center will now be described. It will be recalled from the general description that the digit corresponding to the desired local office is prefixed with the digit "1." Assume that the illustrated incoming register has read in time position channel and highway information and has thus seized the allotted time positon channel. The seize signal applied to the input of multifrequency receiver 2701 controls seize transistor 3112 to be conductive and seize acknowledge amplifier transistor 3117 to be non-conductive to thereby transmit a seize acknowledge signal to the originating office, as previously described. When the transmission of the seize signal is terminated, transistor 3112 becomes non-conductive, transistor 3117 becomes conductive, and the seize acknowledge control flip-flop circuit transistors 3115 and 3116 becomes non-conductive, as previously described. The originating key sender register then transmits the compound frequencies V and W, which correspond to the digit "1," and the flip-flop circuits in the V digit register and in the W digit register are triggered to the condition in which transistor 2706 is conductive and transistor 2705 is non-conductive. Thus, the emitter of digit "1" stage transistor 2707 is returned to ground potential at the collector of transistor 2706 in the V register and since its base is returned to a negative potential at the collector of non-conducting transistor 2705 in the W register, transistor 2707 is rendered conductive. When transistor 2707 becomes conductive, the Z gate transistor corresponding to 2711 become non-conductive and the frequencies Y and Z are transmitted to the originating key sender register as a digit acknowledgment signal.

The ground potential appearing at the collector of conducting transistor 2707 is also coupled through resistor 3044 to bias diode 3038 in the forward direction. The lower terminal of capacitor 3039 remains at a negative potential at this time since the cathode terminal of diode 3038 is returned to negative potential at the collector of non-conducting transistor 3116 in the seize acknowledge control flip-flop circuit. The positive-going potential swing at the collector of transistor 2707 is also coupled through capacitor 2929 and diode 2930 to trigger the route control flip-flop circuit to the condition wherein transistor 2918 is conductive and transistor 2919 is non-conductive. The resulting positive-going potential swing at the collector of transistor 2918 is coupled through capacitor 3138 and diode 3139 to reset the seize acknowledge control flip-flop circuit to the condition in which transistors 3115 and 3116 are conductive. When transistor 3116 becomes conductive, a positive pulse is applied to the base of the register reset transistor 3028 through capacitor 3039 but without effect since transistor 3028 is already non-conductive.

If the first digit was correctly acknowledged, the originating key sender register transmits a second seize signal and when seize transistor 3112 becomes conductive and transistor 3117 therefore becomes non-conductive, a seize acknowledge signal is again transmitted by the incoming register to the originating key sender register. When the transmission of the seize signal is terminated, transistor 3112 becomes non-conductive, transistor 3117 becomes conductive to terminate the transmission of a seize acknowledge signal, and seize acknowledge control flip-flop transistors 3115 and 3116 are triggered non-conductive, all as previously described. When transistor 3116 becomes non-conductive, the negative potential swing at its collector is coupled through diode 3038 and capacitor 3039 to the base of transistor 3028 in the register reset monostable circuit, and the resulting negative pulse appearing at the collector of transistor 3029 serves to reset the V register and W register flip-flop circuits to the condition in which transistor 2705 in each flip-flop circuit is conductive.

The originating key sender register now functions to transmit the next digit over the trunk line to the illustrated long distance switching center. If it be assumed that the digit is "8" and thus comprises the compound frequencies W and Z, positive potential appears on output conductors W and Z from receiver 2701 and the W register and Z register flip-flop circuits are triggered to the condition in which the transistor corresponding to 2706 in each flip-flop is conductive. The transistor corresponding to 2707 in the digit "8" stage 2620 becomes conductive since its base is returned to negative potential at the collector of the transistor corresponding to 2705 in the Z register 2616 and its emitter is returned to ground potential at the collector of the transistor corresponding to 2706 in the W register 2732. Under these conditions, the W gate and X gate transistors corresponding to 2711 are rendered non-conductive and the frequencies W and X are transmitted to the originating key sender register as a digit acknowledgment signal. Ground potential appearing at the collector of the transistor corresponding to 2706 in the Z register 2616 is applied to the anode terminal of diode 3009 and thus to the emitter of transistor 3005. Transistor 3005 becomes conductive since its base is returned to negative potential at the collector of non-conducting transistor 3116 in the seize acknowledge control flip-flop circuit.

The positive potential swing at the collector of transistor 3005 triggers the demand gate control transistors 3119 and 3120 conductive and ground potential is thereby applied to the emitter of transistor 3002, as previously described. If the digit acknowledgment was correct, the originating key sender register removes the digit information from the trunk line and then functions to transmit a third seize signal over the trunk line. When seize transistor 3112 again becomes conductive responsive to the receipt of the seize signal by receiver 2701, transistor 3002 becomes conductive to trigger the connect demand flip-flop circuit transistors 3012 and 3013 conductive and negative potential is applied to the register connect demand conductor RCD1. When the register finder seizes the illustrated incoming register for read out purposes by applying ground potential to conductor RDA1, the ensuing operation in the incoming register is identical to the read out operation previously described with the single exception that digit marking information is read out to the local digit marking bus bars rather than to the digit marking bus bars corresponding to groups of units terminating trunk lines to other long distance switching centers. It can be seen that with the route control flip-flop circuit in the condition in which transistor 2918 is conductive and transistor 2919 is non-conductive, negative potential is applied to the anode terminal of diode 2931 rather than to the anode terminal of diode 2917. Thus, when the read out flip-flop circuit is triggered to the condition in which transistor 2913 is non-conductive and transistor 2914 is conductive and negative potential is applied to the anode terminals of diodes 2916 and 2932, a negative output is obtained from the "and" gate for negative signals formed by diodes 2931 and 2932. Negative potential is thereby applied to the base electrode of each of the lower transistors, such as 2606 and 2619, in each of the digit switches. Since it was assumed that the digit "8" was transmitted, the digit "8" switch transistor corresponding to 2606 or 2619 has ground potential applied to its emitter and therefore becomes conductive to apply ground potential to the local digit marking conductor LDM8.

*Hybrid circuits*

The hybrid circuits, which are shown in Fig. 34, are utilized to connect the attendant's cabinet equipment to the transmission highway networks. It will be recalled that calling line terminating units transmit signal samples to the upper pair of highway conductors and receive signal samples from the lower pair of highway conductors, while called line terminating units transmit signal samples to the lower pair of highway conductors and receive signal samples from the upper pair of highway conductors. Hybrid circuits are required to connect the attendant's cabinet to the highways since the attendant's cabinet must send to and receive from both the calling and called line terminating units in the process of establishing a connection. For example, the attendant must converse with the calling party to determine the desired route, supervisory and digit designation information must be transmitted to the called unit, and release signals may be received from either the calling or called units.

Each resistor hybrid network comprises four resistors, namely, resistors 3401, 3402, 3404, and 3405, of equal resistance values, and two resistors, namely, resistors 3403 and 3406, each having twice the resistance value of each of the aforementioned resistors. Thus, signal samples appearing on the upper pair of highway 1 conductors from a calling unit are coupled to and amplified by push-pull connected, emitter follower, amplifier transistors 3407 and 3408 and applied to the calling pair of receive conductors REC.1, signal samples appearing on the lower pair of highway 1 conductors from a called unit are coupled to and amplified by amplifier 3409 and applied to the called pair of the receive conductors REC.1, signal samples appearing on the called pair of the sending conductors SD1 are coupled to the upper pair of highway 1 conductors for transmission to the called unit, and signal samples appearing on the calling pair of the send conductors SD1 are coupled to the lower pair of highway conductors for transmission to the calling unit. As illustrated, a duplicate set of equipment is, of course, provided for highway 2.

*Link circuit 1*

Figure 35:
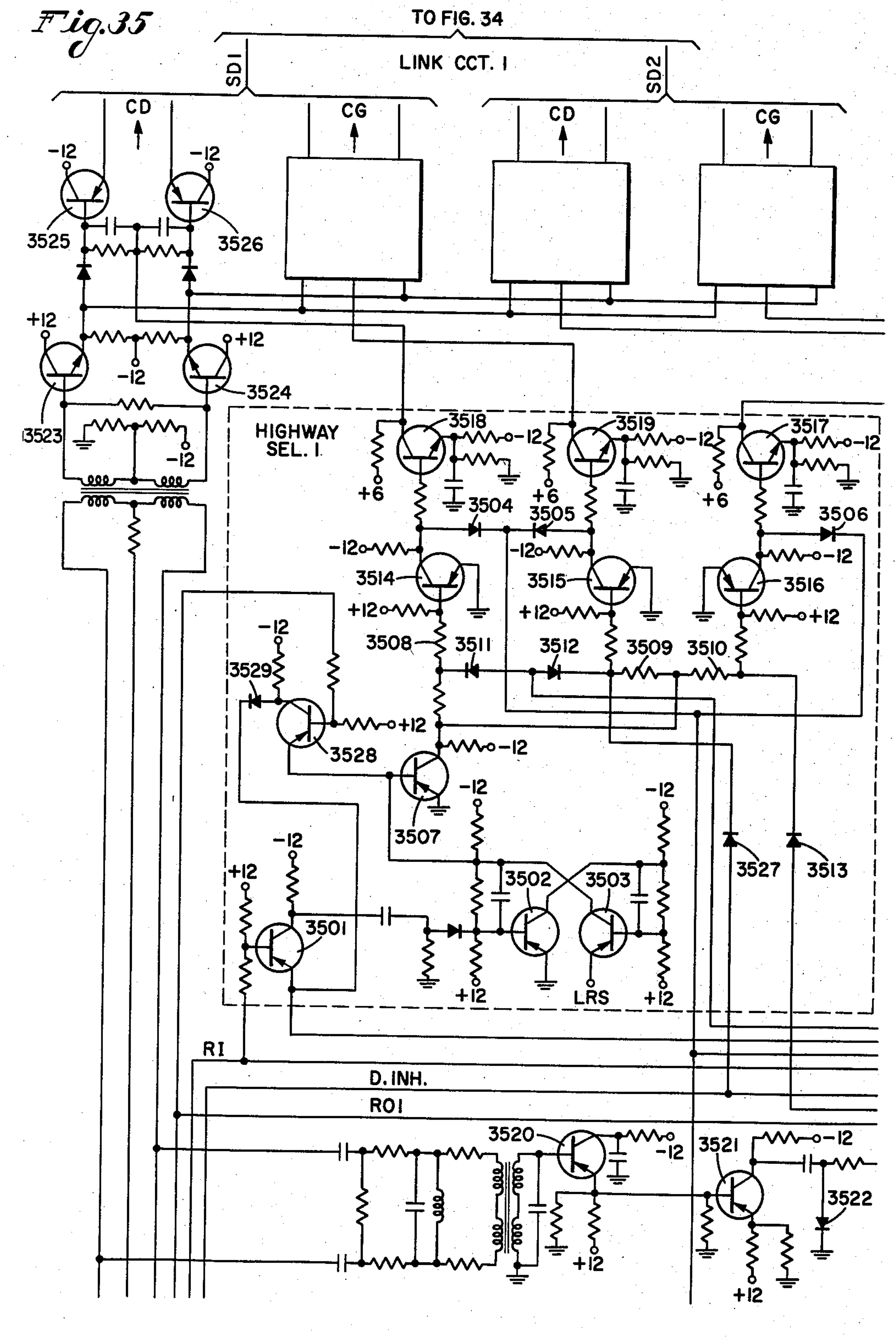
Figure 36:
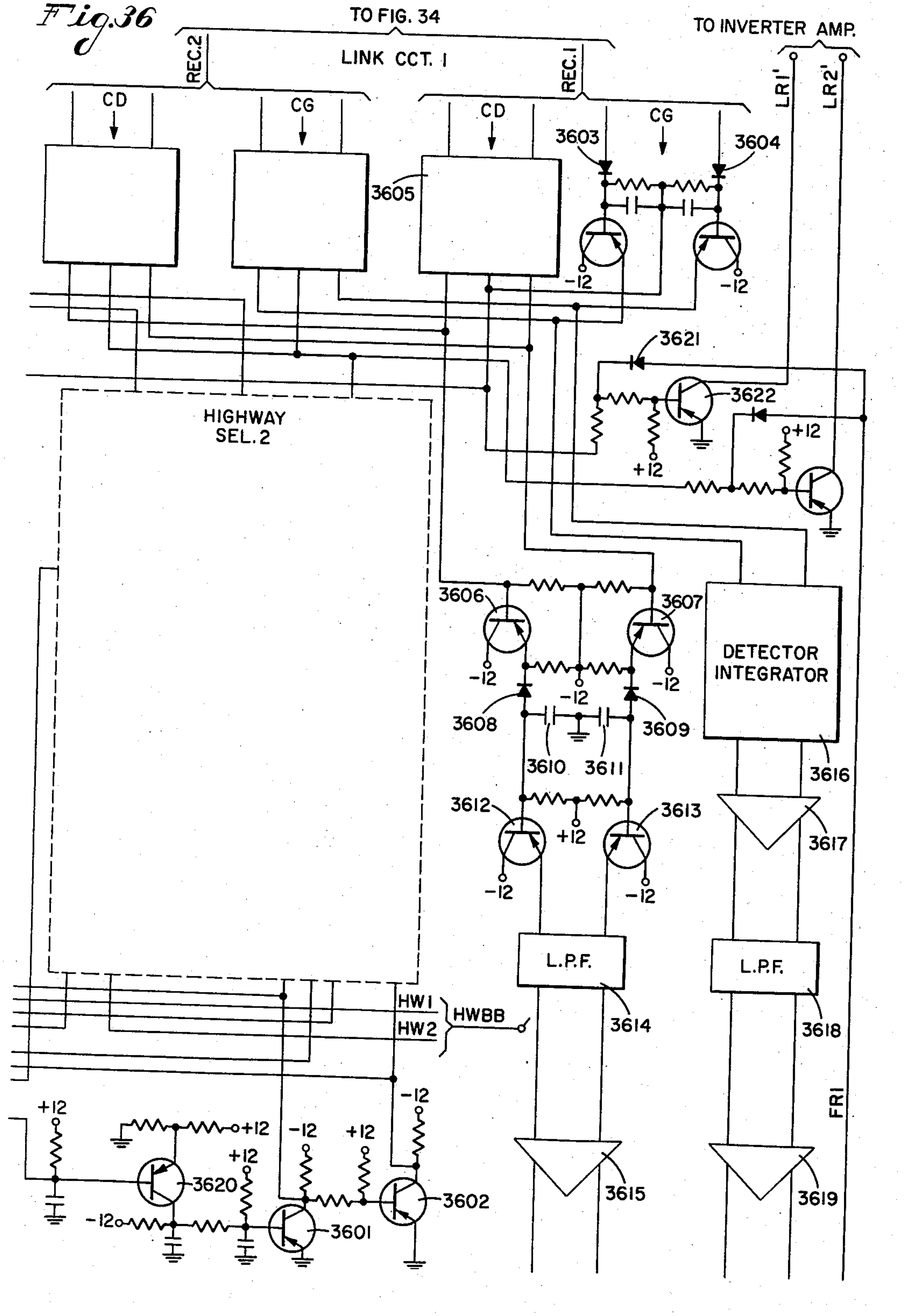
Figure 39:
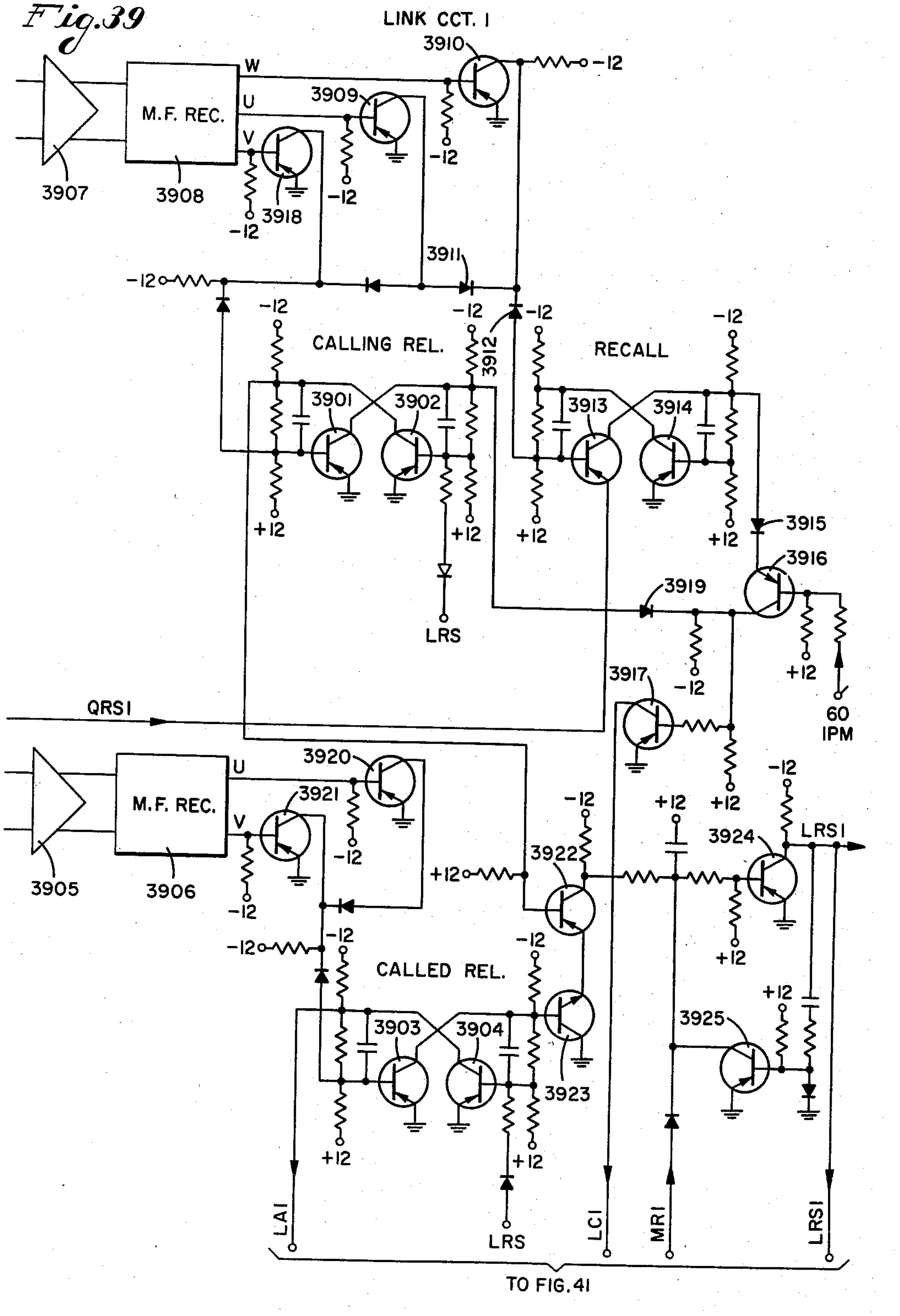

When link circuit 1, which is shown in detail in Figs. 35–39, inclusive, is in the idle or reset condition, the send gates of Fig. 35 and the receive gates of Fig. 36 are closed, each flip-flop circuit in which the emitter of one transistor is returned to either reset conductor LRS1 or to reset conductor QRS1 is in the condition wherein the other transistor in that flip-flop circuit is conductive, the calling release and called release flip-flop circuits of Fig. 39 are in the condition wherein transistors 3902 and 3904, respectively, are conductive, and the flip-flop circuit in each of the ten time position store circuits (Fig. 38) is in the condition in which both transistors comprising the flip-flop circuit are non-conductive. In the idle condition, the queue demand flip-flop circuit comprising transistors 3701 and 3702 is in the condition in which transistor 3701 is non-conductive and a negative potential is, therefore, applied to busy marking conductor busy 135, which is individual to the illustrated link circuit, and serves to mark the illustrated link circuit as idle to the route selector.

It will be recalled from the general description that when a call is initiated on a line terminating unit which terminates a trunk line or radio link from a local office, the incoming register automatically registers the digit "0" and then controls the route selector to select an idle one of the attendant's link circuits. Simultaneously therewith, the incoming register is controlled to read out time position and highway information to the time position bus bars TPBB and to the highway bus bars HWBB for the purpose of controlling the selected link circuit to seize the time position channel seized by the calling line terminating unit.

The illustrated link circuit is seized by the route selector by the application of a positive-going potential to the units marking conductor UM135. The positive-going potential swing on conductor UM135 is coupled through capacitor 3703 and diode 3704 to trigger the link seize flip-flop circuit to the condition in which transistor 3705 is conductive. When transistor 3706 becomes non-conductive, a negative potential is applied to the read in conductor RI and the highway selector and time position store circuits in the illustrated link circuit are controlled to read in the highway and channel marking signals applied to bus bars HWBB and TPBB, respectively, by the incoming register. The base of a transistor corresponding to transistor 3501 in each highway selector and the base of a transistor corresponding to transistor 3707 in each time position store circuit are returned to conductor RI, the emitter of each transistor corresponding to 3501 is returned to an individual one of the highway marking bus bar conductors, and the emitter of each transistor corresponding to 3707 is returned to an individual one of the time position marking bus bar conductors. If it is assumed that the incoming register is applying ground potential to highway conductor HWI and to time position marking conductor TPM1, thus identifying channel 1 on highway 1, transistors 3501 and 3707 are rendered conductive. The transistors corresponding to 3501 and 3707 in the other highway selector and time position store circuits, respectively, are not rendered conductive since their emitter electrodes are returned to minus twelve volt potential appearing on their individually associated highway marking and time position marking conductors. The positive-going potential swing appearing at the collector of conducting transistor 3501 is utilized to trigger the flip-flop circuit comprising transistors 3502 and 3503 to the condition wherein transistor 3503 is conductive and transistor 3502 is non-conductive. Similarly, the positive potential swing at the collector of conducting transistor 3707 is utilized to trigger the flip-flip circuit comprising transistors 3708 and 3709 to the condition wherein both transistors are conductive.

The next occurring positive-going clock pulse on conductor 20 kc. trigger is coupled through capacitor 3710 and diode 3711 to the base of transistor 3705 and serves to reset the link seize flip-flop circuit so that transistor 3706 is conductive. When transistor 3706 becomes conductive, conductor RI and the base electrodes of each transistor corresponding to 3501 and each transistor corresponding to 3707 rise to ground potential. Thus, the storage circuit in the illustrated link circuit is controlled to read in highway and channel marking signals appearing on the bus bars HWBB and TPBB and the read in control circuits are then disabled so that further signals appearing on those bus bars have no effect on the illustrated link circuit.

When the link seize flip-flop circuit is first triggered to the condition wherein transistor 3706 is non-conductive and read in conductor RI goes negative, the queue demand flip-flop circuit is triggered through capacitor 3712 and diode 3713 to the condition in which transistor 3701 is conductive. The resulting ground potential at the collector of transistor 3701 is applied to the demand conductor D1, which extends to the queue store circuit, is applied to conductor busy 135 to mark line circuit 1 busy, and is also coupled through capacitor 3801 and diode 3802 to trigger the link waiting flip-flop circuit to the condition in which transistor 3804 is conductive. When transistor 3803 becomes non-conductive, the emitter of emitter follower transistor 3805 goes negative and transistor 3806 is rendered conductive to illuminate the link waiting lamp 3807, which is common to all of the link circuits, for the purpose of indicating to the attendant that a call is waiting on one of the link circuits.

The queue store circuit is responsive to the application of ground potential to conductor D1 to place the call from the illustrated link circuit in a queue which assures that the incoming calls will be answered by the attendant in the exact same order as they are placed. When the call on the illustrated link circuit is to be answered, the queue store circuit applies ground potential to seize conductor SZ1 to trigger the link-on flip-flop circuit through capacitor 3714 and diode 3715 to the condition in which both transistors 3716 and 3717 are conductive. When transistor 3716 becomes conductive, ground potential is applied to conductor LKON1 to prepare the link key circuit individually associated with the illustrated link circuit for operation. Simultaneously with the application of ground potential to conductor SZ1, the queue store circuit serves to illuminate the incoming lamp associated with link circuit 1 to indicate to the attendant that the call on link circuit 1 is the next call to be answered. If a queue store circuit is not provided in the system, conductors D1 and SZ1 are strapped so that the operation of the queue demand flip-flop circuit results in the immediate operation of the link-on flip-flop circuit.

Figure 37:
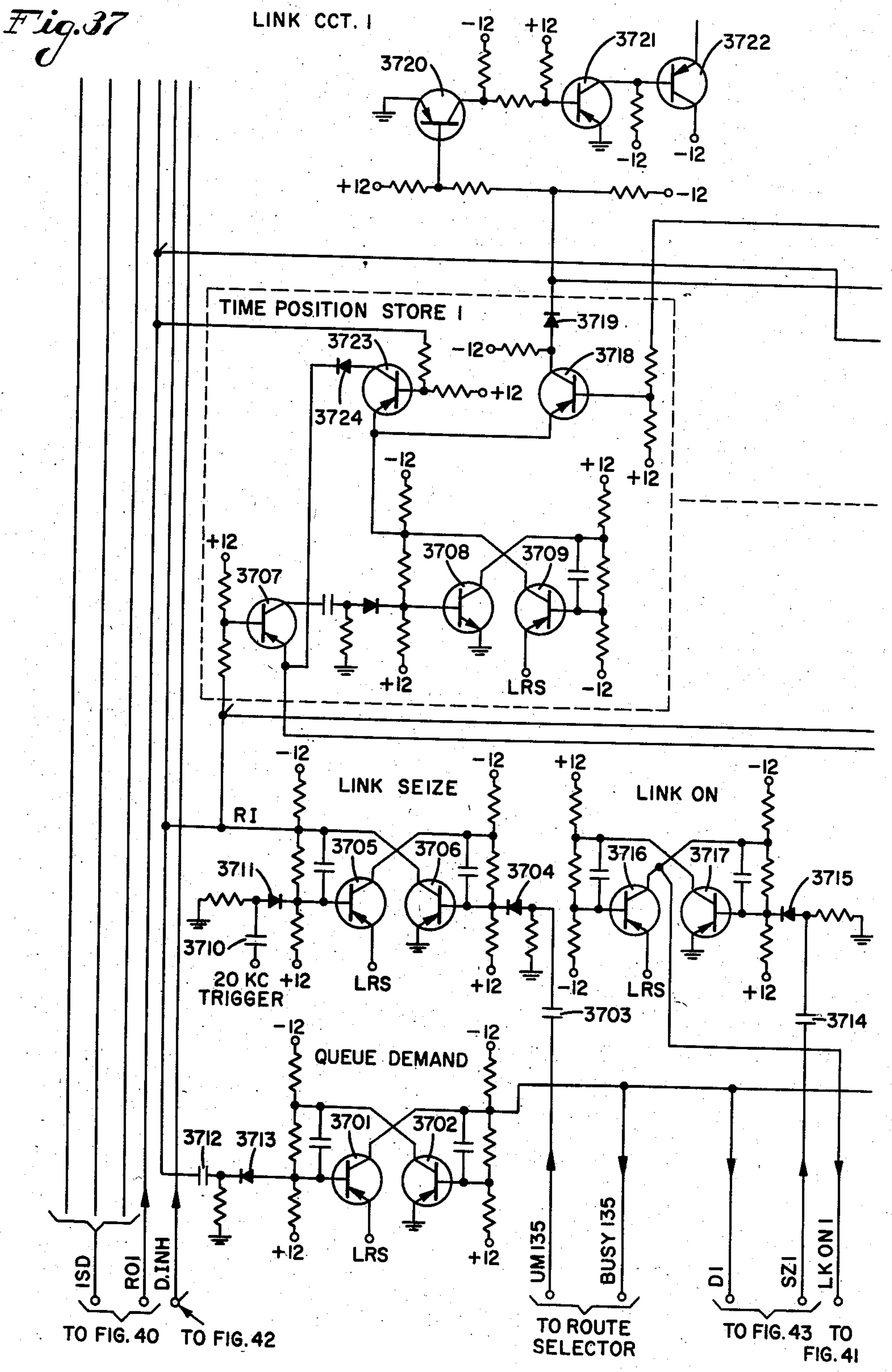
Figure 38:
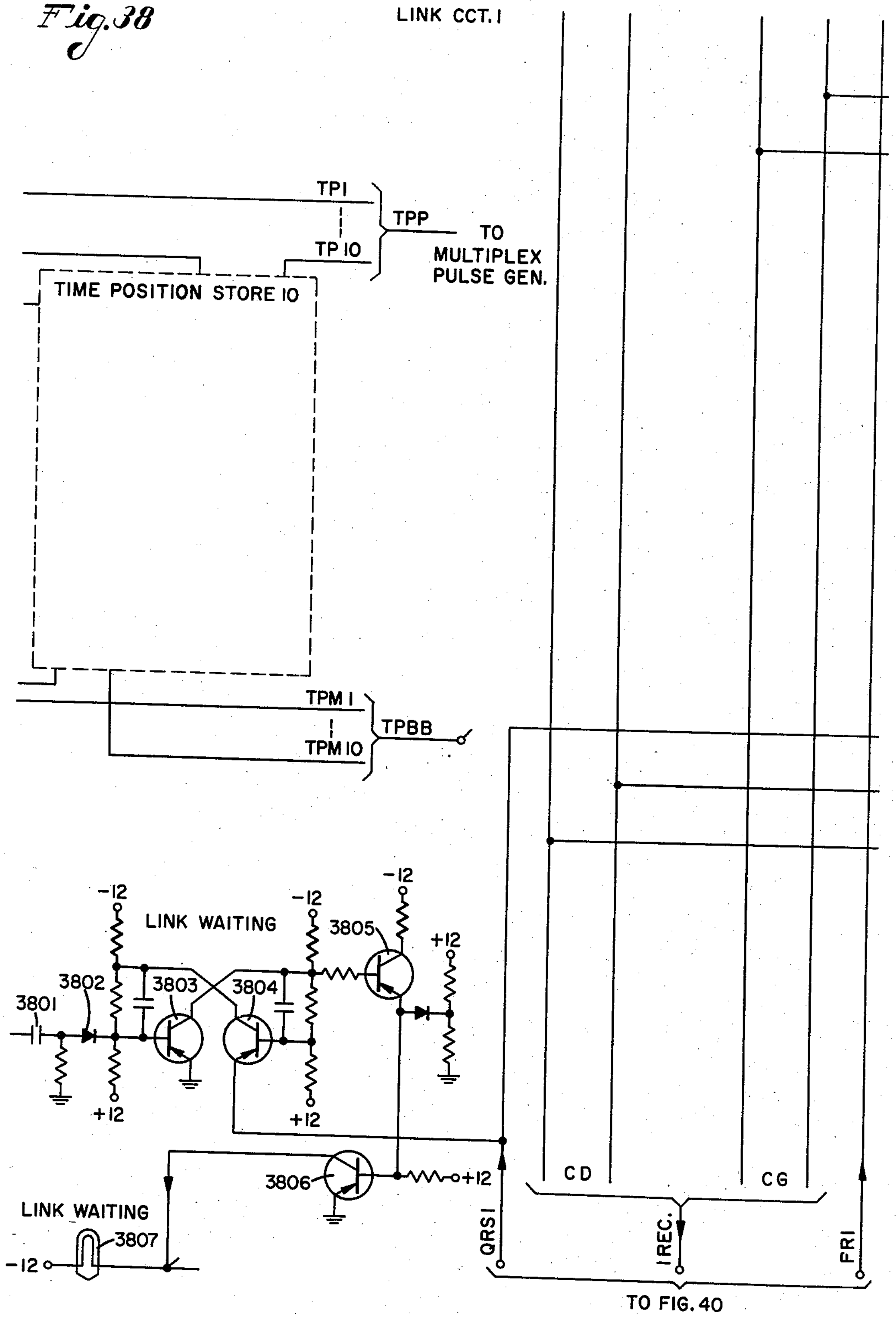

Returning to the consideration of the time position store 1 circuit of Fig. 37, it can be seen that when transistors 3708 and 3709 are rendered conductive responsive to the reading in of marking for time position channel 1, ground potential is applied to the emitter of transistor 3718. The base of transistor 3718 is individually connected to the time position 1 conductor TP1 and when a negative pulse is received on that conductor, transistor 3718 is rendered conductive and a positive-going pulse is coupled through diode 3719 to the base of transistor 3720. Diode 3719 forms one input of a ten output "or" gate for positive pulses and the particular time position pulse coupled through the gate is determined by the setting of the time position store circuits. As just described, when the flip-flop circuit in time position store 1 circuit is operated, the pulse coupled through the "or" gate occurs in time position 1. As explained in the general description, the pulses appearing on conductors TP1–TP10, inclusive, occur at a frequency of 12 kc. and may be generated by any suitable pulse generator. Pulses TP1–TP10 are graphically illustrated in Fig. 3A.

The positive-going pulses in time position 1 coupled through diode 3719 are utilized to render transistor 3720 non-conductive and the resulting negative-going pulses at the collector of transistor 3720 render transistor 3721 conductive. The positive-going pulses at the collector of transistor 3721 are coupled to the base of emitter follower transistor 3722 and are repeated as positive-going pulses at the emitter of transistor 3722 and applied to the cathode terminals of diodes corresponding to 3504, 3505, and 3506 in each of the highway selectors.

Returning to the consideration of highway selector 1, it can be seen that when transistor 3503 of the flip-flop circuit comprising transistors 3502 and 3503 becomes conductive responsive to the reading in of marking for highway 1, ground potential is applied to the base of transistor 3507 to render transistor 3507 non-conductive. Thus, minus twelve volt potential is applied through resistors 3508, 3509, and 3510 to the cathode terminals of diodes 3511, 3512, and 3513, respectively. The anode terminals of diodes 3511 and 3512 are returned to ground potential at the collector of normally conducting transistor 3601 so that diodes 3511 and 3512 are biased in the forward direction and ground potential coupled through said diodes holds transistors 3514 and 3515 non-conductive. The anode terminal of diode 3513 is returned to minus twelve volt potential at the collector of normally non-conductive transisor 3602 so that when the collector of transistor 3507 goes negative, transistor 3516 is rendered conductive and ground potential is applied to the anode terminal of diode 3506. Now when the emitter potential of transistor 3722 rises to ground during time position 1, pulse amplifier transistor 3517 is rendered conductive to transmit a negative pulse to the calling and called receive gates associated with highway 1. It is to be noted that the pulses appearing at the emitter of transistor 3722 are blocked from the base electrodes of pulse amplifier transistors 3518 and 3519, which control the highway 1 called send and calling send gates, respectively, by diodes 3504 and 3505, respectively, which are biased in the reverse direction because of the non-conductivity of transistors 3514 and 3515, respectively. Similarly, the pulses are blocked in the highway 2 selector because of the non-conductivity of the transistor corresponding to transistor 3503 in the flip-flop circuit in that highway selector. Thus, a negative pulse is applied to the called and calling receive gates associated with highway 1 in time position 1 in each frame of the recurring pulse frames for the duration of the call under consideration except when the attendant is sending information as will be described more fully hereinafter.

Examining the calling receive gate associated with highway 1, which gate is identical to the other calling and called receive gates, it can be seen that the gate comprises diodes 3603 and 3604. The cathode terminals of diodes 3603 and 3604 are returned to the collector of pulse amplifier transistor 3517, which collector stands at plus six volt potential except during time position 1. During time position 1, the collector of transistor 3517 drops to approximately minus six volt potential and diodes 3603 and 3604 are biased for conduction and pass any signals appearing on the upper pair of conductors of highway 1. Similarly, the called receive gate 3605 passes any signals appearing on the lower pair of conductors of highway 1. The signal samples coupled through the called receive gate 3605 are amplified by the push-pull connected, emitter follower, amplifier transistors 3606 and 3607, detected by diodes 3608 and 3609, and integrated by capacitors 3610 and 3611. The resulting demodulated signals are amplified by push-pull connected, emitter follower, amplifier transistors 3612 and 3613, passed through low-pass filter 3614 to remove any 12 kc. signals, amplified by amplifier 3615, and applied to the called 1REC. conductors which extend to the link key circuit. Similarly, signal samples passed by the calling receive gate are detected and integrated in detector integrator 3616. The resulting demodulated signals are amplified by amplifier 3617, passed through low-pass filter 3618, amplified by amplifier 3619, and applied to the calling 1REC. conductors which extend to the link key circuit. The signals appearing on the called 1REC. conductors are also amplified by amplifier 3905 and applied to the input of multifrequency receiver 3906 which is designed to detect release signals. The signals appearing on the calling 1REC. conductors are also amplified by amplifier 3907 and applied to the input of multifrequency receiver 3908 which is designed to detect release and recall signals.

When the attendant operates the seize key in link key circuit 1 in response to the illumination of the incoming lamp associated with link circuit 1, a negative-going potential is applied to conductor QRS1 to reset the link waiting flip-flop circuit to the condition wherein transistor 3803 is conductive and thereby extinguish the link waiting lamp 3807 if other calls on other link circuits are not awaiting attention.

The attendant can now converse with the calling party to determine the desired called number. The attendant's speech signals appearing on the conductors 1SD are passed through a suitable filter to the base of emitter follower transistor 3520. The signals are amplified by transistors 3520 and 3521 and detected by diode 3522. The detected signals render transistor 3620 conductive, transistor 3601 non-conductive, and transistor 3602 conductive. The various capacitors associated with this voice detection circuit serve to hold the transistors 3620, 3601, and 3602 in the above described condition for about one second after the termination of transmission of speech or voice frequency supervisory signals. Whenever transistor 3601 becomes non-conductive, transistors 3514 and 3515 become conductive and the positive pulses in time position 1 appearing at the emitter of transistor 3722 render transistors 3518 and 3519 conductive to open the calling and called send gates associated with highway 1. The attendant's speech signals are also amplified by the push-pull connected, emitter follower, transistor amplifiers 3523 and 3524 and sampled in time position 1 by the calling and called send gate diodes. The signal samples are amplified by push-pull connected, emitter follower, amplifier transistors 3525 and 3526 in the calling and called send gates and coupled to the highway conductors.

In accordance with the oral instructions received from the calling party, the attendant keys the desired called number and then operates the end of selection key provided in the position circuit. As described in the general description, the register sender then sends a demand signal to the register finder. When the register finder seizes the register sender, the register sender transmits digit marking information corresponding to the first registered digit to the route selector which seizes an idle line terminating unit terminating a trunk line or radio link to the digit marking identified office. Simultaneously therewith, the register sender applies a negative potential through link key circuit 1 to read out conductor RO1 for the purpose of controlling the illustrated link circuit to read out highway and time position marking information to the highway and time position bus bars so that that information can be read into the line terminating unit selected by the route selector. This information is read into the called line terminating unit so that the calling and called line terminating units and the illustrated link circuit are all connected to time position 1 on highway 1 for the duration of the call. When negative potential is momentarily applied to conductor RO1, read out transistors 3528 and 3723 in highway selector 1 and time position store 1 circuit, respectively, are momentarily rendered conductive to apply ground potential through diodes 3529 and 3724 to conductors HW1 and TMP1, respectively. The read out transistors in the other highway selector and time position store circuits are prevented from becoming conductive since the emitter electrodes of those transistors are returned to a negative potential rather than to ground potential. The highway and time position information is read into the called unit in the exact same manner as previously described for the illustrated link circuit.

The register sender then alternately transmits voice frequency seize and compounded voice frequency digit designation signals over conductors 1SD. During the sending operation, ground potential is applied to the dial inhibit conductor DINH and coupled through diode 3527 to render transistor 3515 non-conductive. Thus during the sending operation, the calling send gate is closed and the voice frequency seize and dialing signals are transmitted through the called send gate only to highway 1. When the call has been answered in the distant office, the attendant retires from the connection by restoring the seize key in link key circuit 1 without effect on the illustrated circuit.

Assume that a recall signal comprising frequencies U and W, which may be 900 and 1300 c.p.s., respectively, is received from the calling party and applied to the input of multifrequency receiver 3908. Multifrequency receiver 3908 and all of the other single or multifrequency receivers used in the system may be of any conventional type and are equipped with suitable voice guard circuits so that an output is realized from each receiver only when the particular frequency, or frequencies, to which it is responsive is received. If a recall signal of frequencies U and W is applied to the input of multifrequency receiver 3908, ground potential appears on output conductors U and W from receiver 3908 and normally conductive transistors 3909 and 3910 are rendered non-conductive. When both transistors 3909 and 3910 are rendered non-conductive, the negative potential on the anode of diode 3911 permits diode 3912 to pass a negative signal to the base of transistor 3913 and transistor 3913 of the recall flip-flop circuit is rendered conductive. The resulting ground potential appearing at the collector of transistor 3913 is applied through isolating diode 3915 to the emitter of transistor 3916 and transistor 3916 is thereafter rendered conductive by each negative pulse appearing on conductor 60 i.p.m. Each time that transistor 3916 becomes conductive, normally conductive transistor 3917 becomes non-conductive to remove ground potential from conductor LC1 and thus flash a calling supervisory lamp associated with link key circuit 1. When the attendant answers the recall signal, negative potential is applied to conductor QRS1 and the recall flip-flop circuit is reset to the condition wherein transistor 3914 is conductive.

Next assume that a release signal comprising frequencies U and V, which may be 900 and 1100 c.p.s., respectively, is received from the calling party and applied to the input of multifrequency receiver 3908. Under these conditions, ground potential appears on output conductors U and V from receiver 3908 and normally conductive transistors 3909 and 3918 are rendered non-conductive and the calling release flip-flop circuit is triggered to the condition in which transistor 3901 is conductive. Ground potential appearing at the collector of conducting transistor 3901 is coupled through diode 3919 to render transistor 3917 non-conductive and ground potential is thereby removed from conductor LC1. Thus, the calling supervisory lamp in link key circuit 1 is steadily illuminated to indicate that the calling party has retired from the connection. Similarly, if a release signal is received from the called party, ground potential is applied to the U and V conductors from receiver 3906 and normally conductive transistors 3920 and 3921 are rendered non-conductive to trigger the called release flip-flop circuit to the condition in which transistor 3903 is conductive. When transistor 3904 becomes non-conductive, a negative potential is applied to conductor LA1 to illuminate a called supervisory lamp in the link key circuit 1.

If release signals are simultaneously received from the calling and called parties, the link circuit is automatically reset to its idle condition. It can be seen that when transistor 3902 of the calling release flip-flop circuit is non-conductive, negative potential is applied to the base of transistor 3922, and that when transistor 3903 of the called release flip-flop circuit is conductive, ground potential is applied to the base of transistor 3923. Transistors 3922 and 3923 form an "and" gate in which transistor 3922 becomes conductive only if negative potential is applied to its base and transistor 3923 is conductive. When transistor 3922 becomes conductive, ground potential appearing at its collector is applied to the base of transistor 3924. Transistors 3924 and 3925 form a monostable circuit in which transistor 3924 is normally conductive and transistor 3925 is normally non-conductive. When ground potential is applied to its base by transistor 3922, transistor 3924 is triggered non-conductive and transistor 3925 is triggered conductive. After a period of approximately ten milliseconds, the monostable circuit reverts to its normal condition. The negative pulse appearing at the collector of transistor 3924 is coupled over link reset conductor LRS1 to the various flip-flop and flip-flop circuits of the link circuit to restore those circuits to their normal condition. Conductor LRS1 also extends to link key circuit 1 and the negative pulse thereon is utilized to reset that circuit.

The link circuit and the link key circuit may also be restored by the operation of a release key in the link key circuit responsive to the illumination of either the calling or called supervisory lamps. Operation of the link key circuit release key results in the application of ground potential to manual release conductor MR1 to trigger the monostable circuit comprising transistors 3924 and 3925 and thus reset the circuits as previously described.

The attendant may wish to release the circuits in the forward or called direction only if a wrong number is transmited or if an all trunks busy condition is encountered. For this purpose, the attendant operates a forward release key at the position circuit to replace the ground potential on conductor FR1 with negative potential. As long as conductor FR1 is held at ground potential, the base of transistor 3622 is held at ground potential through diode 3621 and the negative pulses in time position 1, which are applied to the calling and called receive gates, have no effect on transistor 3621. However, when conductor FR1 is returned to a negative potential, transistor 3622 is rendered conductive by each negative pulse and positive pulses in time position 1 appear at the collector of transistor 3622 and are applied to conductor LR1'. As explained in the general description, the pulses on conductor LR1' are inverted and amplified and routed to the highway 1 monitor circuit where they are utilized to release the circuits in the forward or called direction.

*Link key circuit 1*

A link key circuit, of the type shown in Figs. 40 and 41 of the drawings, is provided for each link circuit at each attendant's position. The conductors extending from link circuit 1 to the link key circuits are thus connected in multiple to a link key circuit 1 at each attendant's position. Therefore, it is necessary to inhibit the other positions from handling a particular call when that call is being handled at one of the attendant's positions. The conductors identified as A1, A2, and A3, and shown at the lower right of Fig. 41, are provided for this purpose.

It will be recalled from the description of link circuit 1 that when link circuit 1 is enabled for seizure by the queue store circuit, the incoming lamp individually associated with link circuit 1 is illuminated and ground potential is applied to conductor LKON1. Ground potential applied to conductor LKON1 enables the transistor corresponding to transistor 4101 in the link key circuit corresponding to link circuit 1 at each position for conduction. The call is answered at the illustrated link key circuit by the operation of the link seize key 4102. When seize key 4102 is operated, negative potential is applied to the base of transistor 4101 and transistor 4101 is rendered conductive. The resulting positive-going potential swing at the collector of transistor 4101 is coupled through capacitor 4103 and diode 4104 to trigger the flip-flop circuit comprising transistors 4105 and 4106 to the condition in which transistor 4105 is conductive and transistor 4106 is non-conductive. Ground potential appearing at the collector of conducting transistor 4105 and applied to conductor A1 is coupled through a diode corresponding to either 4107 or 4108 in each of the other link key circuits associated with the link circuit 1, and through a diode corresponding to 4109 to clamp the base of the transistor corresponding to 4101 in each of those link circuits to ground potential so that the operation of the link seize keys in those circuits will have no effects. The ground potential coupled through the diode corresponding to either 4107 or 4108 is also coupled through a diode corresponding to 4110 to clamp the base of the transistor corresponding to 4111 in each of those link key circuits to ground potential so that the operation of the link release keys in those circuits will have no effect. Thus, when the call is answered at one of the positions, the other positions are positively inhibited from exercising any control over that call. The minus twelve volt potential on the swinger of seize key 4102 is connected through back contacts of keys 4102 and 4120 to the swinger of the key corresponding to 4102 at the second position so that simultaneous answer of a particular call by two positions is also positively prevented.

Returning to the consideration of the illustrated link key circuit, it can be seen that when transistor 4101 becomes conductive, normally conductive transistor 4001 is rendered non-conductive and negative potential is thereby applied to conductor QRS1. Negative potential on conductor QRS1 serves to reset the link waiting flip-flop circuit in link circuit 1 and to advance the queue store read out distributor to the next link circuit awaiting attention, as previously described. Also, when transistor 4106 of the link key circuit 1 flip-flop circuit becomes non-conductive and negative potential appears at its collector, the emitter of emitter follower transistor 4112 goes negative and transistor 4113 is rendered conductive. When transistor 4113 becomes conductive, the calling supervisory and called supervisory lamps are illuminated dimly through resistors 4114 and 4115, respectively. The calling and called supervisory lamps serve a dual purpose in the illustrated circuit. As just described, these lamps are illuminated dimly when the link seize key is first operated and remain in that condition for the duration of the call to indicate the busy condition of the associated link circuit. As will be described more fully hereinafter, the calling and called supervisory lamps are brightly illuminated to indicate recall and release operations.

When transistor 4001 becomes non-conductive and negative potential is applied to conductor QRS1, transistors 4002 and 4003 are rendered conductive. Prior to the time that transistor 4003 is rendered conductive, the gating diodes 4004–4009 are all biased in the reverse direction and thus block the transmission of signals over either send conductors 1SD or receive conductors REC.3 since the cathode terminals of the diodes are returned to the plus twelve volt potential at the collector of non-conducting transistor 4003. When transistor 4003 becomes conductive and its collector potential drops to approximately minus six volts, diodes 4004–4009 are biased in the forward direction and signals can then be transmitted between link circuit 1 and the position circuit.

At the end of the keying operation and when the register sender is seized by the register finder, negative potential is applied to read out conductor RO, as explained in the general description. In the illustrated circuit, transistors 4010 and 4011 are rendered conductive and the emitter potential of emitter follower transistor 4012 drops to a negative value when negative potential is applied to conductor RO. The negative potential at the emitter of transistor 4012 is applied to conductor RO1 to control link circuit 1 to read out highway and channel marking information to the bus bars, as previously described. Read out conductor RO is common to all of the link key circuits associated with the attendant's position but the negative potential applied thereto has no effect on the transistor corresponding to 4010 in the link key circuits in which the seize key is not operated since the base of the transistor corresponding to 4010 in those circuits is clamped to ground potential at the collector of the transistor corresponding to 4001 through a diode corresponding to 4013.

If the attendant desires to release the circuits in the forward or called direction, the forward release key at the position circuit is operated to apply ground potential to conductor LFR, which is connected to all of the link key circuits associated with the position. Transistor 4014 in the illustrated link key circuit is rendered conductive when ground potential is applied to conductor LFR and to its emitter electrode since its base electrode is returned to the negative potential appearing at the collector of non-conducting transistor 4001 and applied to conductor QRS1. The transistor corresponding to 4014 in each of the other link key circuits remains non-conductive because of the conduction of the transistor corresponding to 4001 in each of those circuits. When transistor 4014 becomes conductive, normally conductive transistor 4015 is rendered non-conductive and negative potential is applied to conductor FR1, which extends to link circuit 1. Link circuit 1 is responsive to the receipt of negative potential on conductor FR1 to transmit forward release pulses in the assigned time position to the highway monitor circuit associated with the assigned highway, as previously described. A negative potential appearing at the collector of non-conducting transistor 4015 is also applied through diode 4016 to register release conductor RR for the purpose of restoring the digit register circuits of the register sender to normal.

When the call is answered by the called party, the attendant retires from the connection by restoring the link seize key 4102. When key 4102 is restored, transistor 4001 becomes conductive and ground potential is applied to conductor QRS1 to render transistors 4002 and 4003 non-conductive and effectively disconnect the link circuit associated with the illustrated link key circuit from the position circuit. It is to be noted that the link key circuit flip-flop circuit remains in the condition in which transistor 4105 is conductive so that the calling and called supervisory lamps remain dimly illuminated as an indication that link circuit 1 is busy.

If a recall signal is received by link circuit 1 from the calling party, the ground potential normally appearing on conductor LC1 is interrupted at a 60 i.p.m. rate. Diodes 4116 and 4117 form an "or" gate for positive signals. In non-busy link key circuits, transistor 4106 is conductive and the base of transistor 4118 is clamped to ground potential through diode 4117 regardless of the condition of conductor LC1. In busy link key circuits, transistor 4106 is, of course, non-conductive and the anode terminal of diode 4117 is returned to negative potential. Thus, when ground is removed from conductor LC1, the output of the gate and the emitter of emitter follower transistor 4118 go negative and transistor 4119 is rendered conductive to brightly illuminate the calling supervisory lamp. The attendant operates link seize key 4102 responsive to the flashing of the calling supervisory lamp and link circuit 1 is again effectively connected to the position circuit.

When a release signal is received by link circuit 1 from the calling party, ground potential is removed from conductor LC1 and the calling supervisory lamp is steadily illuminated in the bright condition. Similarly, when a release signal is received by link circuit 1 from the called party, ground potential is removed from conductor LA1, transistor 4123 is rendered conductive, and the called supervisory lamp is illuminated in the bright condition. The attendant operates the link release key 4120 responsive to the steady bright illumination of either lamp and negative potential is thereby applied to the base of transistor 4111 to render transistor 4111 conductive. When transistor 4111 becomes conductive, ground potential is applied to manual release conductor MR1 for the purpose of releasing link circuit 1. During the process of release, link circuit 1 transmits a negative pulse over conductor LRS1 to link key circuit 1. The negative pulse on conductor LRS1 is coupled through capacitor 4121 and diode 4122 to reset the link key circuit flip-flop circuit to the condition in which transistor 4106 is conductive. When transistor 4106 is conductive, the operation of release key 4120, of course, has no effect on transistor 4111 since the base of transistor 4111 is clamped to ground potential through diode 4124.

*Attendant's position circuit*

The attendant's position circuit is shown in Fig. 42 of the drawings. As shown in the block diagram of Figs. 2B and 2C, conductors REC.3, SD3, and LFR extend from the position circuit to all of the link key circuits associated with the position. As previously explained, any one of the link circuits is individually connected to the position circuit by the operation of the seize key in the link key circuit associated with that link circuit. Speech or any other voice frequency signals received from a calling party by a link circuit are routed through the link key circuit associated with that link circuit and appear on the calling pair of REC.3 conductors. Similarly, speech signals and any other voice frequency signals received from circuits in the called direction by a link circuit are routed through the link key circuit associated with that link circuit and appear on the called pair of REC.3 conductors.

Signals received on the calling pair of REC.3 conductors are amplified by push-pull connected, emitter follower, amplifier transistors 4201 and 4202 and coupled to the attendant's receiver 4203. Signals received on the called pair of REC.3 conductors are amplified by push-pull connected, emitter follower, amplifier transistors 4204 and 4205 and coupled to the attendant's receiver 4203. Signals received on the called pair of REC.3 conductors are also amplified by push-pull connected, emitter follower, amplifier transistors 4206 and 4207 and coupled over conductors REC.4 to a multifrequency receiver in the register sender. The multifrequency receiver in the register sender is designed to detect seize acknowledge, digit acknowledge, and dial tone signals which indicate the progress of a call.

Talking battery is supplied to the attendant's transmitter 4208 from negative potential normally appearing at the emitter of emitter follower transistor 4209 through choke coil 4210. Speech signals are coupled from transmitter 4208 through capacitor 4211, transistor 4212, and resistor hybrid network 4213 to the push-pull connected, emitter follower transistors 4214 and 4215. The amplified speech signals are coupled to send conductors SD3. Digit designation signals in the form of compound voice frequency signals, and such voice frequency supervisory signals as seize and cancel signals transmitted by the register sender over send conductors SD4, are also coupled through resistor hybrid network 4213 to amplifier transistors 4214 and 4215 and thus to send conductors SD3.

Routing information is keyed into the register sender by the operation of the digit keys corresponding to the digits "1"–"0" on a one at a time basis. The operation of any one of the digit keys results in the application of minus twelve volt potential to a unique combination of two out of the five conductors KS1–KS5. For example, the operation of digit key 1 results in the application of minus twelve volt potential through diode 4216 to conductor KS1 and through diode 4217 to conductor KS2, while the operation of digit key 2 results in the application of minus twelve volt potential through diode 4218 to conductor KS1 and through diode 4219 to conductor KS3. The end of the keying operation is indicated to the register sender by the application of minus twelve volt potential through diode 4220 to conductor ES when the end of selection key is operated.

Cancellation of registered information before the end of selection key is operated is accomplished by the operation of the cancel key to apply minus twelve vote potential to conductor cancel, which extends to the register sender. If the attendant wishes to release all of the circuits in the forward or called direction after the register sender has started to transmit digit information, the forward release key is operated to apply ground potential to conductor LFR, which extends to the link key circuits.

During the sending operation, negative potential is applied to microphone inhibit conductor MINH by the register sender transistor 4221 conductive. When transistor 4221 becomes conductive, ground potential is applied to inhibitor conductor DINH, which extends to the link circuits. It will be recalled from the description of link circuit 1 that ground potential on conductor DINH serves to block the calling send gate in the link circuit so that digit designation and supervisory information is transmitted only in the called or forward direction. Ground potential at the collector of conducting transistor 4221 also renders transistor 4222 non-conductive. The resulting negative potential at the collector of transistor 4222 renders transistor 4223 non-conductive and the resulting positive potential at the collector of transistor 4223 renders transistor 4209 non-conductive to effectively disconnect talking battery from the attendant's transmitter 4208. Talking battery is removed from transmitter 4208 during the sending operation since any background noise introduced at said transmitter might falsely operate the voice guard circuits associated with multifrequency receivers in incoming registers at distant offices and thus prevent the registration of the transmitted digit designation information.

*Queue store circuits*

The queue store circuit, which is shown in Figs. 43 and 44, is provided in the system for the purpose of assuring that calls incoming to the attendant's position, or positions, are answered in the same order in which they are placed. The queue store circuit comprises a plurality of storage positions and each storage position comprises a plurality of storage elements which individually correspond to each attendant's link circuit provided in the system. In the illustrated system, ten storage positions are provided and each storage position comprises twenty-five storage elements individually corresponding to the twenty-five link circuits provided in the illustrated system. Each storage position further comprises a storage position control circuit, such as storage position 1 control circuit for storage position 1, which is utilized to control the twenty-five vertically arranged storage elements, such as storage elements LK1–POS1 through LK25–POS1, in that storage position. Also, a link control circuit, such as link 1 control circuit, is provided in the queue store circuit for each link circuit of the system.

The storage operation of the queue store is controlled by a distributor, namely, distributor 1, which controls the allotment of the storage positions in turn and a distributor, namely, distributor 2, which enables the horizontal rows of storage elements for reading in on a row at a time basis. Read out of the storage positions in turn is controlled by a read out distributor. Each distributor is designed to stop on and mark a particular position or row of storage elements only if the seize conductor from that position or row of storage elements, respectively, is negative. Mark signals from distributors 1 and 2 are negative-going while mark signals from the read out distributor are positive-going.

To illustrate the operation of the queue store circuit, first assume that no calls are stored in the queue store circuit and that no calls are demanding attention. Under these conditions, the flip-flop circuit in each of the two hundred and fifty storage elements is in the condition in which the transistor corresponding to 4302 is conductive and the transistor corresponding to 4301 is non-conductive. The transistor corresponding to 4303 in each storage position control circuit is, therefore, non-conductive and negative potential is applied to each of the distributor 1 seize conductors D1S1–D1S10, respectively. The negative potential appearing at the collector of each transistor corresponding to 4303 is also coupled through a diode corresponding to 4304 to hold transistor 4401 conductive and thus apply ground potential to the zero or busy position distributor 1 seize conductor D1S0. Since, as previously stated, distributor 1 is designed to stop on and mark a storage position only when the seize conductor from that storage position is negative, distributor 1 stands on one of the storage positions other than the busy position. Assume that distributor 1 stands on the storage position 1 as indicated by the application of negative potential to marking conductor D1M1. Since it was assumed that no calls are awaiting attention, each of the twenty-five link control flip-flop circuits is in the condition in which the transistor corresponding to 4305 is conductive and the transistor corresponding to 4306 is non-conductive. Under these conditions, ground potential is applied to all of the distributor 2 seize conductors D2S1–D2S25 and transistor 4402 is held non-conductive to apply negative potential to the zero or home position distributor 2 seize conductor D2S0. Therefore, distributor 2 stands on the home position when no calls are awaiting attention. If a busy position is not provided for distributor 1 and a home position is not provided for distributor 2, distributors 1 and 2 search until a negative signal is encountered on one of their respective seize conductors. The negative potential applied to marking conductor D1M1 by the first distributor triggers the storage position 1 control flip-flop circuit through diode 4307 to the condition in which transistor 4308 is conductive and transistor 4309 is non-conductive. Therefore, negative potential is applied to read out distributor seize conductor RODS1 and the read out distributor stands on position 1 as indicated by the application of ground potential to conductor RODM1.

Next assume that link circuit 1 is seized by the route selector for the purpose of extending a call to the attendant's position and ground potential appears on demand conductor D1 from link circuit 1. The positive-going potential swing on conductor D1 is coupled through capacitor 4309 and diode 4310 to trigger the link 1 control flip-flop circuit to the condition in which transistor 4306 is conductive and transistor 4305 is non-conductive. The resulting negative potential at the collector of non-conducting transistor 4305 renders transistor 4402 conductive through diode 4311 and ground potential is applied to conductor D2S0 to drive distributor 2 off of the home position. Distributor 2 stops on and marks the first horizontal row of storage elements, which row corresponds to link circuit 1, since seize conductor D2S1 is returned to the negative potential at the collector of transistor 4305. The LK1–POS1 flip-flop circuit is now triggered to the condition in which transistor 4301 is conductive and transistor 4302 is non-conductive since both inputs to the "and" gate for negative signals comprising diodes 4313 and 4314 are negative and the negative output of the gate is coupled through diode 4315 to the base of transistor 4301.

When transistor 4302 becomes non-conductive, the negative potential at its collector is coupled through diode 4316 to render transistor 4303 conductive. The resulting ground potential at the collector of transistor 4303 is applied to conductor D1S1 and serves to advance distributor 1 to the second storage position. The negative potential at the collector of non-conducting transistor 4302 is also coupled through diode 4317 to the base of transistor 4305 and resets the link 1 control flip-flop circuit to the condition in which transistor 4305 is conductive. When the collector of transistor 4305 and conductor D2S1 go to ground potential, the second distributor is advanced off of row 1. If no other calls have been placed, distributor 2 advances over conductors D2S2–D2S25, which have ground potential applied thereto, and stops on conductor D2S0, which now stands at negative potential since transistor 4402 becomes non-conductive when transistor 4305 becomes conductive. If, on the other hand, a call had been placed to another link circuit, such as link circuit 25, for example, the second distributor stops when negative potential is encountered on the seize lead, such as D2S25, corresponding to that link circuit. Thus, since the first distributor now stands on storage position 2 and the second distributor applies a marking signal to conductor D2M25, the link 25 storage element in storage position 2 is activated, the first distributor is advanced to the third storage position, and the second distributor then advances to the home position or resumes its searching operation if no home position is provided.

Returning to the consideration of storage position 1, it will be recalled that it was assumed that the read out distributor stands on storage position 1 and is therefore applying ground potential to read out marking conductor RODM1. Transistor 4318 becomes conductive since its emitter is returned to ground potential on conductor RODM1 and its base is returned to negative potential at the collector of non-conducting transistor 4302. When transistor 4318 becomes conductive, ground potential is applied to seize conductor SZ1 to control link circuit 1 to prepare link key circuit 1 for seizure, as previously described. The resulting positive potential swing at the collector of conducting transistor 4318 is also coupled through capacitor 4319 and diode 4320 to trigger the flip-flop circuit comprising transistors 4321 and 4322 to the condition in which transistor 4321 is conductive and transistor 4322 is non-conductive. When transistor 4322 becomes non-conductive, the emitter of emitter follower transistor 4323 goes negative and transistor 4324 is rendered conductive to illuminate lamp incoming 1, which is individually associated with link circuit 1. When the call is answered at the attendant's position responsive to the illumination of lamp INC1, negative potential is applied to conductor QRS1 as described in the description of link key circuit 1. Negative potential on conductor QRS1 serves to reset the flip-flop circuit, comprising transistors 4321 and 4322, to the condition wherein transistor 4322 is conductive to thereby extinguish lamp INC1. The negative potential on conductor QRS1 also serves to reset the LK1–POS1 flip-flop circuit to the condition in which transistor 4302 is conductive. When transistor 4301 becomes non-conductive, negative potential is coupled through diode 4325 and capacitor 4326 to trigger the storage position 1 control flip-flop circuit to the condition in which transistor 4309 is conductive. When transistor 4309 becomes conductive, read out seize conductor RODS1 rises to ground potential and the read out distributor is thereby advanced to storage position 2. When transistor 4302 becomes conductive, transistors 4318 and 4303 are rendered non-conductive. When transistor 4303 becomes non-conductive, negative potential is again applied to conductor D1S1 to indicate to distributor 1 that storage position 1 is idle and may be used to store another call after calls have been stored in the remaining storage positions of the queue store circuit.

It may happen that calls are placed in such rapid succession that all of the storage positions are filled. Under these conditions, transistor 4401 becomes non-conductive, negative potential is applied to conductor D1S0 and distributor 1 is thereby controlled to stand on the zero or busy position. Distributor 2 will, of course, be standing on and marking the horizontal row which placed the first call after the ten storage positions became filled. Therefore, it can be seen that the illustrated queue store circuit actually stores eleven calls although just ten storage positions are provided. When storage position 1 is read out and transistor 4303 becomes non-conductive, transistor 4401 is rendered conductive, and distributor 1 is controlled to advance from the busy position to storage position 1 and the operation then continues, as previously described.

*Queue store distributor*

The queue store distributor circuit, which is shown in Fig. 45, represents distributors 1 and 2 and the read out distributor which control the queue store circuit just described. Distributors 1 and 2 are identical and differ from the read out distributor only in that a negative going potential is applied to the marking conductors by distributors 1 and 2 whereas a positive-going potential is applied to the marking conductors by the read out distributor. Each stage of the distributors 1 and 2 comprises a free running ring counter transistor, such as 4501, a gating transistor, such as 4506, and an inverter transistor, such as 4507, while each stage of the read out distributor comprises just a free running ring counter transistor and a gating transistor. The free running ring counter, which is illustrated as comprising transistors 4501–4505, inclusive, must of necessity comprise an odd number of transistors. Therefore, distributor 1 comprises eleven complete stages since it is designed to control ten storage positions and a busy position, distributor 2 comprises twenty-six complete stage since it is designed to control twenty-five rows of storage elements corresponding to twenty-five link circuits and a zero or home position, and the read out distributor comprises ten complete stages since it is designed to control the read out of ten storage positions. In addition to the above, distributor 2 and the read out distributor must have an extra or twenty-seventh and eleventh transistor, respectively, in the free running ring counter.

To illustrate the operation of the free running ring counter, assume that the base of transistor 4501 has gone negative and transistor 4501 has just begun to conduct. Capacitor 4508 discharges through resistor 4509 to ground potential at the collector of transistor 4501. When capacitor 4508 has discharged, transistor 4502 becomes non-conductive and capacitor 4510 charges toward minus twelve volt potential through resistors 4511 and 4512. When the base of transistor 4503 becomes slightly negative with respect to its emitter, transistor 4503 begins to conduct. When transistor 4503 becomes conductive, transistor 4504 is rendered non-conductive, transistor 4505 is rendered conductive, and transistor 4501 is rendered non-conductive. Thus, it can be seen that as the operation progresses through the chain, the state of conductivity of each transistor is changed from either conductive to non-conductive or from non-conductive to conductive. The speed of operation of the chain is dependent upon the capacitance value of the capacitors, such as 4508 and 4510, and the type of transistors used in the circuit.

In order to derive a useful, progressive, non-overlapping output from the ring counter, a gating transistor is provided at each stage where an output is desired. Each of the gating transistors is connected with its base to the collector of one of the transistors of the ring counter and with its emitter to the collector of an even numbered transistor following said one transistor in the ring counter. The collectors of the two aforementioned ring counter transistors are normally at the same potential, either ground or negative potential. In either case, the gating transistor is non-conductive. On alternate cycles of operation of the ring counter when the potential at the collectors of the aforementioned ring counter transistors is changing from ground to negative potential, the gating transistor is rendered conductive for the short time interval while the collector of said one transistor is at negative potential and the collector of the second transistor is still at ground potential.

To illustrate the above described gating operation, it can be seen that the base electrode of gating transistor 4506 is connected through diode 4511 to the collector electrode of ring counter transistor 4504 and that the emitter electrode of transistor 4506 is connected to the collector of an even numbered, namely, the second, ring counter transistor 4501 following transistor 4504 in the ring counter circuit. If it is assumed that ring counter transistors 4504 and 4501 are conductive and that transistor 4503 has just started to conduct, it can be seen that transistor 4504 becomes non-conductive and negative potential is applied to the anode terminal of diode 4511 in the base circuit of transistor 4506. Diodes 4511 and 4512 form an "and" gate for negative signals and when negative potential is applied to conductor DS1 and the anode terminal of diode 4511 goes negative, a negative output is realized from the gate and gating transistor 4506 is rendered conductive since its emitter is returned to ground potential at the collector of conducting transistor 4501. When transistor 4506 becomes conductive, ground potential is coupled through diode 4513 to the base of ring counter transistor 4505 to prevent transistor 4505 from becoming conductive and the ring counter operation is stopped in the condition in which transistor 4504 is non-conductive and transistor 4501 is conductive to thereby maintain transistor 4506 conductive as long as negative potential is applied to conductor DS1. When gating transistor 4506 becomes conductive, ground potential is also applied to mark conductor DM1 (+) and inverter transistor 4507 is rendered non-conductive to apply negative potential to mark conductor DM1 (−).

When ground potential is applied to conductor DS1 by the controlled circuit, transistor 4506 is rendered non-conductive through diode 4512 and the ring counter continues its stepping operation since ground potential is no longer applied through diode 4513 to the base of ring counter transistor 4505. The ring counter then continues its stepping operation until a seize conductor with negative potential thereon is encountered.

*Register sender*

The register sender which is shown in detail in Figs. 46–52, inclusive, of the drawings, is utilized to store digit designation information received from the digit key set at the associated attendant's position and to then control the establishment of the connection over the desired route in accordance with the stored information. It will be recalled from the general description that when an attendant's link circuit is seized by the route selector to extend a call to the attendant's position, the attendant operates a seize key in the link key circuit associated with the calling link circut to connect the send and receive conductors of the link circuit to the register sender. The attendant keys the number corresponding to the desired called route in accordance with oral instructions received from the calling party and then operates the end of a selection key provided at the position circuit. The operation of the end of selection key initiates the operation of the register sender to obtain an outgoing trunk and transmit the stored digital information.

The register sender is designed to control the extension of calls to either local offices or to and through other long distance switching centers. It will be recalled from the general description that calls to local offices are identified as such by a first digit of "1." Assume that the attendant operates the digit "4" key at the attendant's position circuit, thus identifying the call as a call to a long distance switching center. When the digit "4" key is operated, negative potential appears on conductors KS1 and KS4 of Fig. 46 and is applied to corresponding stages in each of the digit registers of the illustrated register sender. The reading in operation of the digit registers is controlled by the read in distributor, which comprises a stage for each digit register. In the idle or reset condition of the register sender, the read in 1 distributor stage flip-flop circuit is operated to the condition wherein transistor 4602 is conductive since the emitter of transistor 4601 is returned to reset conductor ESRS, while the transistor corresponding to 4601 in each of the remaining read in distributor stage flip-flop circuits is conductive since the emitter of the transistor corresponding to 4602 in each of those flip-flop circuits is returned to conductor ESRS. Similarly, in the reset condition, each of the five flip-flop circuits in each digit register are operated to the Ccondition in which the transistor corresponding to 4603 is conductive and the transistor corresponding to 4604 is non-conductive.

The negative potential appearing at the collector of non-conducting transistor 4601 in the read in 1 distributor stage is applied to the anode terminal of a diode corresponding to 4605 in each stage of the first digit register. A negative potential appearing on conductor KS1 is applied to the anode terminal of a diode corresponding to 4606 in the V-stage of each digit register and the negative potential appearing on conductor KS4 is applied to the anode terminal of a diode corresponding to 4606 in the Y-stage of each digit register. Since the transistors corresponding to 4601 in each of the read in distributor stages except stage 1 is conductive and ground potential is therefore applied to the anode terminal of the diode corresponding to 4605 in each stage of each digit register except digit register 1, the output of the "and" gate for negative signals, comprising diodes 4605 and 4606, goes negative only in stages V and Y of the first digit register. The negative output of the "and" gate in stages V and Y of the first digit register serves to charge the capacitor corresponding to 4607 in those stages but has no effect on the transistor corresponding to 4603 since transistor 4603 is already conductive. When the digit key 4 is released and ground potential is reapplied to conductors KS1 and KS4, the output of the "and" gates in stages V and Y of the first digit register go positive and the V and Y stage flip-flop circuits are triggered to the condition in which the transistor corresponding to 4603 is non-conductive and the transistor corresponding to 4604 is conductive. Thus, the binary digit "VY" is effectively stored in the first digit register.

Transistor 4608 is rendered conductive as long as negative potential is received on any one of the conductors KS1–KS5 and is, of course, rendered non-conductive when ground potential reappears on those conductors. When transistor 4608 becomes non-conductive, the negative potential swing at its collector is coupled through capacitor 4609 to render transistor 4610 conductive. Transistors 4610 and 4611 comprise a monostable circuit in which transistor 4610 is normally non-conductive and transistor 4611 is normally conductive. When transistor 4610 is triggered conductive, transistor 4611 is rendered non-conductive for a period of approximately ten microseconds and at the end of the period, the monostable circuit reverts to its original condition. When transistor 4611 again becomes conductive, the resulting positive-going potential swing at its collector renders normally conductive transistor 4612 non-conductive and transistor 4613 conductive for a short period of time. When transistor 4613 becomes conductive, the positive-going potential swing at its collector is coupled through diode 4614 and capacitor 4615 to trigger the read in 1 distributor stage flip-flop circuit to the condition in which transistor 4601 is conductive. Simultaneously therewith, the positive pulse is coupled through capacitor 4616 to trigger the read in 2 distributor stage to the condition in which the transistor corresponding to 4602 is conductive. The positive pulse coupled to the anode terminals of the diodes corresponding to 4614 in the other distributor stages has no effect since the transistor corresponding to 4601 in each stage is conductive and the cathode terminals of the diodes corresponding to 4614 are held at ground potential. Thus, at the end of the keying operation for the first digit, the first digit designation is stored in the first digit register and the second digit register is enabled to store the second digit designation. When transistor 4601 in read in 1 distributor stage becomes conductive, a positive pulse is coupled through capacitor 4701 and steering diode 4702 to trigger the lamp 1 control flip-flop circuit to the condition in which transistor 4704 is conductive. When transistor 4703 becomes non-conductive, the emitter of emitter follower transistor 4705 goes negative and transistor 4706 is rendered conductive to illuminate lamp 1 and thus indicate that the first digit has been registered. Each succeeding digit is stored in a succeeding one of said digit registers. At the termination of the keying operation for each digit when negative potential is removed from the KS conductors, the read in distributor is advanced to enable the next succeeding digit register and the lamp corresponding to the digit register just activated is illuminated, all as previously described.

Figure 49:
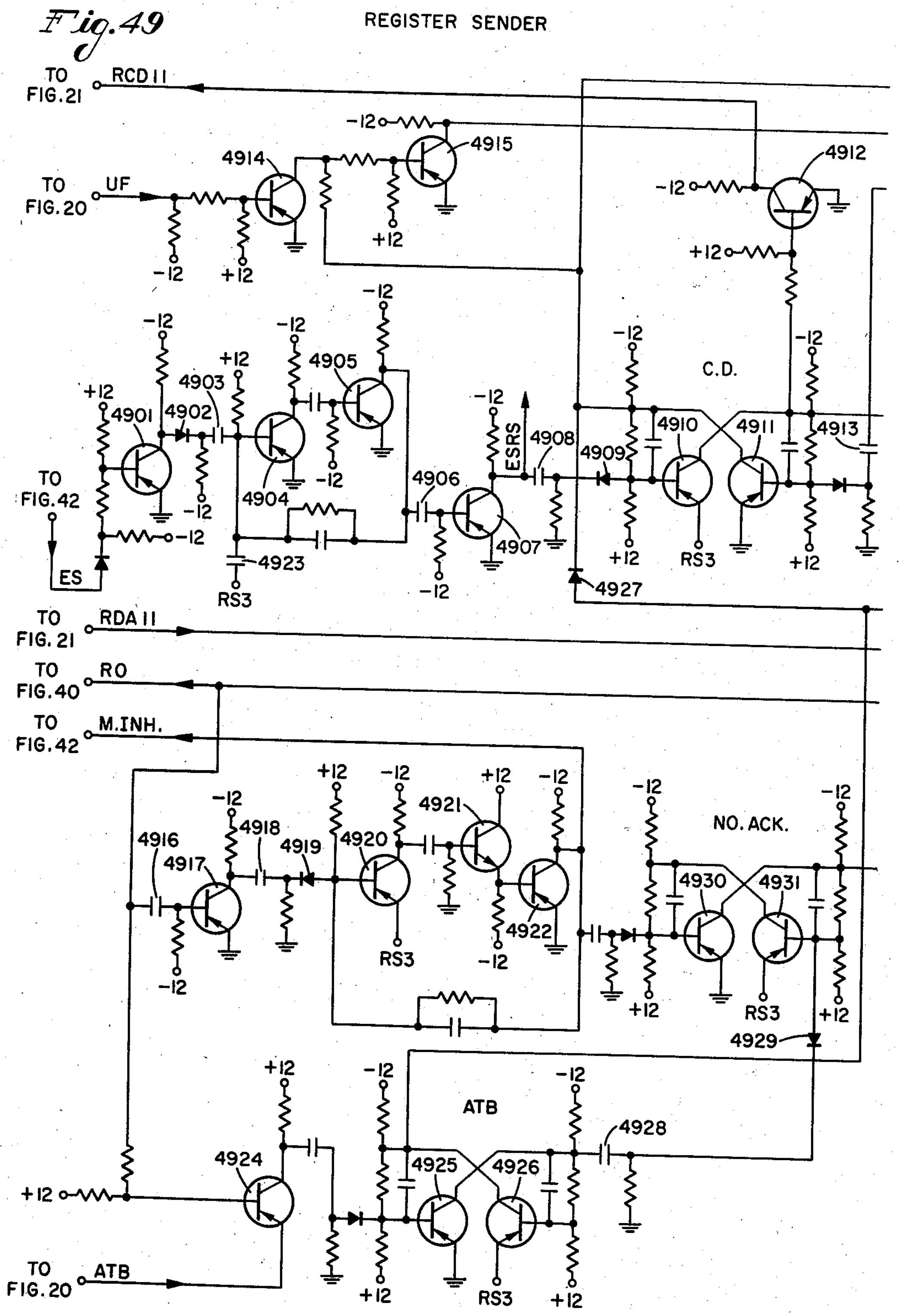
Figure 50:
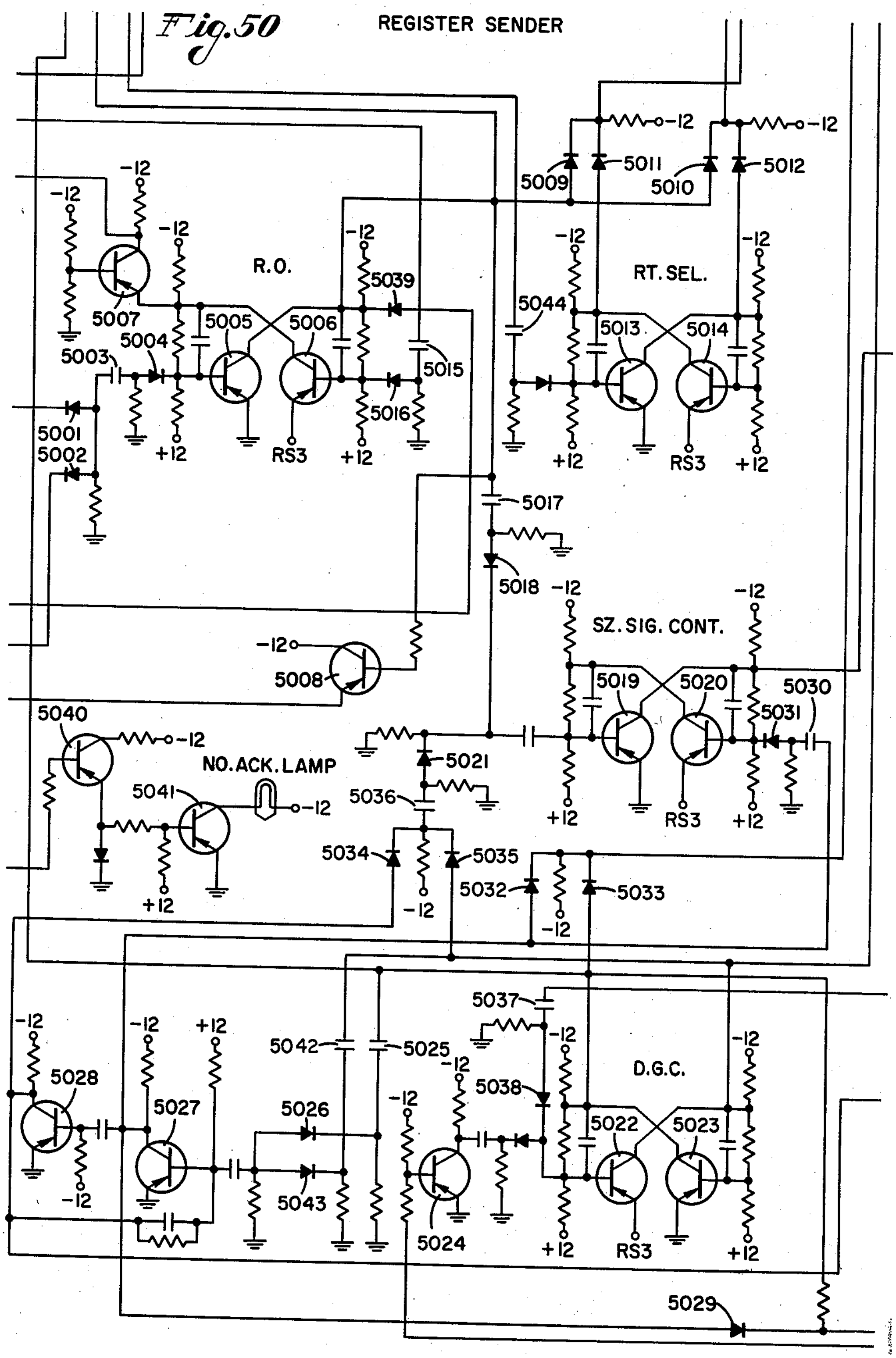
Figure 51:
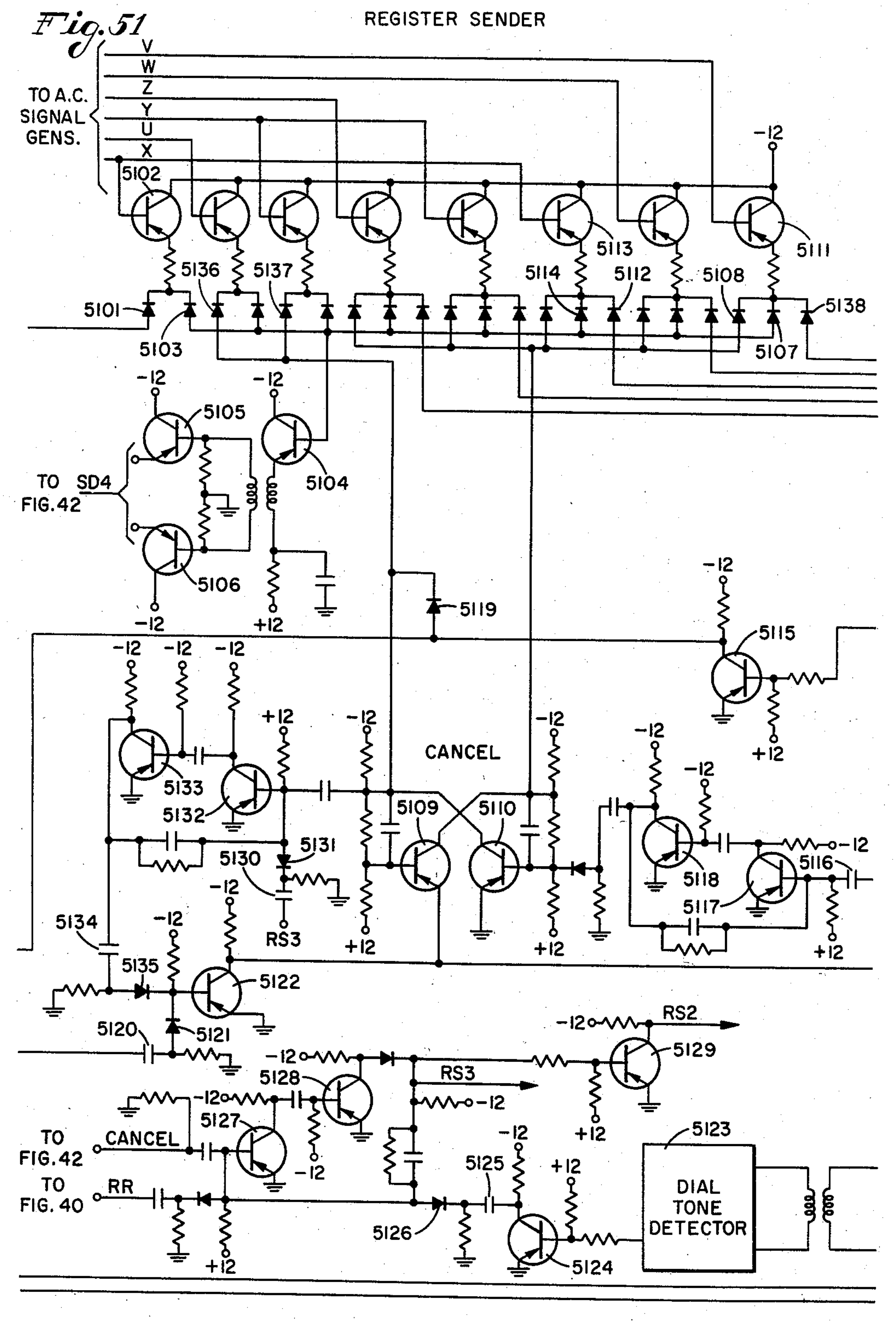

When all of the digits corresponding to the desired route have been keyed, the attendant operates the end of selection key to apply negative potential to conductor ES of Fig. 49. Negative potential on conductor ES serves to render transistor 4901 conductive. When the end of selection key is released, transistor 4901 again becomes non-conductive and a negative pulse is coupled through capacitor 4903 to trigger the monostable circuit comprising transistors 4904 and 4905 to the condition in which transistor 4904 is conductive and transistor 4905 is non-conductive. After a short delay, the monostable circuit reverts to its normal condition and a positive pulse is coupled through capacitor 4906 to render normally conductive transistor 4907 non-conductive for the charge time of capacitor 4906. When transistor 4907 becomes non-conductive, negative potential is applied to conductor ESRS to thereby restore the read in distributor to its normal condition in which transistor 4602 is conductive in the read in 1 distributor stage and the transistor corresponding to 4601 is conductive in all of the other read in distributor stages. The negative-going pulse at the collector of transistor 4907 is also coupled through capacitor 4908 and diode 4909 to trigger the connect demand flip-flop circuit to the condition in which transistor 4910 is conductive and transistor 4911 is non-conductive.

When transistor 4910 becomes conductive, normally conductive transistor 4912 is rendered non-conductive and negative potential is applied to register connect demand conductor RCD11 to indicate to the register finder that the illustrated register sender has digit information stored therein and is in readiness to be read out. Ground potential appearing at the collector of conducting transistor 4910 is also applied to the anode terminal of diode 5001, which with diode 5002 forms an "and" gate for positive signals, but the output of this gate remains negative since conductor RDA11 is returned to negative potential. When the illustrated register sender is seized by the register finder as signified by the application of ground potential to register demand answer conductor RDA11, the output of the gate comprising diodes 5001 and 5002 goes positive and read out flip-flop circuit is triggered through capacitor 5003 and diode 5004 to the condition in which transistor 5005 is non-conductive and transistor 5006 is conductive. When transistor 5006 becomes conductive, transistor 5007 becomes conductive to charge capacitor 4913 but has no effect on the connect demand flip-flop circuit at this time.

When transistor 5005 of the read out flip-flop circuit becomes non-conductive, negative potential is applied to the base of emitter follower transistor 5008 and the resulting negative potential at its emitter is applied to read out conductor RO to control the calling link circuit to read out highway and time position channel information to the bus bars, as previously described. The negative potential appearing at the collector of transistor 5005 is also applied to the anode terminals of diodes 5009 and 5010, which with diodes 5011 and 5012, respectively, form "and" gates for negative signals, and a negative output is realized from the "and" gate comprising diodes 5009 and 5011 since transistor 5014 of the route selector flip-flop circuit is non-conductive. As will be later described, transistor 5014 of the route selector flip-flop circuit is rendered conductive only if the call being processed is to be routed to a local office accessible to the illustrated long distance switching center. The negative potential appearing at the output of the gate comprising diodes 5009 and 5011 is applied to the anode terminal of a diode corresponding to 4617 in each of the stages 2–0 of the binary to decimal converter 1 to enable the transistor corresponding to 4618 in each of those stages for conduction. The transistor corresponding to 4618 in stage 4 is rendered conductive at this time since its emitter is returned to ground potential at the collector of conducting transistor 4604 in the Y-stage of the first digit register and its base is returned to negative potential at the collector of non-conducting transistor 4603 in the V-stage of the first digit register. Ground potential appearing at the collector of the transistor corresponding to 4618 in the fourth stage of binary to decimal converter 1 is coupled through diode 4619 to digit marking conductor 4 in cable DM to control the route selector to select an idle line terminating unit in the group of line terminating units terminating trunk lines or radio links to the long distance switching center identified by the digit "4."

As previously described, the route selector seizes an idle line terminating unit in the desired group, highway and time position channel information applied to bus bars HWBB and TPBB by the calling link circuit is read into the seized line terminating unit and ground potential is applied to the units found conductor UF by the route selector. When ground potential is applied to conductor UF, normally conductive transistor 4914 becomes non-conductive and the base of transistor 4915 is returned to negative potential since connect demand flip-flop circuit transistor 4911 is non-conductive. When transistor 4915 becomes conductive, a positive pulse is coupled through capacitor 5015 and diode 5016 to reset the read out flip-flop circuit to the condition in which transistor 5005 is conductive. When transistor 5005 becomes conductive, the "and" gate comprising diodes 5009 and 5011 is closed, the emitter of transistor 5008 goes to ground potential, and a positive pulse is coupled through capacitor 4916 to render transistor 4917 non-conductive for the charge time of capacitor 4916. When transistor 4917 becomes non-conductive, a negative pulse is coupled through capacitor 4918 and diode 4919 to trigger the monostable circuit comprising transistors 4920, 4921, and 4922. Transistors 4920, 4921, and 4922 form a monostable circuit in which transistor 4920 is normally non-conductive, the emitter of emitter follower transistor 4921 normally stands at a slightly negative potential, and transistor 4922 is normally conductive. When the circuit is triggered by a negative pulse, transistor 4920 becomes conductive, the emitter of transistor 4921 goes positive, and transistor 4922 becomes non-conductive to begin the measurement of a ten-second interval during which the call under consideration should be completed. While transistor 4922 is non-conductive and negative potential appears at its collector, negative potential is applied to microphone inhibit conductor MINH for the purpose of removing talking battery from the attendant's transmitter and for the purpose of controlling the calling link circuit to transmit the voice frequency seize and digit designation signals received from the register sender to the called line terminating unit only.

When the read out flip-flop circuit is reset and the collector of transistor 5005 goes to ground potential, a positive pulse is coupled through capacitor 5017 and diode 5018, which with diode 5021 forms an "or" gate for positive signals, and the seize signal control flip-flop circuit is triggered to the condition in which transistor 5019 is non-conductive and transistor 5020 is conductive. When transistor 5019 becomes non-conductive, inhibiting diode 5101 is biased in the reverse direction and the voice frequency seize signal X, amplified by emitter follower amplifier transistor 5102, is coupled through diode 5103, amplified by emitter follower transistor 5104, amplified by the push-pull connected, emitter follower transistors 5105 and 5106, and applied to the send conductors SD4 which extend to the position circuit and through the operated link key circuit to the calling link circuit. As previously described, the signal is transmitted by the calling link circuit in the forward or called direction. When the read out flip-flop circuit is reset and the collector of transistor 5005 goes to ground potential, a positive pulse is also coupled through capacitor 4620 and diode 4621 to render normally conductive transistor 4622 non-conductive for the duration of the positive spike corresponding to the leading edge of the waveform as differentiated by capacitor 4623. The resulting negative pulse occurring at the collector of transistor 4622 is utilized to trigger the monostable circuit comprising transistors 4610 and 4611 to advance the read in distributor to stage 2 in the same manner as previously described. When transistor 4601 of the read in 1 distributor stage becomes conductive, the lamp 1 control flip-flop circuit is reset through capacitor 4707 and steering diode 4708 to thereby extinguish lamp 1 as an indication that the first registered digit has been sent.

As explained in the general description, the seize signal transmitted by the register sender to the calling link circuit is sampled in the link circuit and signal samples are transmitted to the assigned highway in the time position assigned to the call. The signal samples received by the called line terminating unit from the highway are demodulated and transmitted to the distant long distance switching center. The seize signal received by the distant long distance switching center is utilized to control the assignment of a time position channel in that office to the line terminating unit terminating the trunk line or radio link from the illustrated long distance switching center and to an idle incoming register in that office. When the incoming register in the distant long distance switching center is connected to the assigned channel and is in readiness to receive digit designation signals, the incoming register transmits a seize acknowledge signal over the extended connection to the illustrated originating register sender.

Figure 52:
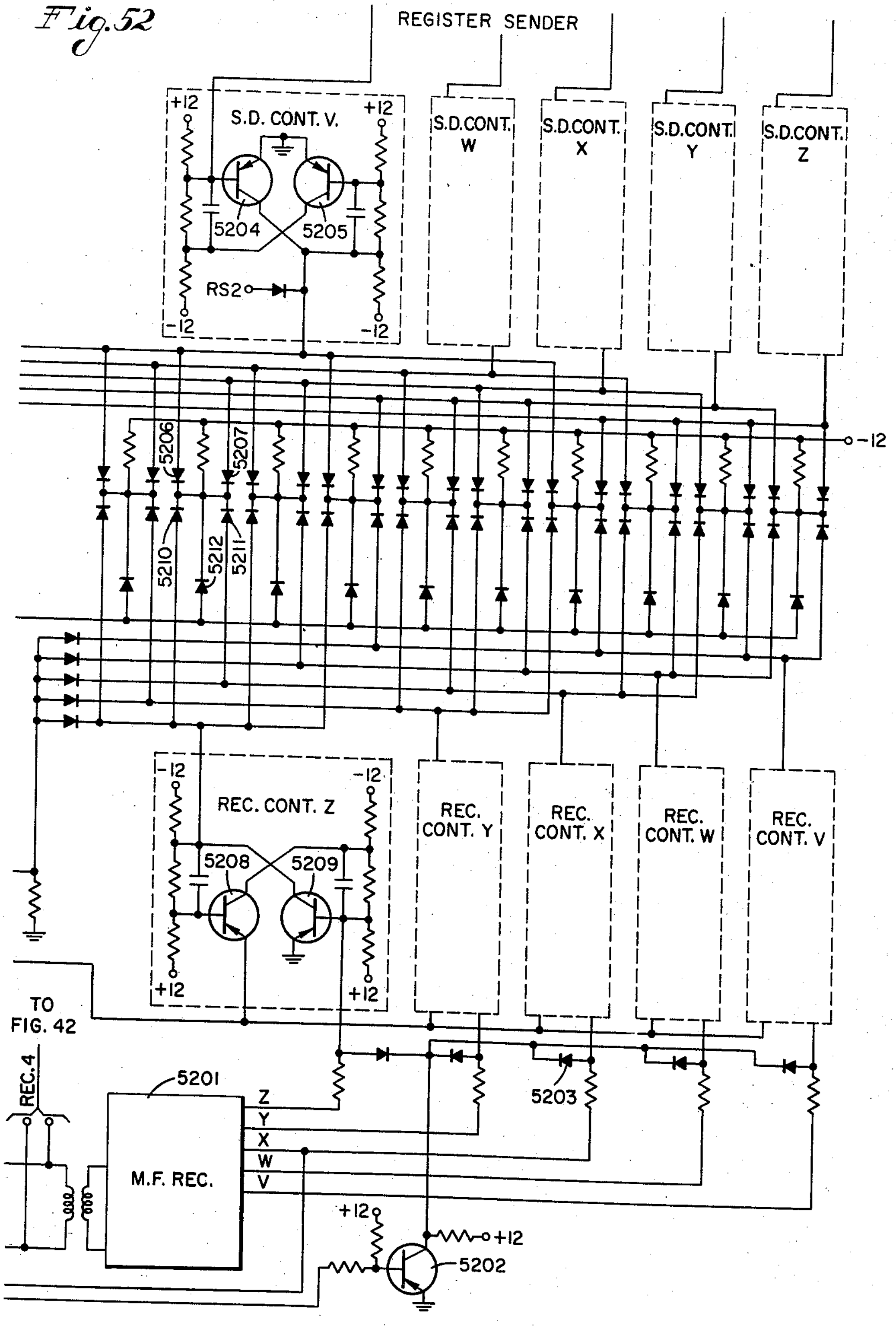

When a seize acknowledge signal of frequency X is received over the receive conductors REC.4 of Fig. 52 and is thus applied to the input of multi-frequency receiver 5201, a positive potential appears on output conductor X from receiver 5201. The positive potential on output conductor X has no effect on the receive control X flip-flop circuit since normally conducting transistor 5202 is applying ground potential to the cathode terminal of diode 5203 at this time. Transistor 5202 is held conductive to block the receive control flip-flop circuits at this time since its base electrode is returned to ground potential at the collector of normally conducting transistor 5023 in the digit gate control flip-flop circuit. The positive potential on output conductor X from receiver 5201 serves to render normally conductive transistor 5024 non-conductive and the resulting negative potential swing at the collector of transistor 5024 is utilized to trigger transistor 5022 of the digit gate control flip-flop circuit conductive.

When transistor 5023 of the digit gate control flip-flop circuit becomes non-conductive, the negative potential swing at its collector is coupled through capacitor 5025 and diode 5026 to trigger the monostable circuit comprising transistors 5027 and 5028 to the condition in which transistor 5027 is conductive and transistor 5028 is non-conductive. When transistor 5027 becomes conductive, ground potential is coupled through diode 5029 to maintain transistor 5202 conductive. The positive-going potential swing at the collector of transistor 5027 is also coupled through capacitor 5030 and diode 5031 to reset the seize signal control flip-flop circuit to the condition in which transistor 5019 is conductive and thereby bias inhibiting diode 5101 in the forward direction and thus remove the seize signal X from the send conductors SD4. After a period of approximately twenty-five milliseconds, the monostable circuit comprising transistors 5027 and 5028 reverts to the condition wherein transistor 5027 is non-conductive and transistor 5028 is conductive. When transistor 5027 becomes non-conductive, transistor 5202 becomes non-conductive and positive potential is applied to the cathode terminals of the diodes corresponding to 5203 to thereby enable the receive control flip-flop circuits for registration of received digit acknowledge signals. It is to be noted that the distant office incoming register discontinues the transmission of a seize acknowledge signal when the seize signal is terminated by the register sender. Therefore, a positive potential no longer appears on output conductor X from receiver 5201 at the time when transistor 5202 becomes non-conductive.

When the monostable circuit transistor 5027 becomes non-conductive at the termination of the twenty-five millisecond measured period, negative potential is applied to the anode terminal of diode 5032, which with diode 5033 forms an "and" gate for negative signals, and since the anode terminal of diode 5033 is also returned to negative potential at the collector of non-conducting transistor 5023, a negative output is realized from the "and" gate and the V amplifier-Z amplifier transistors corresponding to 4801 are enabled for conduction. Examining the read out distributor of Figs. 47 and 48 it can be seen that transistor 4710 is conductive in read out 1 stage flip-flop circuit since the emitter of transistor 4709 in that stage is returned to reset conductor RS3 while the transistor corresponding to 4709 in the remaining read out distributor stages is conductive since the emitter of the transistor corresponding to 4710 in each of those stages is returned to conductor RS3. Under these conditions, the base electrode of the transistor corresponding to 4711 in each stage of the digit gate 2 is returned to negative potential at the collector of non-conducting transistor 4709 in read out 1 distributor stage, while the base electrode of the transistor corresponding to 4711 in each stage of the remaining digit gates is returned to ground potential at the collector of the transistor corresponding to 4709 in each of the remaining read out distributor stages. Thus, digit gate 2 is enabled to read out the second digit designation which was stored in the second digit register.

If it is assumed that the second digit keyed by the attendant was the digit "2," the transistor corresponding to 4604 is conductive in the V- and X-stages of the second digit register and ground potential is therefore applied to the emitter electrodes of the transistor 4711 in the V-stage of digit gate 2 and to the emitter electrode of the transistor corresponding to 4711 in the X-stage of digit gate 2. When transistor 4711 of the V-stage of digit gate 2 becomes conductive, ground potential is applied to the emitter of V amplifier transistor 4801. Similarly, when the transistor corresponding to 4711 of the X-stage of digit gate 2 becomes conductive, ground potential is applied to the emitter of the X amplifier transistor corresponding to 4801. Since the base electrodes of the V-amplifier-Z amplifier transistors are returned to negative potential at the output of the "and" gate comprising diodes 5032 and 5033, as previously described, the V amplifier transistor 4801 and the X amplifier transistor corresponding to 4801 are rendered conductive to trigger the send control V and send control X flip-flop circuits to the condition in which transistor 5205 is conductive. When the send control V flip-flop circuit transistor 5204 becomes non-conductive, negative potential is applied to the anode terminal of inhibiting diode 5138 to bias said diode in the reverse direction. Since the inhibiting diode 5108 is also biased in the reverse direction by the negative potential appearing at the collector of non-conducting transistor 5109 in the cancel flip-flop circuit, the voice frequency signal of frequency V appearing at the emitter of emitter follower transistor 5111 is coupled through diode 5107 to emitter follower transistor 5104. Similarly, when the send control X flip-flop circuit transistor 5204 becomes non-conductive, negative potential is applied to the anode terminal of inhibiting diode 5112 and the voice frequency signal of frequency X appearing at the emitter of emitter follower transistor 5113 is coupled through diode 5114 to emitter follower transistor 5104. Thus, the digit designating voice frequency signal VX is applied to send conductors SD4 and routed to the incoming register in the distant office.

Ten comparator gates are provided in the register sender for the purpose of comparing the received digit acknowledge signals with the transmitted digit designation signals. Each comparator gate comprises four diodes arranged in an "and" gate for negative signal configuration. It can be seen that when the transistors 5204 in the send control V and send control X stages become non-conductive, negative potential is applied to the anode terminals of diodes 5206 and 5207, respectively. If it is assumed that the correct digit acknowledgment signal for the digit "2" is received by the register sender, the Z and X output conductors from receiver 5201 go positive and the transistors corresponding to 5208 in the receive control Z and receive control X flp-flop circuits become conductive and the negative potential appearing at the collectors of the transistors 5209 is applied to the anode terminals of diodes 5210 and 5211, respectively. Since all four inputs to the "and" gate for negative signals, comprising diodes 5206, 5207, 5210, and 5211, are negative, the output of the "and" gate goes negative and a negative signal is coupled through diode 5212 to render transistor 5115 conductive. Simultaneously with the above, a negative signal is coupled through capacitor 5116 to trigger the monostable circuit comprising transistors 5117 and 5118 to the condition in which transistor 5117 is conductive and transistor 5118 is non-conductive. After a period of approximately one millisecond, the monostable circuit reverts to its normal condition and when transistor 5118 again becomes conductive, a positive pulse is coupled to the base of transistor 5110 in the cancel flip-flop circuit. The cancel flip-flop circuit is prevented from triggering, however, since the correct acknowledgment signal was received and transistor 5115 is therefore conductive to hold the base of transistor 5109 positive through diode 5119.

When transistor 5115 becomes conductive, the digit gate control flip-flop circuit is reset through capacitor 5037 and diode 5038 to the condition in which transistor 5023 is conductive. When transistor 5023 becomes conductive, the output of the "and" gate comprising diodes 5032 and 5033 goes to ground potential and the V and X amplifier transistors 4801 are rendered non-conductive. When the transistors 4801 become non-conductive and negative potential appears at their collector electrodes, the send control V and send control X flip-flop circuits are reset to the condition in which transistor 5204 is conductive. When the send control flip-flop circuits are reset, the voice frequency signals V and X are inhibited from being applied to transistor 5104 since they are shunted to ground through diodes 5138 and 5112, respectively. The positive potential swing at the collector of transistor 5023 is also coupled through capacitor 4624 and diode 4625 to momentarily render transistor 4622 non-conductive and thereby advance the read in distributor to the third stage and extinguish lamp 2 as an indication that the second digit has been sent. Ground potential appearing at the collector of conducting transistor 5023 also serves to render transistor 5202 conductive to again inhibit the receive control flip-flop circuits, as previously described.

When transistor 5022 of the digit gate control flip-flop circuit becomes non-conductive, negative potential is coupled through diode 4713 and the resulting negative pulse coupled through capacity 4714 renders transistor 4712 conductive. The positive-going pulse appearing at the collector of transistor 4712 is applied to the anode terminal of a diode corresponding to 4715 in each read out distributor stage except the last and the read out distributor is advanced to the second stage. When transistor 5022 of the digit gate control flip-flop circuit becomes non-conductive, a negative pulse is also coupled through capacitor 5042 and diode 5043 to trigger the twenty-five millisecond delay monostable circuit comprising transistors 5027 and 5028. When transistor 5028 becomes non-conductive, negative potential is applied to the anode terminal of diode 5034, which with 5035 forms an "and" gate for negative pulses, and since the anode terminal of diode 5035 is also returned to negative potential at the collector of non-conducting transistor 5022, the output of the gate goes negative and capacitor 5036 is charged. At the termination of the twenty-five millisecond period, the monostable circuit reverts to its normal condition and when transistor 5028 again becomes conductive, the output of the "and" gate comprising diodes 5034 and 5035 goes positive and the seize signal control flip-flop circuit is again triggered to the condition in which transistor 5020 is conductive. Thus, approximately twenty-five milliseconds after the correct digit acknowledgement signal is received and the digit designating voice frequency signals are removed from the send conductors SD4, a voice frequency seize signal of frequency X is again applied to the send conductors SD4 for the purpose of controlling the incoming register in the distant long distance switching center to further extend the connection in accordance with the acknowledged registered digit. Also when transistor 5028 again becomes conductive, a positive pulse is coupled through capacitor 5120 and diode 5121 to the base of transistor 5122. The resulting negative pulse appearing at the collector of transistor 5122 serves to reset the receive control flip-flop circuits to the condition in which the transistor corresponding to 5209 in each flip-flop circuit is conductive.

When a seize acknowledge signal is received, the transmission of a seize signal is terminated and twenty-five milliseconds later the digit designation registered in the third digit register is loaded into the send control flip-flop circuits and corresponding voice frequency signals are transmitted to the send conductors SD4. If the correct digit acknowledgment signal for the transmitted signal is received, the transmission of digit designation signals is terminated, the read in distributor is advanced to stage 4 to thereby extinguish digit lamp 3, and the read out distributor is advanced to prepare for the transmission of the fourth registered digit. The register sender continues to function in the above described manner until all of the registered digits have been transmitted. Dial tone is received over receive conductors REC.4 when the call has been extended to the terminating local office, which corresponds to the last registered digit. When all of the digit lamps have been extinguished, the attendant listens in on the connection and then passes the number of the desired called station to the attendant at the answering local office.

When dial tone is received over receive conductors REC.4, the output from the dial tone detector 5123 goes positive and normally conductive transistor 5124 becomes non-conductive. When transistor 5124 becomes non-conductive, a negative pulse is coupled through capacitor 5125 and diode 5126 to trigger the monostable circuit comprising transistors 5127 and 5128 to the condition in which 5127 is conductive and 5128 is non-conductive. When transistor 5128 becomes non-conductive, negative potential is applied to reset conductor RS3 and transistor 5129 is rendered conductive to apply ground potential to reset conductor RS2. Negative potential on conductor RS3 serves to reset the following circuits if those circuits are not already in the reset condition: the read out distributor is reset to the first stage, the route selector flip-flop, the read out flip-flop, the connect demand flip-flop, the seize signal control flip-flop, the monostable circuit comprising transistors 4920, 4921, and 4922, the "no acknowledgement" flip-flop, the all trunks busy flip-flop, and the digit gate control flip-flop. In addition, a negative pulse is coupled through capacitor 4923 to trigger the monostable circuit comprising transistors 4904 and 4905 so that a negative pulse is applied to reset conductor ESRS to reset the read in distributor to the first stage. It is to be noted that negative potential is applied to conductor RS3 for a longer period than negative potential is applied to conductor ESRS so that the connect demand flip-flop circuit is not triggered by the negative potential on conductor ESRS. A negative pulse is also coupled through capacitor 5130 and diode 5131 to trigger the monostable circuit comprising transistors 5132 and 5133 to the condition in which 5133 is non-conductive and 5132 is conductive. When this monostable circuit reverts to its original condition after approximately twenty-five milliseconds, a positive pulse is coupled through capacitor 5134 and diode 5135 and a negative pulse appears at the collector of transistor 5122 to reset the cancel flip-flop and the receive control flip-flop circuits. The positive pulse applied to conductor RS2 serves to reset the digit register flip-flop circuits and the send control flip-flop circuits. Thus, the register sender is completely reset and is in readiness to handle another call.

It is to be noted that the monostable circuit comprising transistors 5127 and 5128 can be triggered to completely reset the register sender by the application of negative potential to either conductor cancel or conductor RR. It will be recalled that negative potential is applied to conductor cancel whenever the attendant operates the cancel key provided in the position circuit. It will also be recalled that negative potential is applied to the conductor RR whenever the attendant operates the forward release key provided at the position circuit.

The normal operation of the register sender in extending a connection to and through other long distance switching centers has just been described. The operation of the register sender when certain abnormal conditions are encountered will now be described. First assume that all of the line terminating units corresponding to the first digit registered in the register sender are busy and the route selector, therefore, applies ground potential to the all trunks busy conductor ATB. It will be recalled that the read out flip-flop circuit in the register sender is operated at this time so that negative potential is applied to conductor RO and thus to the base of transistor 4924. When ground potential is applied to conductor ATB and thus to the emitter of transistor 4924, transistor 4924 becomes conductive and the all trunks busy flip-flop circuit is triggered to the condition in which transistor 4926 is conductive and transistor 4925 is non-conductive. When transistor 4926 becomes conductive, the positive-going potential swing at its collector is coupled through diodes 4927 and 5039 to reset the connect demand and read out flip-flop circuits, respectively. Thus, negative potential is removed from the register connect demand conductor RCD11 and from the read out conductor RO. Also, the gate comprising diodes 5009 and 5011 is closed to remove digit marking from cable DM. When transistor 4925 of the all trunks busy flip-flop circuit becomes non-conductive, a negative pulse is coupled through capacitor 4928 and diode 4929 to trigger the "no acknowledgment" flip-flop circuit to the condition in which transistor 4931 is conductive. When transistor 4930 becomes non-conductive, the emitter of emitter follower transistor 5040 goes negative and transistor 5041 is rendered conductive to illuminate the "no acknowledgment" lamp. Since all of the digit lamps 1–N are illuminated at this time, the attendant is informed that no digits have been sent. The attendant then operates the cancel key to reset the register sender.

Next assume that an incorrect digit acknowledgment is received from one of the register senders along the desired route. Under these conditions, transistor 5115 remains non-conductive and when the monostable circuit comprising transistors 5117 and 5118 reverts to the condition in which transistor 5118 is conductive, the cancel flip-flop circuit is triggered to the condition in which transistor 5109 is conductive and transistor 5110 is nonconductive. When transistor 5109 becomes conductive, ground potential is applied to the anode terminals of the inhibiting diodes corresponding to 5108 associated with the digit designation frequency amplifiers and the transmission of digit designation signals is thereby terminated. When transistor 5110 becomes non-conductive, negative potential is applied to the anode terminals of inhibiting diodes 5136 and 5137 and the voice frequency cancel signal frequencies UY are applied to send conductors SD4. When transistor 5110 becomes non-conductive, the monostable circuit comprising transistors 5132 and 5133 is triggered to the condition in which 5132 is conductive and 5133 is non-conductive. After approximately twenty-five milliseconds, the monostable circuit reverts to the condition in which transistor 5133 is conductive and a positive pulse is coupled through capacitor 5134 and diode 5135 to the base of transistor 5122. The resulting negative pulse at the collector of transistor 5122 serves to reset the cancel flip-flop circuit and the receive control flip-flop circuits. Thus, it can be seen that whenever an incorrect digit acknowledgment signal is received, a cancel signal is automatically transmitted for twenty-five milliseconds and the digit designation frequencies are then retransmitted.

It will be recalled that when negative potential is applied to read out conductor RO by the register sender responsive to the operation of the end of selection key by the attendant, the monostable circuit comprising transistors 4920, 4921, and 4922 is triggered to begin the measurement of a ten-second timing interval. If no acknowledgment signal is received from one of the incoming registers along the route, or if an incorrect acknowledgment signal is repeatedly received from one of the incoming registers, or if for any other reason the call is not completed within ten seconds, the monostable circuit reverts to the condition in which transistor 4922 is conductive and the "no acknowledgment" flip-flop circuit is triggered to the condition in which transistor 4930 is non-conductive. As previously described, when transistor 4930 becomes non-conductive, transistor 5041 becomes conductive and the "no acknowledgment" lamp is illuminated. The attendant can ascertain from the condition of the digit lamps of Figs. 47 and 48 in which office trouble was encountered and the attendant can then listen in on the connection to determine if an all trunks busy message is being transmitted from that office.

The illustrated register sender can also be used to control the extension of calls to local offices accessible to the illustrated long distance switching center. This feature is provided so that when trunk lines or radio links normally interconnecting local offices served by the same long distance switching center are out of service or are all busy, calls between the local offices can be routed through the long distance switching center. Under these conditions, the attendant at the calling local office places a call to the long distance switching center and is automatically connected to the attendant's position in that center, as previously described. In accordance with oral instructions received over the connection from the local office, the attendant at the long distance switching center then keys the prefix digit "1" followed by the digit corresponding to the desired local office into the register sender. To illustrate the operation, assume that the attendant keys the digit "1" into the register sender by the application of negative potential to conductors KS1 and KS2. When negative potential is removed from conductors KS1 and KS2, the V and W stage flip-flop circuits of the first digit register are triggered to the condition in which the transistors corresponding to 4604 are conductive. Assume that the attendant then keys the digit "4" into the second digit register so that the V and Y stage flip-flop circuits of the second digit register are triggered to the condition in which the transistors corresponding to 4604 are conductive. The attendant then operates the end of selection key to trigger the connect demand flip-flop circuit to the condition in which transistor 4910 is conductive, all as previously described. When transistor 4911 of the connect demand flip-flop circuit becomes non-conductive, negative potential is applied to the anode terminal of diode 4617 in the base circuit of transistor 4618 in stage 1 of the binary to decimal converter 1 and since the base of transistor 4618 is returned to negative potential at the collector of the non-conducting transistor corresponding to 4603 in the W-stage and the emitter of transistor 4618 is returned to ground potential at the collector of conducting transistor 4604 in the V-stage of the first digit register, transistor 4618 is rendered conductive. When transistor 4618 becomes conductive, ground potential is coupled through diode 4626 to advance the read in distributor to stage 2 and thus extinguish lamp 1. When transistor 4618 becomes conductive, a positive pulse is coupled through capacitor 5044 to trigger the route selector flip-flop circuit to the condition in which transistor 5014 is conductive and transistor 5013 is non-conductive. Under these conditions, negative potential is applied to the anode terminal of diode 5012 and when the read out flip-flop circuit is triggered responsive to the seizure of the illustrated register sender by the register finder, a negative output is realized from the "and" gate comprising diodes 5010 and 5012. Thus, negative potential is applied to the anode terminals of the diodes corresponding to 4617 in the ten stages of the binary to decimal converter 2 and the decimal representation of the binary digit stored in the second digit register is applied to the corresponding one of the conductors of the local digit marking cable LDM. Thus, the route selector is controlled to select an idle line terminating unit terminating a trunk line or radio link to the desired local office. The long distance switching center attendant then orally instructs the attendant at the called local office over the extended connection as to the number of the desired called party.

While there has been shown and described what is at present considered to be the preferred embodiment of the invention, modifications thereto will readily occur to those skilled in the art. It is not desired, therefore, that the invention be limited to the arrangement shown and described, and it is intended in the appended claims to cover all such modifications as fall within the true spirit and scope of the invention.

What is claimed is:

1. In a telephone system, a first office comprising a register sender, a second office comprising switching equipment for extending connections, means in said register sender for selectively transmitting one of a plurality of selecting signals individually representing different numerical digital values to said second office, registering means in said second office for registering the numerical digital value represented by the received selecting signal, means in said second office for transmitting a different acknowledgment signal to said register sender for each selecting signal received, means in said register sender for transmitting a seize signal to said second office only if the acknowledgment signal received from the second office is correct for the selecting signal transmitted to the second office, and means in said second office responsive to the receipt of said seize signal for controlling said switching equipment to extend the connection in accordance with the numerical digital value registered in said registering means.

2. The system of claim 1 including means in said register sender responsive to the receipt of an incorrect acknowledgment signal for the transmitted selecting signal for transmitting a cancel signal to said second office, means in said second office responsive to the receipt of a cancel signal for canceling the numerical digital value registered by said registering means, and means in said register sender for then retransmitting said one selecting signal to said second office.

3. In a telephone system, a first office comprising a register sender, a second office comprising switching equipment for extending connections, means in said register sender for selectively transmitting one of a plurality of selecting signals individually representing different numerical digital values to said second office, each of said selecting signals comprising at least two voice frequency signals, registering means in said second office for registering the numerical digital value represented by the received selecting signal, means in said second office for transmitting a different acknowledgment signal to said register sender for each selecting signal received, each of said acknowledgment signals comprising at least two voice frequency signals and at least one of the voice frequency signals comprising each acknowledgment signal being of a different frequency than the voice frequency signals comprising the corresponding selecting signal, means in said register sender for transmitting a seize signal to said second office only if the acknowledgment signal received from the second office is correct for the selecting signal transmitted to the second office, and means in said second office responsive to the receipt of said seize signal for controlling said switching equipment to extend the connection in accordance with the numerical digital value registered in said registering means.

4. In a telephone system, a first office comprising a register sender, a second office comprising switching equipment for extending connections, means in said register sender for selectively transmitting one of a plurality of selecting signals individually representing different numerical digital values to said second office, registering means in said second office for registering the numerical digital value represented by the received selecting signal, means in said second office responsive to the receipt of a selecting signal for transmitting a selecting acknowledgment signal to said register sender, means in said register sender responsive to the receipt of a selecting acknowledgment signal for discontinuing the transmission of said one selecting signal, means in said register sender for then transmitting a seize signal to said second office, and means in said second office responsive to the receipt of said seize signal for controlling said switching equipment to extend the connection in accordance with the numerical digital value registered by said registering means.

5. In a telephone system, a first office comprising a register sender, a second office comprising an incoming register and switching equipment for extending connections, means in said register sender for transmitting a first seize signal to said incoming register, means in said incoming register for transmitting a seize acknowledge signal to said register sender responsive to the receipt of said first seize signal, means in said register sender responsive to the receipt of said seize acknowledge signal for selectively transmitting one of a plurality of selecting signals individually representing different numerical digital values to said incoming register, means in said incoming register for registering the numerical digital value represented by the received selecting signal, means in said incoming register for transmitting a different selecting acknowledgment signal to said register sender for each selecting signal received, means in said register sender for transmitting a second seize signal to said incoming register only if the selecting acknowledgment signal received from said incoming register is correct for the selecting signal transmitted to said incoming register, and means in said incoming register responsive to the receipt of said second seize signal for controlling said switching equipment to extend the connection in accordance with the numerical digital value registered in said incoming register.

6. The system of claim 5 including means in said register sender responsive to the receipt of an incorrect acknowledgment signal for the transmitted selecting signal for transmitting a cancel signal to said incoming register, means in said incoming register responsive to the receipt of a cancel signal for canceling the numerical digital value registered by said incoming register, and means in said register sender for then retransmitting said one seelcting signal to said incoming register.

7. In a telephone system, a first office comprising a register sender, a second office comprising an incoming register and switching equipment for extending connections, means in said register sender for transmitting a first seize signal to said incoming register, means in said incoming register for transmitting a seize acknowledge signal to said register sender responsive to the receipt of said first seize signal, means in said register sender responsive to the receipt of said seize acknowledge signal for discontinuing the transmission of said seize signal, means in said register sender for then selectively transmitting one of a plurality of selecting signals individually representing different numerical digital values to said incoming register, means in said incoming register for registering the numerical digital value represented by the received selecting signal, means in said incoming register responsive to the receipt of a selecting signal for transmitting a selecting acknowledgment signal to said register sender, means in said register sender responsive to the receipt of a selecting acknowledgment signal for discontinuing the transmission of said one selecting signal, means in said register sender for then transmitting a second seize signal to said incoming register, and means in said incoming register responsive to the receipt of said second seize signal for controlling said switching equipment to extend the connection in accordance with the numerical digital value registered in said incoming register.

8. In a telephone system, first, second, and third offices, a register sender in said first office, an incoming register in said second office, means for storing first and second digit designations corresponding to said second and third offices, respectively, in said register sender, means in said first office controlled in accordance with said stored first digit designation for extending a connection to said second office, means in said register sender for transmitting a seized signal over said extended connection, means in said second office responsive to the receipt of said seize signal for connecting said incoming register to said extended connection, means in said incoming register for transmitting a seize acknowledge signal over said extended connection when said incoming register is connected thereto, means in said register sender responsive to the receipt of said seize acknowledge signal for transmitting a digit identifying signal corresponding to said second digit designation over said extended connection, means in said incoming register responsive to the receipt of said digit identifying signal for storing said second digit designation, means in said incoming register for then transmitting a digit dentifying acknowledgment signal corresponding to said second digit designation over said extended connection, means in said register sender responsive to the receipt of said digit identifying acknowledgment signal for transmitting a second seize signal over said extended connection, and means in said second office responsive to the receipt of said second seize signal by said incoming register and controlled in accordance with the digit designation stored in said incoming register for further extending the connection to said third office.

9. In a telephone system, first, second, and third offices, a register sender in said first office, an incoming register in said second office, means for storing first and second digit designations corresponding to said second and third offices, respectively, in said register sender, means in said first office controlled in accordance with said stored first digit designation for extending a connection to said second office, means in said register sender for transmitting a seize signal over said extended connection, means in said second office responsive to the receipt of said seize signal for connecting said incoming register to said extended connection, means in said incoming register for transmitting a seize acknowledge signal over said extended connection when said incoming register is connected thereto, means in said register sender responsive to the receipt of said seize acknowledge signal for discontinuing the transmission of said seize signal and for then transmitting a digit identifying signal corresponding to said second digit designation over said extended connection, means in said incoming register responsive to the receipt of said digit identifying signal for storing said second digit designation, means in said incoming register responsive to the receipt of a digit identifying signal for transmitting a digit acknowledgment signal over said extended connection, means in said register sender responsive to the receipt of said digit acknowledgment signal for discontinuing the transmission of said digit identifying signal and for then transmitting a second seize signal over said extended connection, and means in said second office responsive to the receipt of said second seize signal by said incoming register and controlled in accordance with the digit designation stored in said incoming register for further extending the connection to said third office.

10. In a telephone system, first, second, and third offices, a register sender in said first office, first and second incoming registers in said second and third offices, respectively, means for storing first and second digit designations corresponding to said second and third offices, respectively, in said register sender, means in said first office controlled in accordance with the first digit designation stored in said register sender for extending a connection to said second office, means in said register sender for transmitting a seize signal over said extended connection, means in said second office responsive to the receipt of said seize signal for connecting said first incoming register to the extended connection, means in said first incoming register for transmitting a seize acknowledge signal over said extended connection when said first incoming register is connected thereto, means in said register sender responsive to the receipt of said seize acknowledge signal for transmitting a digit identifying signal corresponding to said second digit designation over said extended connection, means in said first incoming register responsive to the receipt of said digit identifying signal for storing said second digit designation, means in said first incoming register for then transmitting a digit identifying acknowledgment signal corresponding to said second digit designation over said extended connection, means in said register sender responsive to the receipt of said digit identifying acknowledgment signal for transmitting a second seize signal over said extended connection, means in said first incoming register responsive to the receipt of said second seize signal for controlling the further extension of said connection to said third office in accordance with the digit designation stored in said first incoming register, means for disconnecting said first incoming register from said extended connection when said connection is further extended, and means in said third office responsive to the receipt of said second seize signal for connecting said second incoming register to said further extended connection.

11. In a telephone system, first, second, and third offices, a register sender in said first office, first and second incoming registers in said second and third offices, respectively, means for storing first and second digit designations corresponding to said second and third offices, respectively, in said register sender, means in said first office controlled in accordance with the first digit designation stored in said register sender for extending a connection to said second office, means in said register sender for transmitting a seize signal over said extended connection, means in said second office responsive to the receipt of said seize signal for connecting said first incoming register to the extended connection, means in said first incoming register for transmitting a seize acknowledge signal over said extended connection when said first incoming register is connected thereto, means in said register sender responsive to the receipt of said seize acknowledge signal for terminating the transmission of said seize signal and for then transmitting a digit identifying signal corresponding to said second digit designation over said extended connection, means in said first incoming register responsive to the receipt of said digit identifying signal for storing said second digit designation, means in said first incoming register responsive to the receipt of a digit identifying signal for transmitting a digit acknowledgment signal over said extended connection, means in said register sender responsive to the receipt of said digit acknowledgment signal for discontinuing the transmission of said digit identifying signal and for then transmitting a second seize signal over said extended connection, means in said first incoming register responsive to the receipt of said second seize signal for controlling the further extension of said connection to said third office in accordance with the digit designation stored in said first incoming register, means for disconnecting said first incoming register from said extended connection when said connection is further extended, and means in said third office responsive to the receipt of said second seize signal for connecting said second incoming register to said further extended connection.

12. In a telephone system, first, second, and third offices, a register sender in said first office, an incoming register in said second office, means for extending a connection from said register sender to said second office, means in said register sender for transmitting a first seize signal to said second office over the extended connection, means in said second office responsive to the receipt of said first seize signal for connecting said incoming register to the extended connection, means in said incoming register for transmitting a seize acknowledge signal over the extended connection when said incoming register is connected thereto, means in said register sender responsive to the receipt of said seize acknowledge signal for transmitting a selecting signal representing the numerical digital value corresponding to said third office over the extended connection, registering means in said incoming register for registering the numerical digital value represented by the received selecting signal, means in said incoming register for transmitting a different selecting acknowledgment signal over the extended connection for each selecting signal received, means in said register sender for transmitting a second seize signal over the extended connection only if the selecting acknowledgment signal received from said incoming register is correct for the selecting signal transmitted by said register sender, and means in said incoming register responsive to the receipt of said second seize signal for controlling the further extension of said connection to said third office.

13. The system of claim 12 including means in said register sender for transmitting a cancel signal over the extended connection if the selecting acknowledgment signal received from said incoming register is incorrect for the selecting signal transmitted by said register sender, means in said incoming register responsive to the receipt of a cancel signal for canceling the numerical digital value registered by said registering means, and means in said register sender for then retransmitting said selecting signal over the extended connection.

14. In a telephone system, first, second, and third offices, a register sender in said first office, first and second incoming registers in said second and third offices, respectively, means for extending a connection from said register sender to said second office, means in said register sender for transmitting a first seize signal to said second office over the extended connection, means in said second office responsive to the receipt of said first seize signal for connecting said first incoming register to the extended connection, means in said first incoming register for transmitting a seize acknowledge signal over the extended connection when said first incoming register is connected thereto, means in said register sender responsive to the receipt of said seize acknowledge signal for transmitting a selecting signal representing the numerical digital value corresponding to said third office over the extended connection, registering means in said first incoming register for registering the numerical digital value represented by the received selecting signal, means in said first incoming register for transmitting a different selecting acknowledgment signal over the extended connection for each selecting signal received, means in said register sender for transmitting a second seize signal over the extended connection only if the selecting acknowledgment signal received from said first incoming register is correct for the selecting signal transmitted by said register sender, means in said first incoming register responsive to the receipt of said second seize signal for controlling the further extension of said connection to said third office, means for disconnecting said first incoming register from the extended connection when said connection is further extended, and means in said third office responsive to the receipt of said second seize signal for connecting said second incoming register to the further extended connection.

15. The system of claim 14 including means in said register sender for transmitting a cancel signal over the extended connection if the selecting acknowledgment signal received from said first incoming register is incorrect for the selecting signal transmitted by said register sender, means in said first incoming register responsive to the receipt of a cancel signal for canceling the numerical digital value registered by said registering means, and means in said register sender for then retransmitting said selecting signal over the extended connection.

16. In a telephone system, first, second, and third offices, a register sender in said first office, an incoming register in said second office, means for extending a connection from said register sender to said second office, means in said register sender for transmitting a first seize signal to said second office over the extended connection, means in said second office responsive to the receipt of said first seize signal for connecting said incoming register to the extended connection, means in said incoming register for transmitting a seize acknowledge signal over the extended connection when said incoming register is connected thereto, means in said register sender responsive to the receipt of said seize acknowledge signal for discontinuing the transmission of said first seize signal, means in said register sender for then transmitting a selecting signal representing the numerical digital value corresponding to said third office over the extended connection, registering means in said incoming register for registering the numerical digital value represented by the received selecting signal, means in said incoming register for transmitting a different selecting acknowledgment signal over the extended connection for each selecting signal received, means in said register sender responsive to the receipt of a selecting acknowledgment signal for discontinuing the transmission of said selecting signal, means in said register sender for transmitting a second seize signal over the extended connection only if the selecting acknowledgment signal received from said incoming register is correct for the selecting signal transmitted by said register sender, and means in said incoming register responsive to the receipt of said second seize signal for controlling the further extension of said connection to said third office.

17. The system of claim 16 including means in said register sender for transmitting a cancel signal over the extended connection if the selecting acknowledgment signal received from said incoming register is incorrect for the selecting signal transmitted by said register sender, means in said incoming register responsive to the receipt of a cancel signal for canceling the numerical digital value registered by said registering means, and means in said register sender for then retransmitting said selecting signal over the extended connection.

18. In a telephone system, first, second, and third offices, a register sender in said first office, first and second incoming registers in said second and third offices, respectively, means for extending a connection from said register sender to said second office, means in said register sender for transmitting a first seize signal to said second office over the extended connection, means in said second office responsive to the receipt of said first seize signal for connecting said first incoming register to the extended connection, means in said first incoming register for transmitting a seize acknowledge signal over the extended connection when said first incoming register is connected thereto, means in said register sender responsive to the receipt of said seize acknowledge signal for discontinuing the transmission of said first seize signal, means in said register sender for then transmitting a selecting signal representing the numerical digital value corresponding to said third office over the extended connection, means in said first incoming register for registering the numerical digital value represented by the received selecting signal, means in said first incoming register for transmitting a different selecting acknowledgment signal over the extended connection for each selecting signal received, means in said register sender responsive to the receipt of a selecting acknowledgment signal for discontinuing the transmission of said selecting signal, means in said register sender for transmitting a second seize signal over the extended connection only if the selecting acknowledgment signal received from said first incoming register is correct for the selecting signal transmitted by said register sender, means in said first incoming register responsive to the receipt of said second seize signal for controlling the further extension of said connection to said third office, means for disconnecting said first incoming register from the extended connection when said connection is further extended, and means in said third office responsive to the receipt of said second seize signal for connecting said second incoming register to the further extended connection.

19. The system of claim 18 including means in said register sender for transmitting a cancel signal over the extended connection if the selecting acknowledgment signal received from said first incoming register is incorrect for the selecting signal transmitted by said register sender, means in said first incoming register responsive to the receipt of a cancel signal for canceling the numerical digital value registered by said registering means, and means in said register sender for then retransmitting said selecting signal over the extended connection.

20. In a telephone system, a calling office, a called office, a plurality of tandem offices between said calling and called offices, means for extending a connection from said calling office to a first one of said tandem offices, means in said calling office for transmitting, one at a time, selecting signals individually representing the numerical digital value corresponding to the next succeeding office to each of said tandem offices in turn, registering means in each tandem office for registering the numerical value represented by the selecting signal received by that office, means in each tandem office for transmitting a different acknowledgment signal to said calling office for each selecting signal received, and means in said calling office for controlling each tandem office in turn to extend the connection to the next succeeding office in accordance with the numerical value registered by the registering means in that tandem office only if the acknowledgment signal received from that tandem office is correct for the particular selecting signal transmitted to that office.

21. In a telephone system, a first office comprising a register sender, a second office comprising a plurality of terminating units, an incoming register, and switching equipment, a transmission medium interconnecting said first and second offices and terminating in one of said units at said second office, a transmission highway network of the time division channel type interconnecting said units and said incoming register in said second office, means in said register sender for transmitting a first seize signal over said transmission medium, means in said second office responsive to the receipt of said first seize signal for assigning an idle one of said time division channels to said one unit and to said incoming register, means in said incoming register for transmitting a seize acknowledge signal over the assigned channel to said one unit and thus over the transmission medium to said register sender, means in said register sender responsive to the receipt of said seize acknowledge signal for transmitting a digit designation selecting signal representing a second one of said units over said transmission medium and the assigned channel to said incoming register, means in said incoming register for registering the numerical digital value represented by the received selecting signal, means in said register sender for transmitting a second seize signal to said incoming register, means in said incoming register responsive to the receipt of a second seize signal for controlling said switching equipment to seize said second unit in accordance with the digital value registered in said incoming register, means for assigning the channel assigned to said first unit and to said incoming register to said second unit, and means for disconnecting said incoming register from the assigned channel when said second unit is connected thereto.

22. The system of claim 21 including means in said incoming register for transmitting a digit acknowledgment signal to said register sender responsive to the receipt of a digit designation signal, means in said register sender responsive to the receipt of a digit acknowledgment signal for terminating the transmission of said digit designation signal, and said means for transmitting a second seize signal being effective only after the transmission of said digit designation signal is terminated.

23. The system of claim 21 including means in said incoming register for transmitting a different digit acknowledgment signal to said register sender for each selecting signal received, and means in said register sender for transmitting a second seize signal to said incoming register only if the digit acknowledgment signal received from said incoming register is correct for the digit designation signal transmitted to said incoming register.

24. The system of claim 23 including means in said register sender responsive to the receipt of an incorrect digit acknowledgment signal for the transmitted digit designation signal for transmitting a cancel signal to said incoming register, means in said incoming register responsive to the receipt of a cancel signal for canceling the numerical digital value registered by said incoming register, and means in said register sender for then retransmitting the digit designation signal representing a second one of said units to said incoming register.

References Cited in the file of this patent

UNITED STATES PATENTS

| | | |
|---|---|---|
| 1,923,724 | Griffith | Aug. 22, 1933 |
| 1,936,200 | Locke et al. | Nov. 21, 1933 |
| 2,690,548 | Joel et al. | Sept. 28, 1954 |
| 2,828,362 | Darwin et al. | Mar. 25, 1958 |